Oct. 14, 1958     P. H. GIROUARD ET AL     2,855,828
RAPID FIRE GUN TURRET APPARATUS
Filed March 31, 1950                        94 Sheets-Sheet 1

INVENTORS
P. H. GIROUARD
A. J. STANTON
C. V. HICKMAN
D. WERTMAN
E. F. CAMPBELL

ATTYS

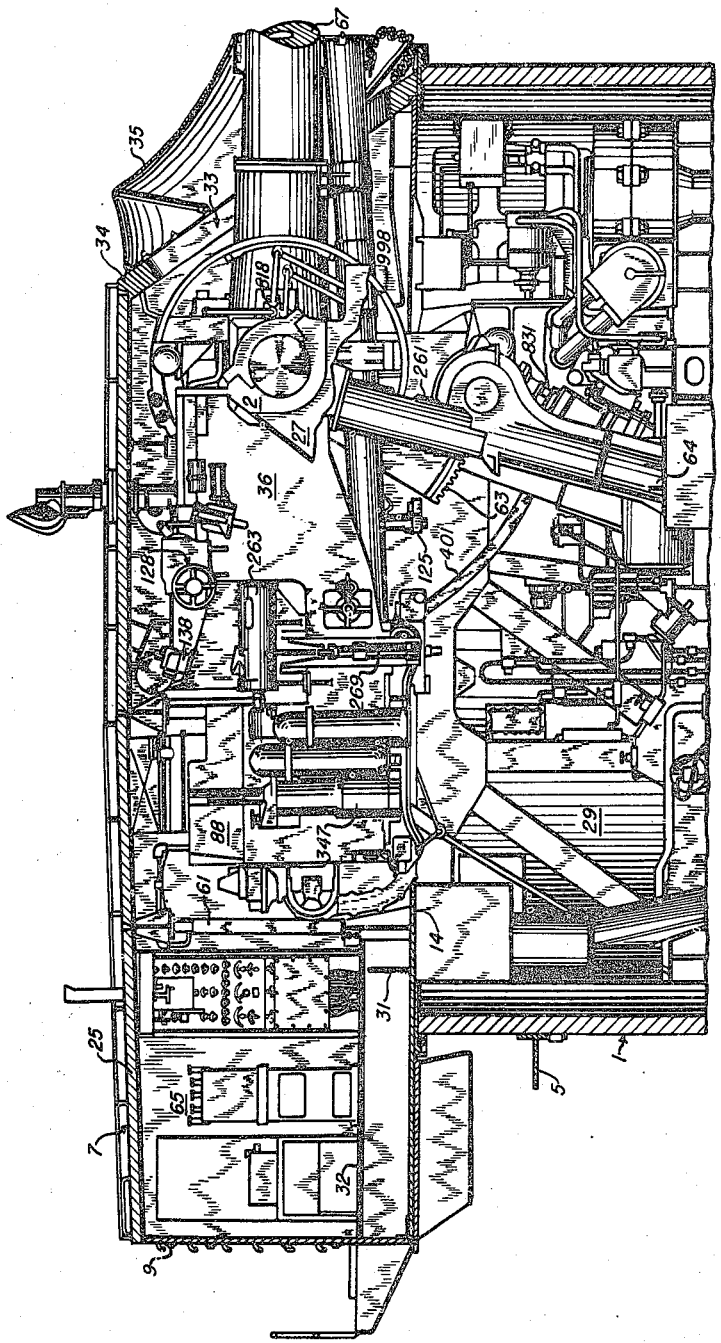

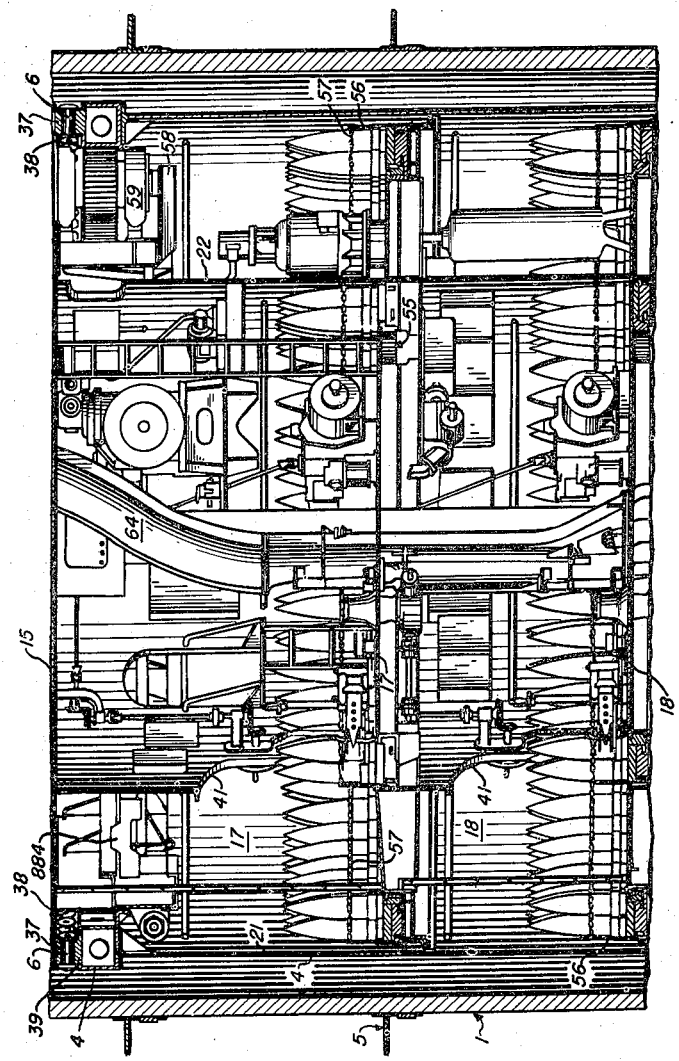

Oct. 14, 1958  P. H. GIROUARD ET AL  2,855,828
RAPID FIRE GUN TURRET APPARATUS
Filed March 31, 1950  94 Sheets-Sheet 6

INVENTORS
P. H. GIROUARD
A. J. STANTON
C. V. HICKMAN
D. WERTMAN
E. F. CAMPBELL
BY
ATTYS

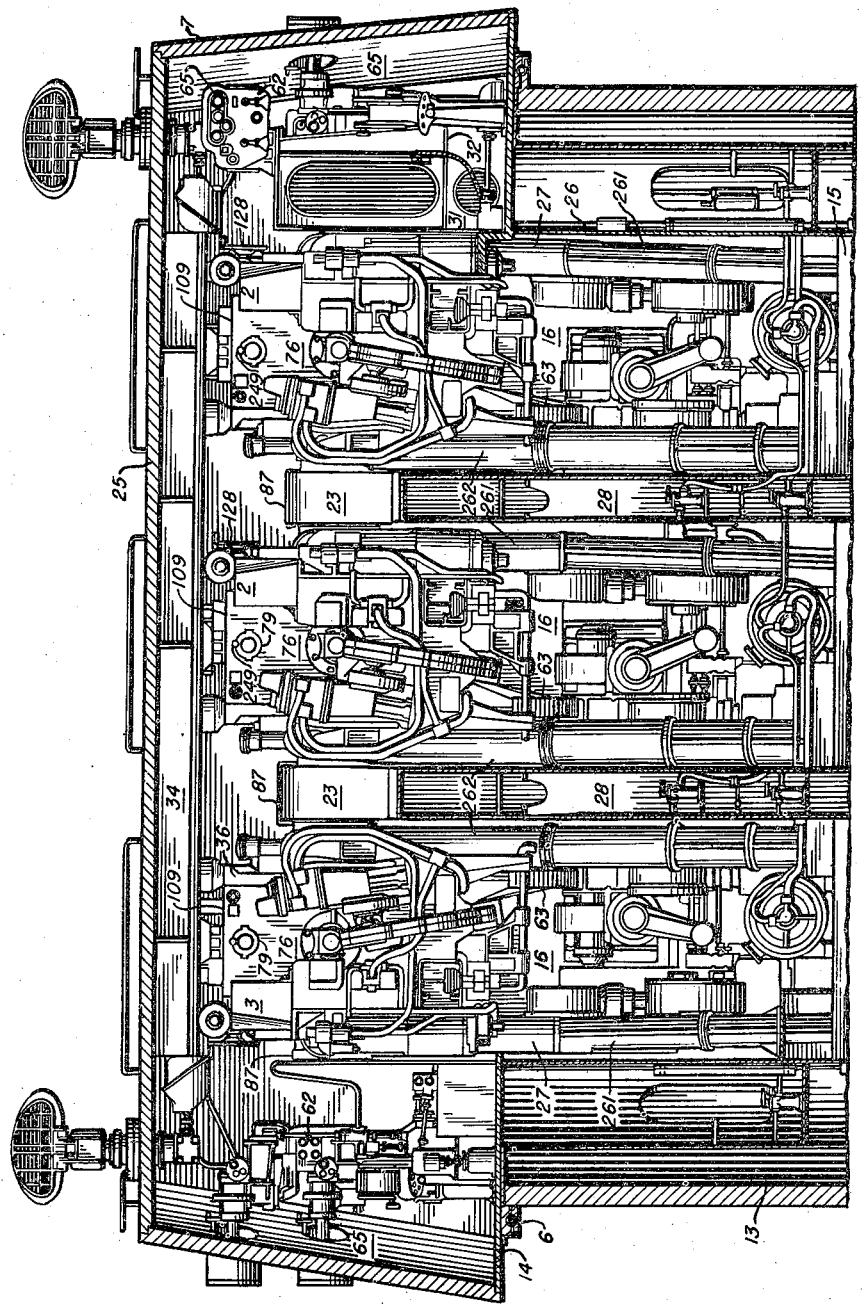

INVENTORS
P. H. GIROUARD
A. J. STANTON
C. V. HICKMAN
D. WERTMAN
E. F. CAMPBELL
ATTYS

Oct. 14, 1958  P. H. GIROUARD ET AL  2,855,828
RAPID FIRE GUN TURRET APPARATUS

Filed March 31, 1950  94 Sheets-Sheet 10

INVENTORS
P. H. GIROUARD
A. J. STANTON
C. V. HICKMAN
D. WERTMAN
E. F. CAMPBELL
BY
ATTYS

Oct. 14, 1958 P. H. GIROUARD ET AL 2,855,828
RAPID FIRE GUN TURRET APPARATUS
Filed March 31, 1950 94 Sheets-Sheet 11

INVENTORS
P. H. GIROUARD
A. J. STANTON
C. V. HICKMAN
D. WERTMAN
E. F. CAMPBELL
BY
ATTYS

Oct. 14, 1958  P. H. GIROUARD ET AL  2,855,828
RAPID FIRE GUN TURRET APPARATUS
Filed March 31, 1950  94 Sheets-Sheet 12

INVENTORS
P. H. GIROUARD
A. J. STANTON
C. V. HICKMAN
D. WERTMAN
E. F. CAMPBELL

BY

ATTYS

Oct. 14, 1958     P. H. GIROUARD ET AL     2,855,828
RAPID FIRE GUN TURRET APPARATUS

Filed March 31, 1950     94 Sheets—Sheet 13

INVENTORS
P. H. GIROUARD
A. J. STANTON
C. V. HICKMAN
D. WERTMAN
E. F. CAMPBELL

BY

ATTYS

Oct. 14, 1958  P. H. GIROUARD ET AL  2,855,828
RAPID FIRE GUN TURRET APPARATUS

Filed March 31, 1950  94 Sheets-Sheet 14

INVENTORS
P. H. GIROUARD
A. J. STANTON
C. V. HICKMAN
D. WERTMAN
E. F. CAMPBELL
BY
ATTYS

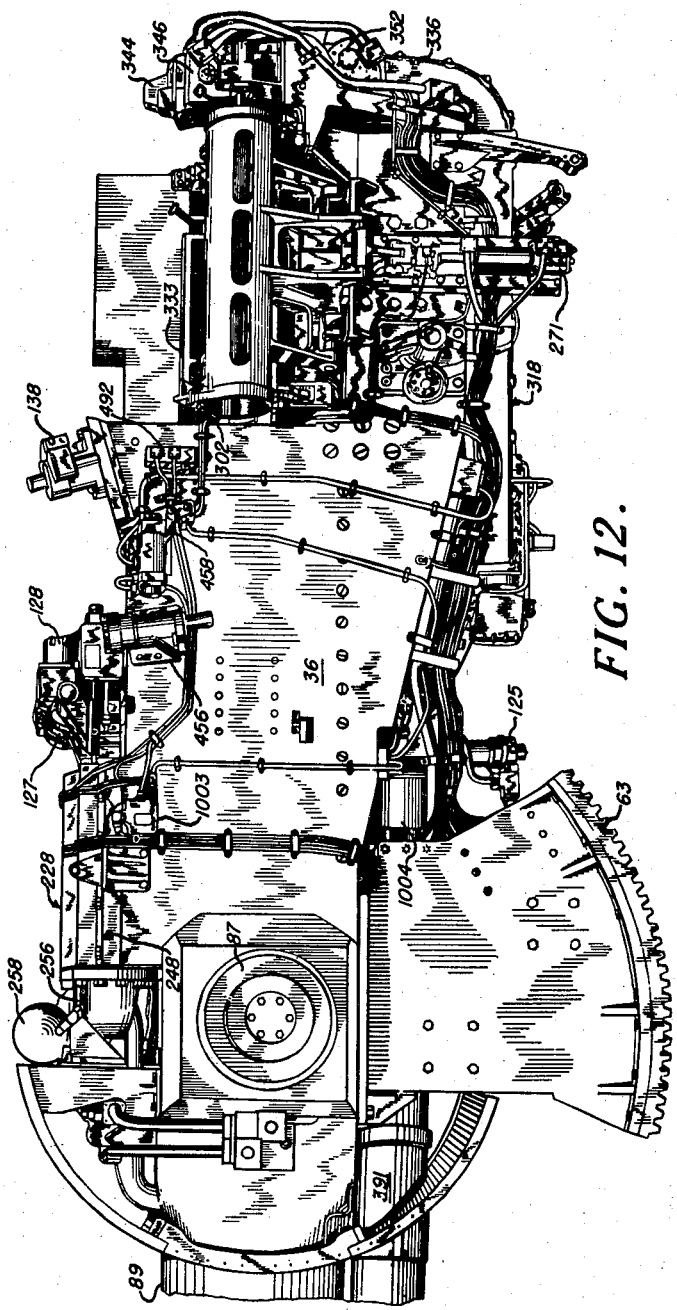

INVENTORS
P. H. GIROUARD
A. J. STANTON
C. V. HICKMAN
D. WERTMAN
E. F. CAMPBELL
ATTYS

INVENTORS
P. H. GIROUARD
A. J. STANTON
C. V. HICKMAN
D. WERTMAN
E. F. CAMPBELL
ATTYS

Oct. 14, 1958 P. H. GIROUARD ET AL 2,855,828
RAPID FIRE GUN TURRET APPARATUS
Filed March 31, 1950 94 Sheets-Sheet 18

INVENTORS
P. H. GIROUARD
A. J. STANTON
BY C. V. HICKMAN
D. WERTMAN
E. F. CAMPBELL
ATTYS

Oct. 14, 1958   P. H. GIROUARD ET AL   2,855,828
RAPID FIRE GUN TURRET APPARATUS
Filed March 31, 1950   94 Sheets-Sheet 19

INVENTORS
P. H. GIROUARD
A. J. STANTON
C. V. HICKMAN
D. WERTMAN
E. F. CAMPBELL

BY

ATTYS

Oct. 14, 1958   P. H. GIROUARD ET AL   2,855,828
RAPID FIRE GUN TURRET APPARATUS
Filed March 31, 1950   94 Sheets-Sheet 26

*INVENTORS*
P. H. GIROUARD
A. J. STANTON
C. V. HICKMAN
D. WERTMAN
E. F. CAMPBELL

BY

ATTYS

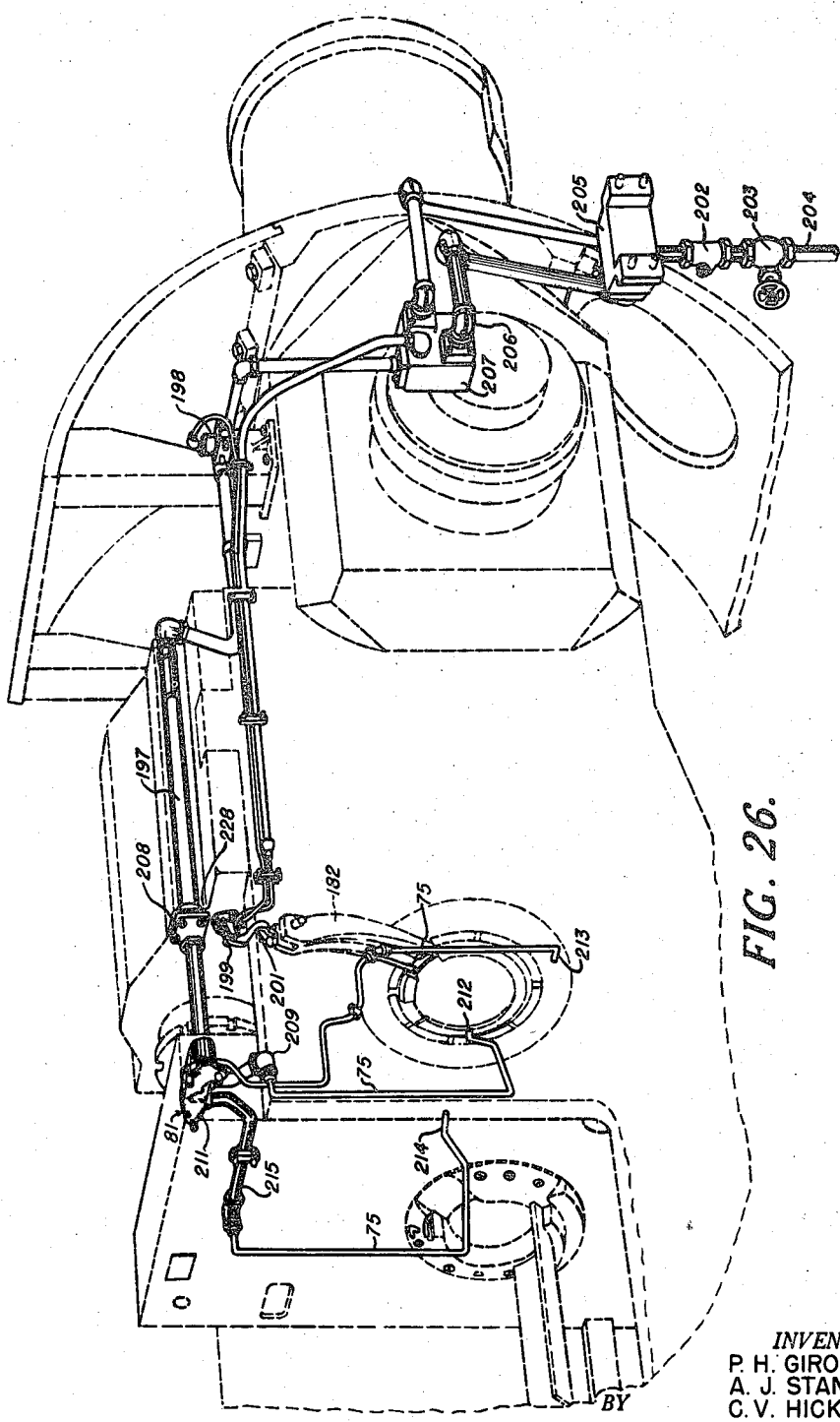

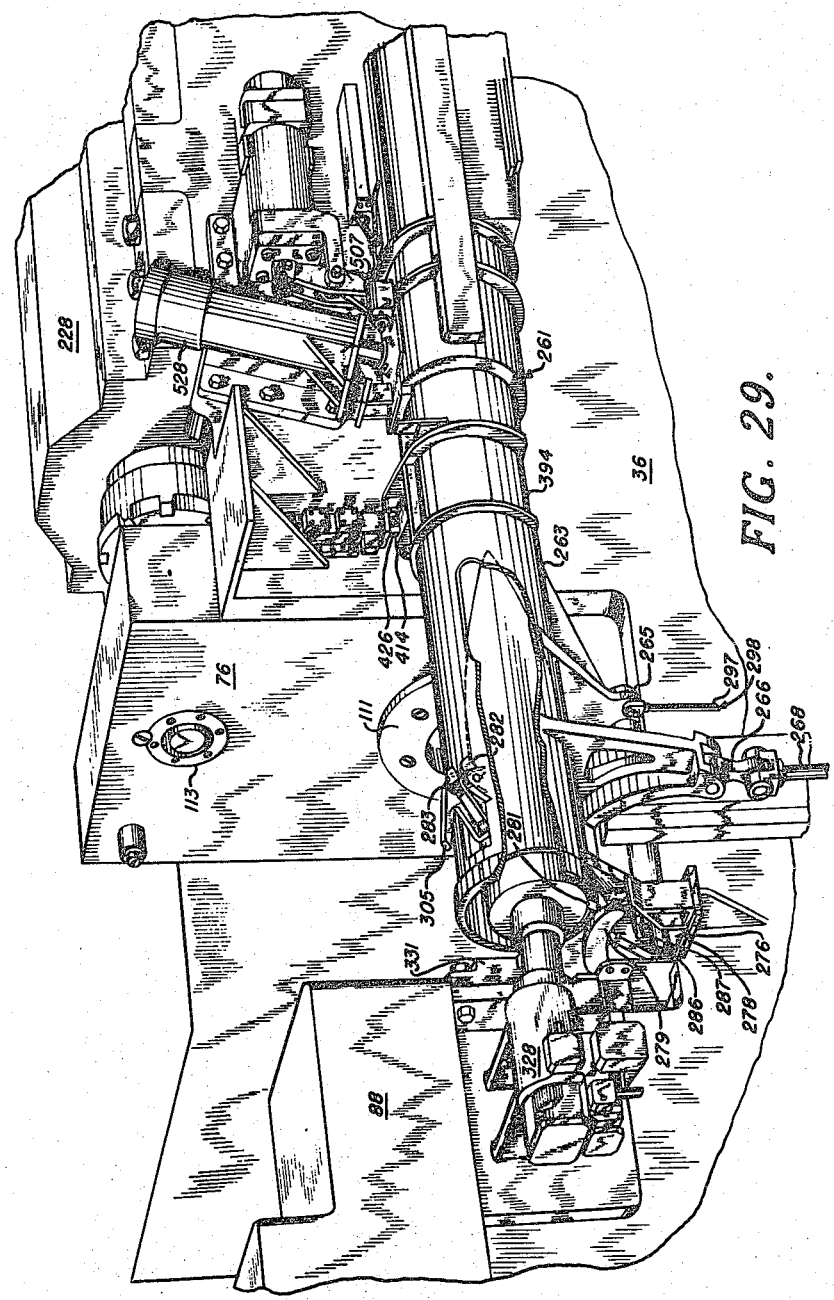

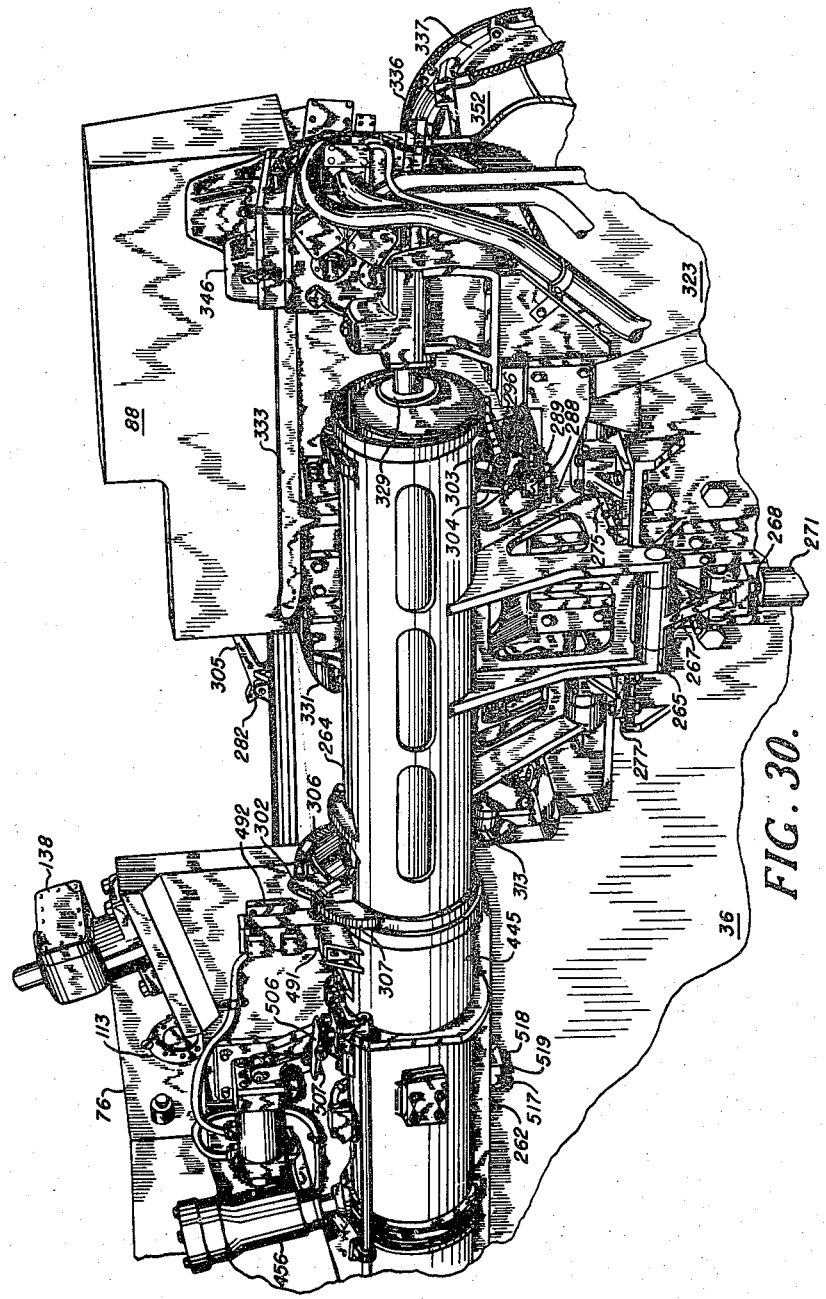

INVENTORS
P. H. GIROUARD
A. J. STANTON
C. V. HICKMAN
D. WERTMAN
E. F. CAMPBELL
ATTYS

INVENTORS
P. H. GIROUARD
A. J. STANTON
C. V. HICKMAN
D. WERTMAN
E. F. CAMPBELL
ATTYS

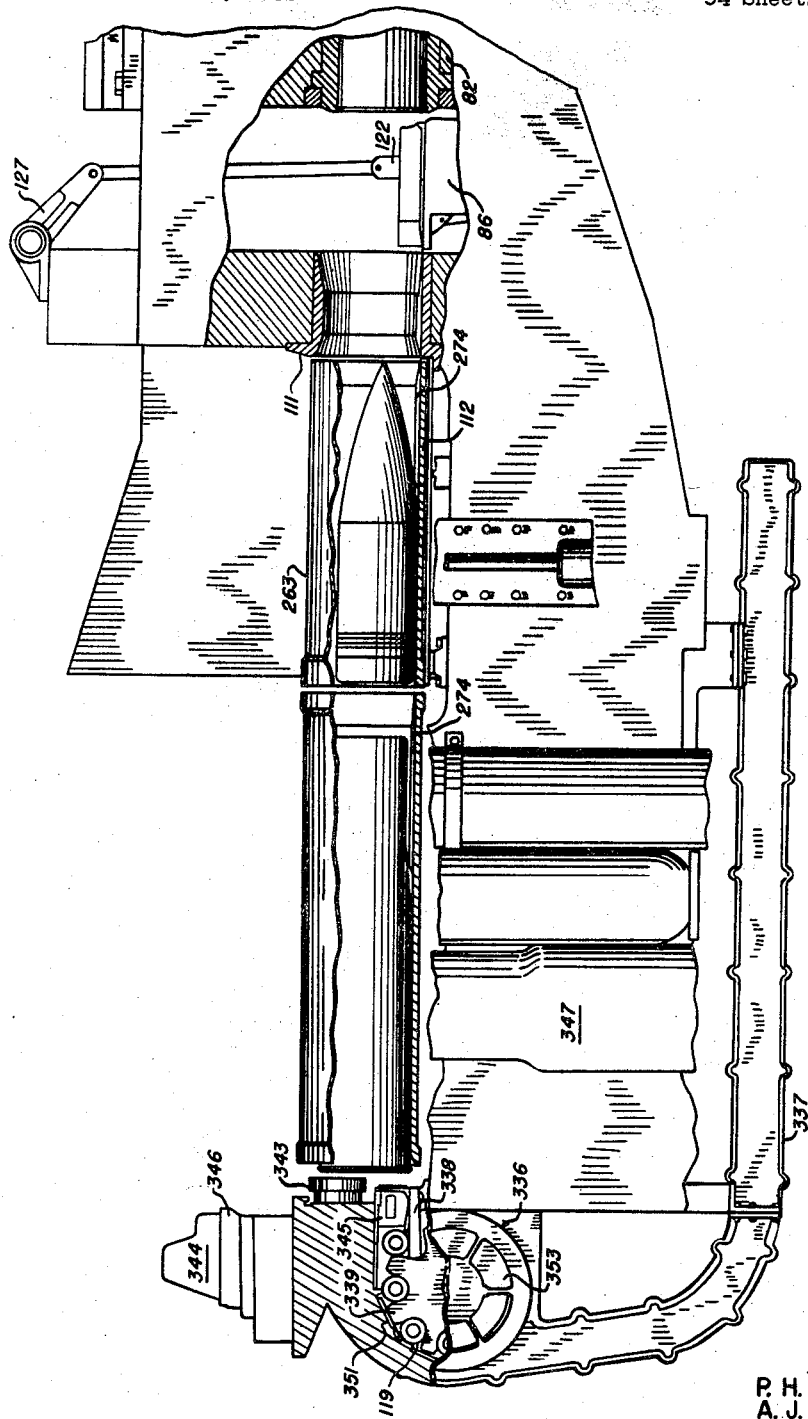

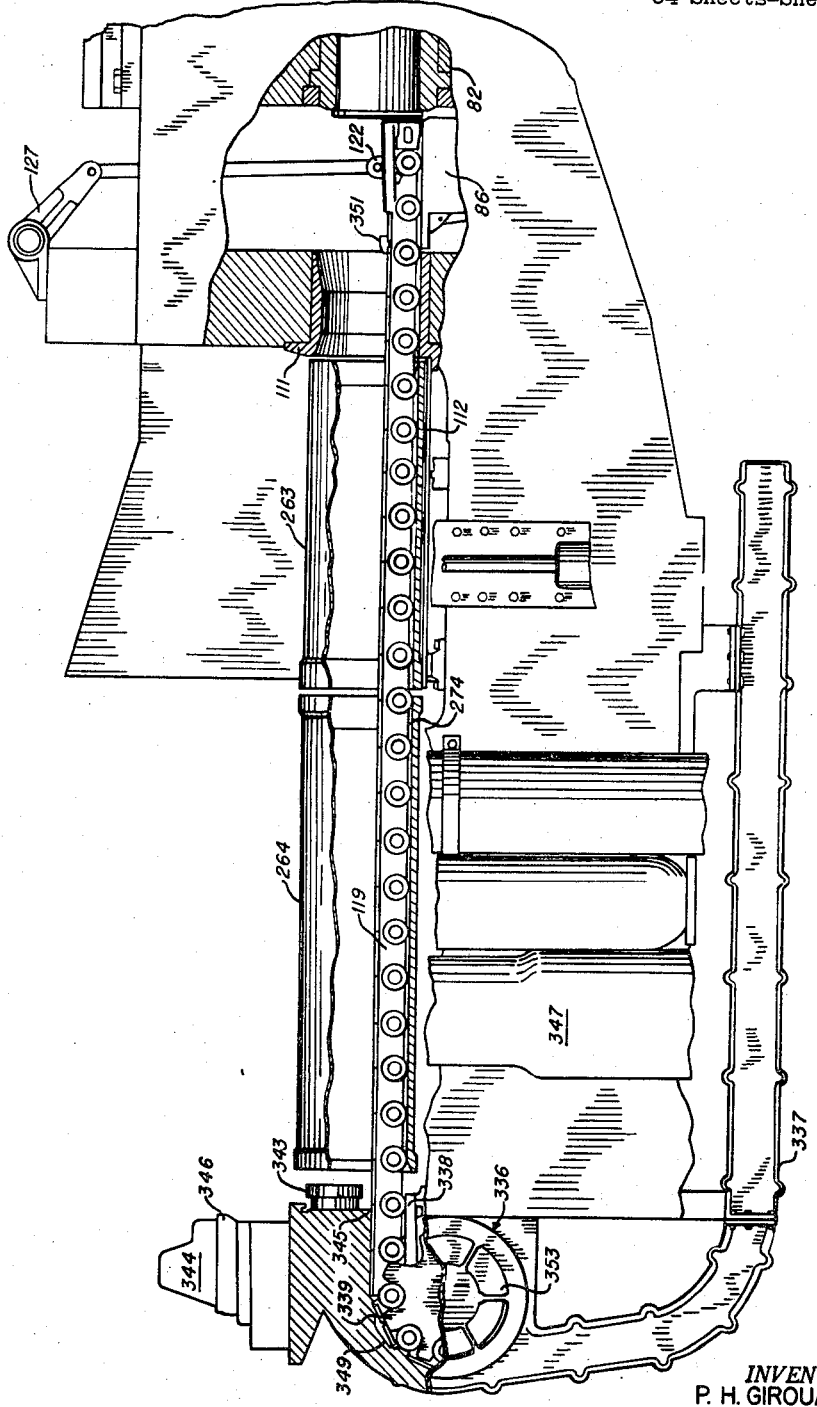

Oct. 14, 1958 P. H. GIROUARD ET AL 2,855,828
RAPID FIRE GUN TURRET APPARATUS
Filed March 31, 1950 94 Sheets-Sheet 37

INVENTORS
P. H. GIROUARD
A. J. STANTON
C. V. HICKMAN
D. WERTMAN
E. F. CAMPBELL
BY
ATTYS

INVENTORS
P. H. GIROUARD
A. J. STANTON
C. V. HICKMAN
D. WERTMAN
E. F. CAMPBELL

Oct. 14, 1958     P. H. GIROUARD ET AL     2,855,828
RAPID FIRE GUN TURRET APPARATUS

Filed March 31, 1950                               94 Sheets-Sheet 41

INVENTORS
P. H. GIROUARD
A. J. STANTON
C. V. HICKMAN
D. WERTMAN
E. F. CAMPBELL

BY

ATTYS

Oct. 14, 1958   P. H. GIROUARD ET AL   2,855,828
RAPID FIRE GUN TURRET APPARATUS

Filed March 31, 1950   94 Sheets-Sheet 42

INVENTORS
P. H. GIROUARD
A. J. STANTON
C. V. HICKMAN
D. WERTMAN
E. F. CAMPBELL

BY

ATTYS

INVENTORS
P. H. GIROUARD
A. J. STANTON
C. V. HICKMAN
D. WERTMAN
E. F. CAMPBELL

INVENTORS
P. H. GIROUARD
A. J. STANTON
C. V. HICKMAN
D. WERTMAN
E. F. CAMPBELL

Oct. 14, 1958    P. H. GIROUARD ET AL    2,855,828
RAPID FIRE GUN TURRET APPARATUS

Filed March 31, 1950    94 Sheets-Sheet 45

INVENTORS
P. H. GIROUARD
A. J. STANTON
C. V. HICKMAN
D. WERTMAN
E. F. CAMPBELL

BY

ATTYS

Oct. 14, 1958  P. H. GIROUARD ET AL  2,855,828
RAPID FIRE GUN TURRET APPARATUS
Filed March 31, 1950  94 Sheets-Sheet 46

INVENTORS
P. H. GIROUARD
A. J. STANTON
C. V. HICKMAN
D. WERTMAN
E. F. CAMPBELL
BY
ATTYS

Oct. 14, 1958 P. H. GIROUARD ET AL 2,855,828
RAPID FIRE GUN TURRET APPARATUS
Filed March 31, 1950 94 Sheets-Sheet 49

INVENTORS
P. H. GIROUARD
A. J. STANTON
C. V. HICKMAN
D. WERTMAN
E. F. CAMPBELL

BY
*C. D. O'Brien*
*R. M. Hicks*

ATTYS

Oct. 14, 1958  P. H. GIROUARD ET AL  2,855,828
RAPID FIRE GUN TURRET APPARATUS
Filed March 31, 1950  94 Sheets-Sheet 54

INVENTORS
P. H. GIROUARD
A. J. STANTON
C. V. HICKMAN
D. WERTMAN
E. F. CAMPBELL
BY
ATTYS

INVENTORS
P. H. GIROUARD
A. J. STANTON
C. V. HICKMAN
D. WERTMAN
E. F. CAMPBELL

ATTYS

INVENTORS
P. H. GIROUARD
A. J. STANTON
C. V. HICKMAN
D. WERTMAN
E. F. CAMPBELL

ATTYS

Oct. 14, 1958  P. H. GIROUARD ET AL  2,855,828
RAPID FIRE GUN TURRET APPARATUS
Filed March 31, 1950  94 Sheets-Sheet 58

INVENTORS
P. H. GIROUARD
A. J. STANTON
C. V. HICKMAN
D. WERTMAN
E. F. CAMPBELL
BY
ATTYS

INVENTORS
P. H. GIROUARD
A. J. STANTON
C. V. HICKMAN
D. WERTMAN
E. F. CAMPBELL

BY

ATTYS

Oct. 14, 1958   P. H. GIROUARD ET AL   2,855,828
RAPID FIRE GUN TURRET APPARATUS
Filed March 31, 1950   94 Sheets-Sheet 61

INVENTORS
P. H. GIROUARD
A. J. STANTON
C. V. HICKMAN
D. WERTMAN
E. F. CAMPBELL

BY
C. D. O'Brien
R. M. Hicks
ATTYS.

Oct. 14, 1958    P. H. GIROUARD ET AL    2,855,828
RAPID FIRE GUN TURRET APPARATUS

Filed March 31, 1950    94 Sheets-Sheet 62

INVENTORS
P. H. GIROUARD
A. J. STANTON
C. V. HICKMAN
D. WERTMAN
E. F. CAMPBELL

BY

ATTYS

Oct. 14, 1958  P. H. GIROUARD ET AL  2,855,828
RAPID FIRE GUN TURRET APPARATUS
Filed March 31, 1950  94 Sheets-Sheet 63

INVENTORS
P. H. GIROUARD
A. J. STANTON
C. V. HICKMAN
D. WERTMAN
E. F. CAMPBELL

BY

ATTYS

Oct. 14, 1958  P. H. GIROUARD ET AL  2,855,828
RAPID FIRE GUN TURRET APPARATUS
Filed March 31, 1950  94 Sheets-Sheet 64

INVENTORS
P. H. GIROUARD
A. J. STANTON
C. V. HICKMAN
D. WERTMAN
E. F. CAMPBELL

BY

ATTYS

Oct. 14, 1958     P. H. GIROUARD ET AL     2,855,828
RAPID FIRE GUN TURRET APPARATUS
Filed March 31, 1950     94 Sheets-Sheet 65

INVENTORS
P. H. GIROUARD
A. J. STANTON
C. V. HICKMAN
D. WERTMAN
E. F. CAMPBELL

BY

ATTYS

Oct. 14, 1958 P. H. GIROUARD ET AL 2,855,828
RAPID FIRE GUN TURRET APPARATUS
Filed March 31, 1950 94 Sheets-Sheet 66

INVENTORS
P. H. GIROUARD
A. J. STANTON
C. V. HICKMAN
D. WERTMAN
E. F. CAMPBELL
BY
ATTYS

Oct. 14, 1958  P. H. GIROUARD ET AL  2,855,828
RAPID FIRE GUN TURRET APPARATUS
Filed March 31, 1950  94 Sheets-Sheet 67

INVENTORS
P. H. GIROUARD
A. J. STANTON
C. V. HICKMAN
D. WERTMAN
E. F. CAMPBELL

BY
*C. O. O'Brien*
*R. M. Hicks*

ATTYS

Oct. 14, 1958 P. H. GIROUARD ET AL 2,855,828
RAPID FIRE GUN TURRET APPARATUS
Filed March 31, 1950 94 Sheets-Sheet 78

INVENTORS
P. H. GIROUARD
A. J. STANTON
C. V. HICKMAN
D. WERTMAN
E. F. CAMPBELL

BY

ATTYS

INVENTORS
P. H. GIROUARD
A. J. STANTON
C. V. HICKMAN
D. WERTMAN
E. F. CAMPBELL
BY
ATTYS

Oct. 14, 1958 P. H. GIROUARD ET AL 2,855,828
RAPID FIRE GUN TURRET APPARATUS
Filed March 31, 1950 94 Sheets-Sheet 89

INVENTORS
P. H. GIROUARD
A. J. STANTON
C. V. HICKMAN
D. WERTMAN
E. F. CAMPBELL
BY
ATTYS

Oct. 14, 1958  P. H. GIROUARD ET AL  2,855,828
RAPID FIRE GUN TURRET APPARATUS

Filed March 31, 1950  94 Sheets-Sheet 92

INVENTORS
P. H. GIROUARD
A. J. STANTON
C. V. HICKMAN
D. WERTMAN
E. F. CAMPBELL

BY

ATTYS

Oct. 14, 1958    P. H. GIROUARD ET AL    2,855,828
RAPID FIRE GUN TURRET APPARATUS
Filed March 31, 1950    94 Sheets-Sheet 93

INVENTORS
P. H. GIROUARD
A. J. STANTON
C. V. HICKMAN
D. WERTMAN
E. F. CAMPBELL

BY

ATTYS

Oct. 14, 1958    P. H. GIROUARD ET AL    2,855,828
RAPID FIRE GUN TURRET APPARATUS
Filed March 31, 1950    94 Sheets-Sheet 94

INVENTORS
P. H. GIROUARD
A. J. STANTON
C. V. HICKMAN
D. WERTMAN
E. F. CAMPBELL
BY
ATTYS

United States Patent Office 2,855,828
Patented Oct. 14, 1958

2,855,828

RAPID FIRE GUN TURRET APPARATUS

Philias H. Girouard, Washington, D. C., Arthur J. Stanton, Bethesda, Carl V. Hickman, Kensington, and David Wertman, Mount Rainier, Md., and Ernest F. Campbell, Springfield, Va.

Application March 31, 1950, Serial No. 153,262

32 Claims. (Cl. 89—45)

(Granted under Title 35, U. S. Code (1952), sec. 266)

This invention pertains to a naval gun turret and more specifically to the new and novel structure and arrangement of parts thereof whereby the turret is fully automatic in operation and mounts a plurality of large bore guns which are more rapid in their firing than large bore guns of similar size heretofore in use.

The prior art naval turrets mounting large bore guns have heretofore incorporated in their apparatus and method of operation, the usage of projectile propellant powder charges packaged in cloth bags which are manually handled and loaded by attendants at the gun loading station. In the operation of such a gun and upon insertion and ramming of the projectile and its propellant charge into the breech thereof, a screw plug type breechblock is closed and secured, thus rendering the gun ready for movement into an aimed firing position. After gun firing the gun is returned to loading position and the breech opened for manual gun swabbing to remove residual fragments of the expended powder bag charge. The loading and firing cycle is completed by repositioning the gun in an accessible position for the subsequent manual loading step. This procedure in handling, loading and swabbing of the gun imposes a number of operational limitations to high rate gun laying and firing, which, in addition to the requirement for heavy expenditures of manual effort, include the inability to load the gun at all angles of elevation, and the necessity for elaborate and cumbersome fire precautionary installations as a protection to the men attending the gun as well as to the equipment adjacent thereto.

The guns incorporated in the mounts of the turret of the present invention are well adapted for use with semi-fixed cased ammunition rather than the powder bag type of ammunition previously used in guns of similar large bore. The incorporation of semi-fixed case ammunition therein as handled by the novel structural embodiment of the turret provides loadability at any angle of elevation of the guns in their mounts. Means are also included therein whereby after manual hoist loading the transfer of both powder and projectiles from their respective storage chambers to a loaded position in the gun breech is fully automatic, both as to the transfer thereof and as to the gun loading. In addition to local fire control the turret further incorporates remote automatic firing control to minimize manual intervention in its operation.

The instrumentalities effecting automatic loading and fire control are either electrically or hydraulically actuated and include suitable interlocks which are provided to insure the proper sequence of operation as well as to prevent improper gun firing.

The structure and space arrangements of the turret of this invention differ substantially from conventional turret designs as used on such vessels as battleships and cruisers for which use the turret of this invention is intended. This difference, in part is due to the use of semi-fixed ammunition, which has not heretofore been completely practical, for automatic usage in heavy ordnance of this size, and, in part, to new and novel details and arrangements of the guns and the ammunition handling apparatus therefor, incorporated in a manner to eliminate the necessity for flame proof bulkheads as separation means between the guns, control stations, and the projectile storage chambers. Only the powder charge magazine spaces are separated from the rest of the turret by flameproof bulkheads. The turret, while being generally similar to prior gun turrets with respect to conventional foundation structure, barbette and magazine designs, differs materially in the magazine storage means and in the use of powder cases whereby new and novel powder case ordnance assemblies are advantageously incorporated therein.

The ordnance installations are mounted in the rotating structure of the turret, hereinafter described in detail, and comprise units of namely the following types: gun equipment, gun laying equipment, ammunition hoists, ammunition stowing equipment, ammunition handling equipment and gun fire control equipment. The elements of this ordnance apparatus are advantageously arranged with respect to other components thereof and with respect to the structural assemblies of the turret in a manner providing convenient interrelated cooperative functioning, overall compactness, improved turret utility, and increased rate of accomplishment of all turret operations.

A turret is thus provided wherein the gun mount and the loading and firing mechanisms are isolated from the areas occupied by the crew. The elimination of the necessity for elaborate fire prevention and precautionary measures and installations in the gun pit makes available for use the upper rearward portions of the turret house chamber as a housing for such operation initiating apparatus and remote control panel assemblies, as require observation and control by the gunnery officers and gun crew.

A preferred embodiment of the gun of the present invention includes a cradling slide with conventionally positioned trunnions for the reception and mounting of a gun housing and major caliber gun barrel. These assemblies are mounted for reciprocating movement, and are connected to the slide by conventional recoil and counter-recoil mechanisms. The breech block is vertically movable transversely of the gun housing and barrel and is hydraulically actuated in its opening and closing cycles. Empty case extractors are arranged on the housing for actuation to impart removal of the case from the barrel and to eject it rearwardly into the case disposal assembly.

Projectile and powder case trays are rigidly secured to opposite sides of the slide for pivotal movement from a position rearwardly of the trunnions to an aligned position for ramming in axial alignment with the gun bore. These tray assemblies move with the gun slide in all angles of elevational rotation. A cradle assembly is attached to each trunnion for arcuate rotational movement thereabout to receive a load increment from a hoist therebelow and transfer the thus received load to the transfer tray associated therewith.

Empty case ejection is accomplished by a device which includes an empty tray case arranged in coupled relationship with the powder case tray for movement therewith to discharge the empty case to a position below the gun bore axis.

The method of operating major caliber guns contemplated by the present invention thus includes, among others, the steps of moving separate increments of a complete round of semi-fixed ammunition from separate storage chambers below the gun to positions rearwardly of the trunnions and simultaneously moving the round increments to an aligned position in axial alignment with the gun bore, sequentially ramming the round of ammunition into the gun barrel, retracting the rammer, closing the breech, retracting the trays, firing the round and ejecting the empty case. Empty case disposal is accomplished during the subsequent loading cycle which follows immediately and to some extent overlaps the cycle of first round operation.

In connection with the foregoing, the method of removing and disposing of the empty cartridge case is considered novel wherein the case is dispensed through the gun port shield at the forward portion of the turret.

The power plant or source of hydraulic energy comprises a tank containing a hydraulic medium, a manifold assembly connected to the various hydraulic units of the gun and an accumulator connected in series relation with the manifold and tank. An electric motor driven pump supplies the hydraulic medium from the tank to the manifold and to the accumulator for charging the latter, valves are provided for automatically by-passing the pump to the tank when the accumulator has been fully charged and for automatically reestablishing the supply of the medium by the pump to the manifold after the accumulator has been partially discharged. The power plant thus supplies a variable amount of energy which increases with the simultaneous operation of certain of the hydraulic units in the gun cycle.

A feature of the present invention, according to a preferred embodiment thereof, of a character well adapted for use with an 8" bore gun is to provide for rapid handling, hoisting, transferring, loading, discharging, ejecting and repetitive cyclic reloading of major caliber guns, all of which functions are attained automatically by a new and novel construction and apparatus arrangement, which has been found to permit satisfactory firing at a rate of 8 to 11 projectiles or rounds per minute, thereby providing an approximate increase in the speed of handling and firing of 3 to 1 over the firing rate of 3 rounds per minute for a manually or semi-manually loaded and fired gun of 8" bore.

One object of the present invention is the provision of a fully automatic gun loading and firing system in which many of the foregoing disadvantages are obviated and which is adapted to perform satisfactorily all of the essential functions of the systems heretofore or now in general use, and in which the possibility of apparatus malfunction or failure is reduced to a minimum. Personnel malfunction is reduced to zero.

An additional object of this invention lies in the provision of a rapid fire rate gun mechanism for use with the gun mounts of a turret.

Another object of this invention lies in the provision of a turret adapted to use semi-fixed cased ammunition in the turret guns.

An additional object of the invention is the attainment of new and improved gun loading of both the projectile and powder charge mechanically and without manual intervention.

Another object of the invention lies in the accomplishment by improved means of projectile transfer from any of a plurality of storage magazine rooms arranged in superimposed relationship with respect to the gun loading mechanism.

Additionally it is an object of this invention to rapidly load a gun with projectiles, simultaneously or selectively received from projectile storage chambers disposed at different levels.

In correlation with the immediately preceding object regarding simultaneous loading of projectiles from a plurality of storage levels or chambers it is also an object of this invention to provide powder case loading in synchronized timed relationship with the projectile loading whereby both the powder case and projectile are available as needed at the gun loading station to maintain uninterrupted operational loading and firing sequence.

A further object resides in the provision of a powder case handling chamber for use with a single or plural projectile storage chambers whereby the projectile chambers are in superimposed relationship with the powder chamber to provide an arrangement directly below the gun chamber and within the turret enclosure proper which occupies minimum space.

Another object of the invention is the provision of new and improved control means to permit gun operation from a location remote from the operating mechanisms of a turret.

Another object of the present invention is to provide an electric-hydraulically actuated automatic apparatus of the character stated in which suitable hydraulic interlocks insure the proper sequence of operation between the component parts thereof and in which the source of hydraulic energy for the apparatus is variable to accommodate the peak loads occasioned by the joint movements of certain parts of the apparatus.

An additional object of this invention lies in the provision in a gun loading system for a large bore gun of automatic projectile fuze setting means so arranged as to cut fuze dead time to a minimum, and variations in dead time out to zero.

Another object of this invention resides in a new and novel arrangement of the gun loading elements with respect to the elevation and training gear of a turret whereby the guns may be sighted in elevation simultaneously and without interfering with gun loading operations.

An additional object of this invention is to provide elevation gear controls for each of the three guns whereby each is independently driven in elevation and depression in synchronized relationship with the others without mechanical across coupling but with controls arranged in a manner whereby they can alternatively be separately controlled and operated.

It is also an object of this invention to provide a turret for large bore rapid fire guns in which hazardous fire conditions to the gun personnel during loading and gun firing are eliminated.

Still another object lies in the new and novel disposal of discharged powder cases by ejecting the cases at the front of the turret.

An additional object of the invention is the provision of a new and improved mechanism for simultaneously ramming both the powder casing and the projectile into the gun breech.

Another object of the invention resides in a novel arrangement of elements of the gun loading system to accomplish turret storage chamber loading by reverse operation of the loading system.

Additional objects and advantages of this invention will be apparent from the following description of a preferred embodiment of the invention and the accompanying drawings wherein.

Figure 1:
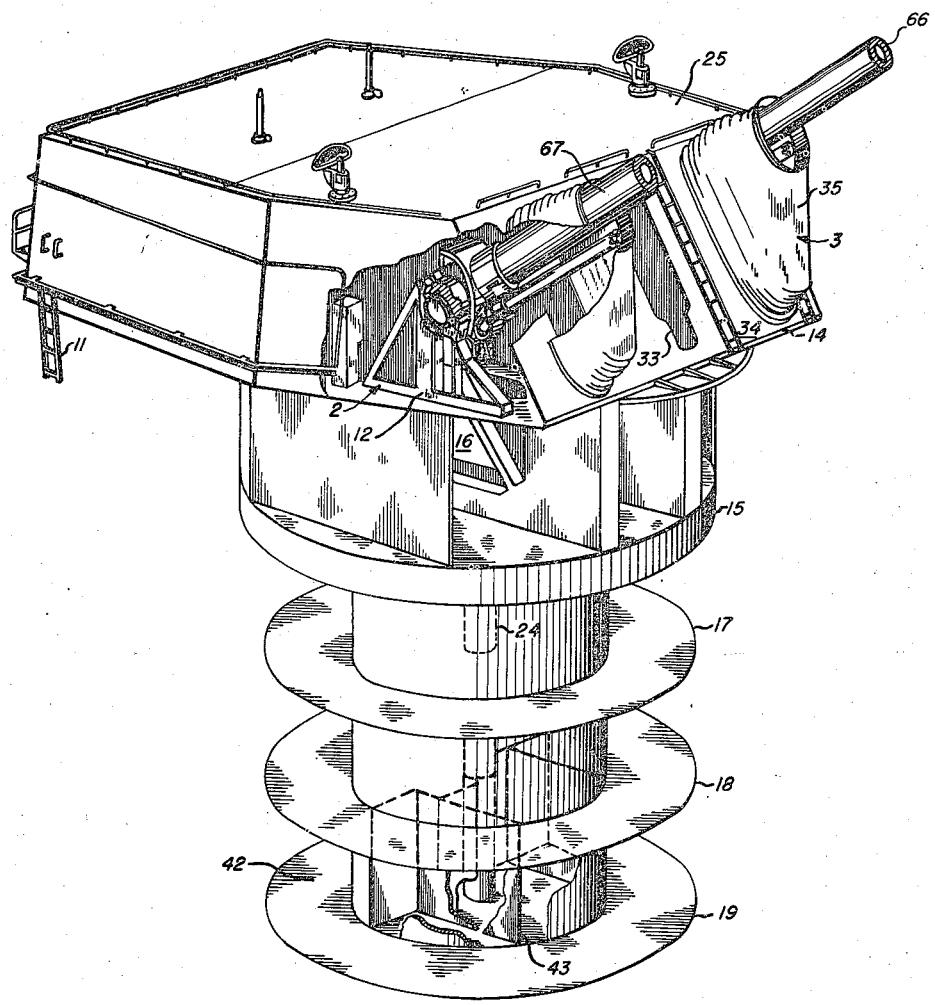
Fig. 1 is a pictorial view of a turret of the present invention according to a preferred embodiment thereof and showing the general structural arrangement of the three gun mounts.
Figure 4:
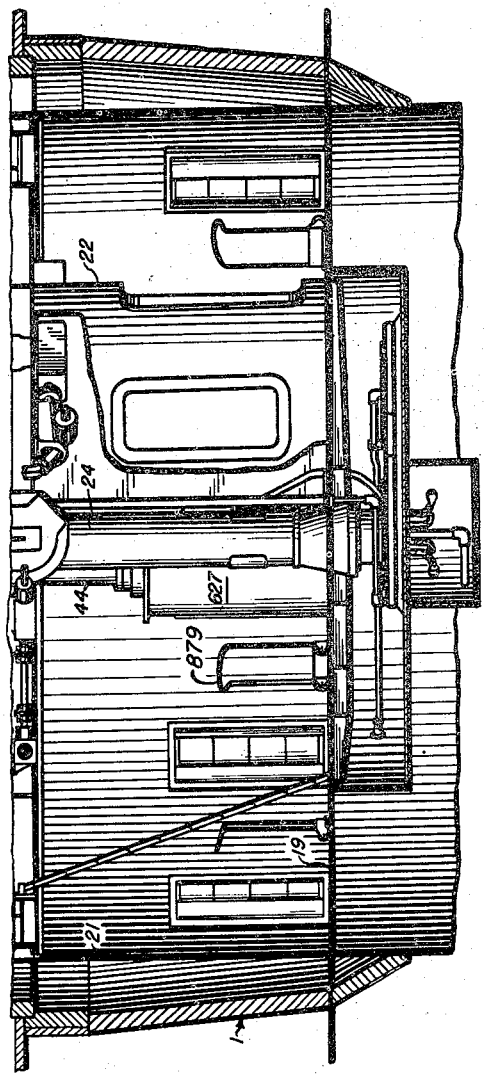
Figure 5B:
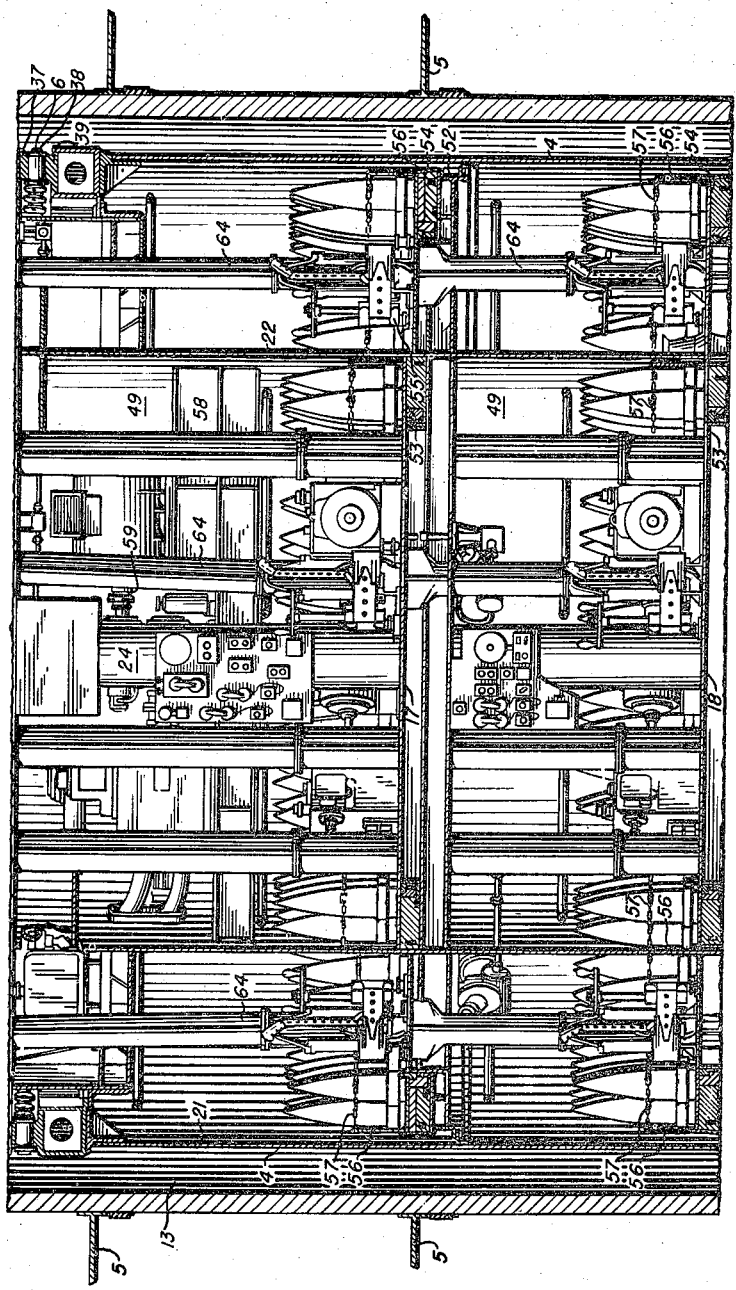
Figure 5C:
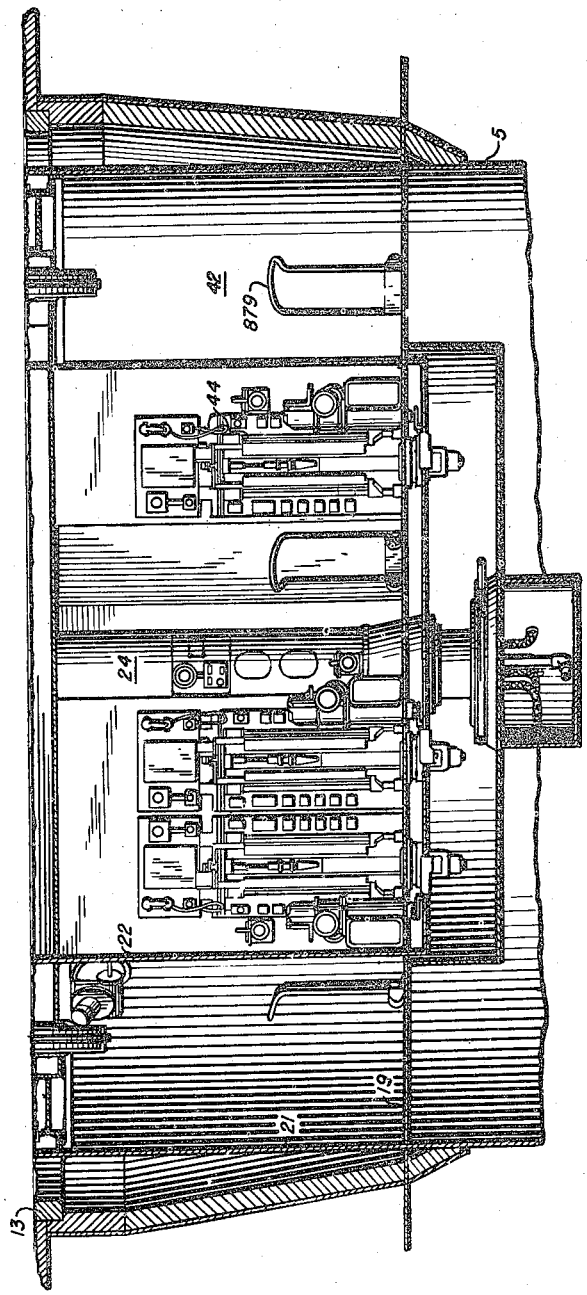
Figure 6:
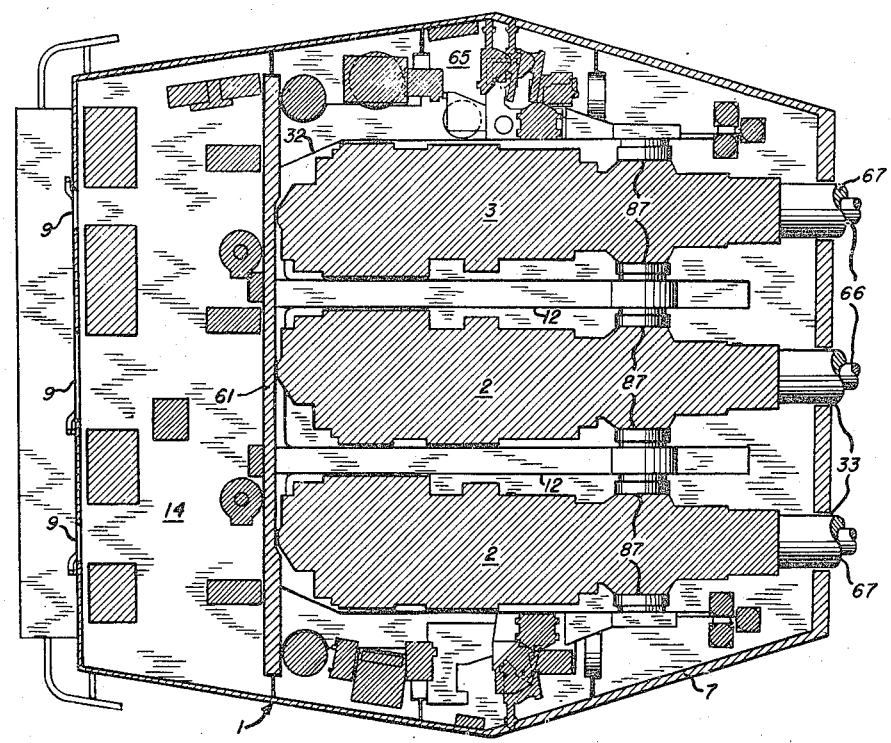
Figure 7:
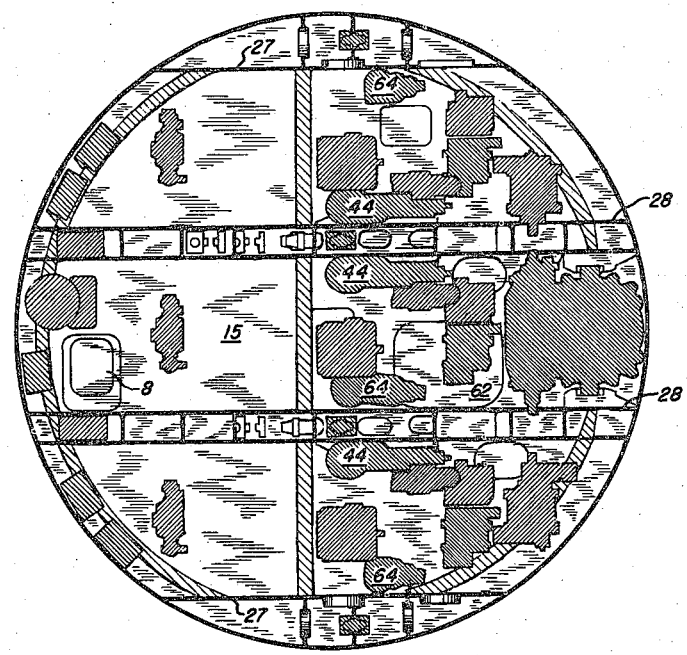
Figure 8:
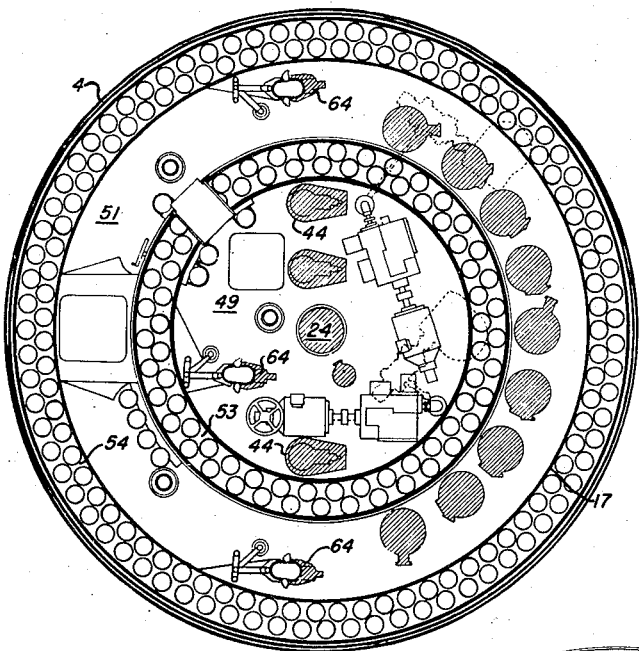
Figure 9:
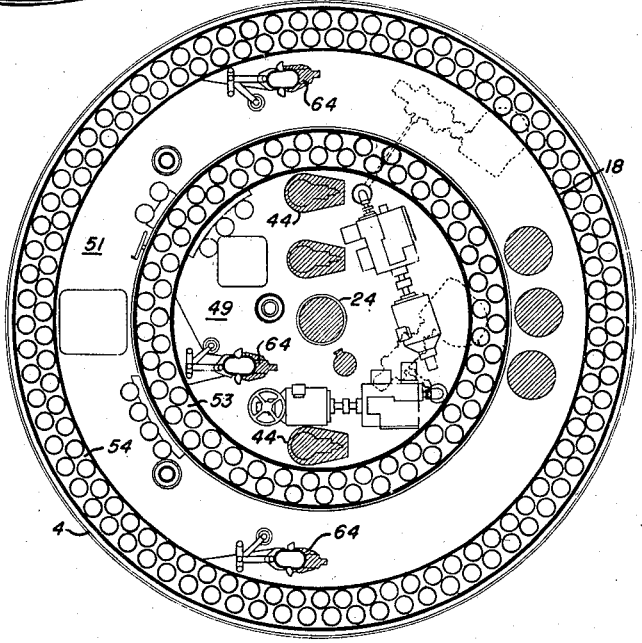
Figure 10:
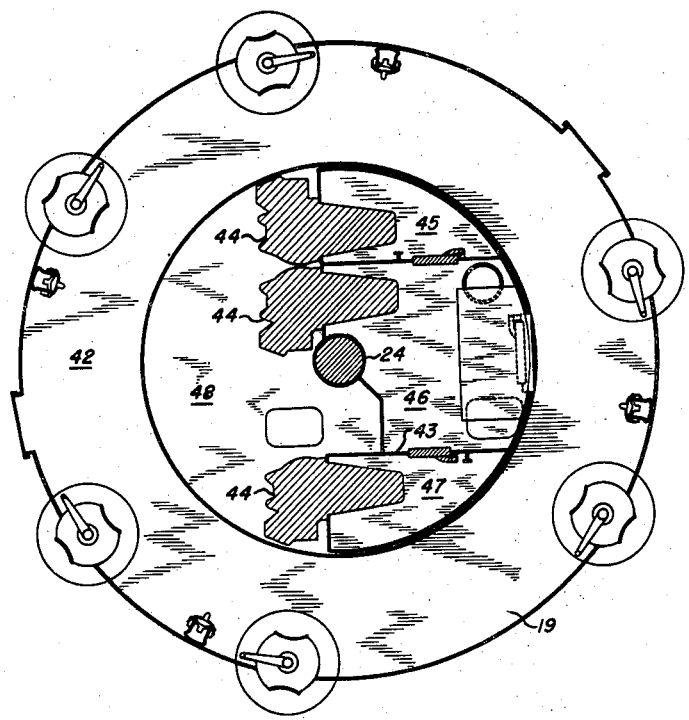
Figure 14:
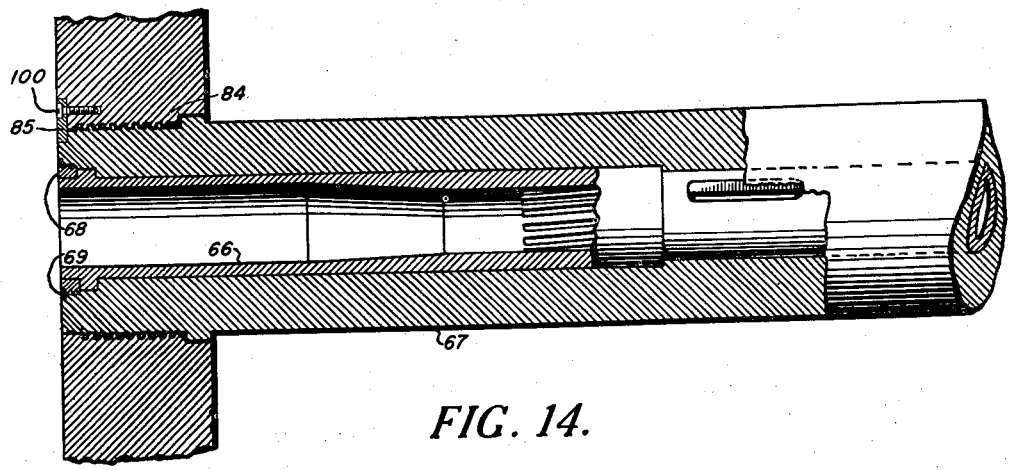
Figure 11:
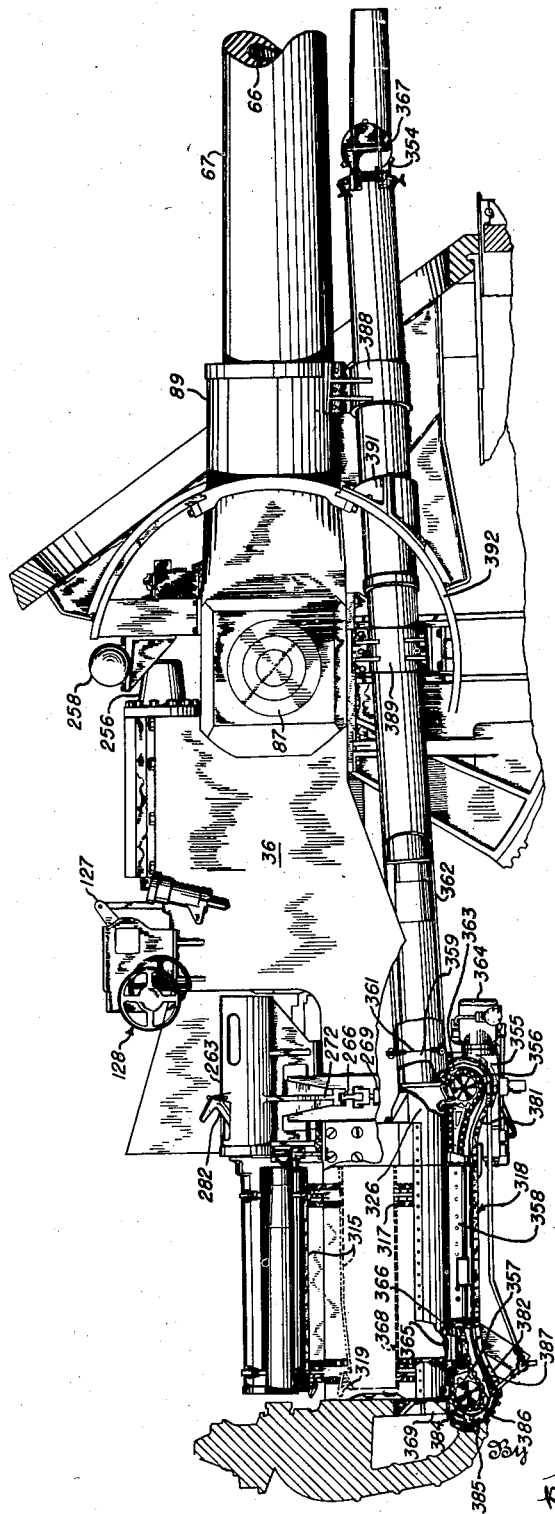
Figure 39:
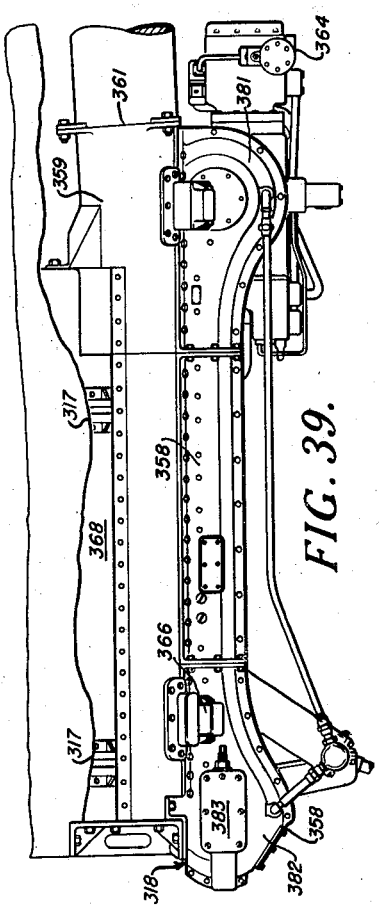
Figure 13:
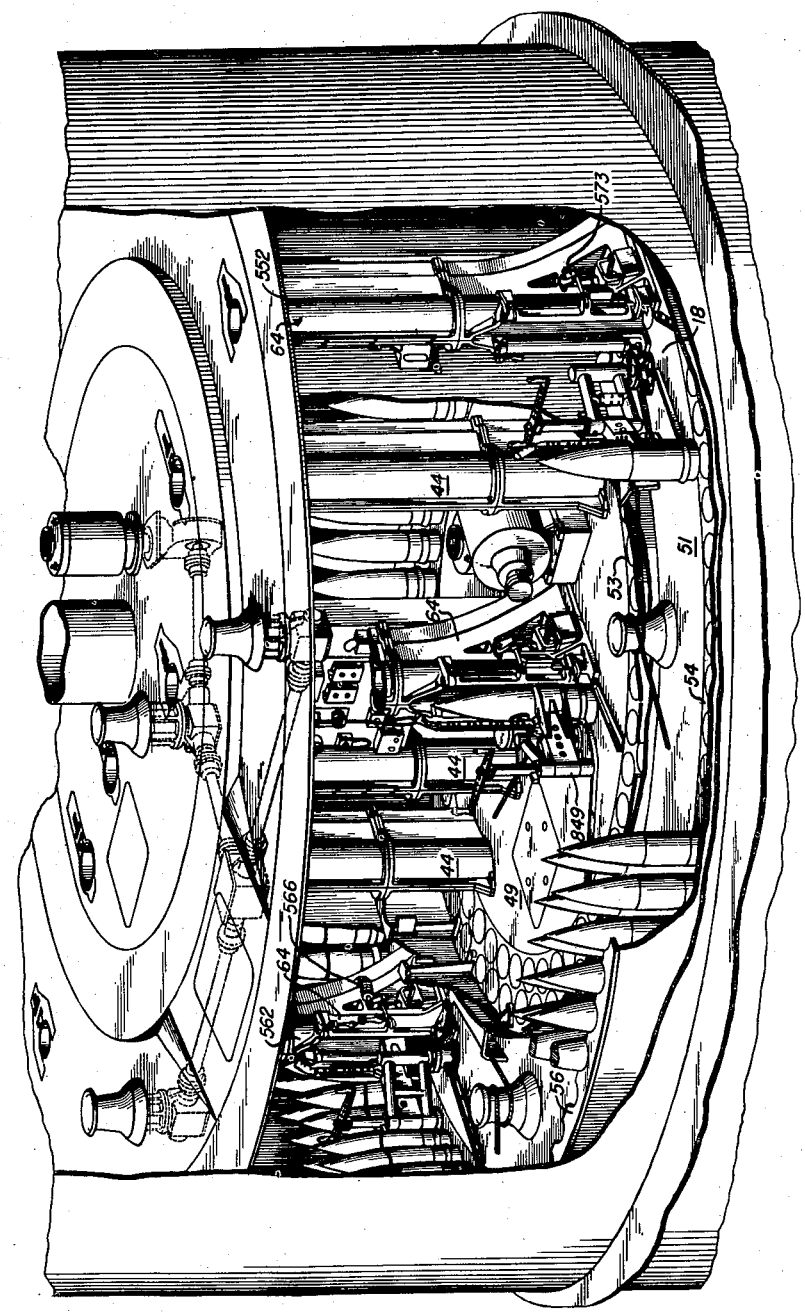
Figure 15:
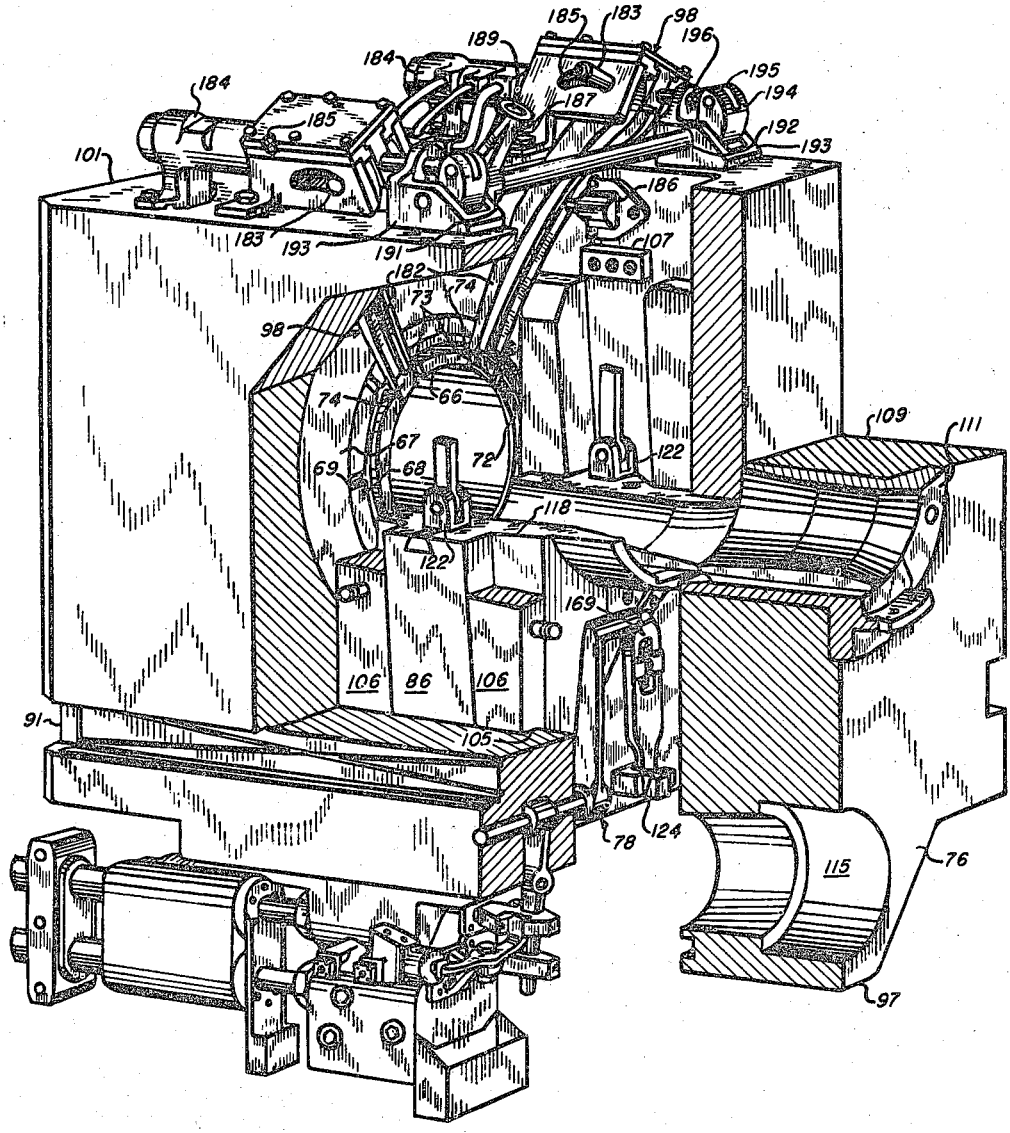
Figure 16:
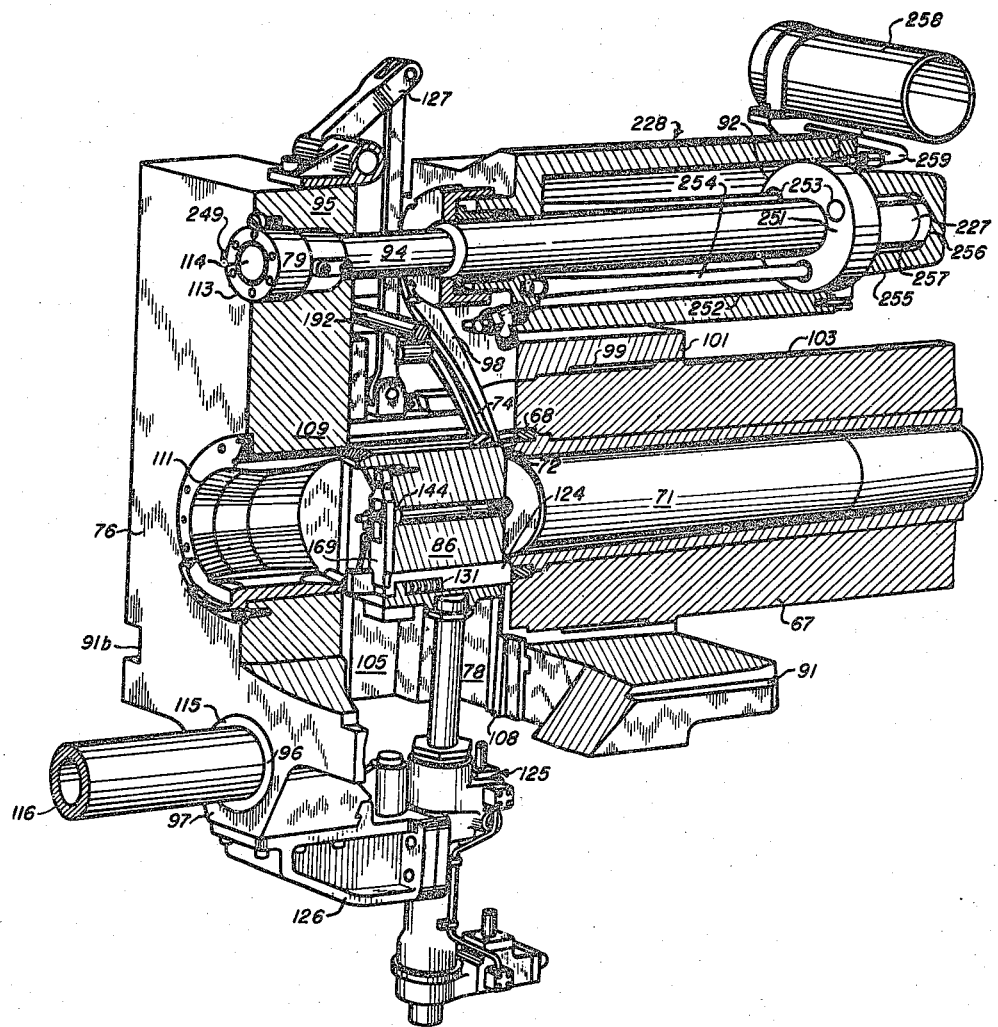
Figure 17:
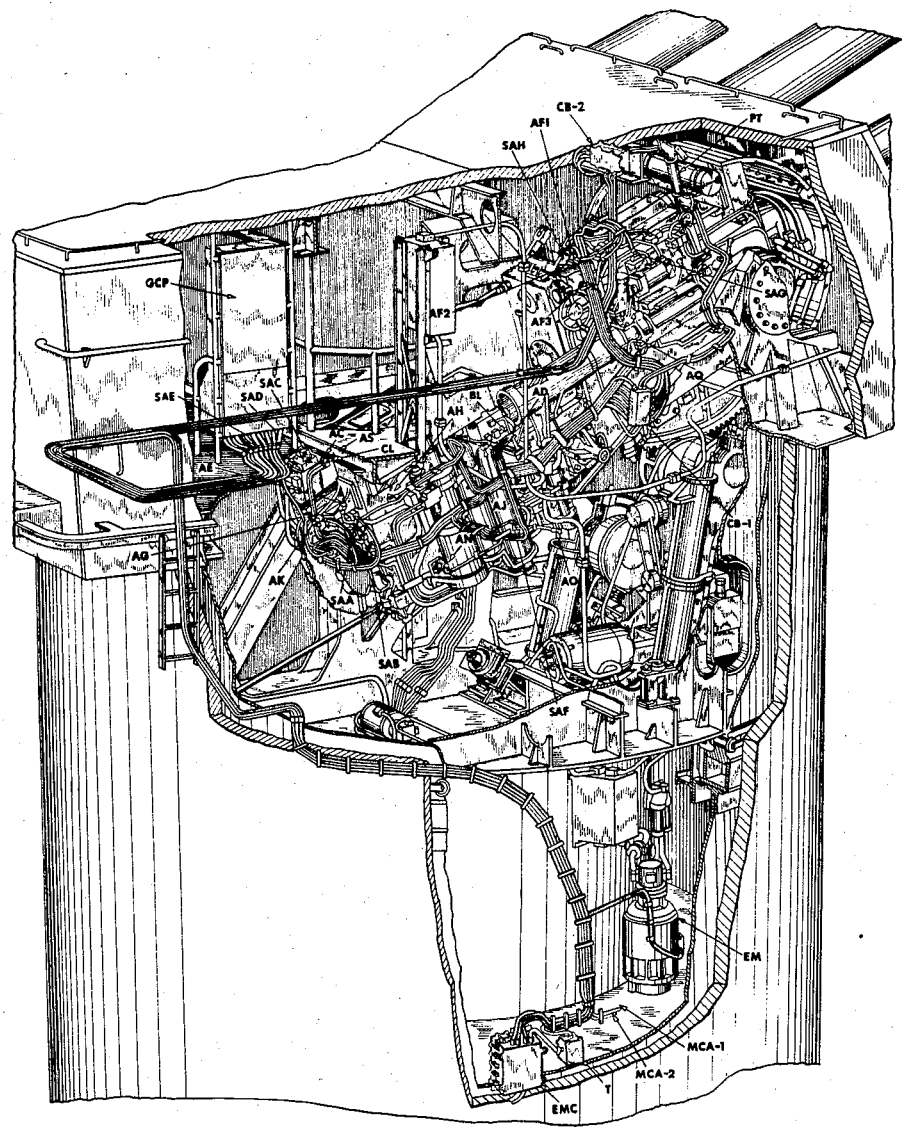
Figure 18:
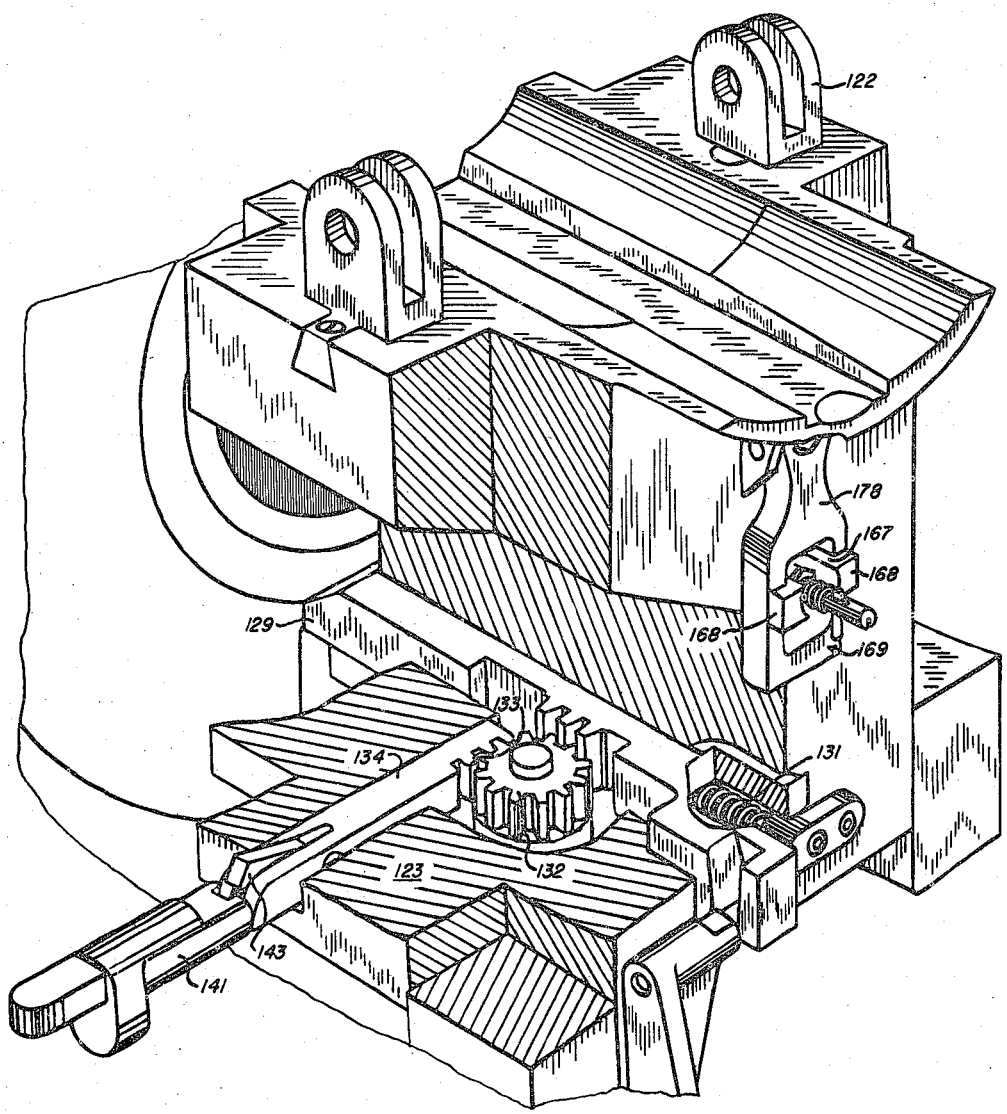
Figure 19:
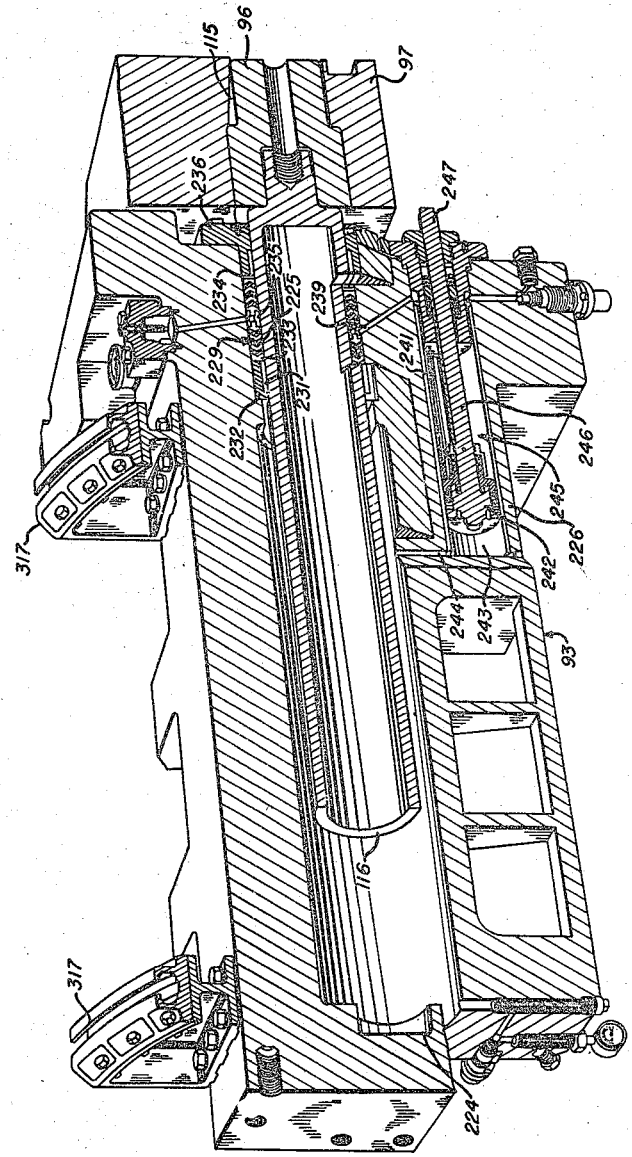
Figure 20:
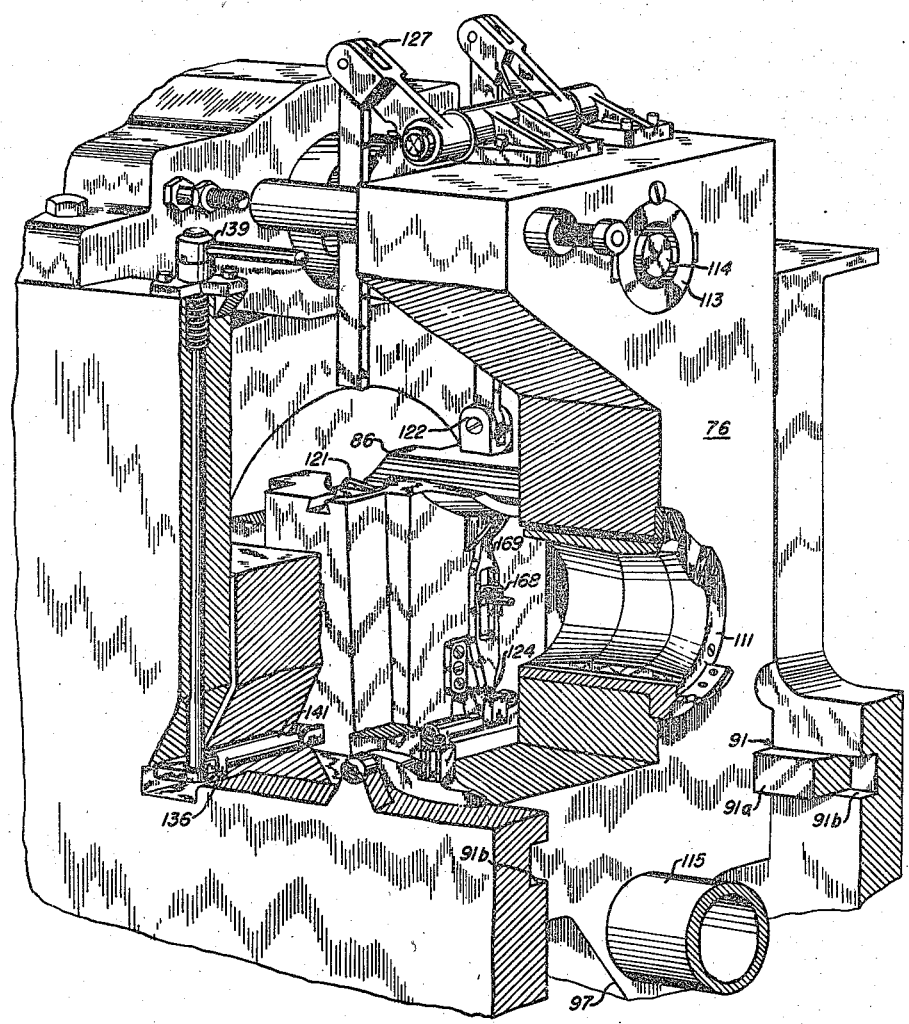
Figure 21:
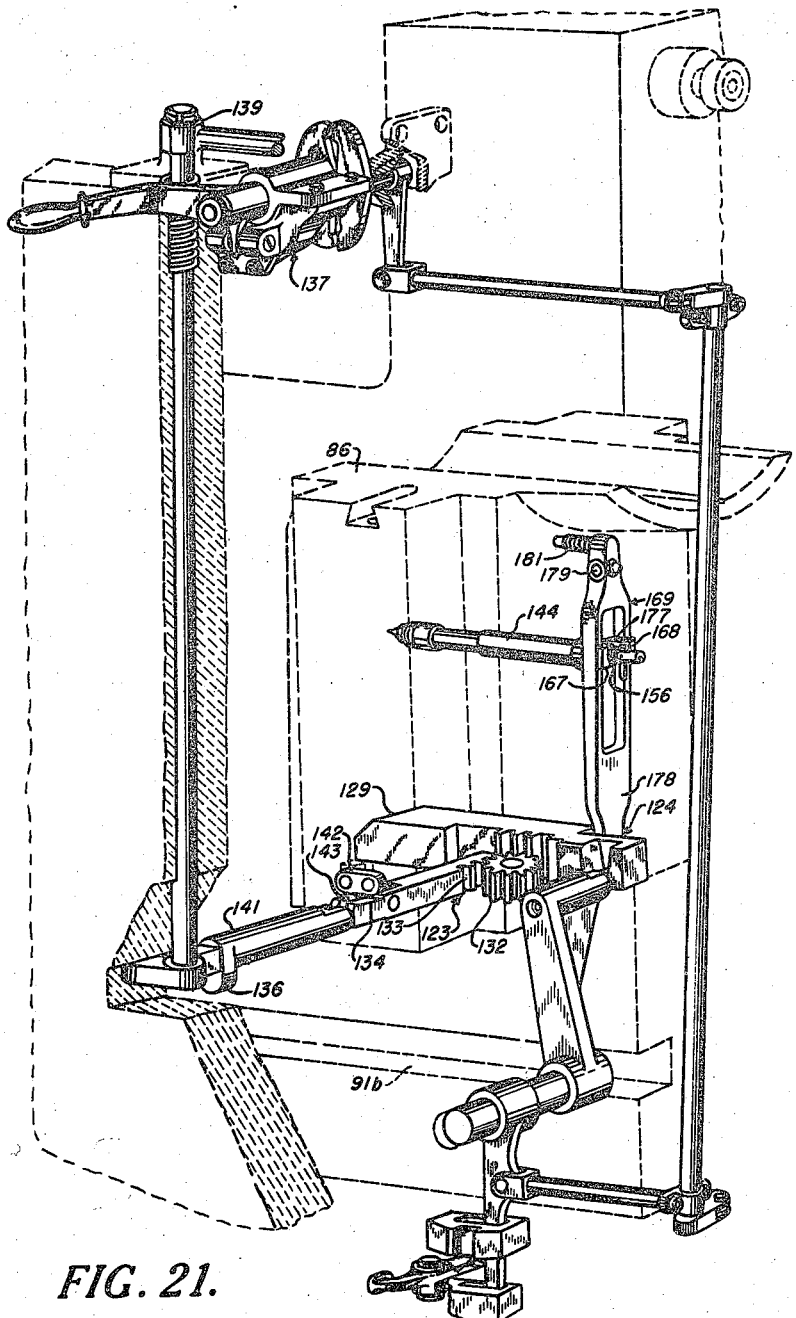
Figure 22:
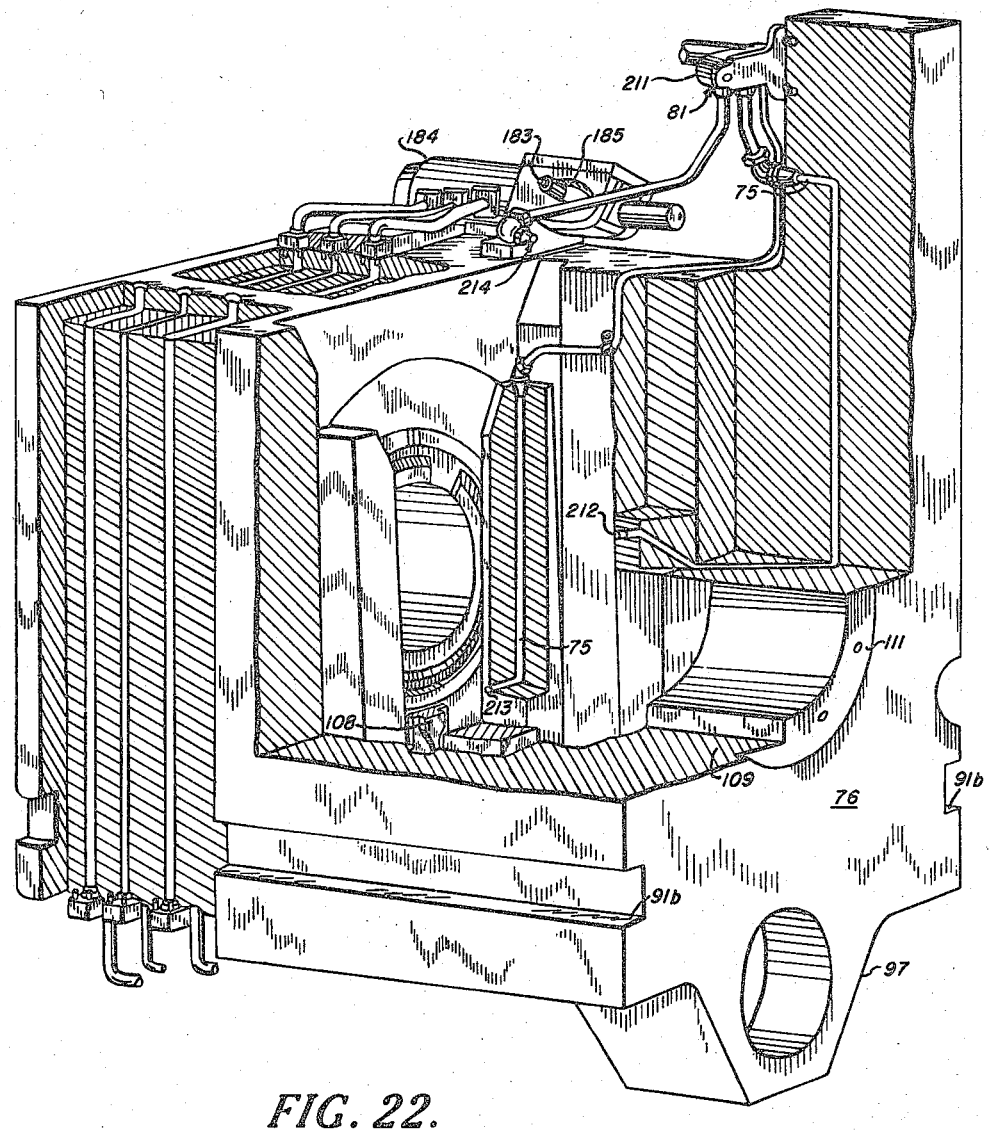
Figure 23:
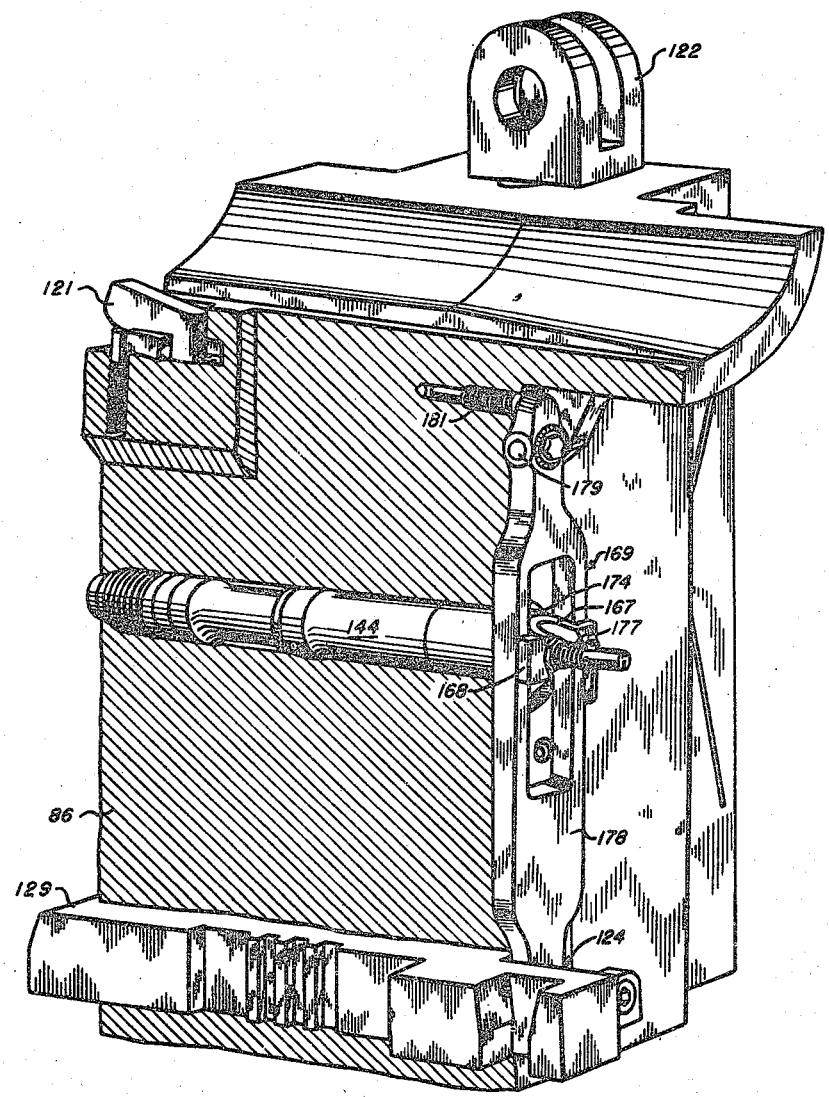
Figure 27:
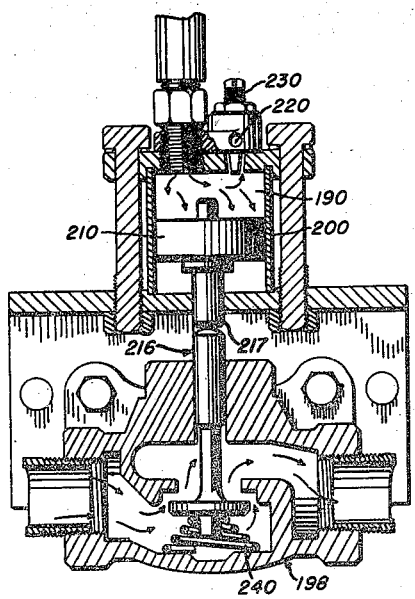
Figure 28:
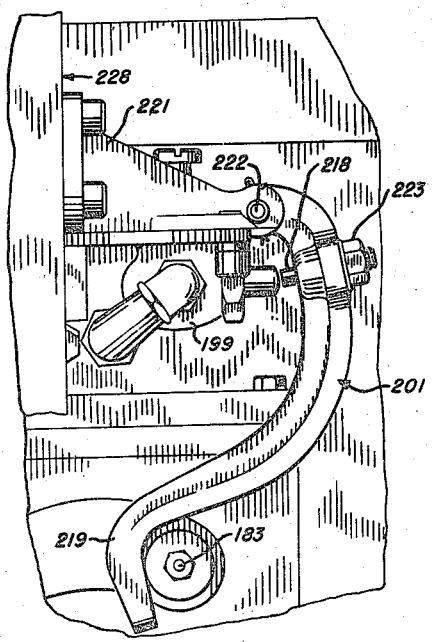
Figure 24:
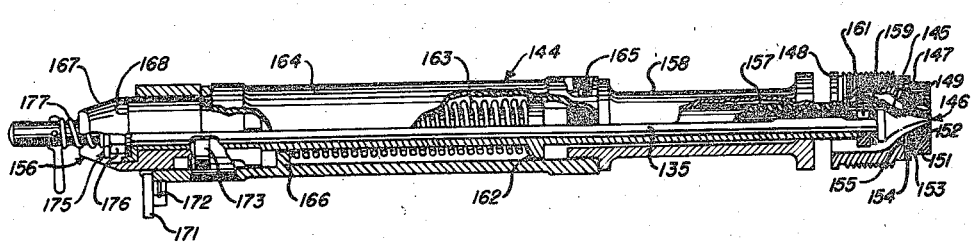
Figure 25:
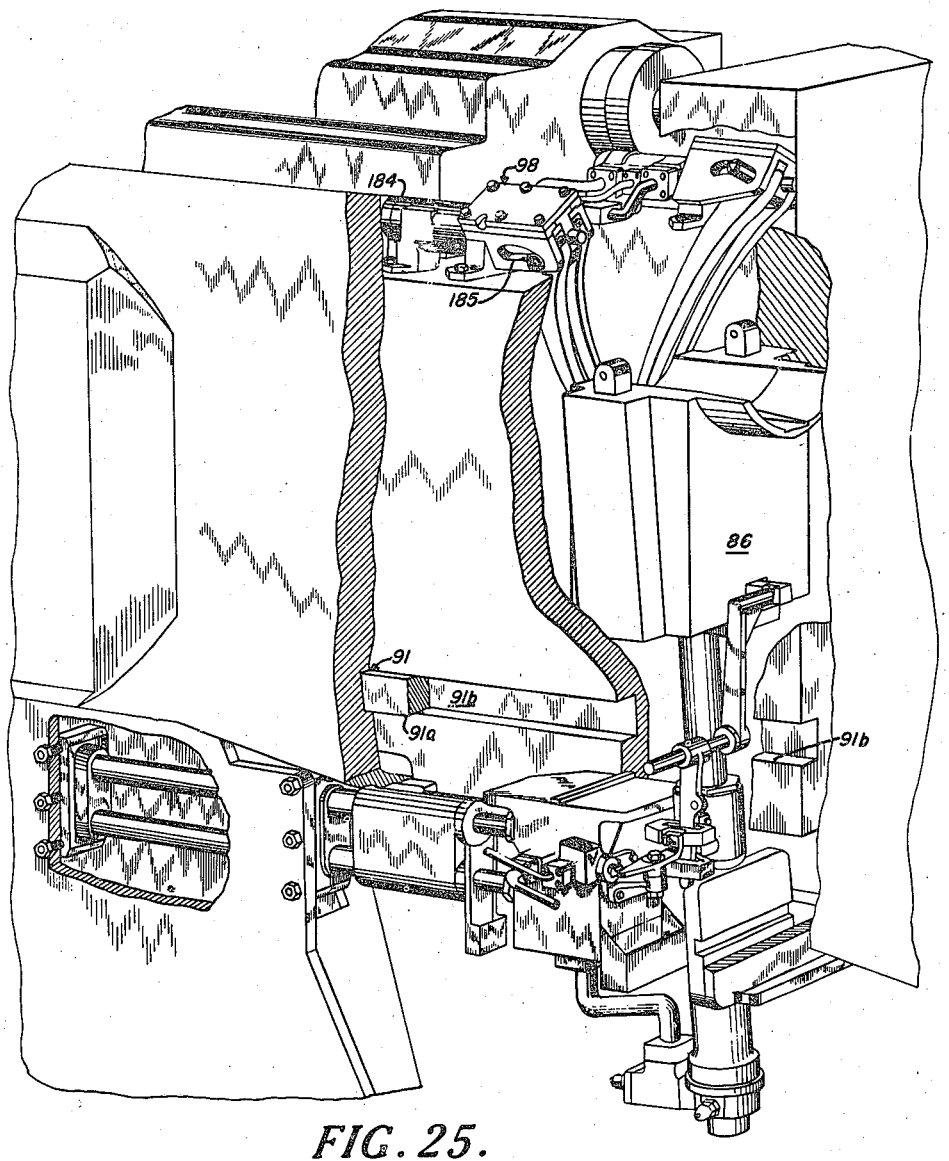
Figure 31:
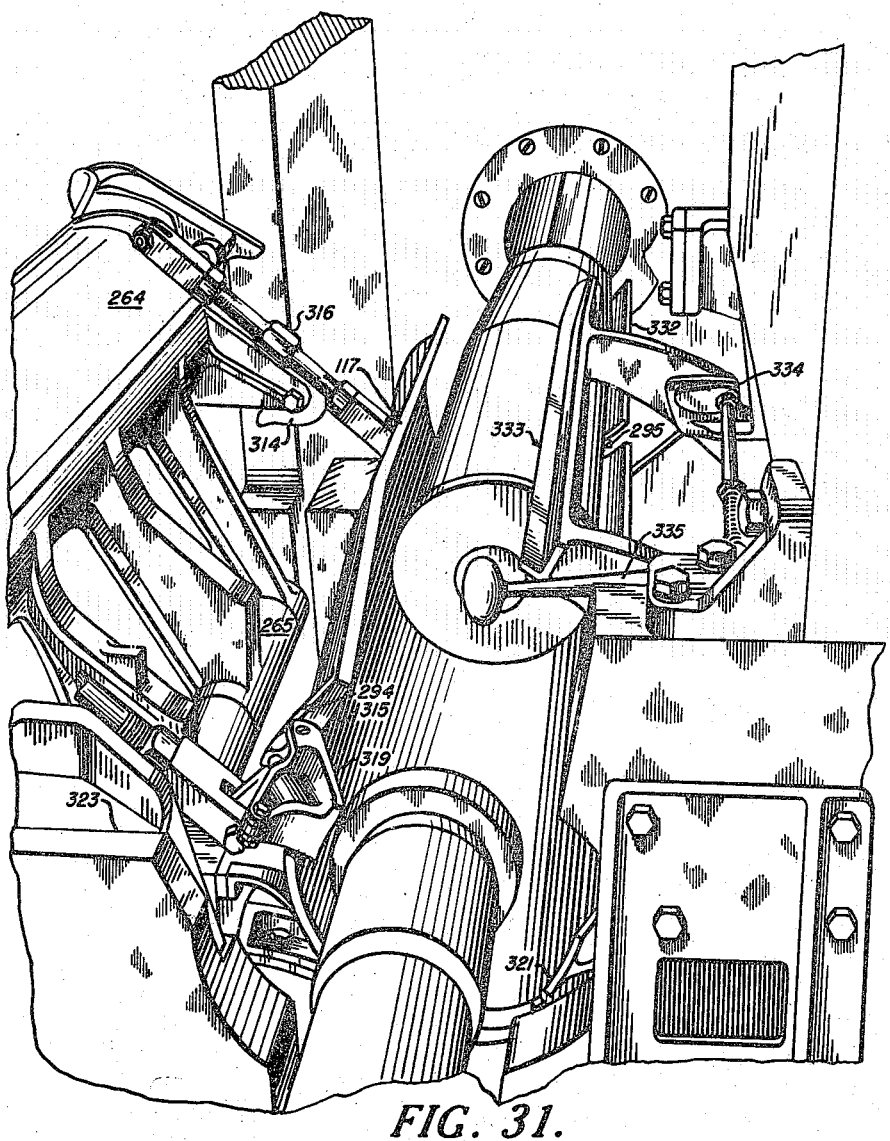
Figure 32:
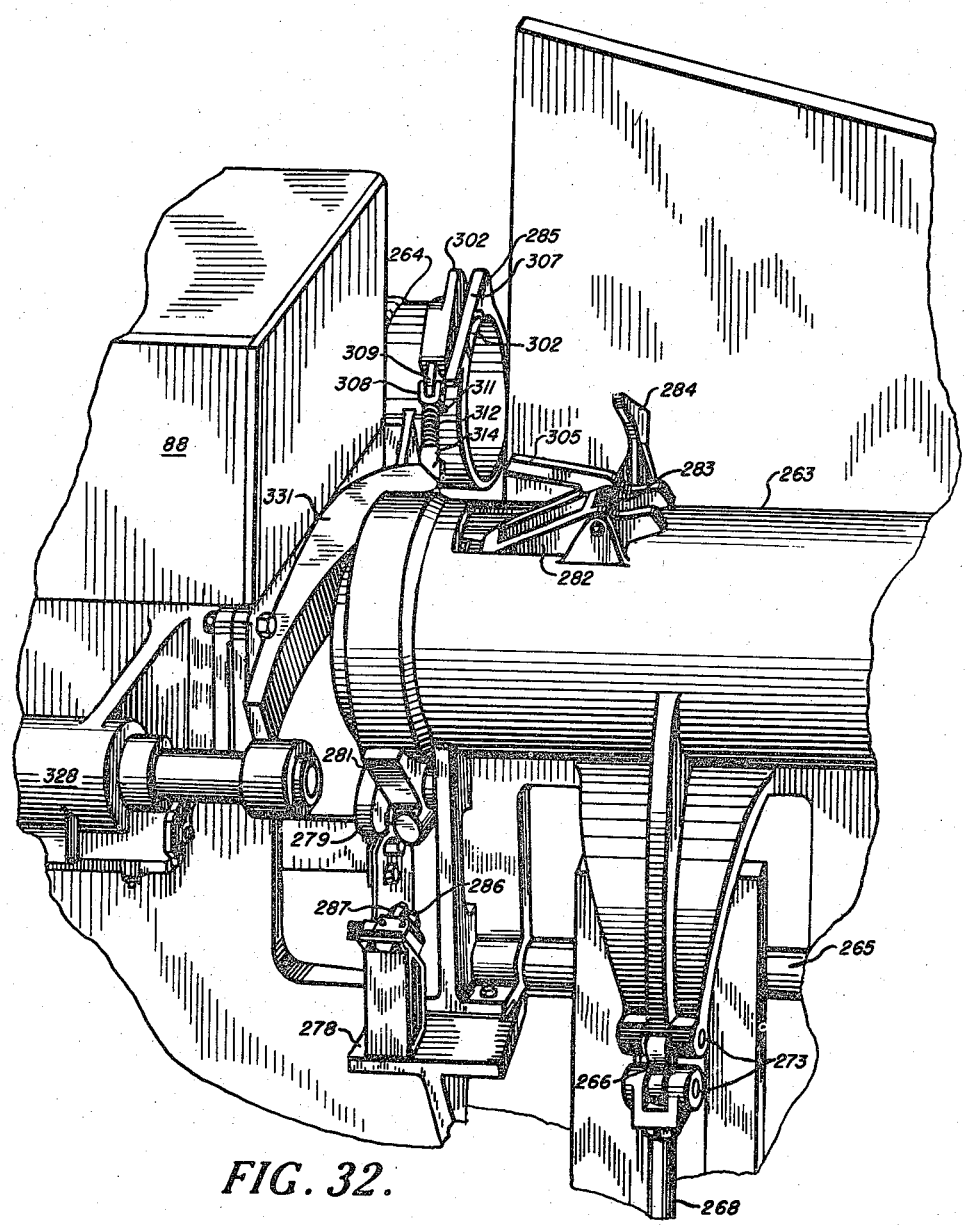
Figure 33:
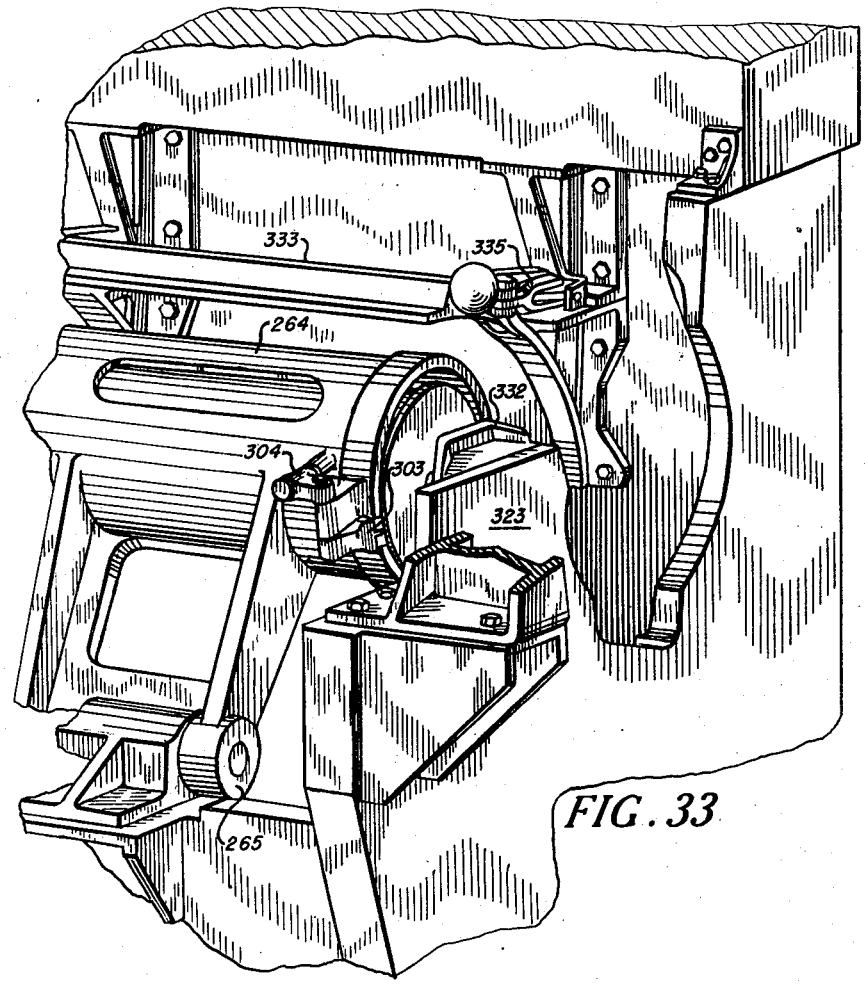
Figure 34:
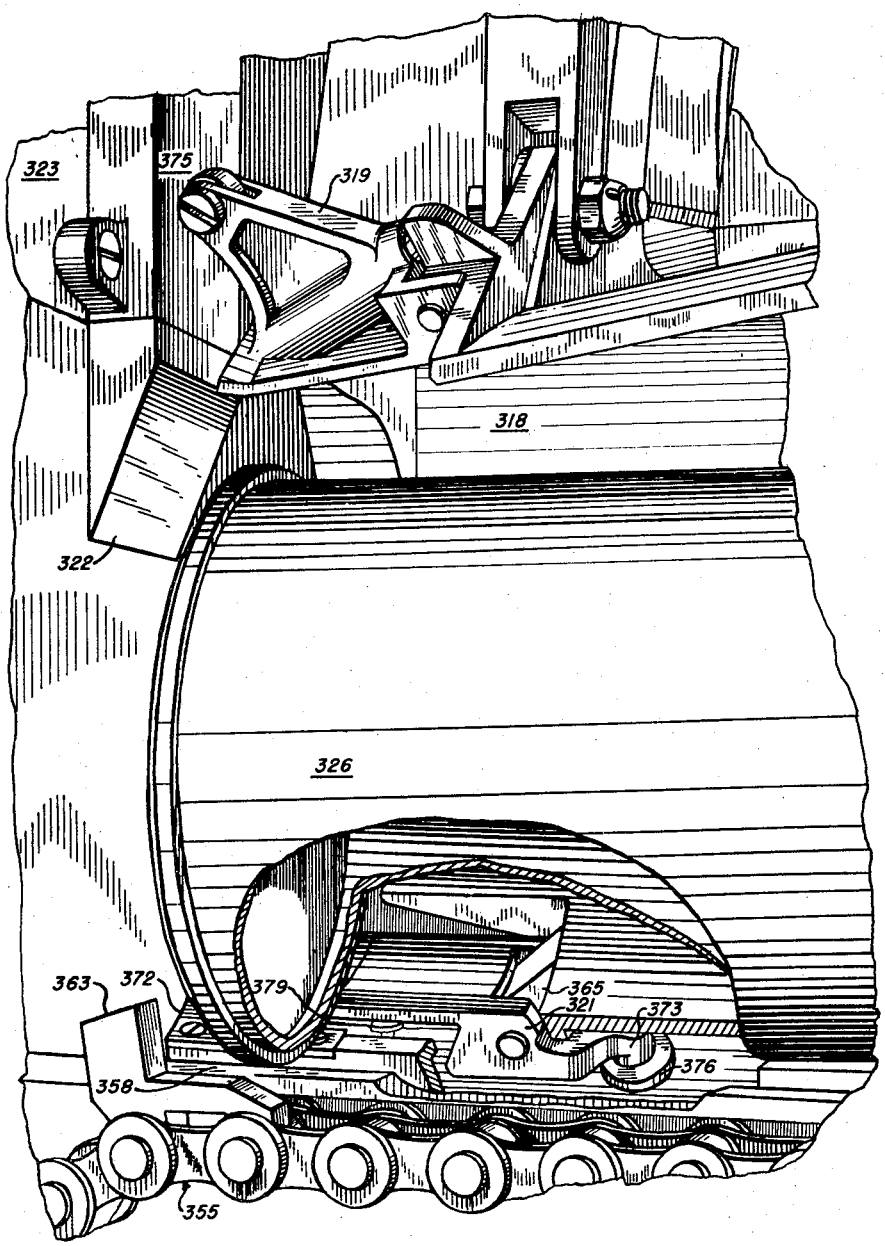
Figure 100:
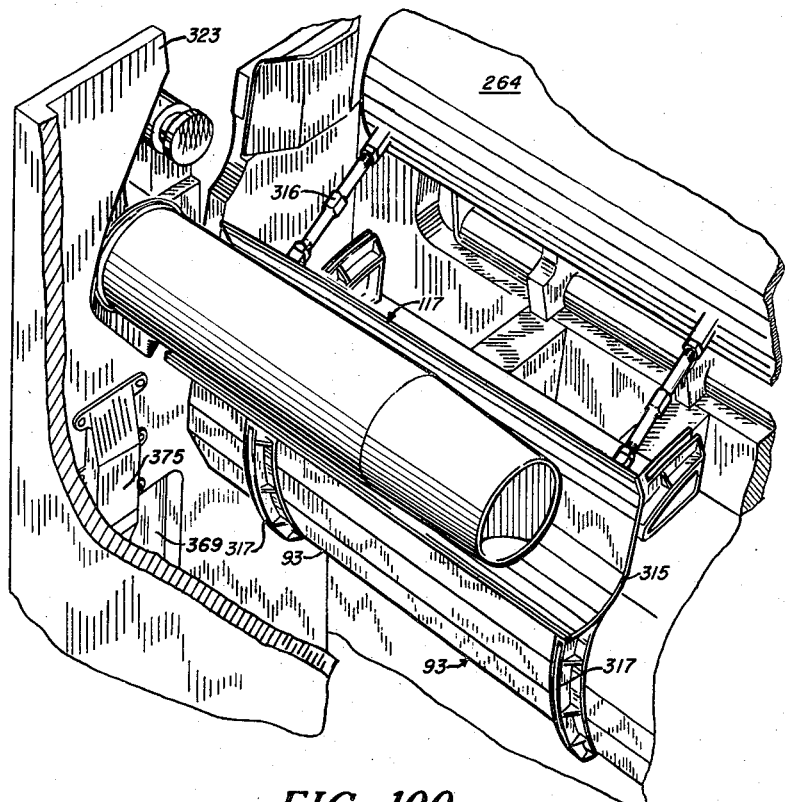
Figure 37:
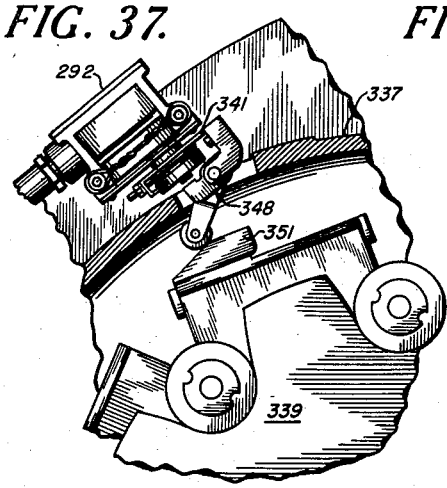
Figure 38:
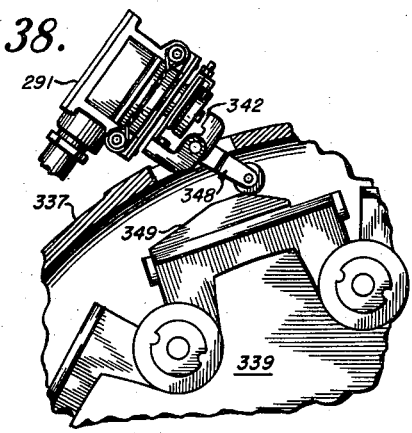
Figure 40:
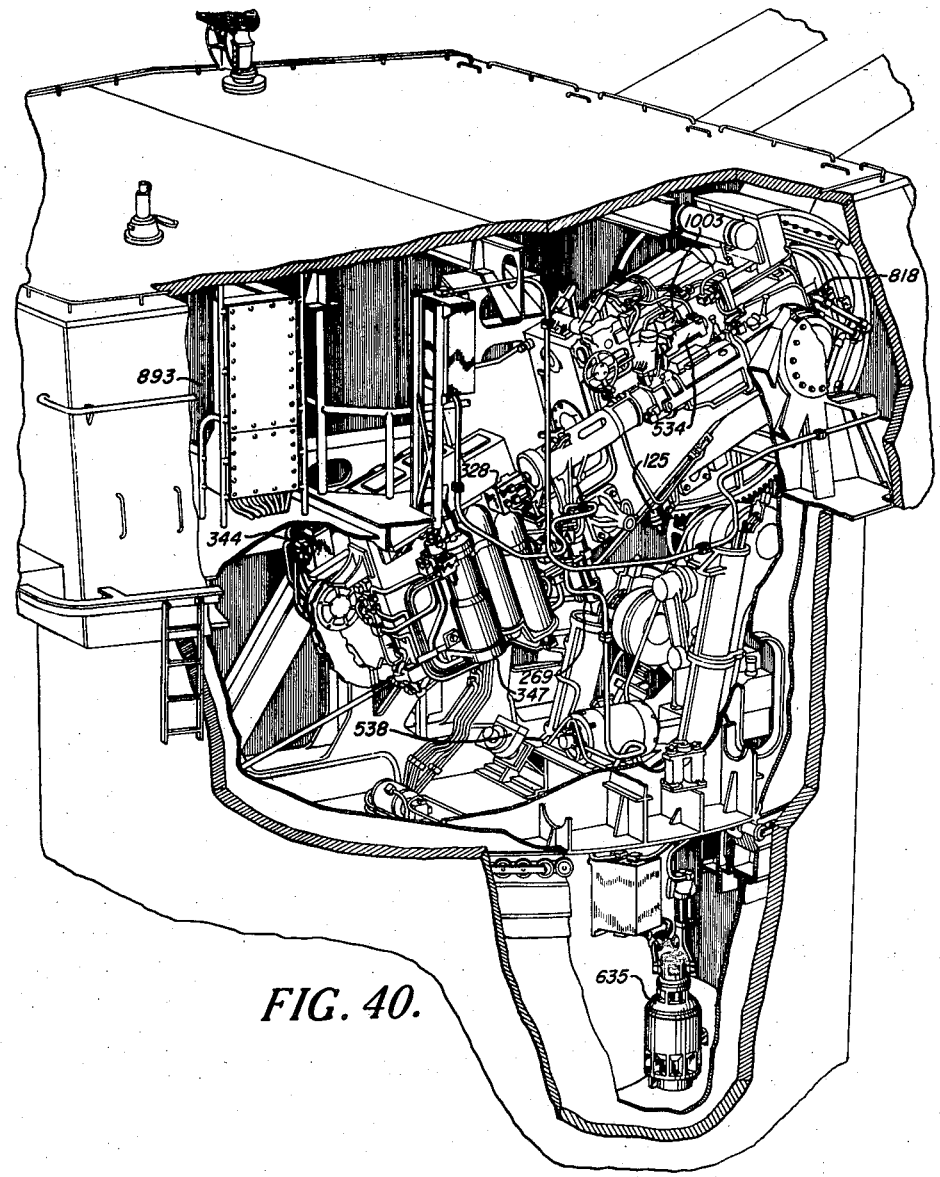
Figure 41:
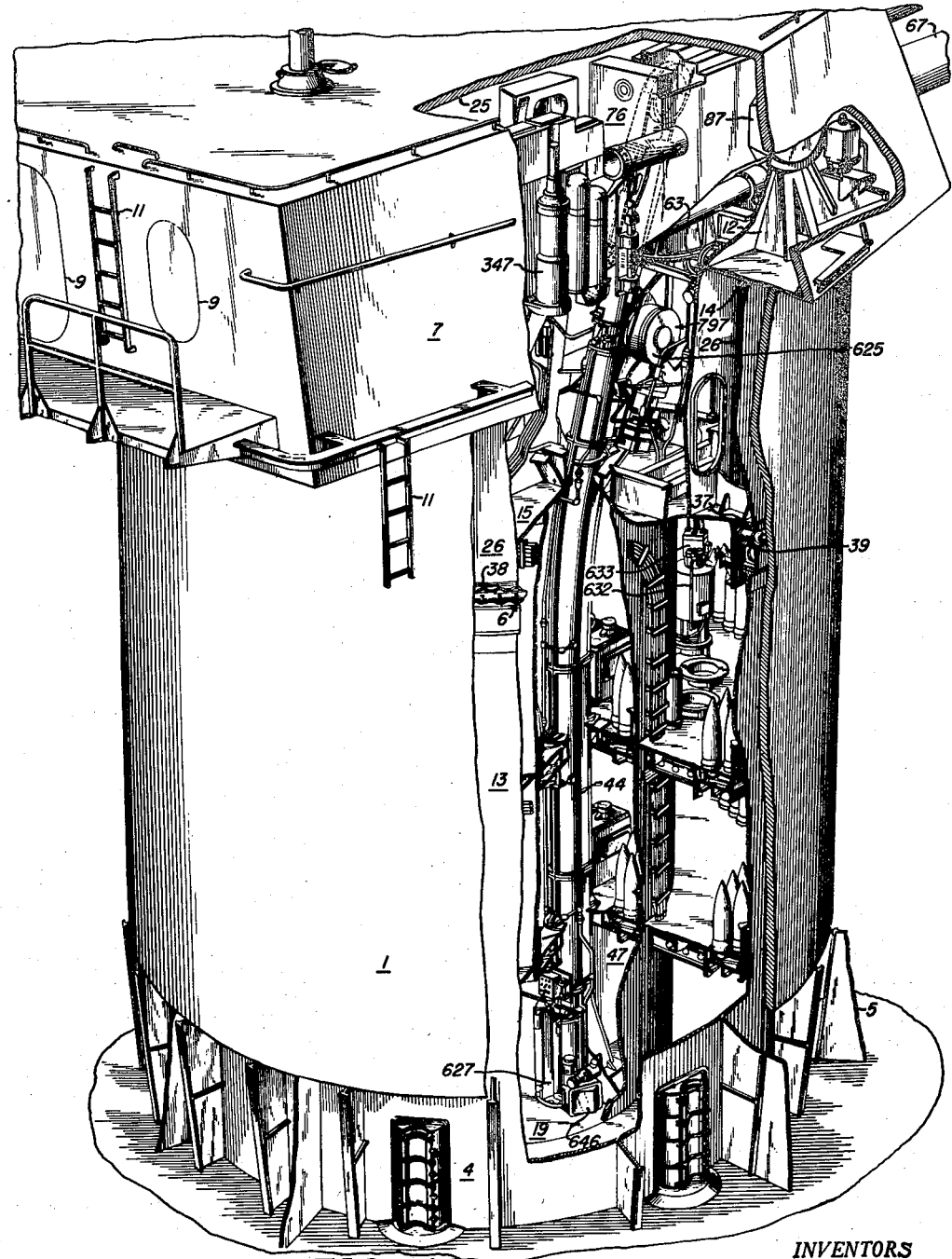
Figure 42:
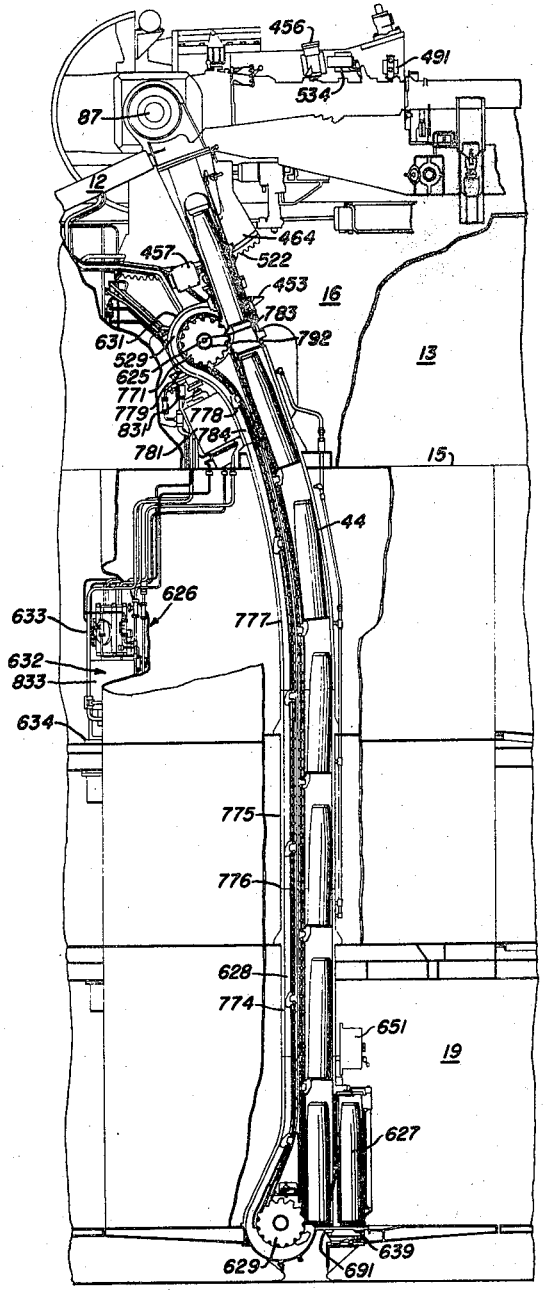
Figure 43:
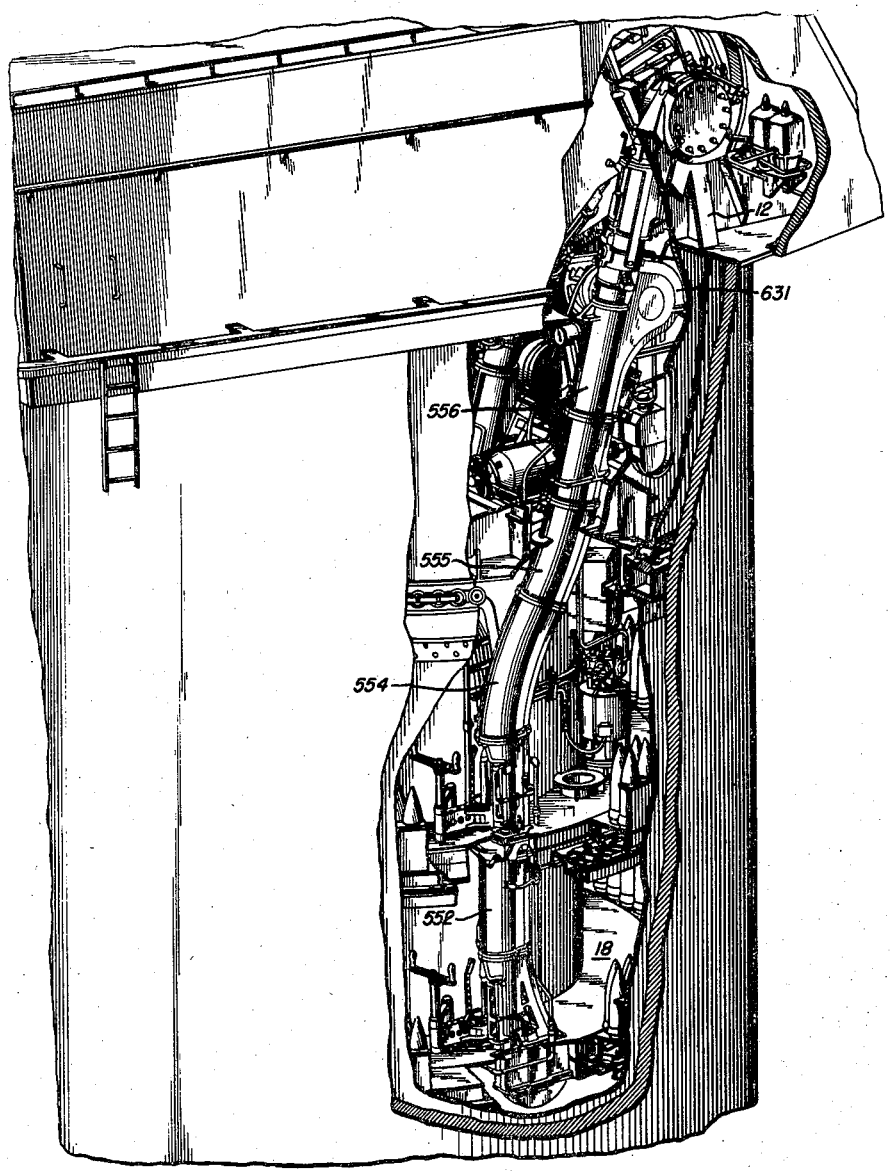
Figure 44:
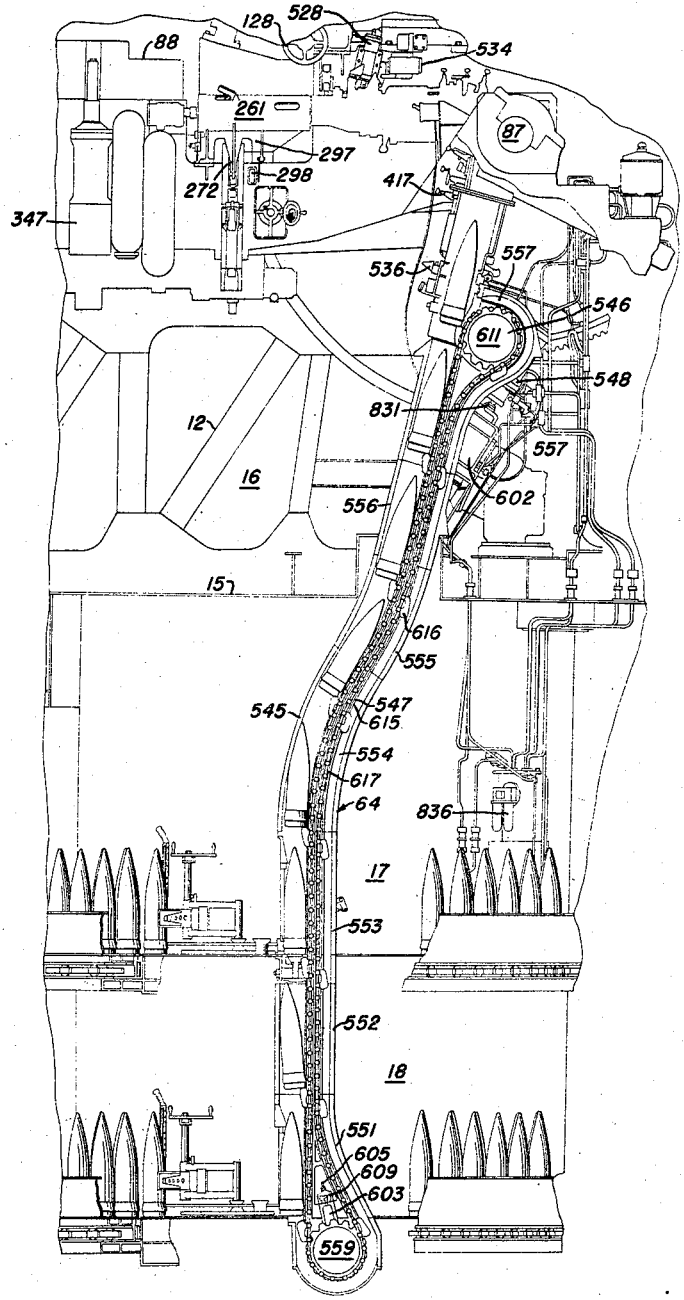
Figure 45:
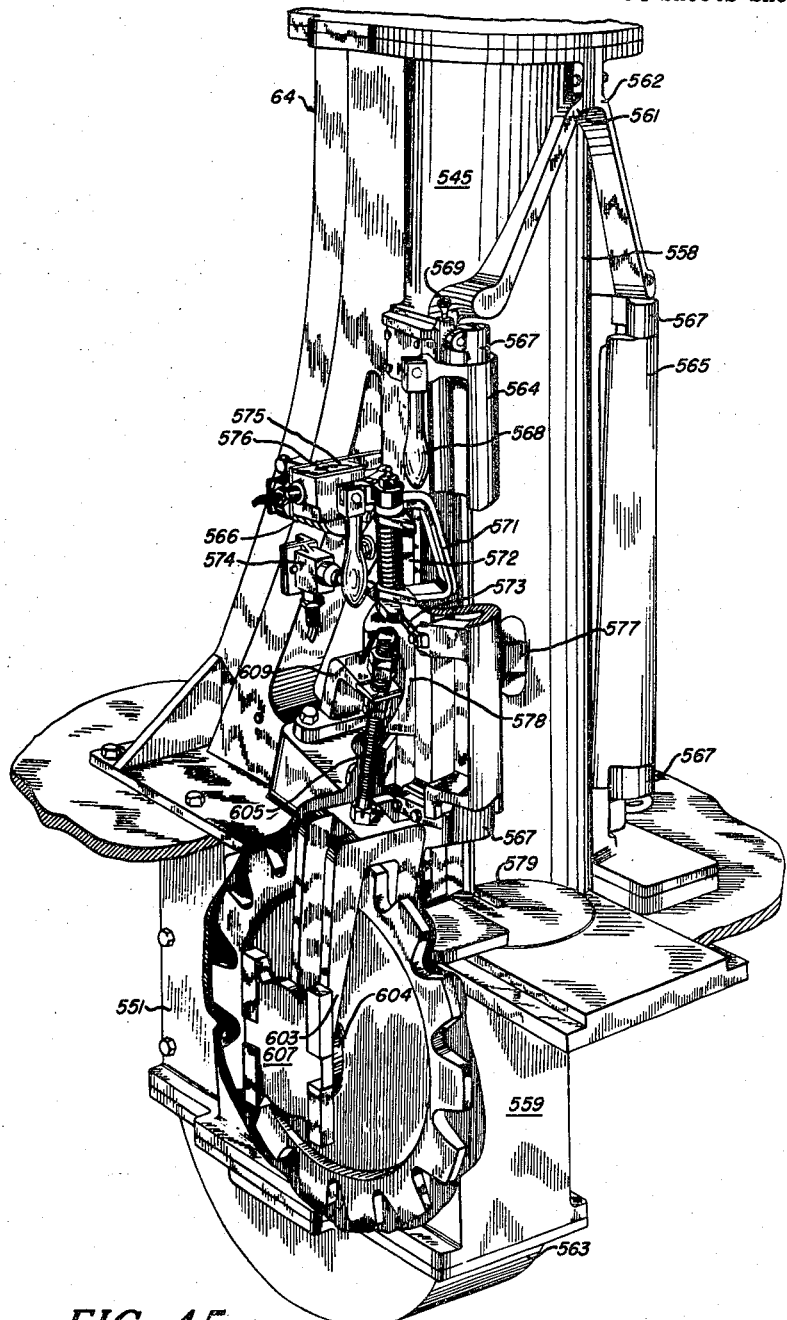
Figure 46:
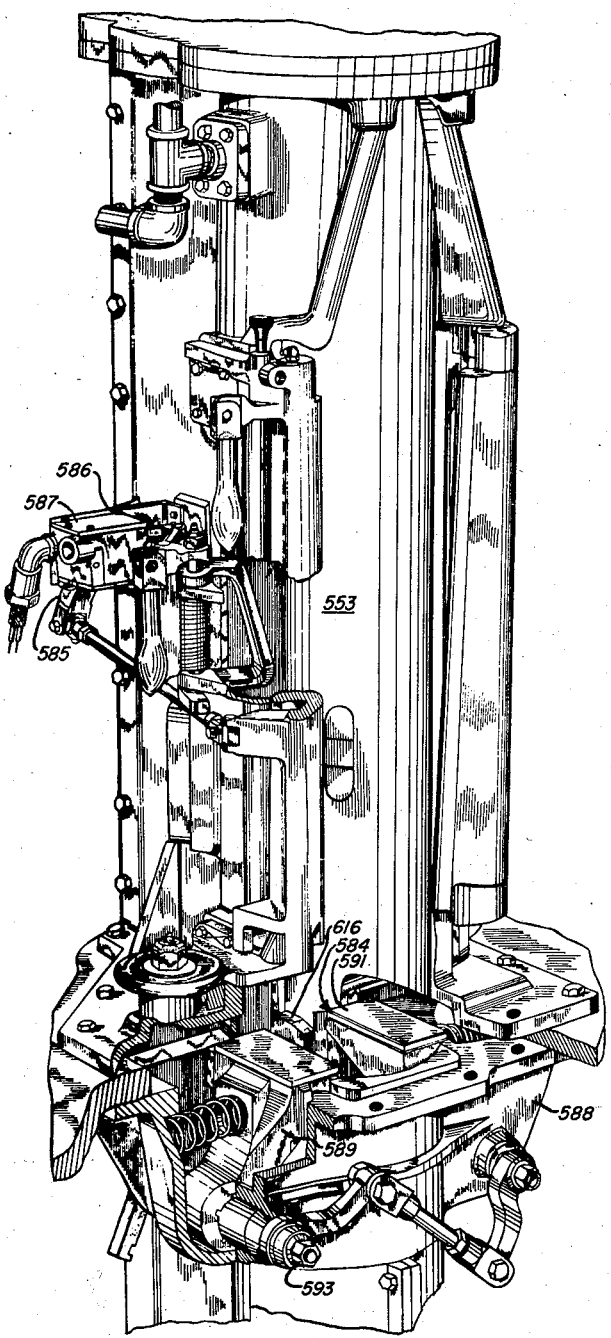
Figure 47:
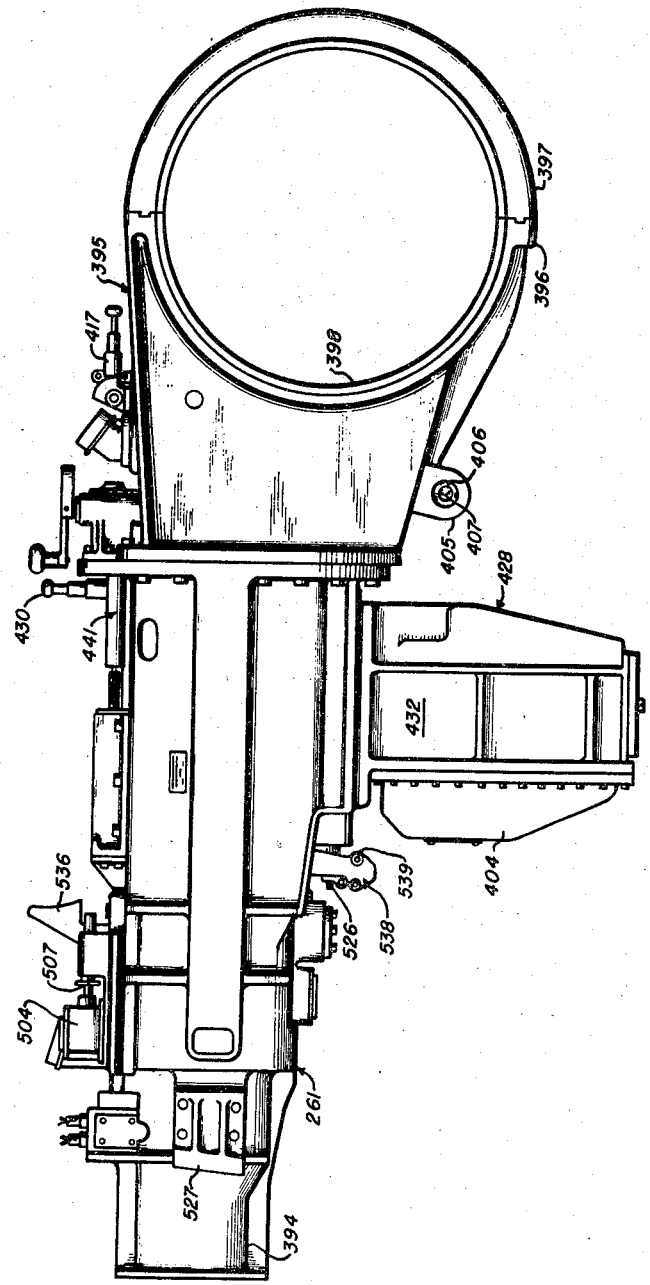
Figure 48:
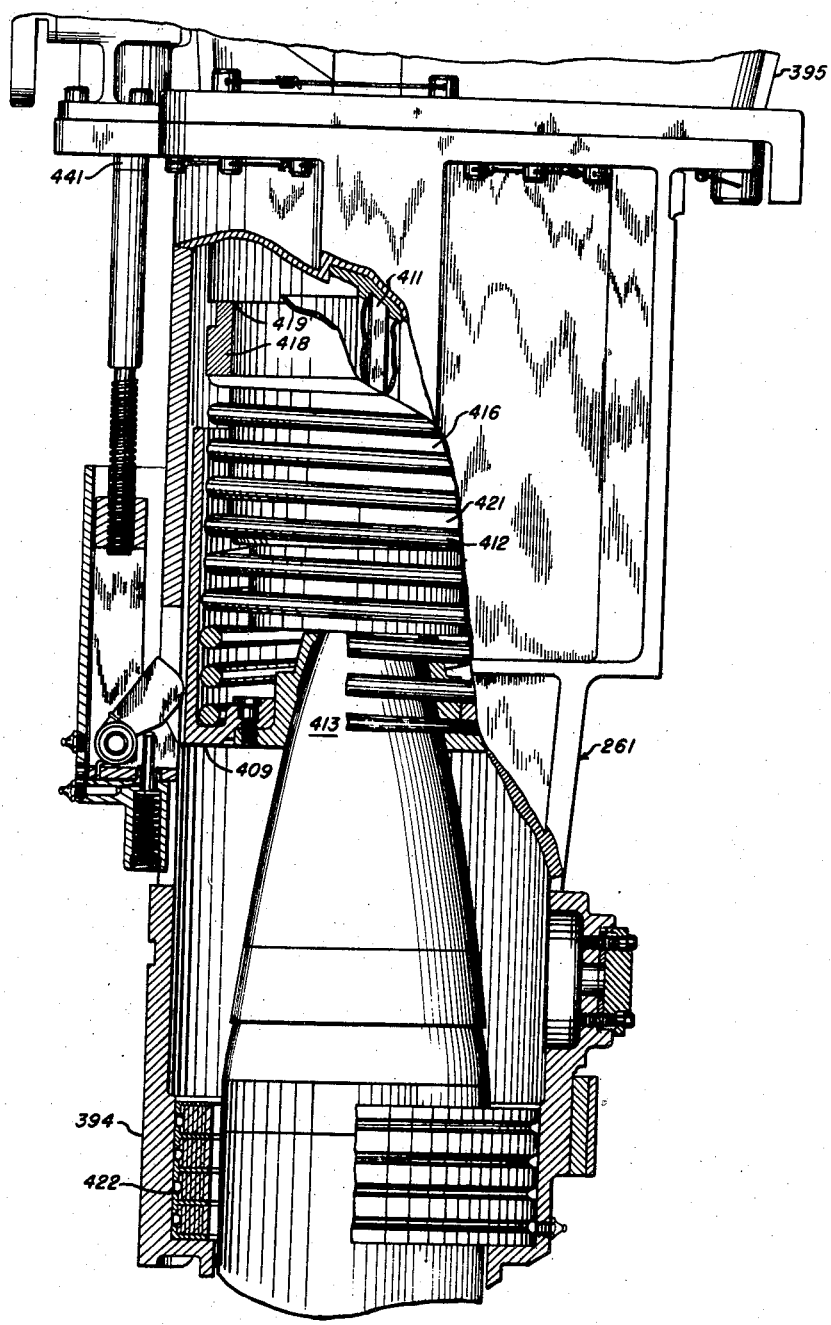
Figure 49:
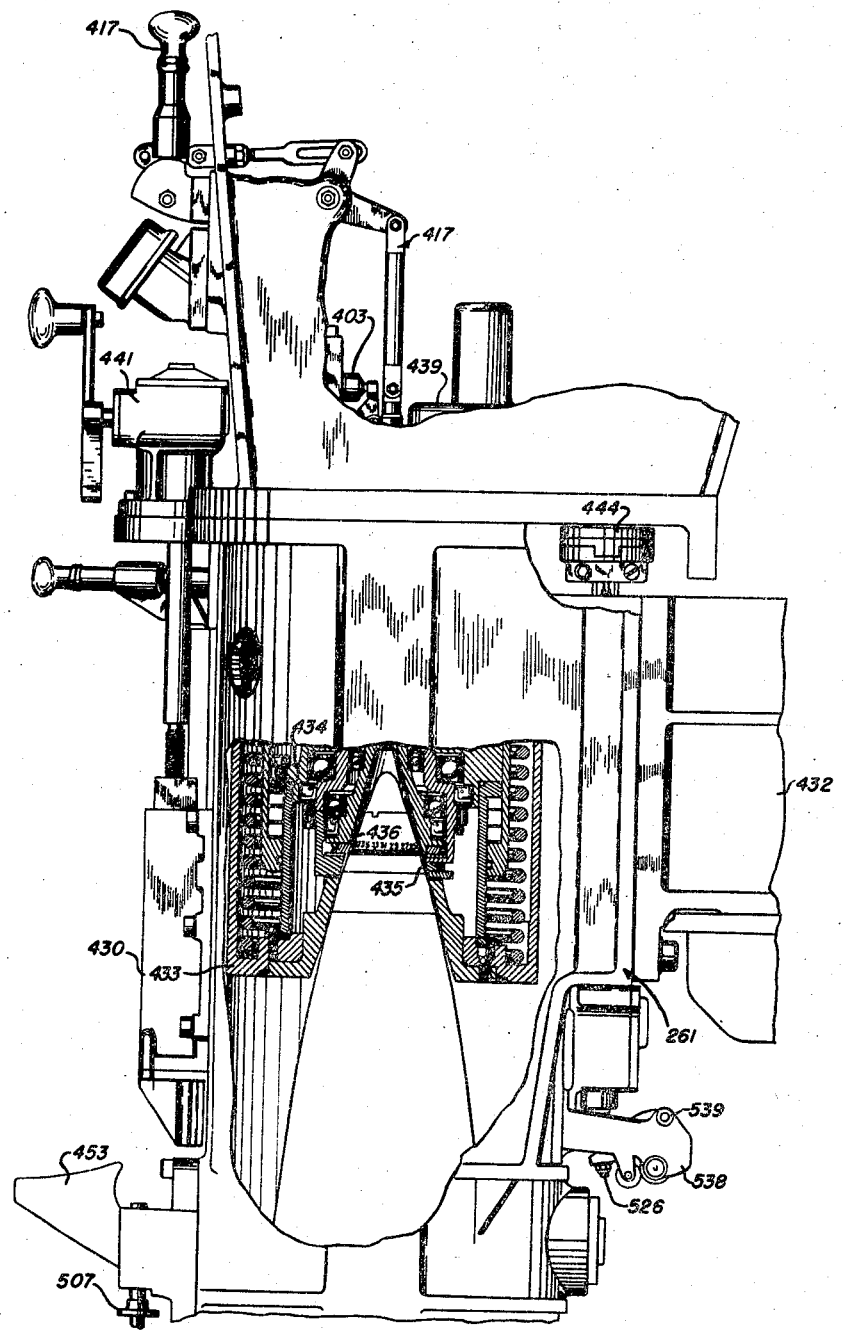
Figure 50:
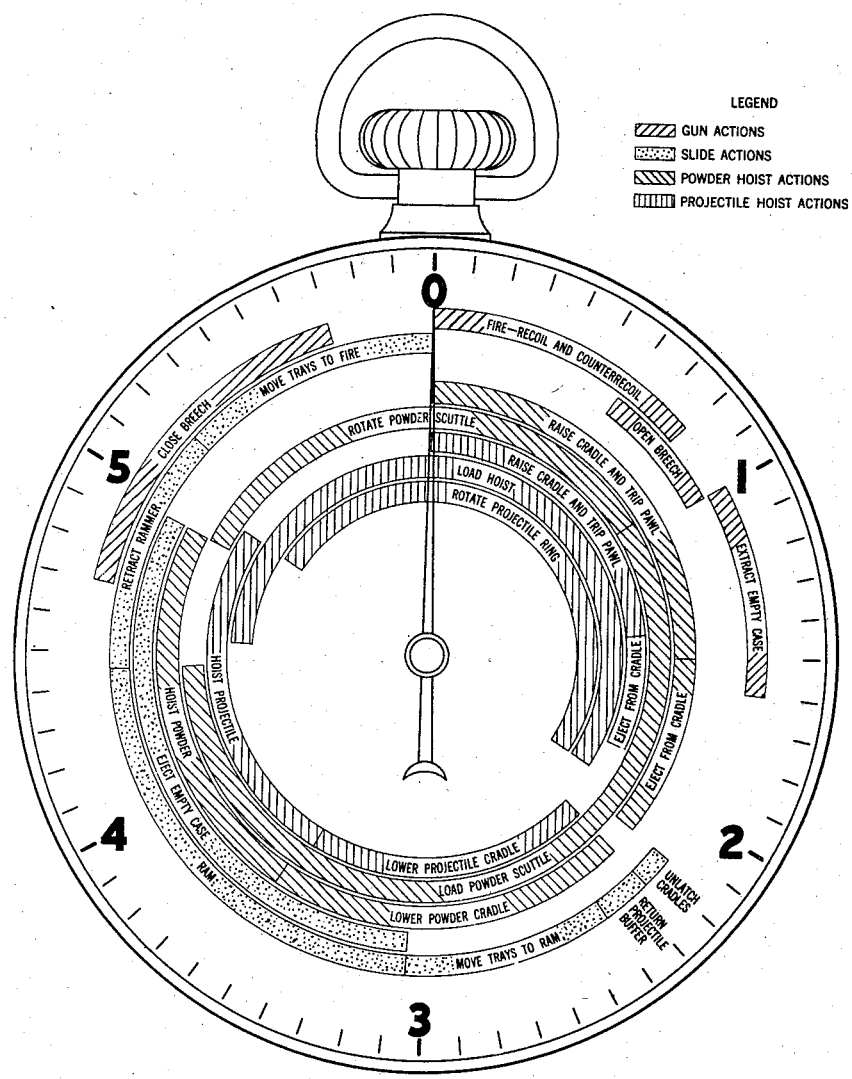
Figure 51:
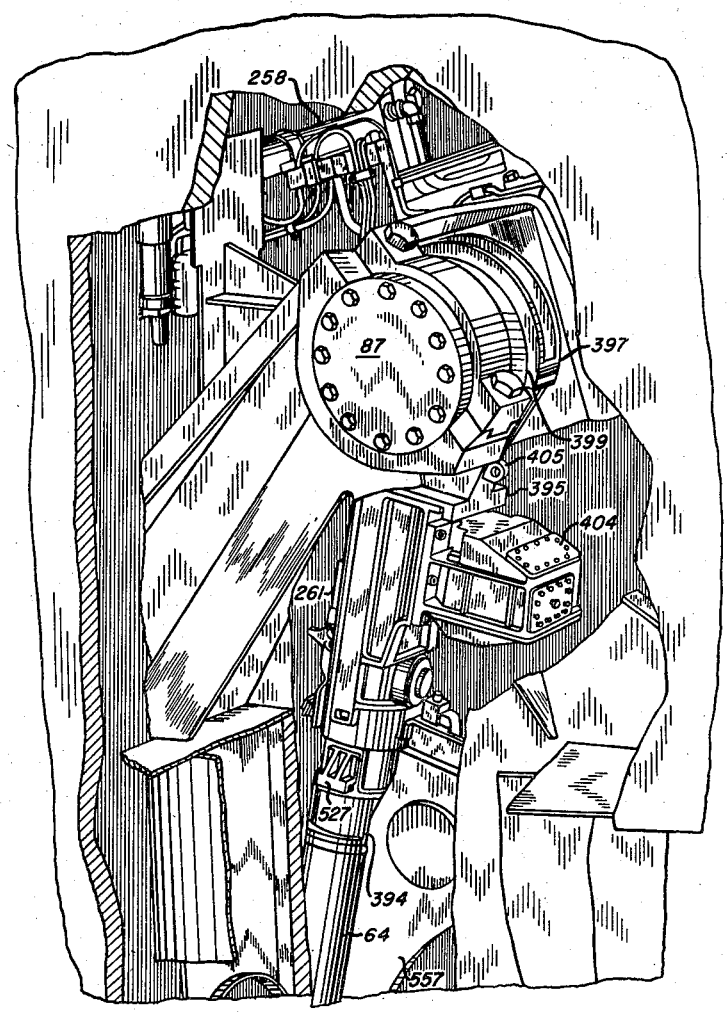
Figure 52:
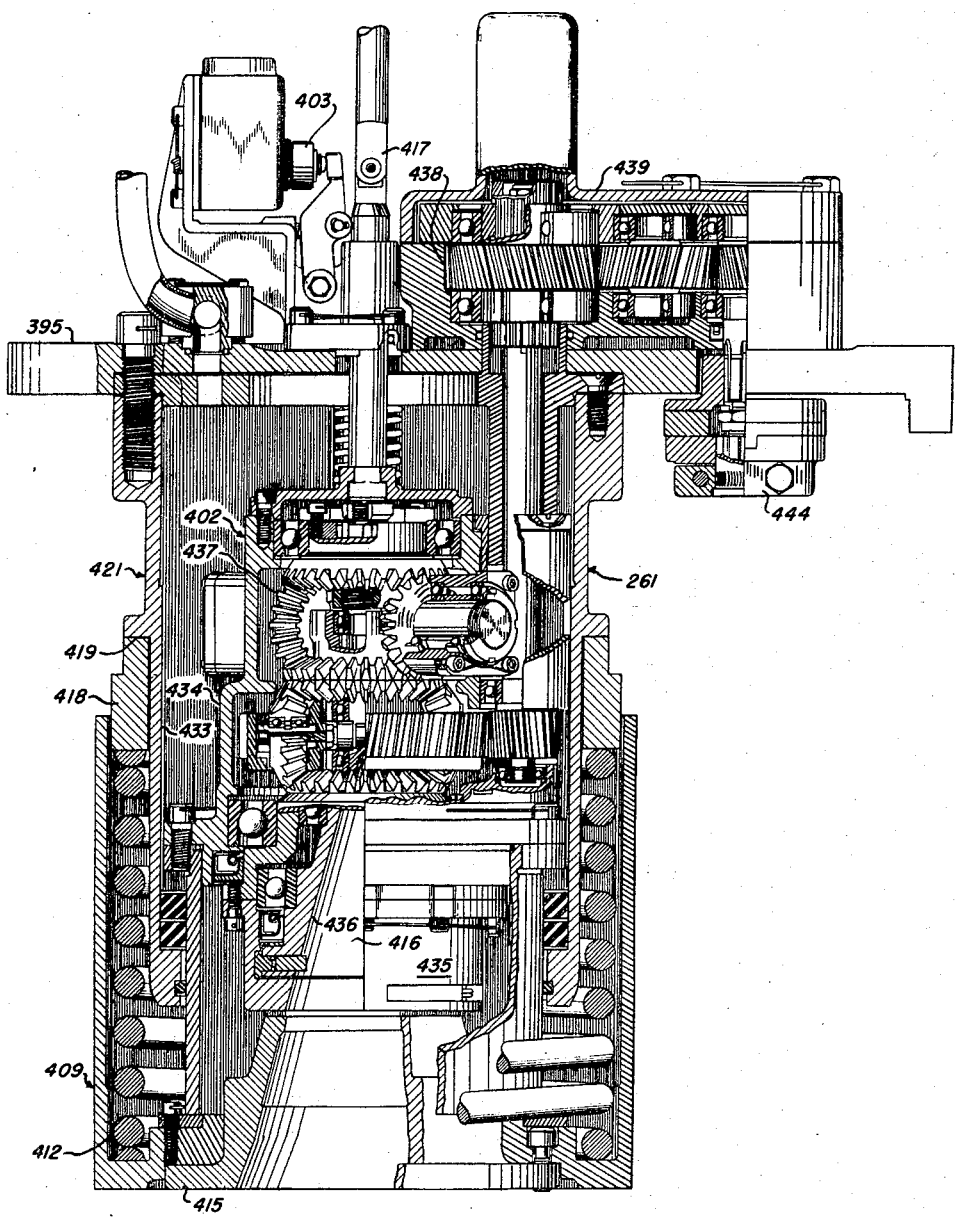
Figure 53:
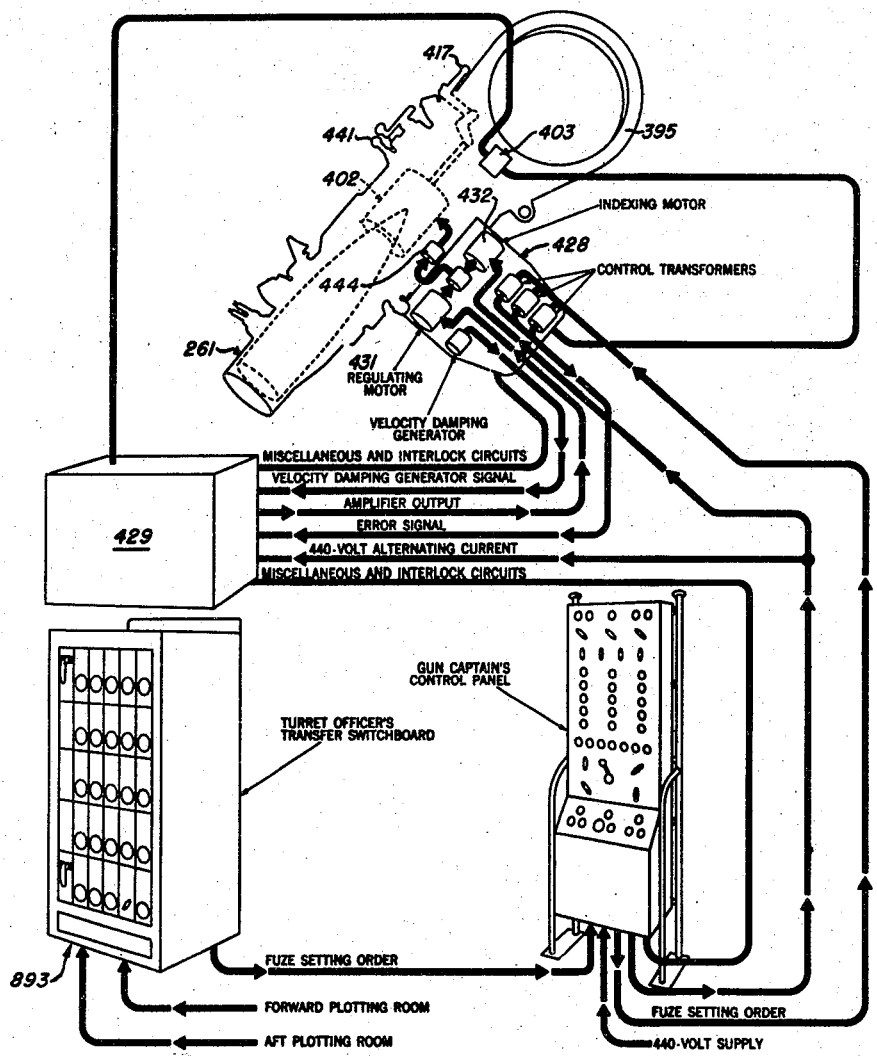
Figure 54:
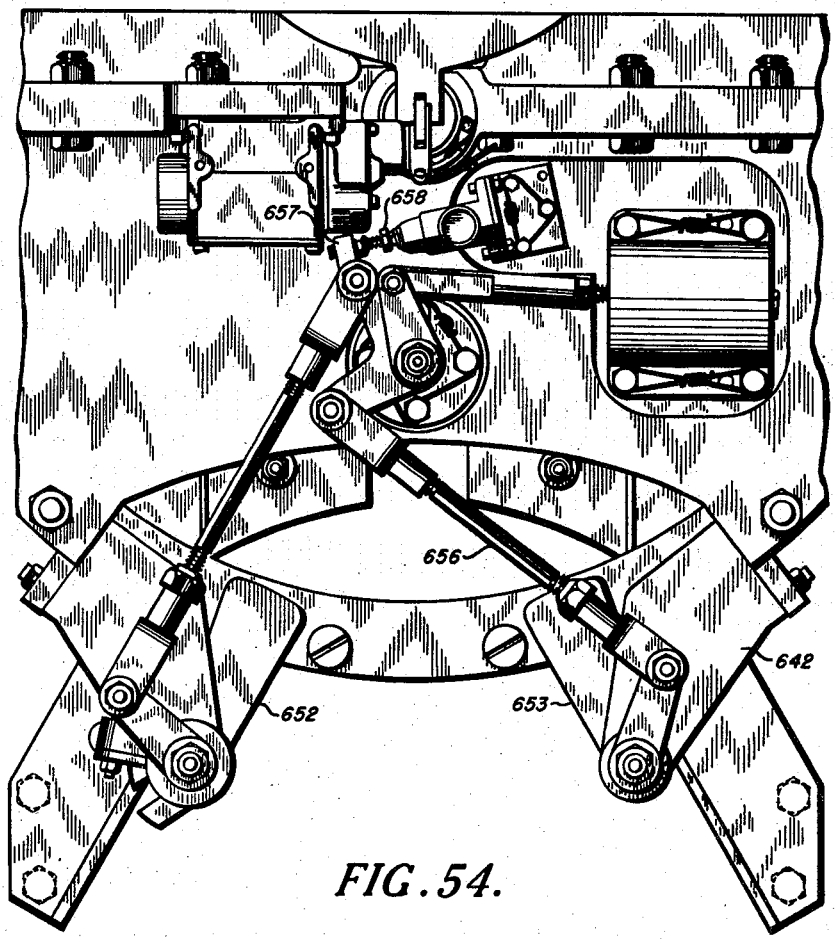
Figure 55:
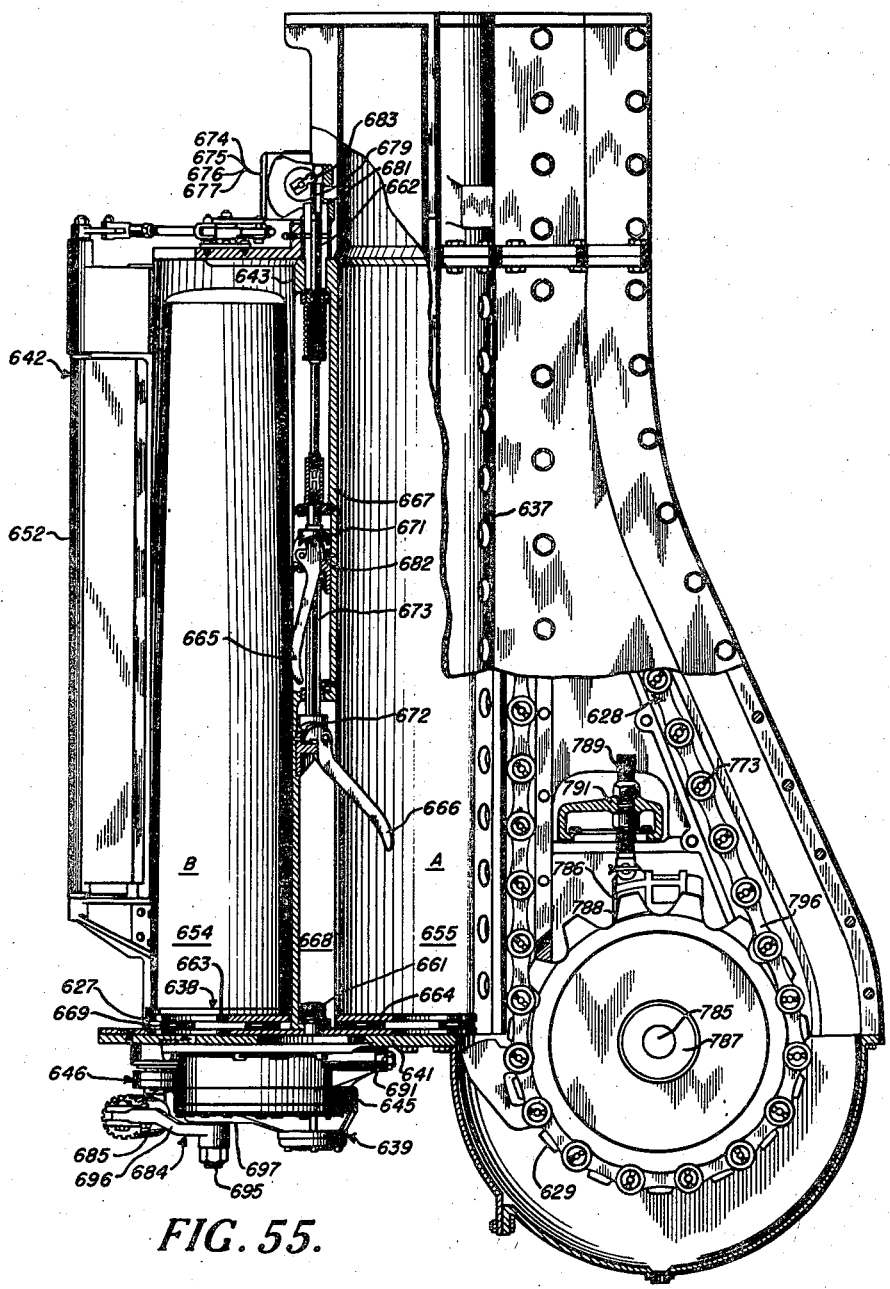
Figure 56:
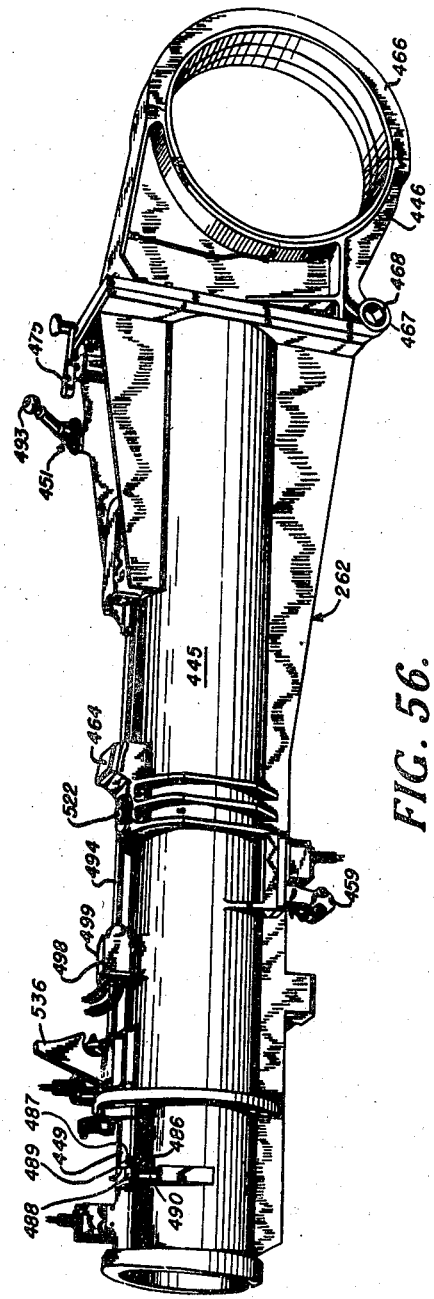
Figure 57:
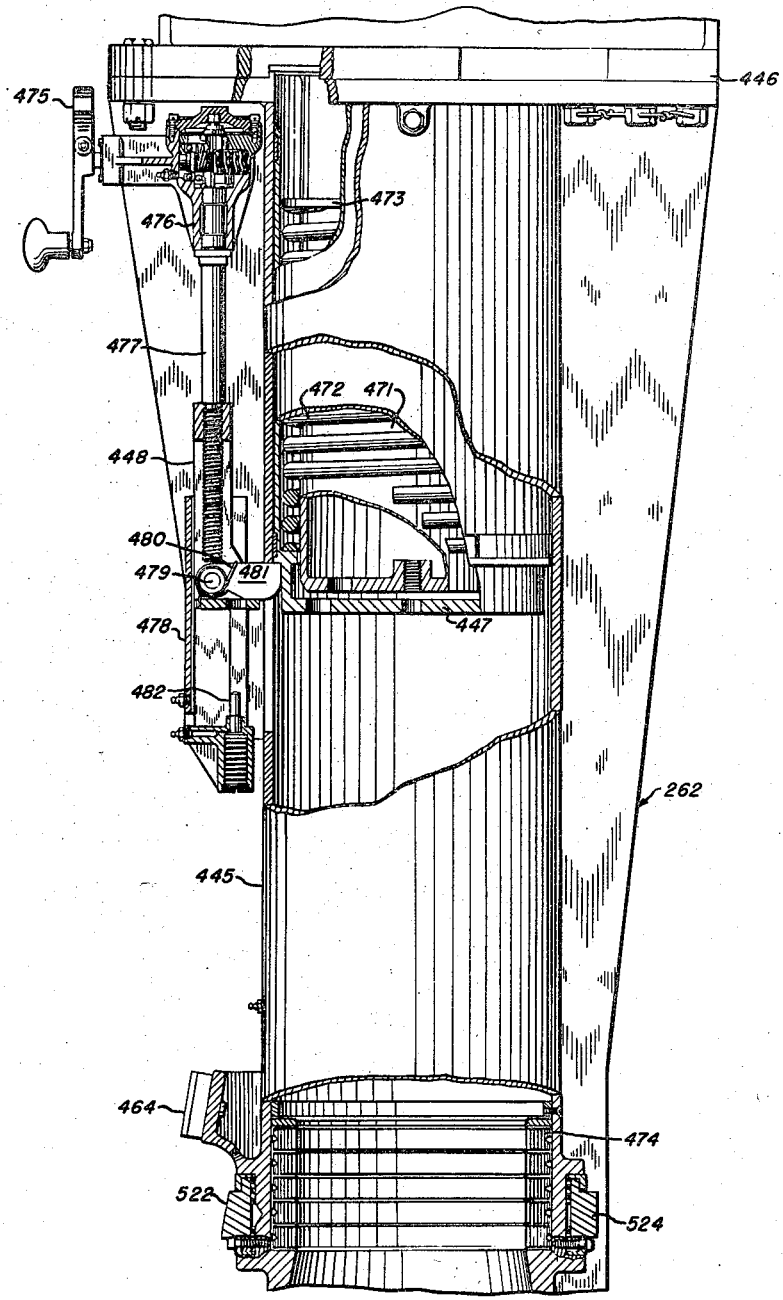
Figure 58:
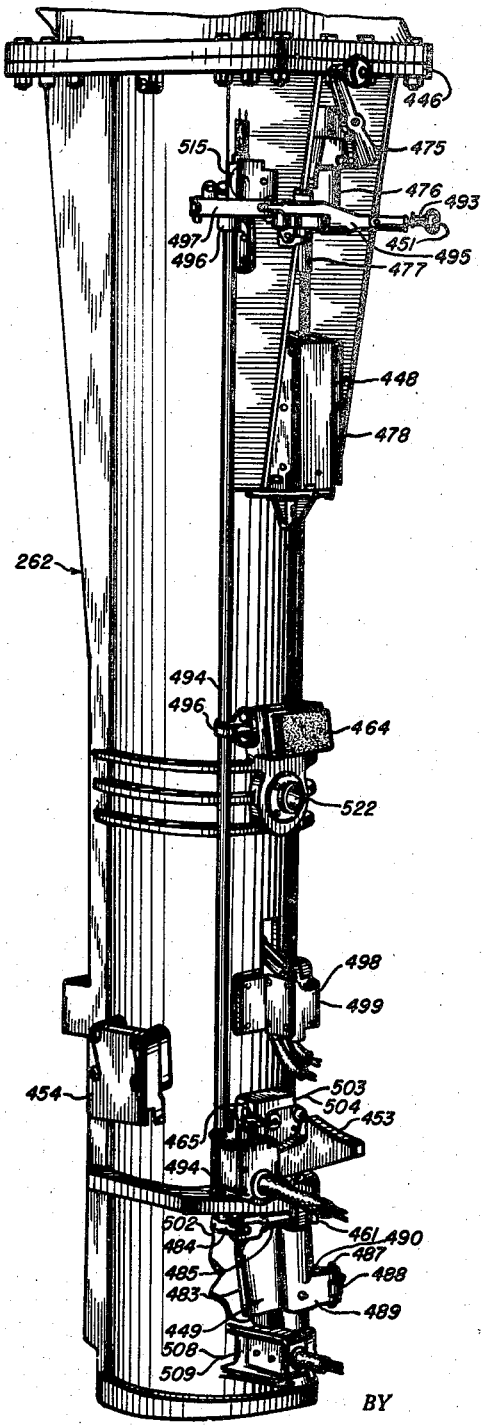
Figure 59:
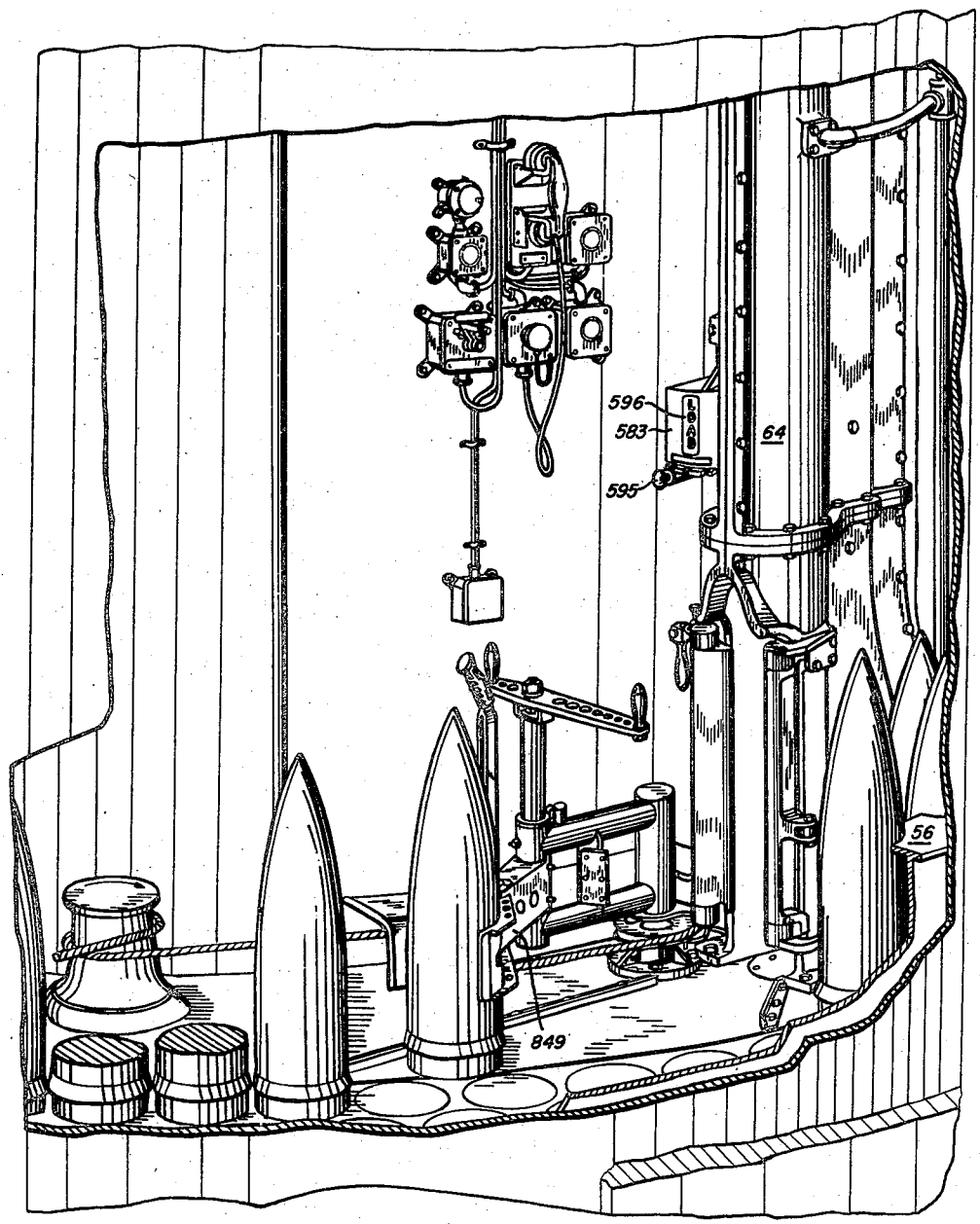
Figure 60:
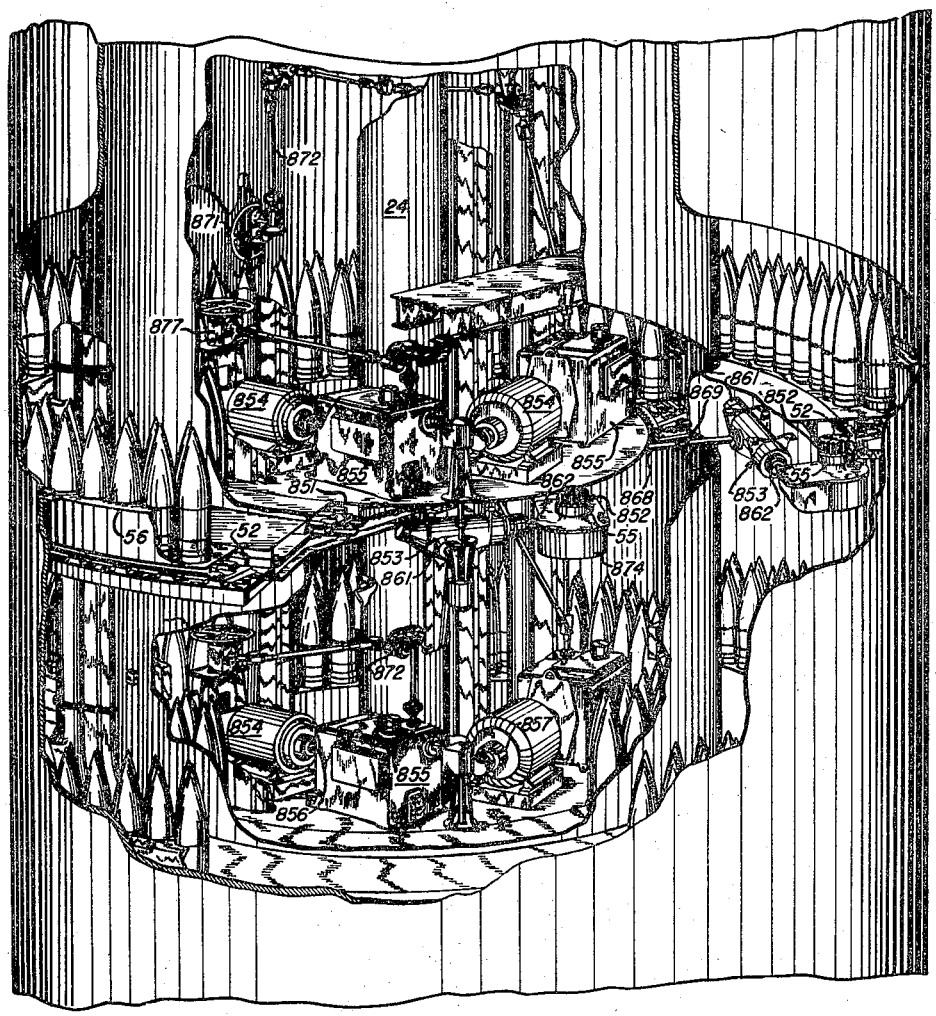
Figure 61:
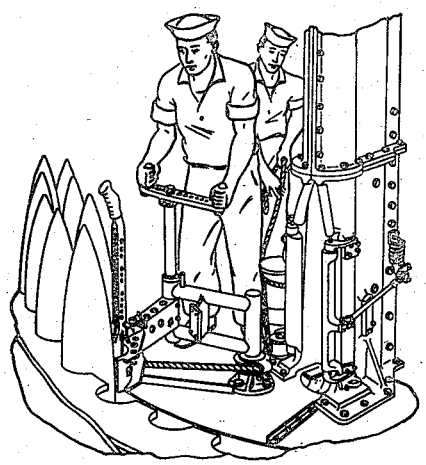
Figure 62:
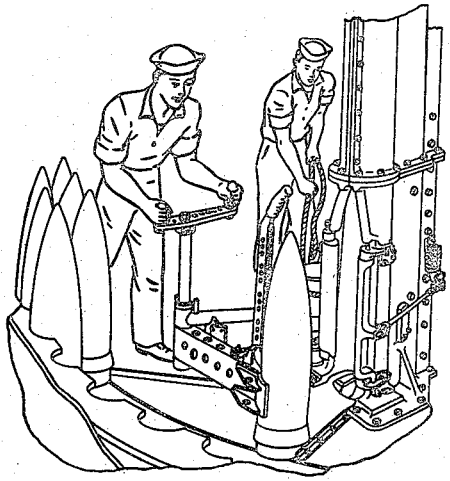
Figure 63:
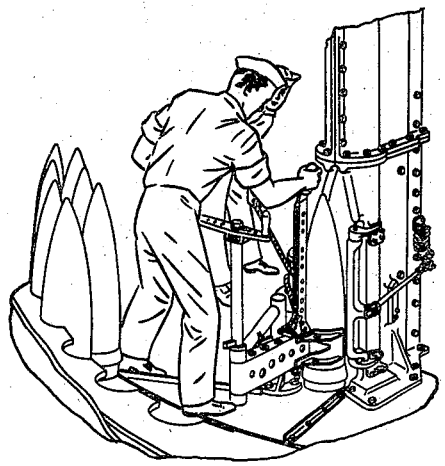
Figure 64:
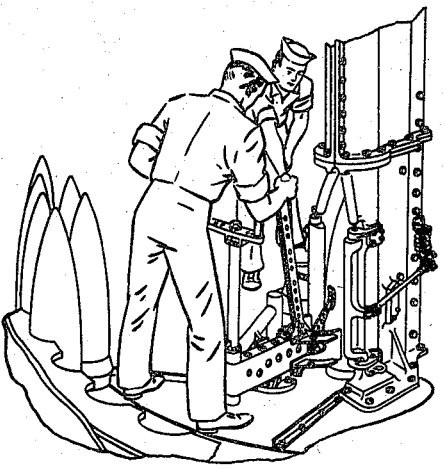
Figure 65:
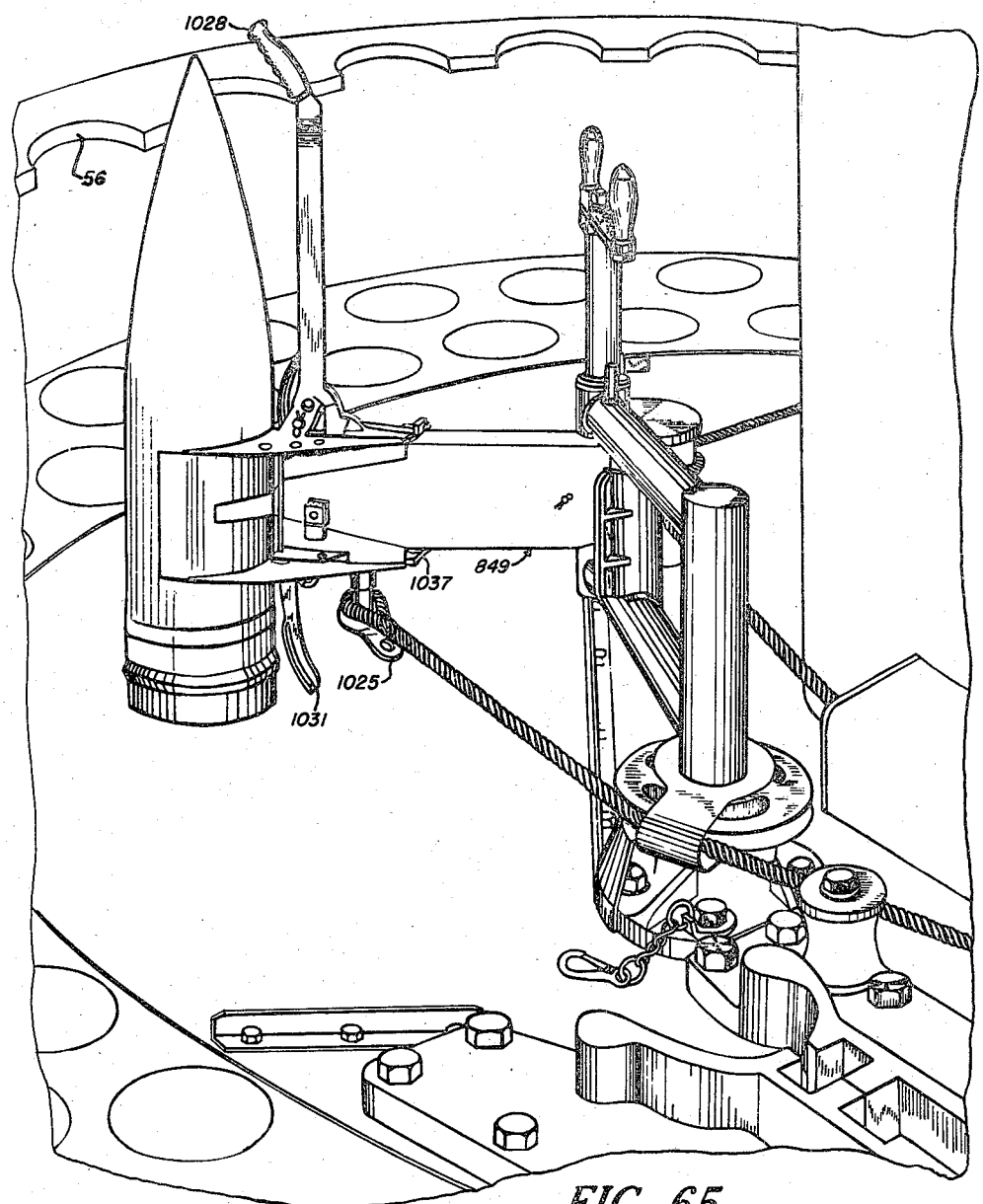
Figure 66:
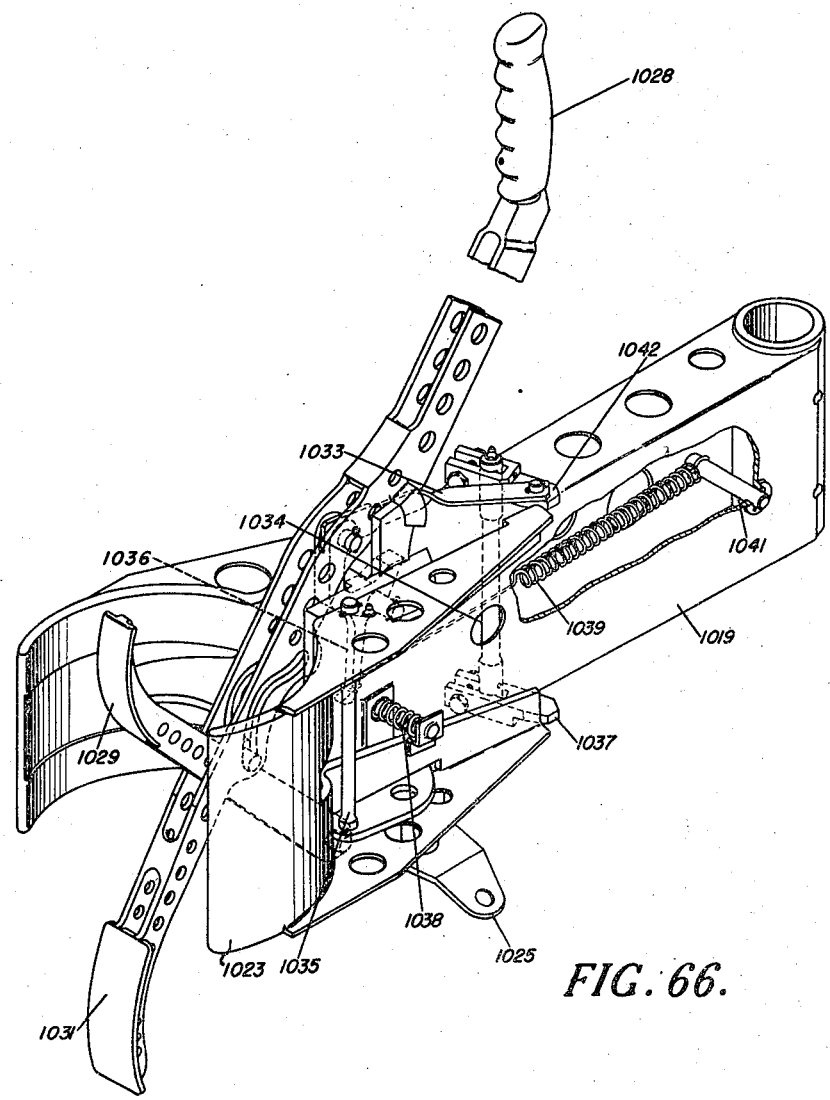
Figure 67:
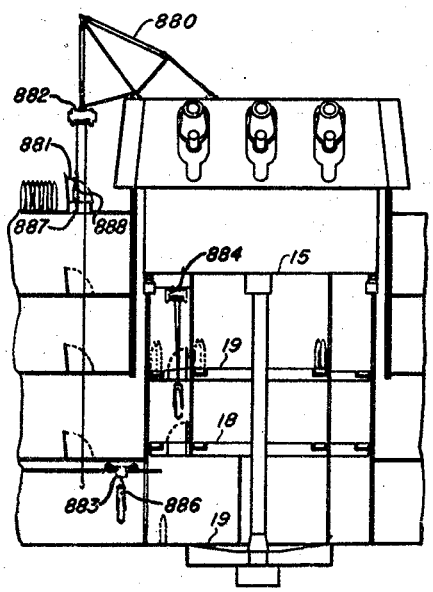
Figure 68:
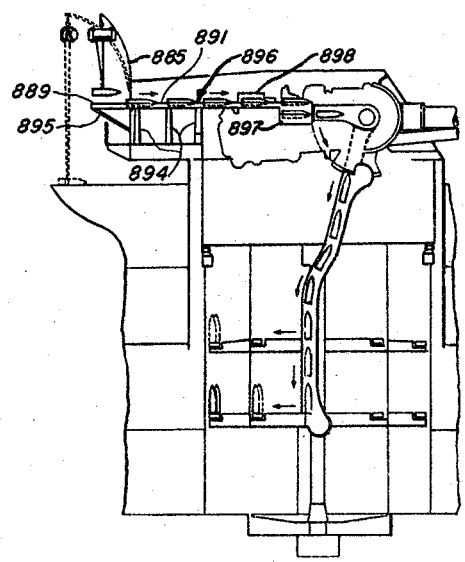
Figure 99:
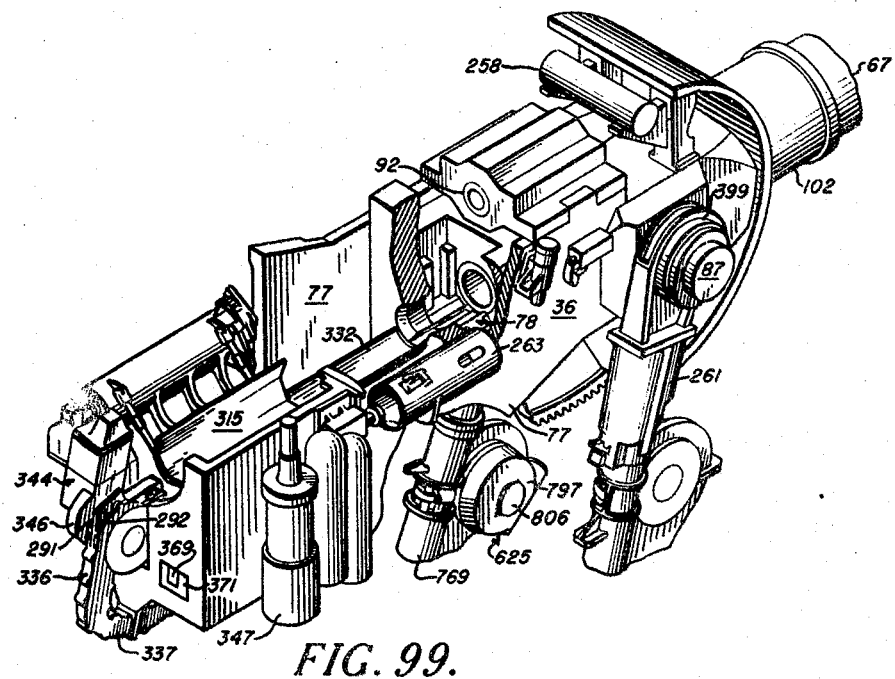
Figure 69:
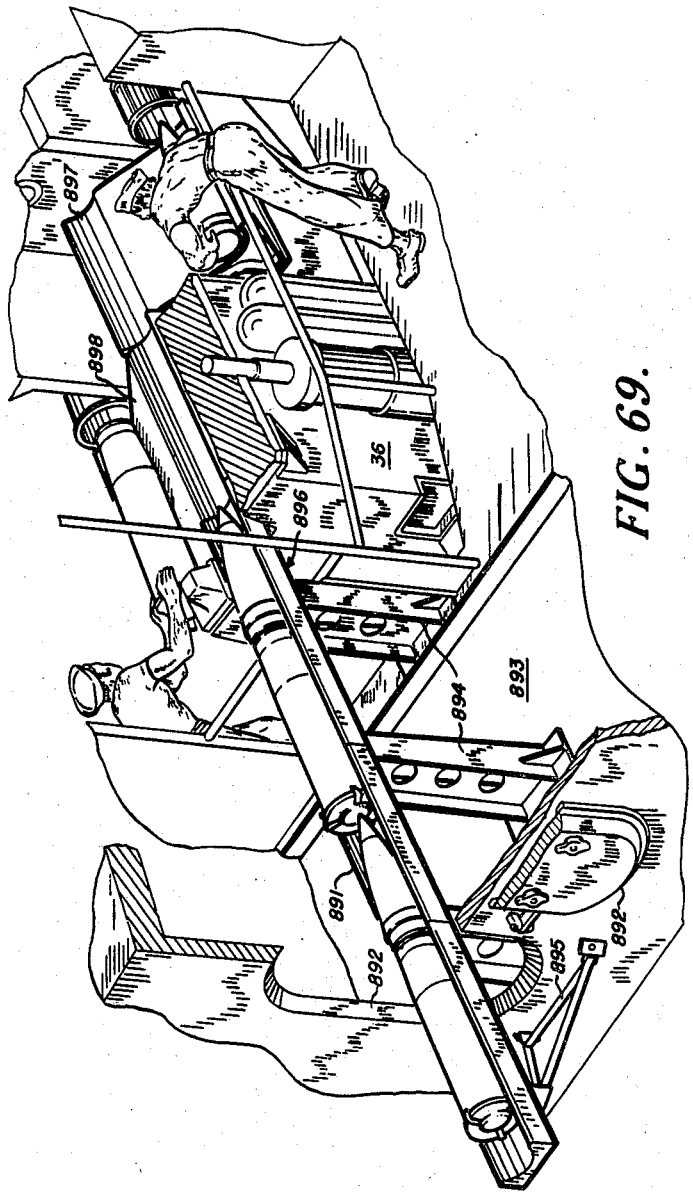
Figure 70:
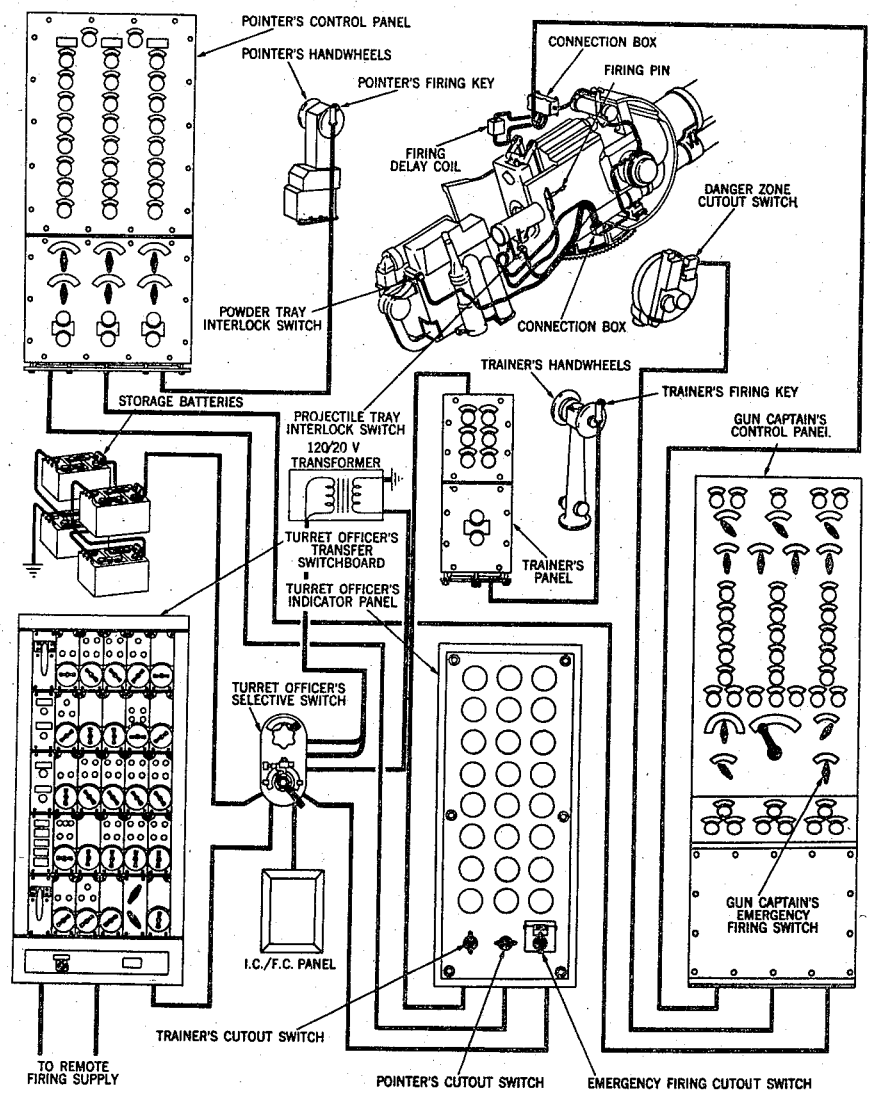
Figure 71:
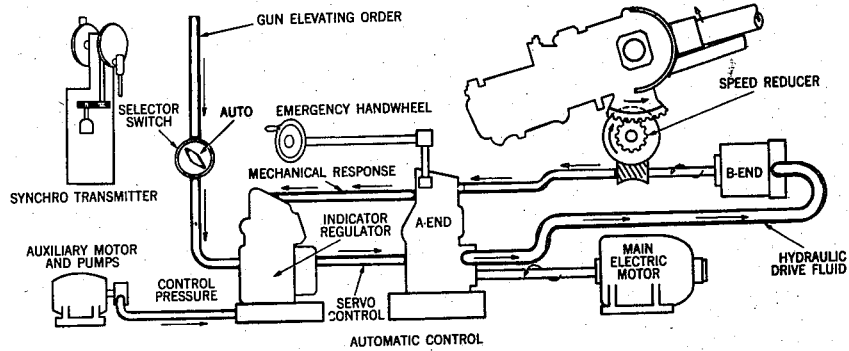
Figure 72:
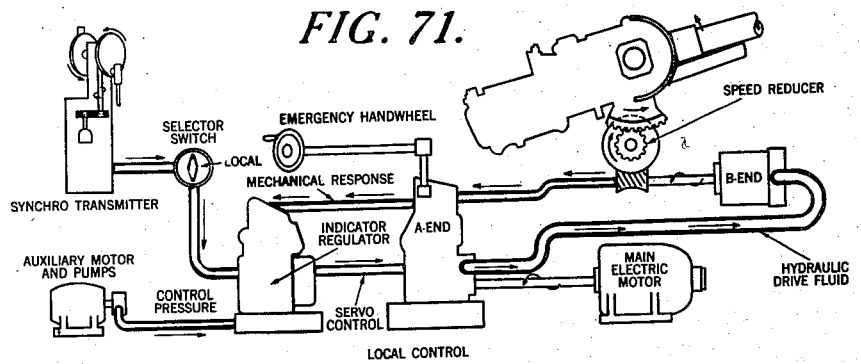
Figure 73:
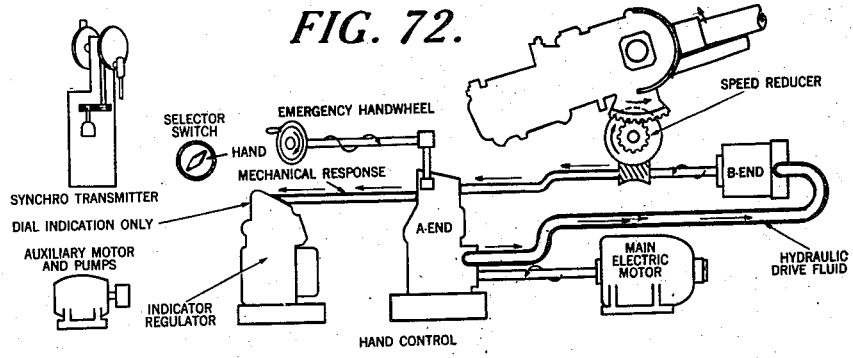
Figure 74:
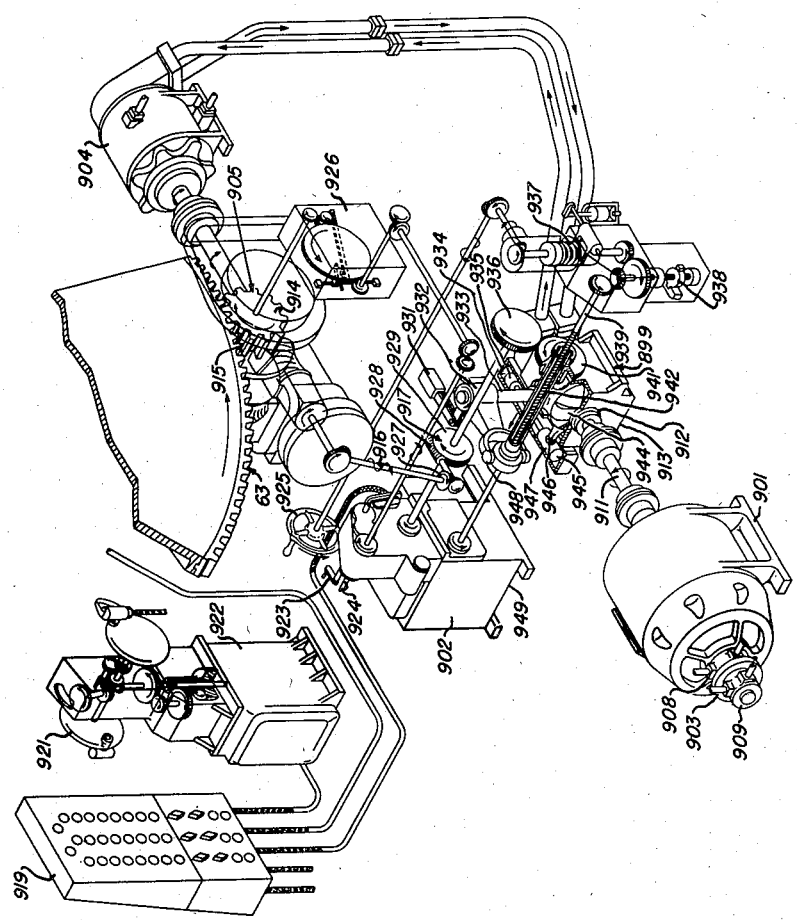
Figure 75:
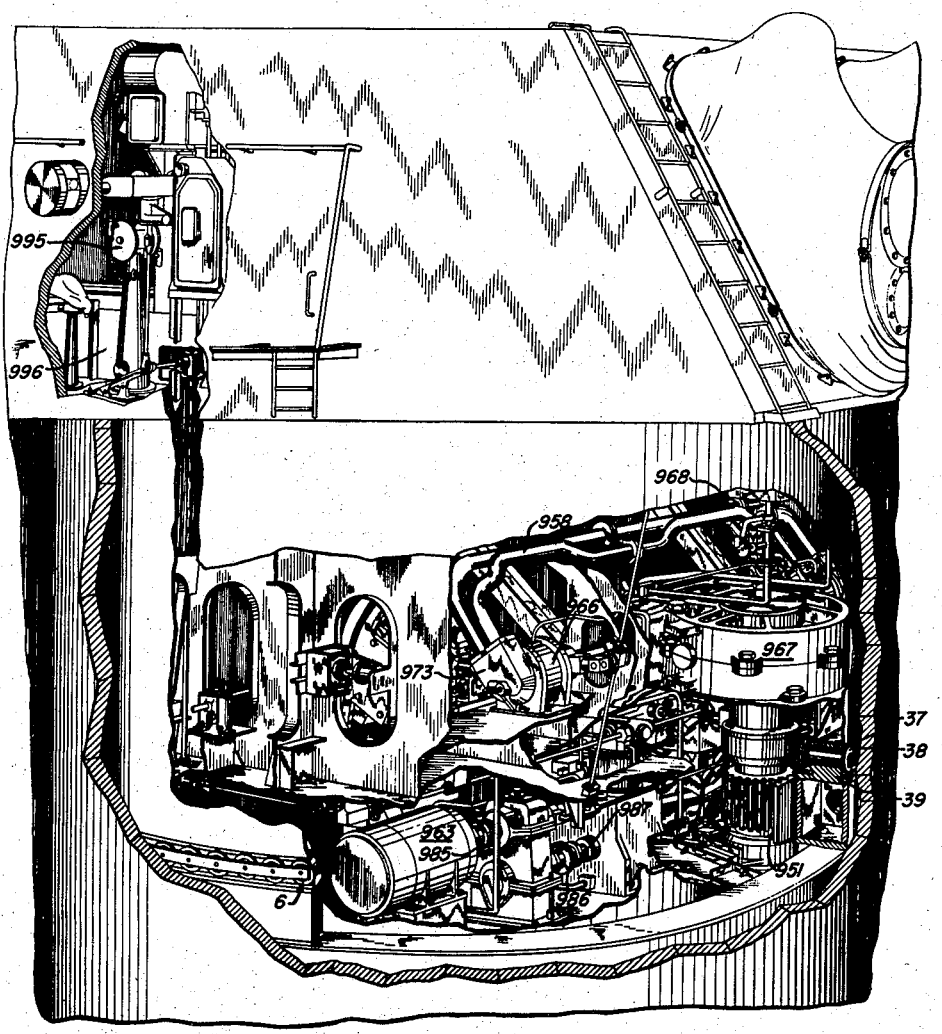
Figure 76:
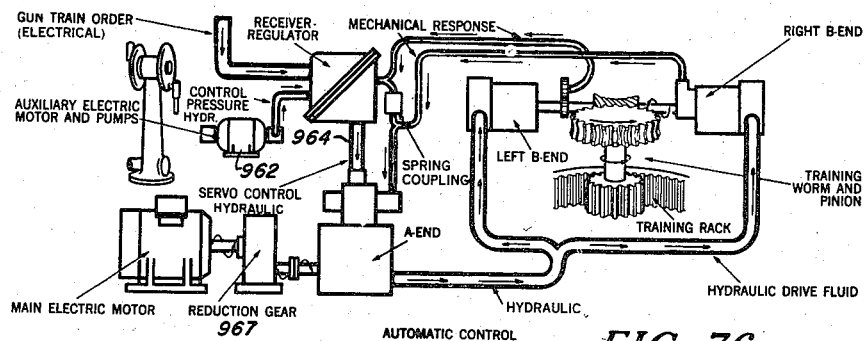
Figure 77:
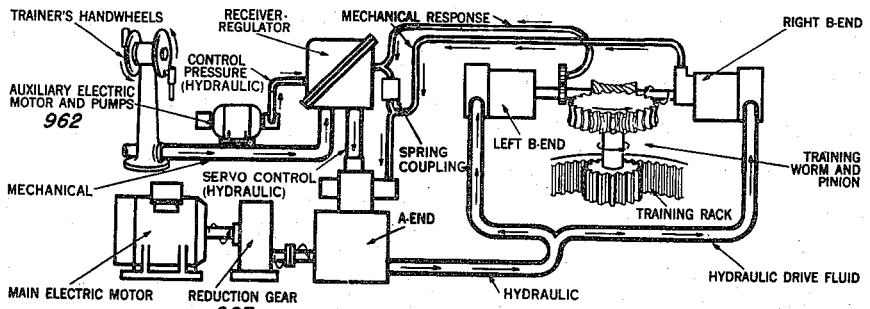
Figure 78:
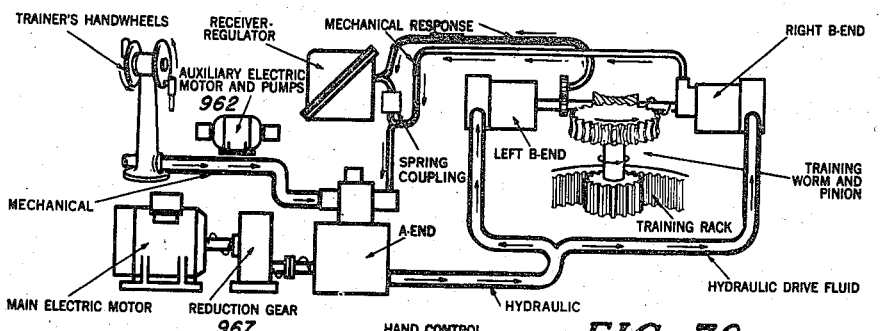
Figure 79:
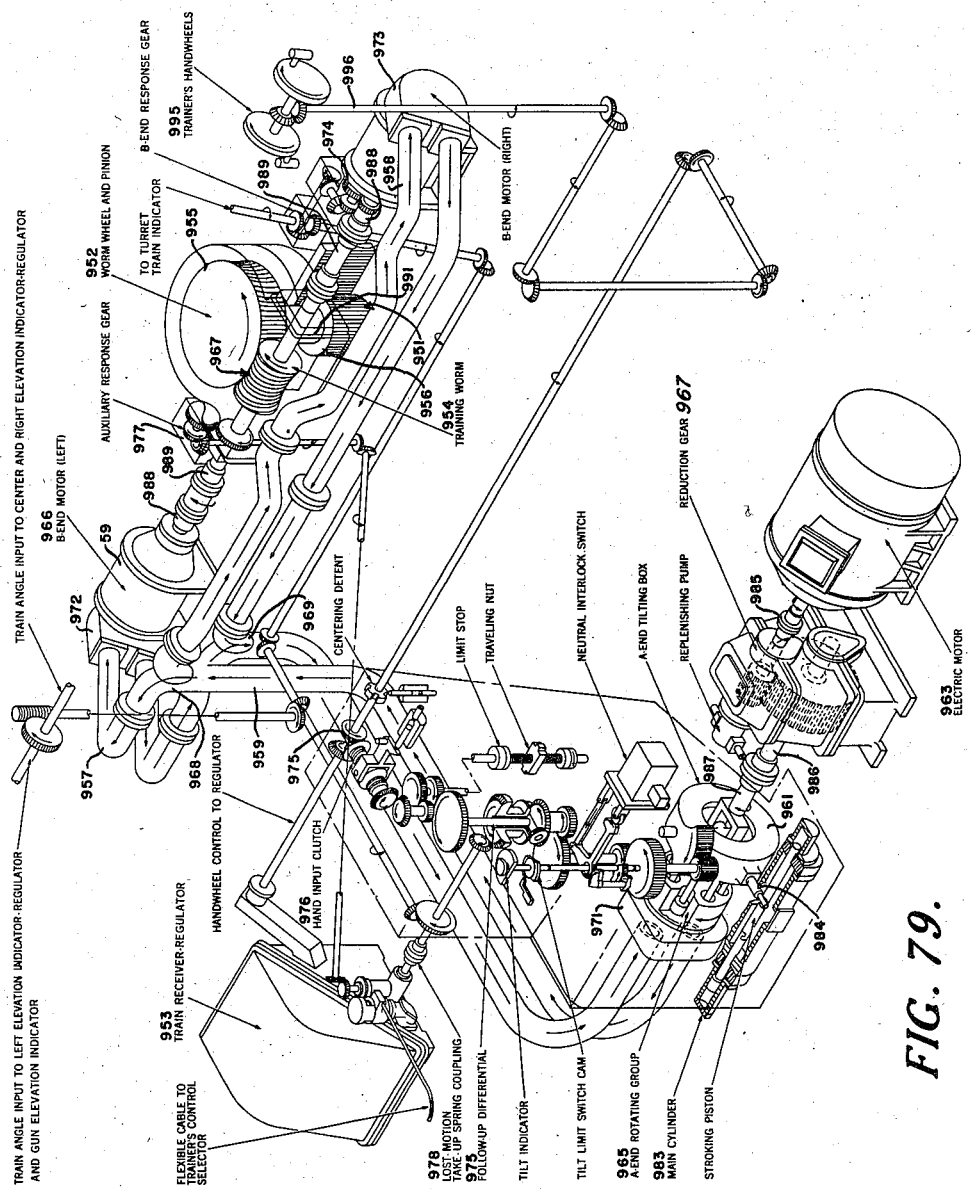
Figure 80:
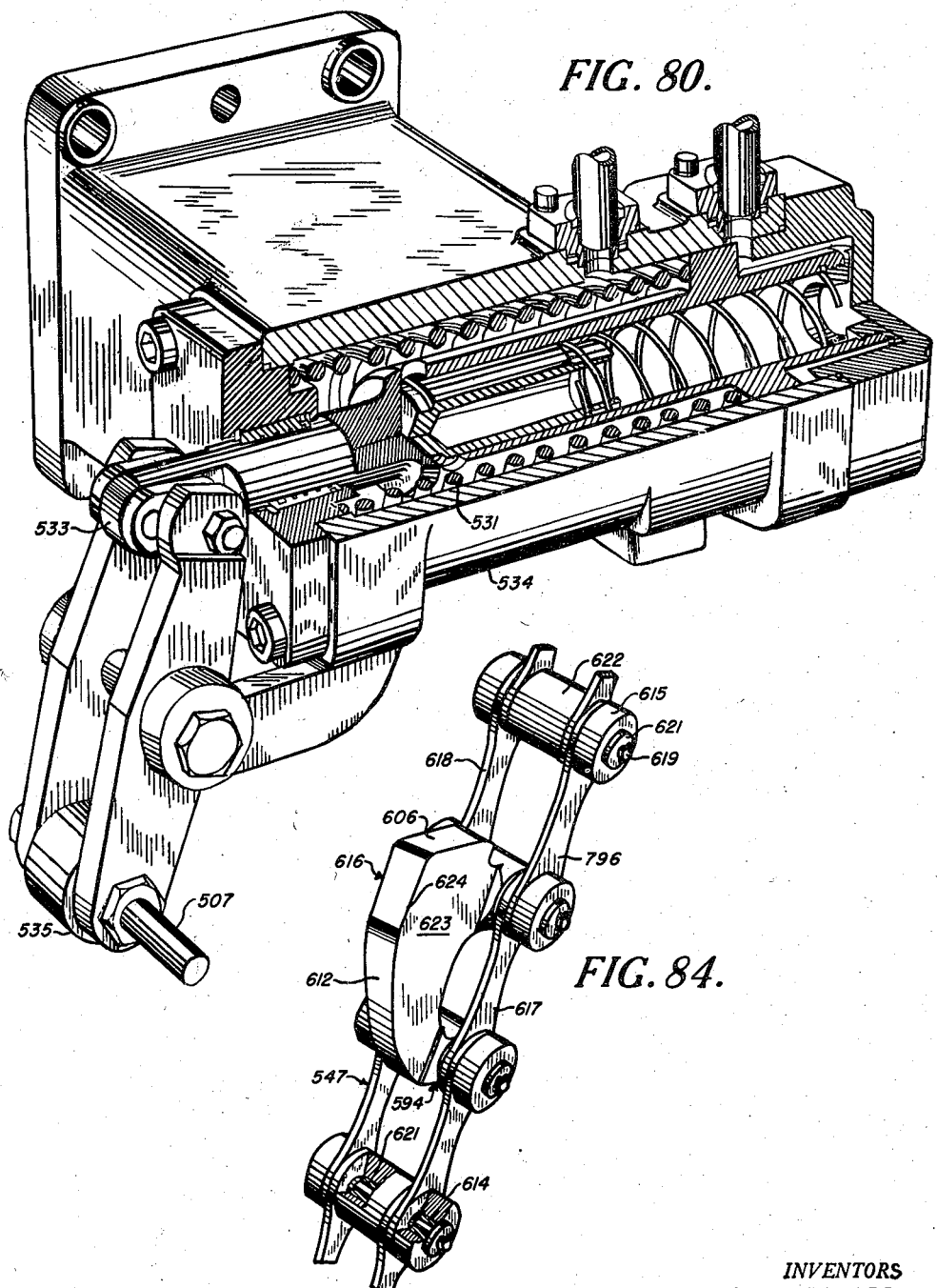
Figure 81:
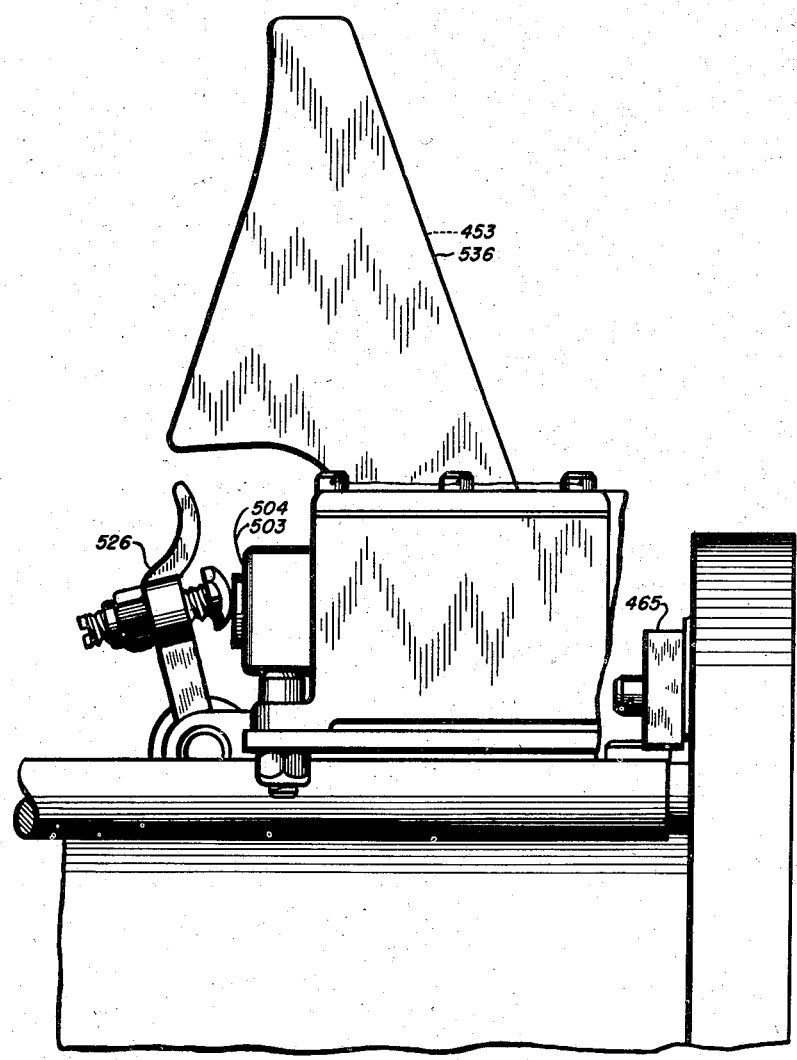
Figure 82:
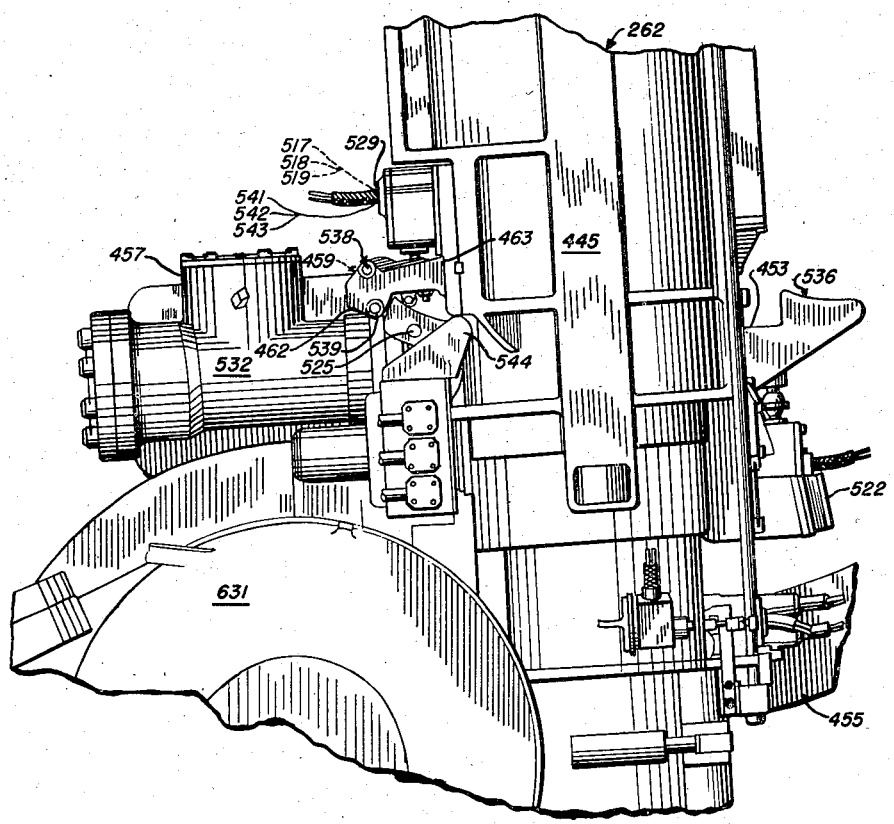
Figure 83:
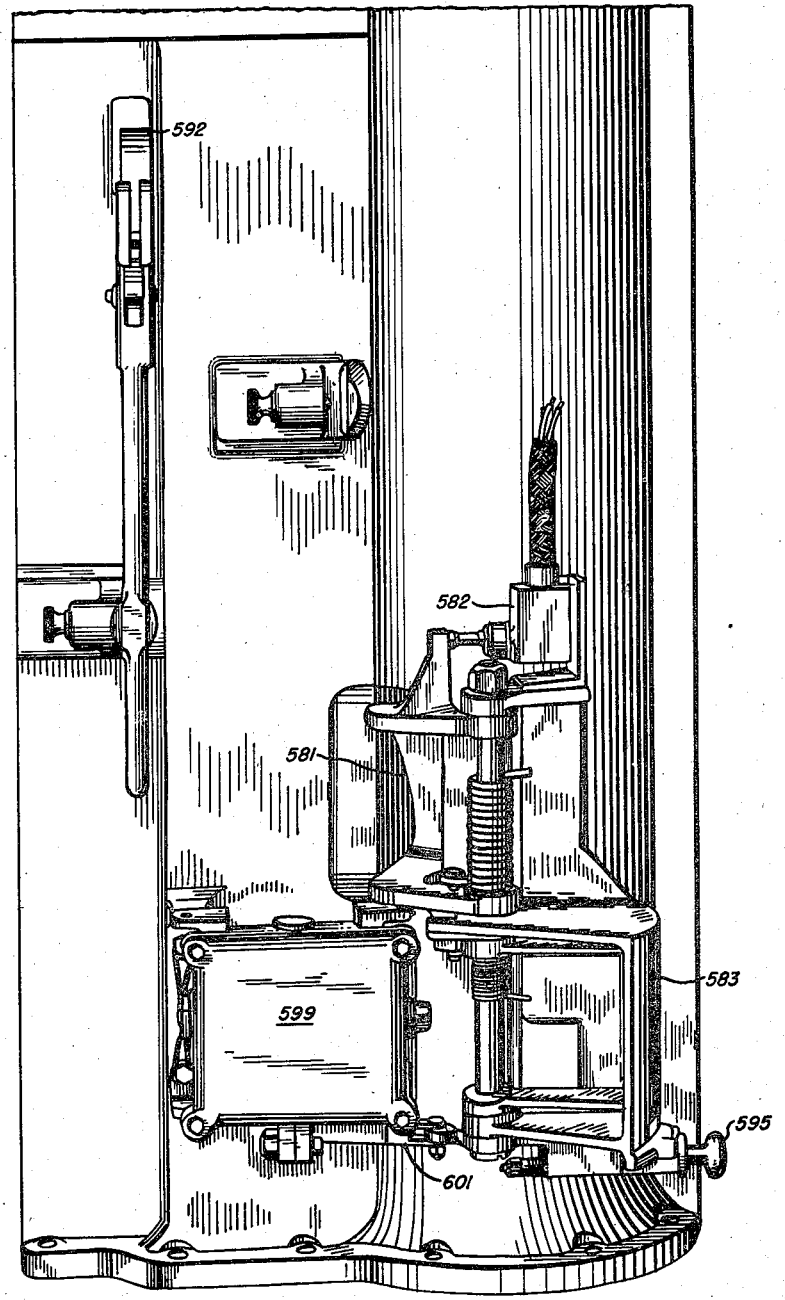
Figure 85:
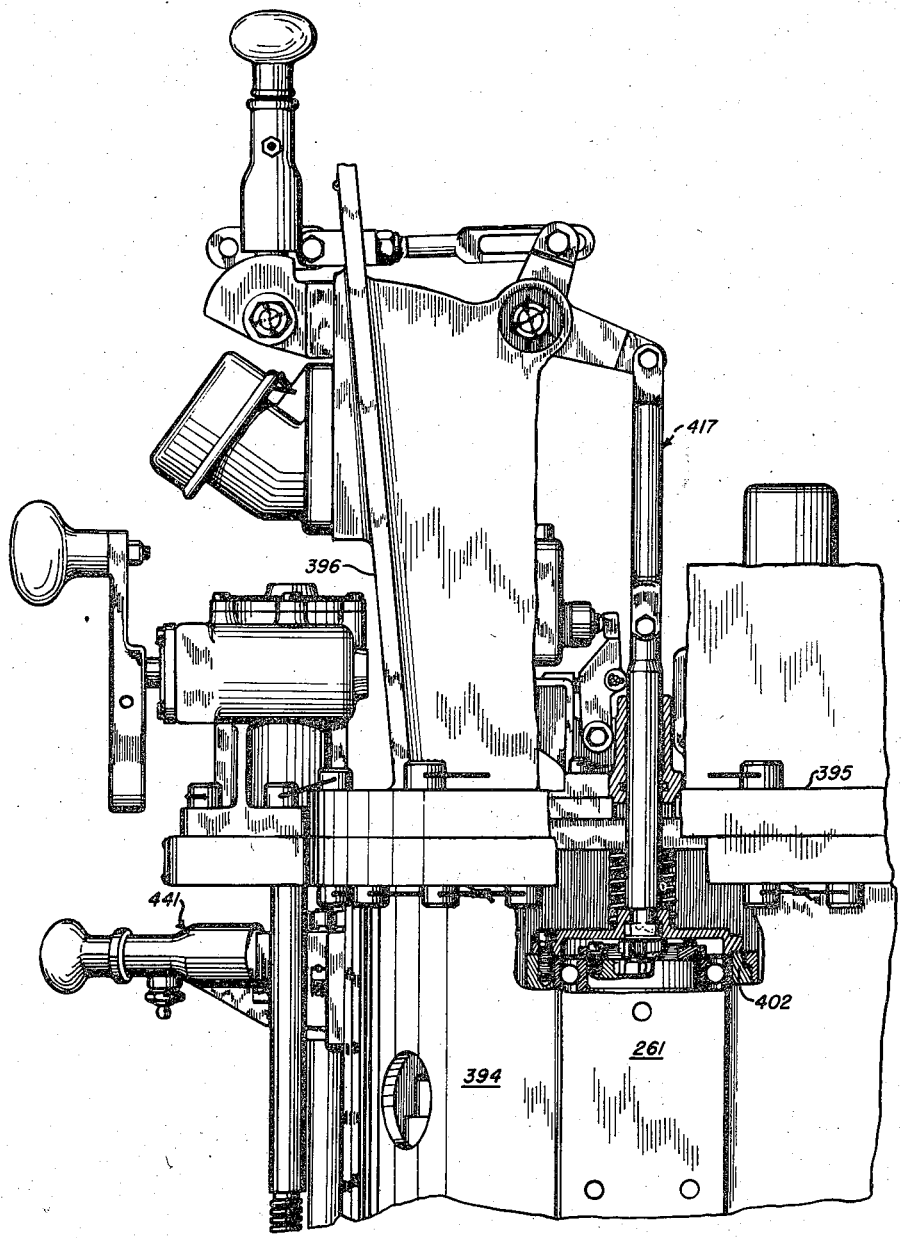
Figure 86:
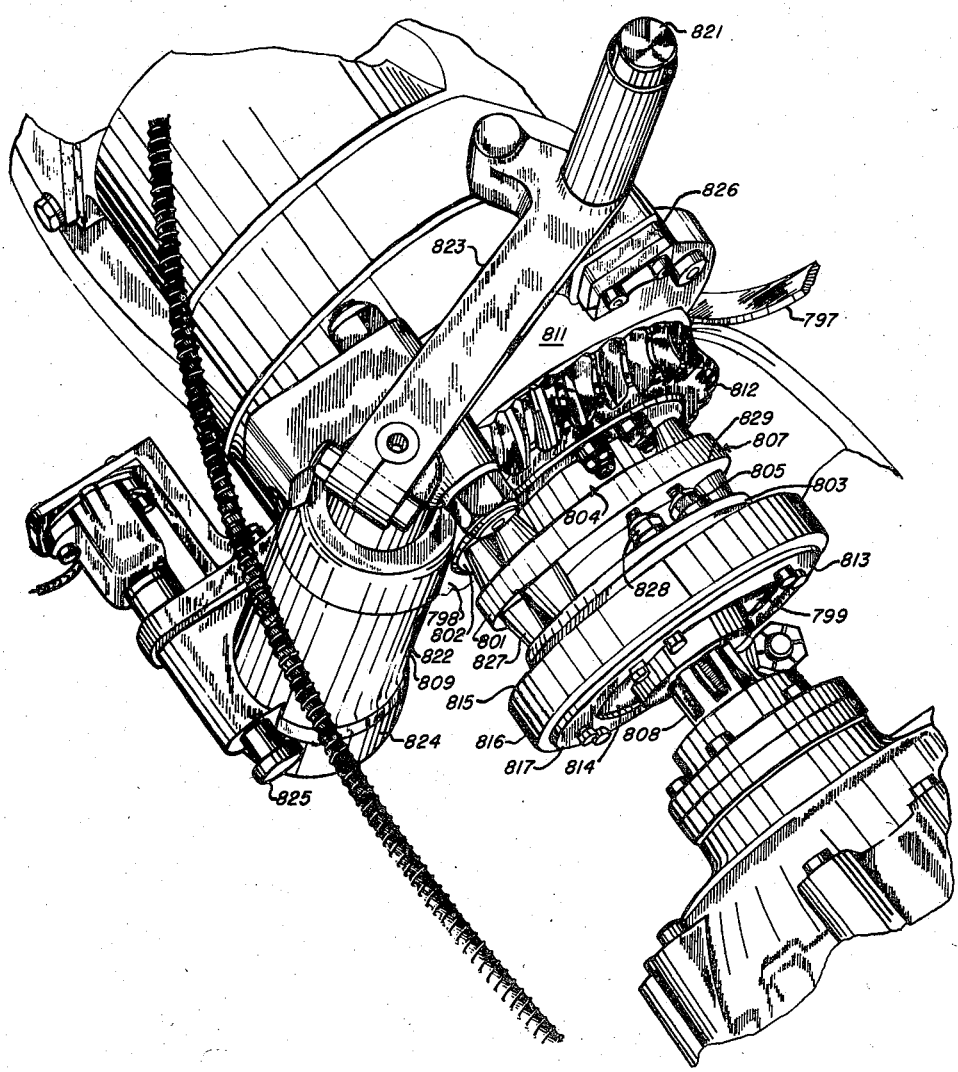
Figure 87:
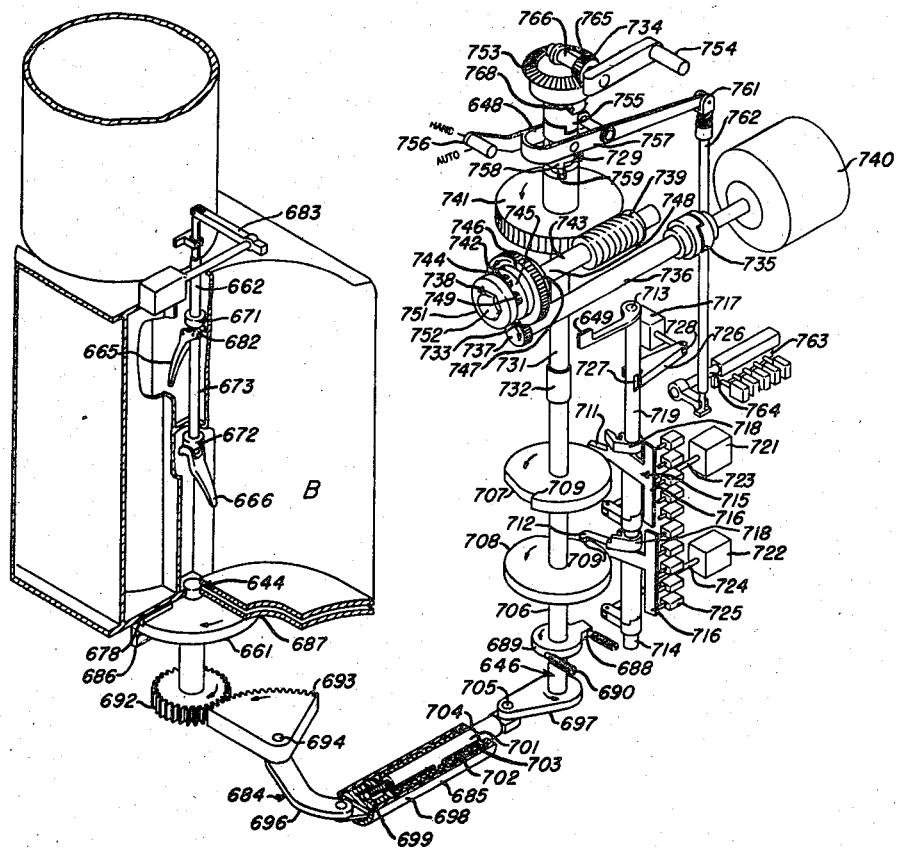
Figure 88:
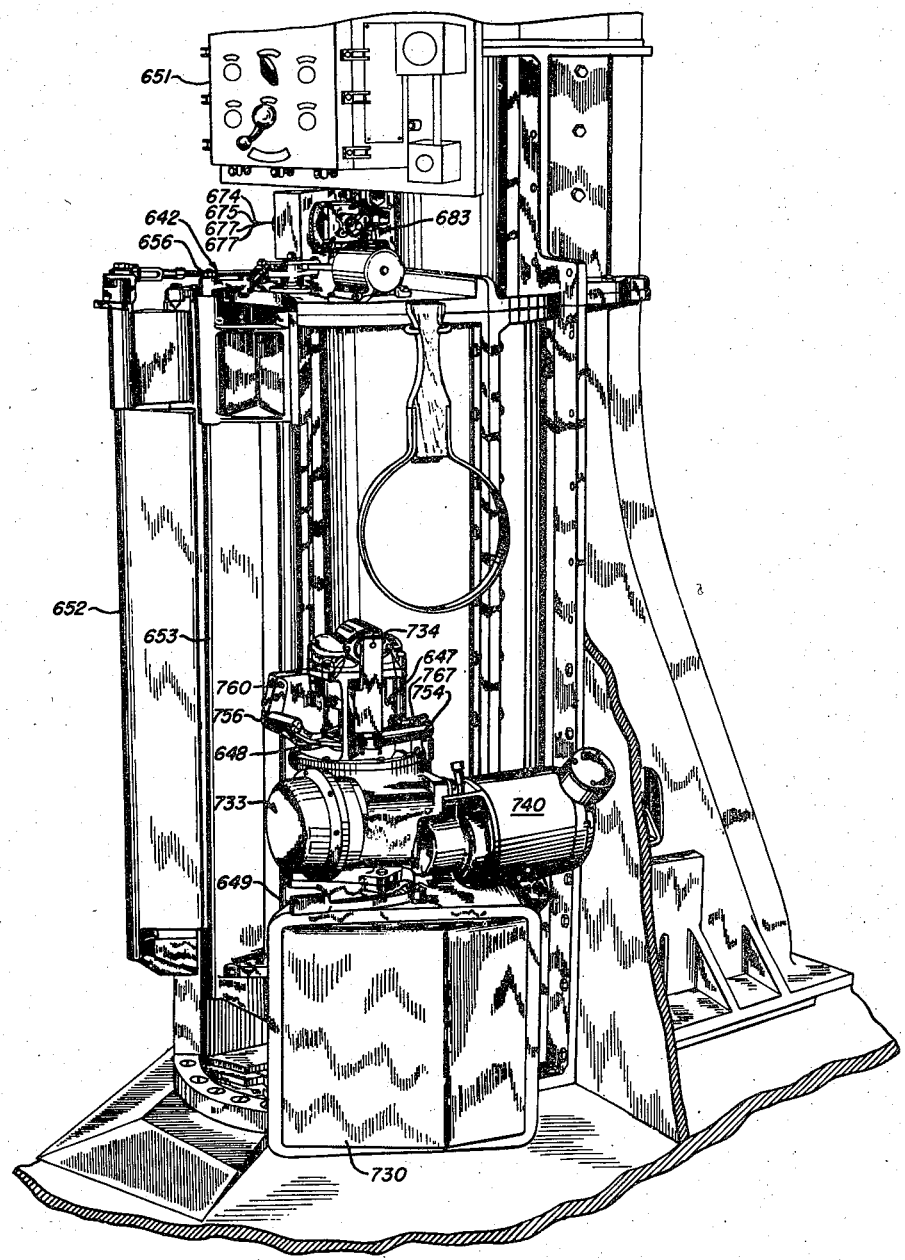
Figure 89:
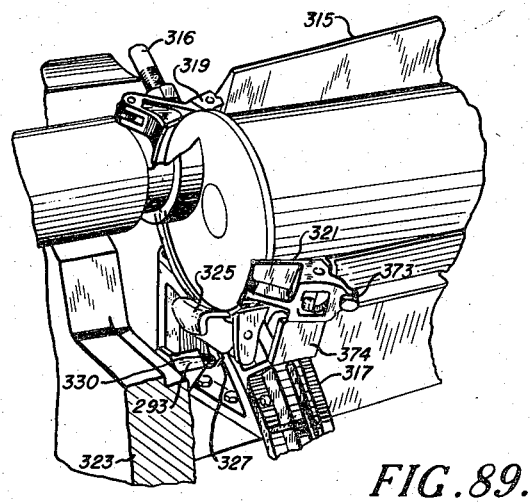
Figure 90:
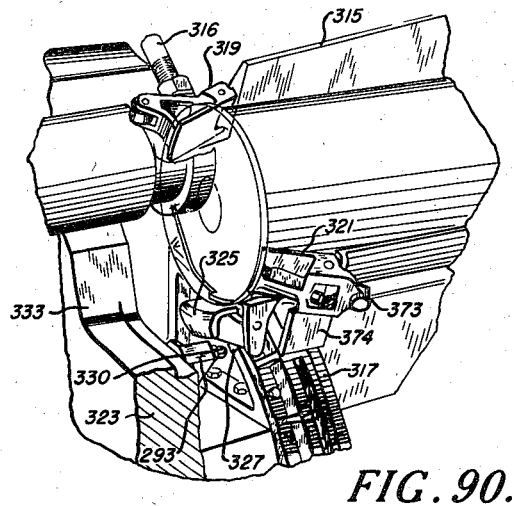
Figure 91:
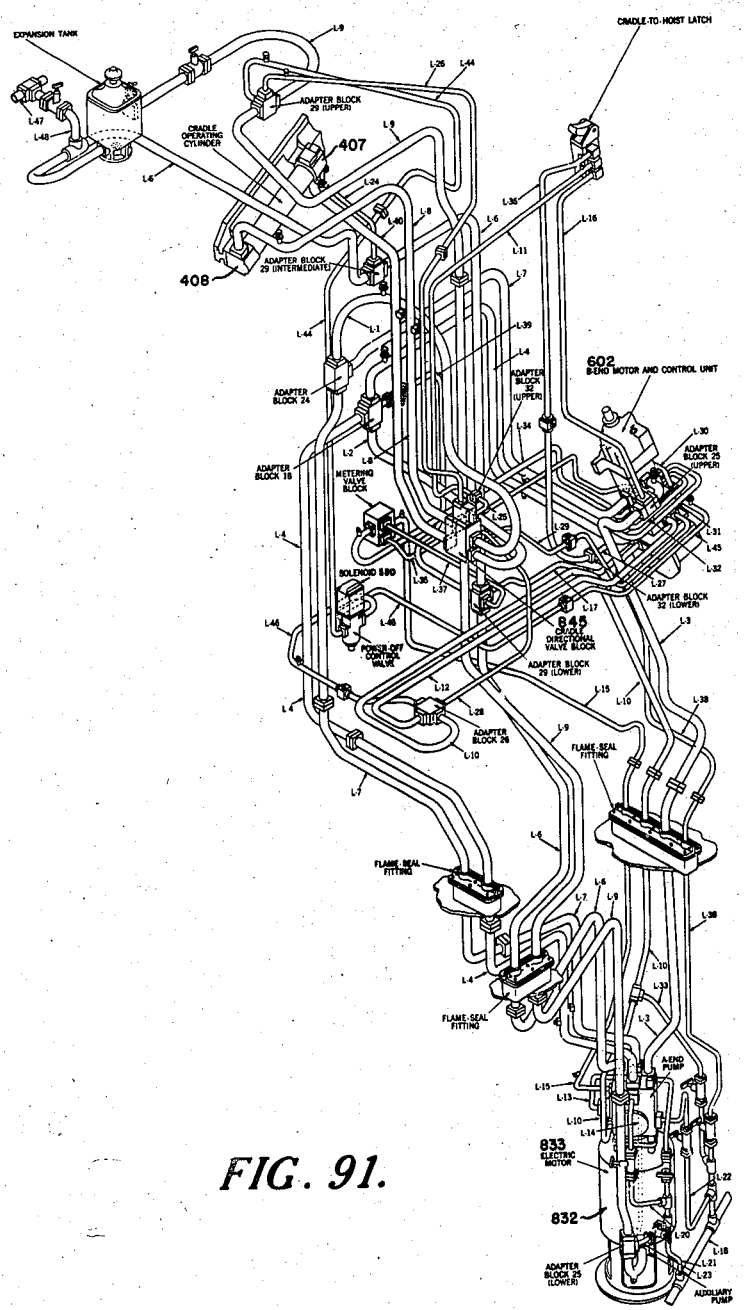
Figure 92:
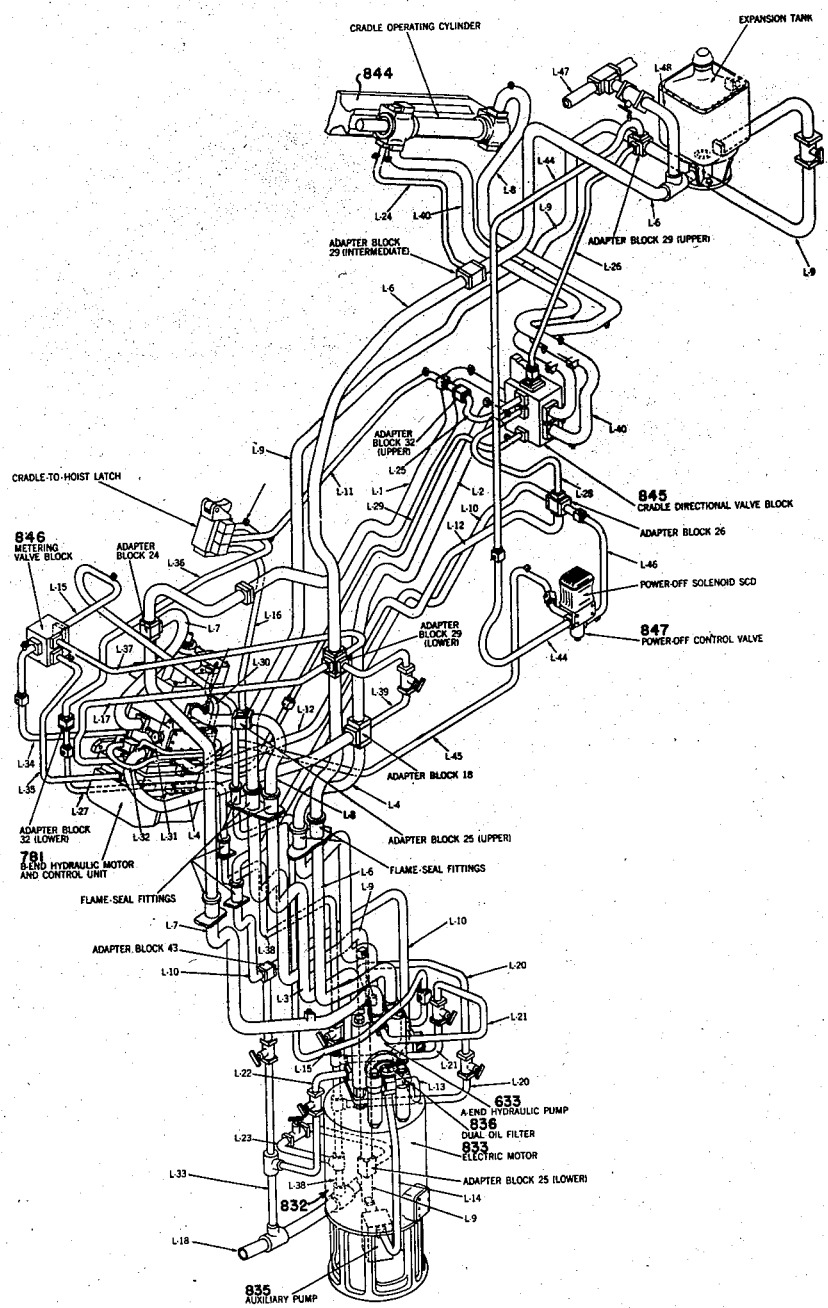
Figure 93:
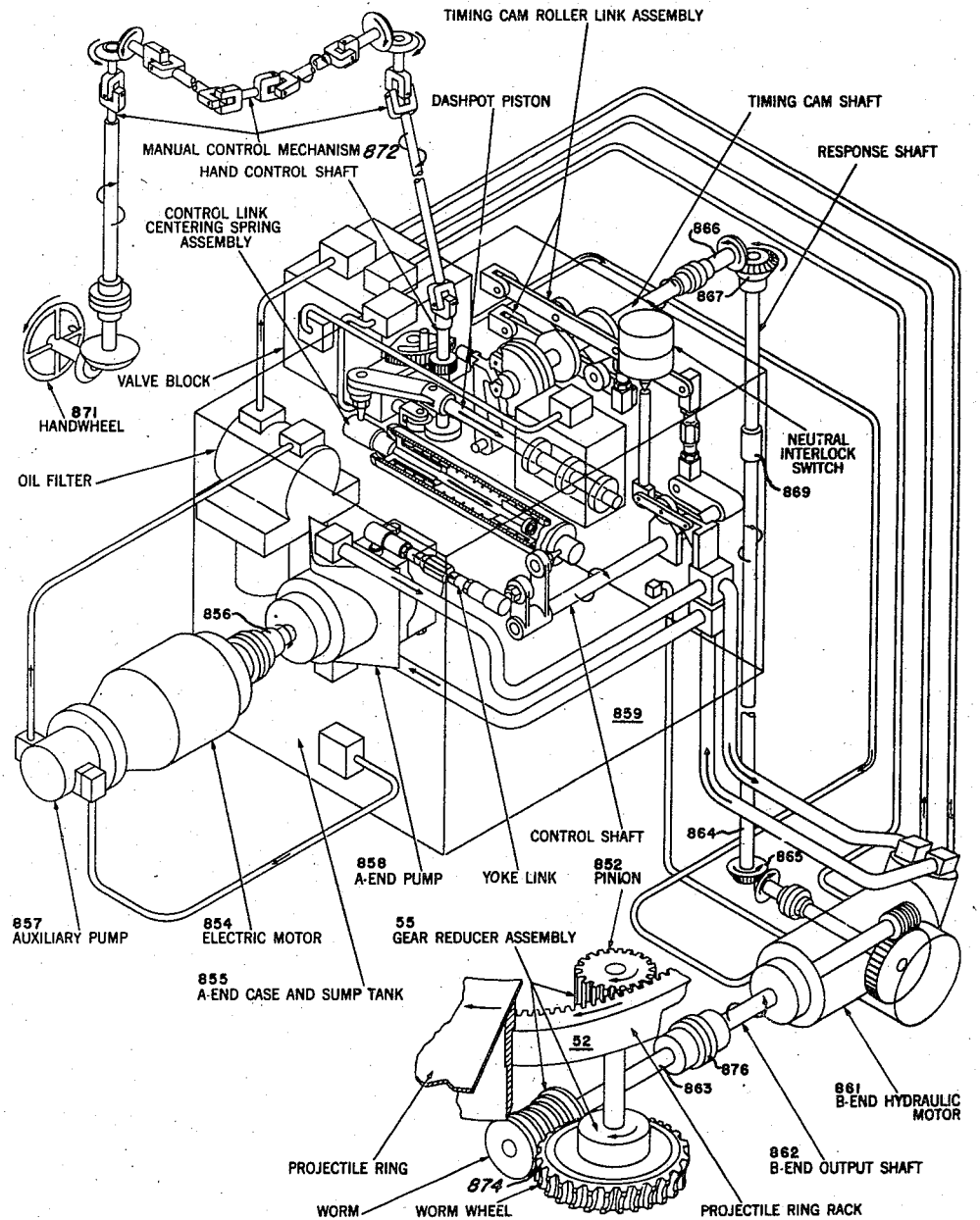
Figure 94:
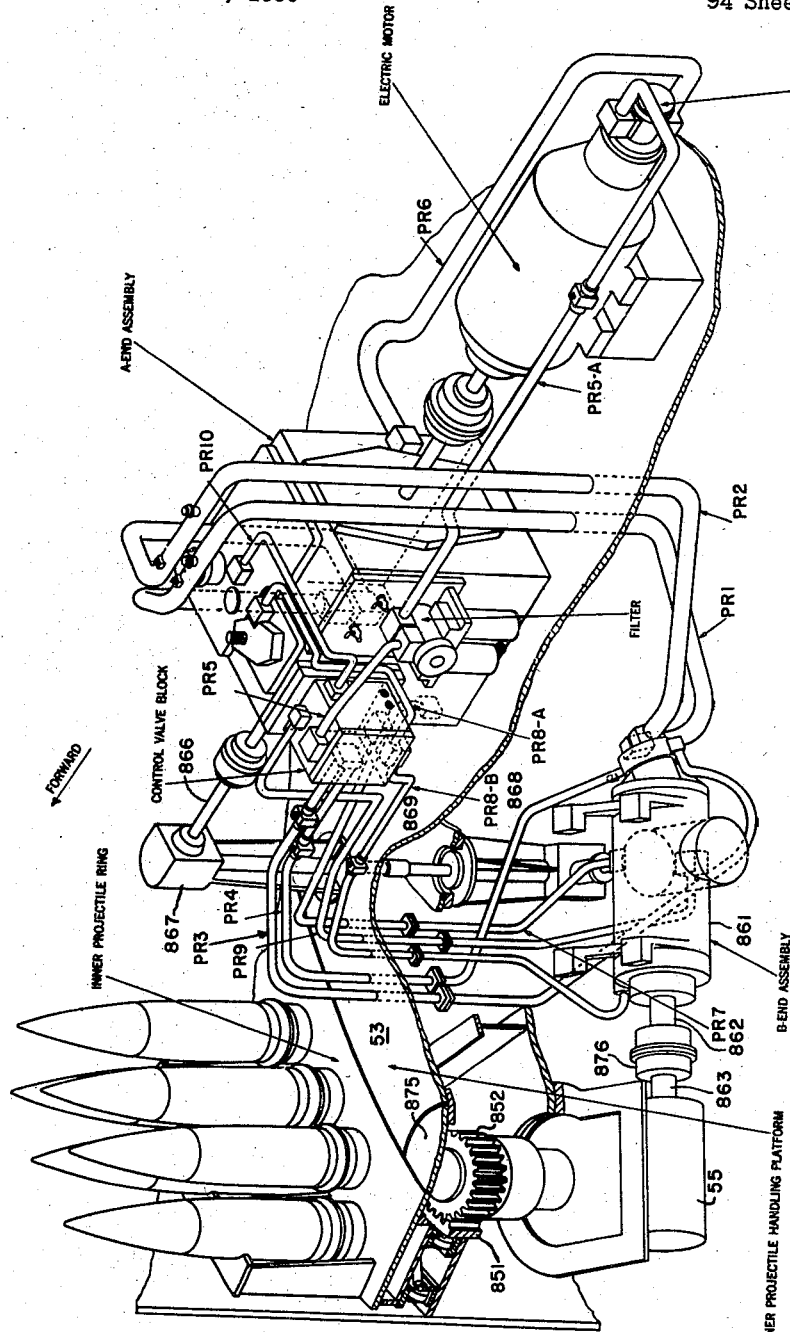
Figure 95:
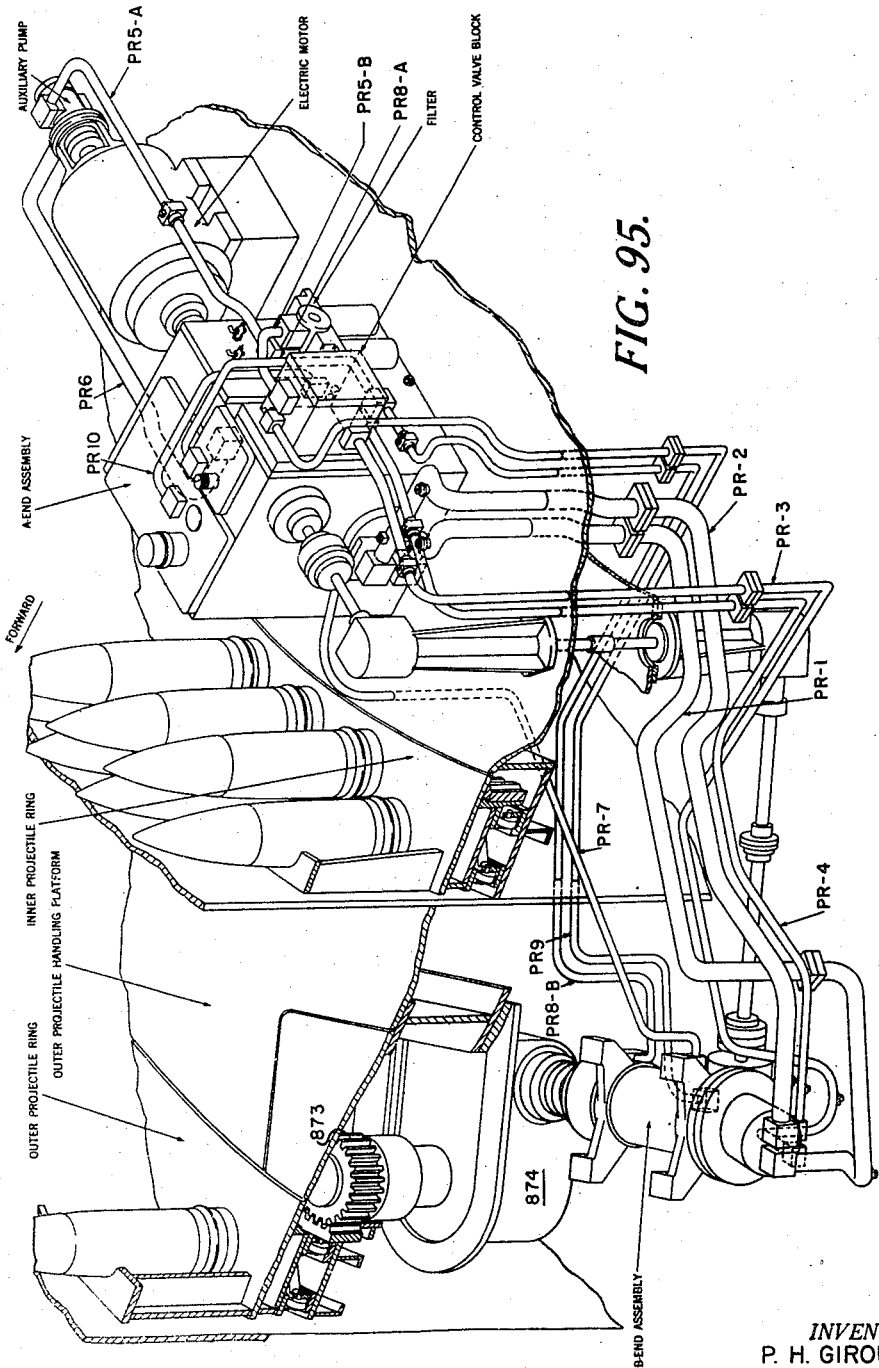
Figure 96:
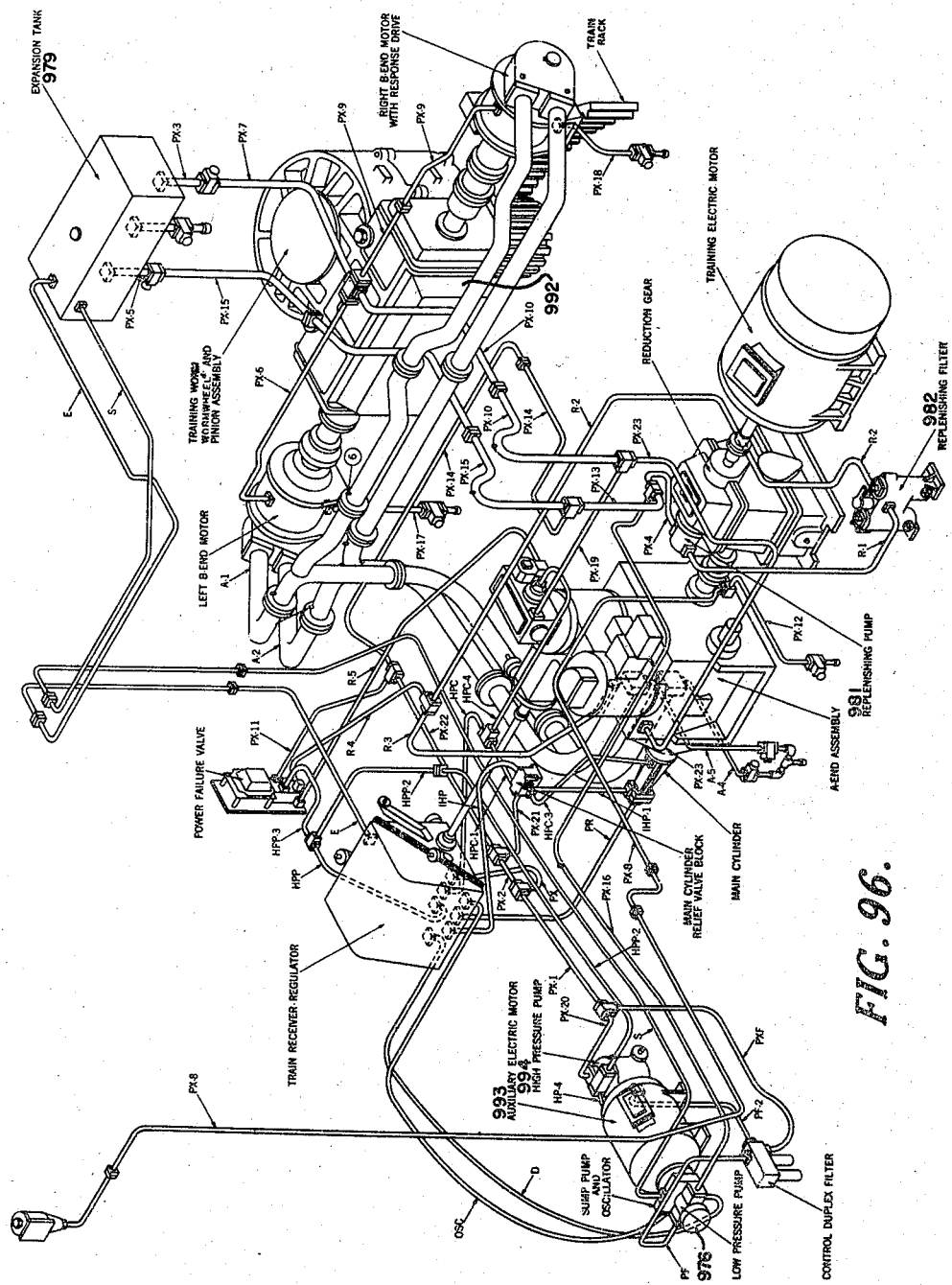
Figure 97:
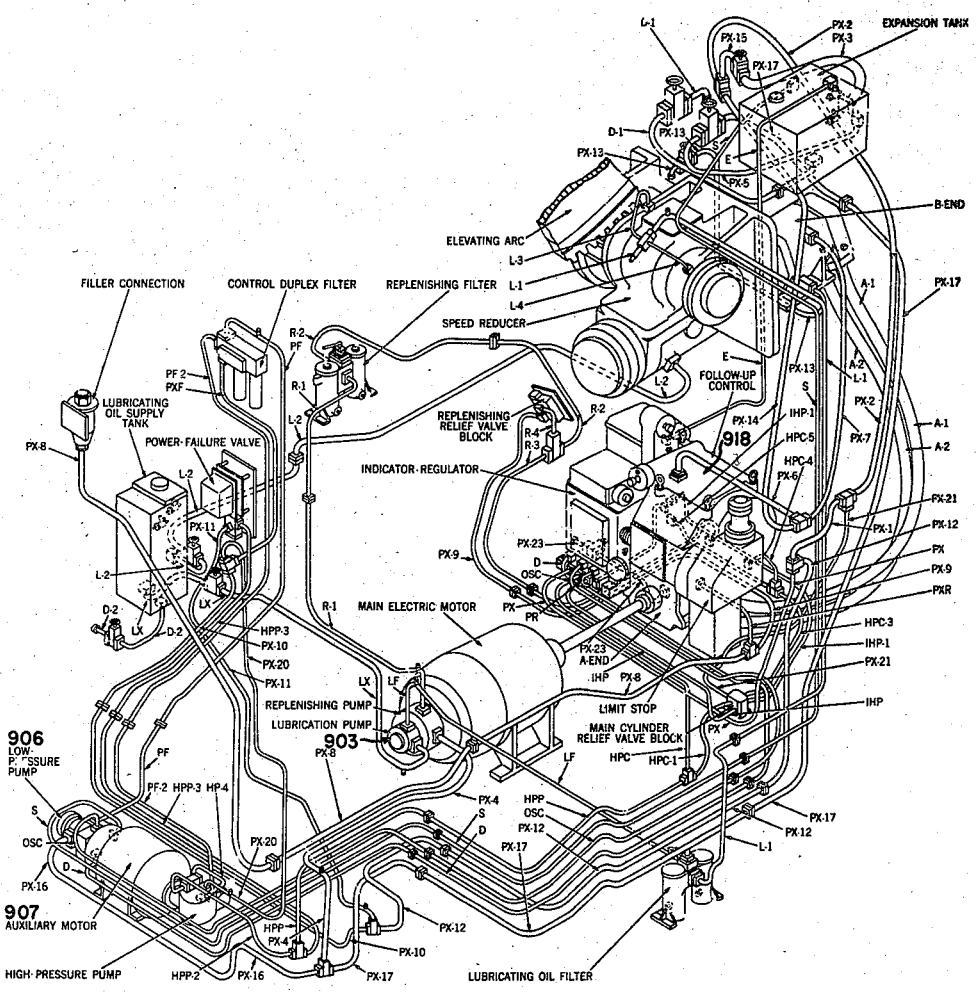
Figure 98:
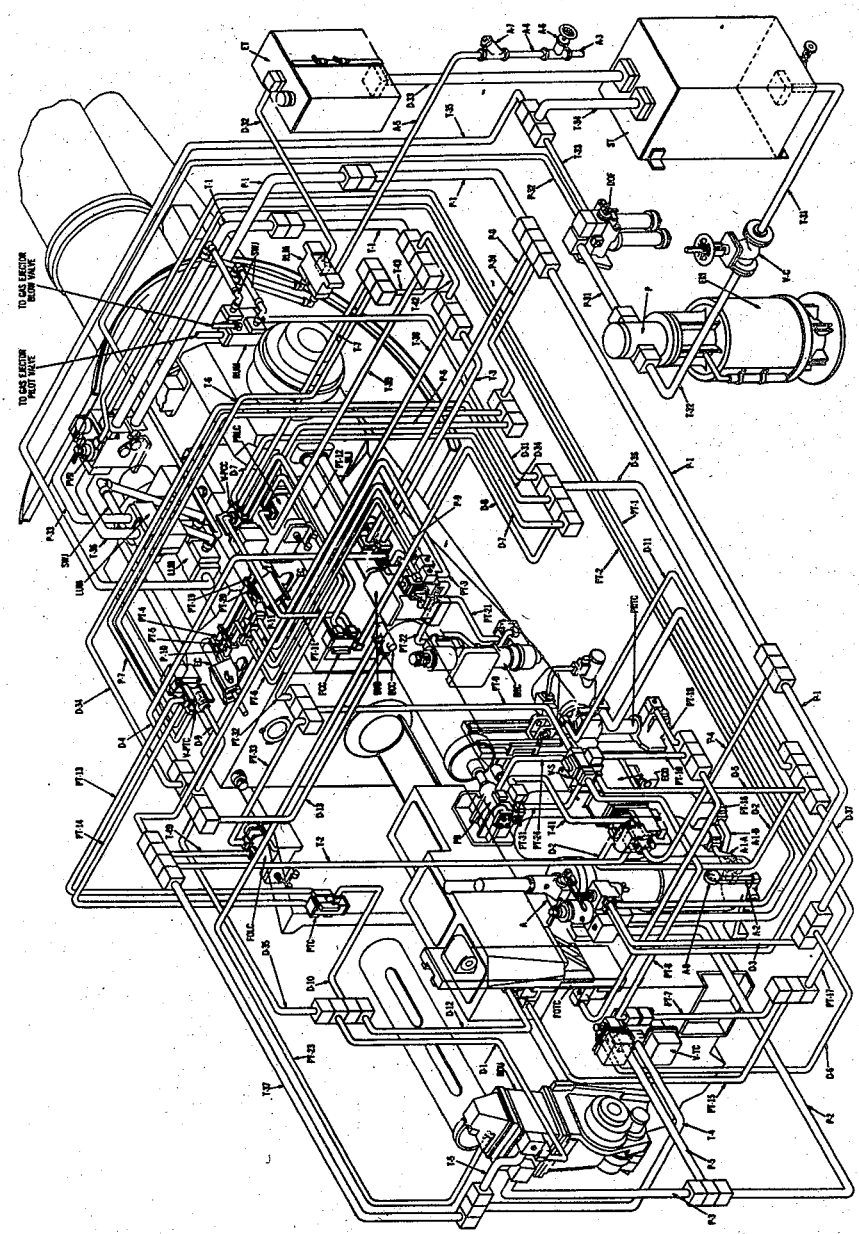
Figure 101:
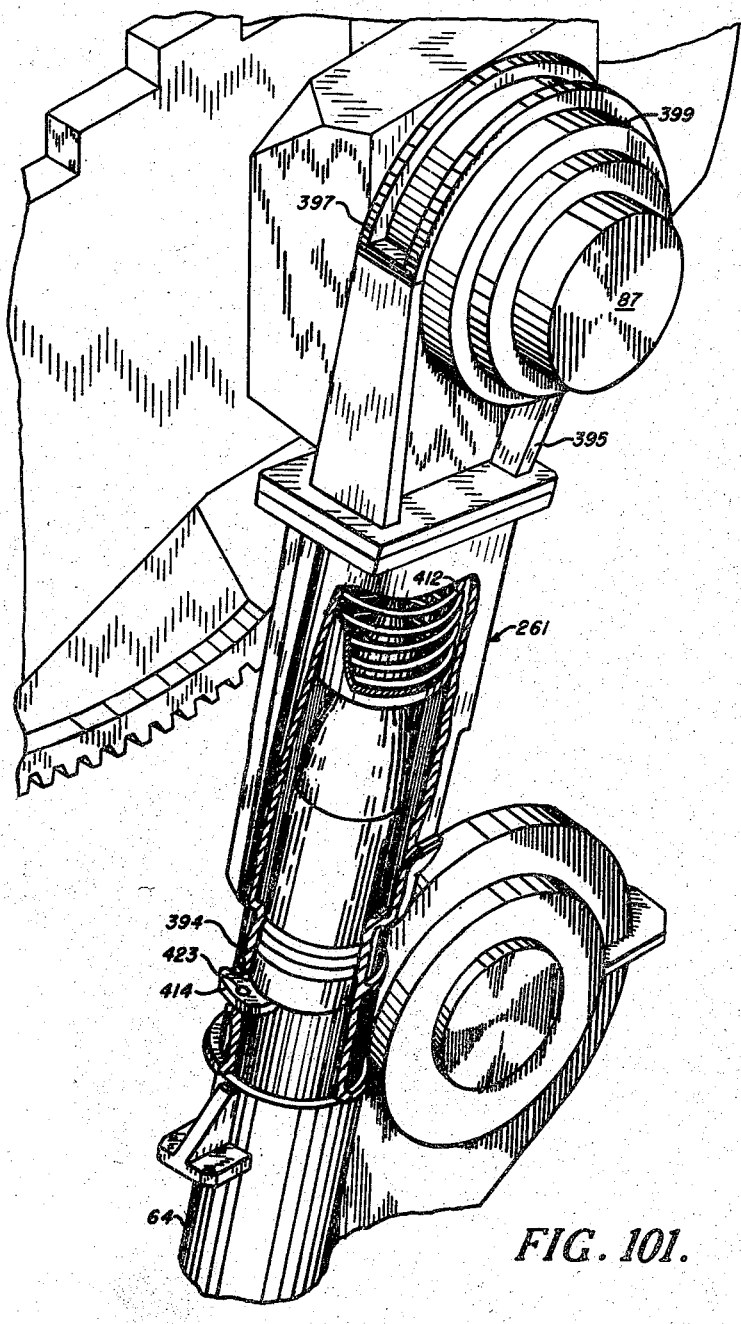
Figure 102:
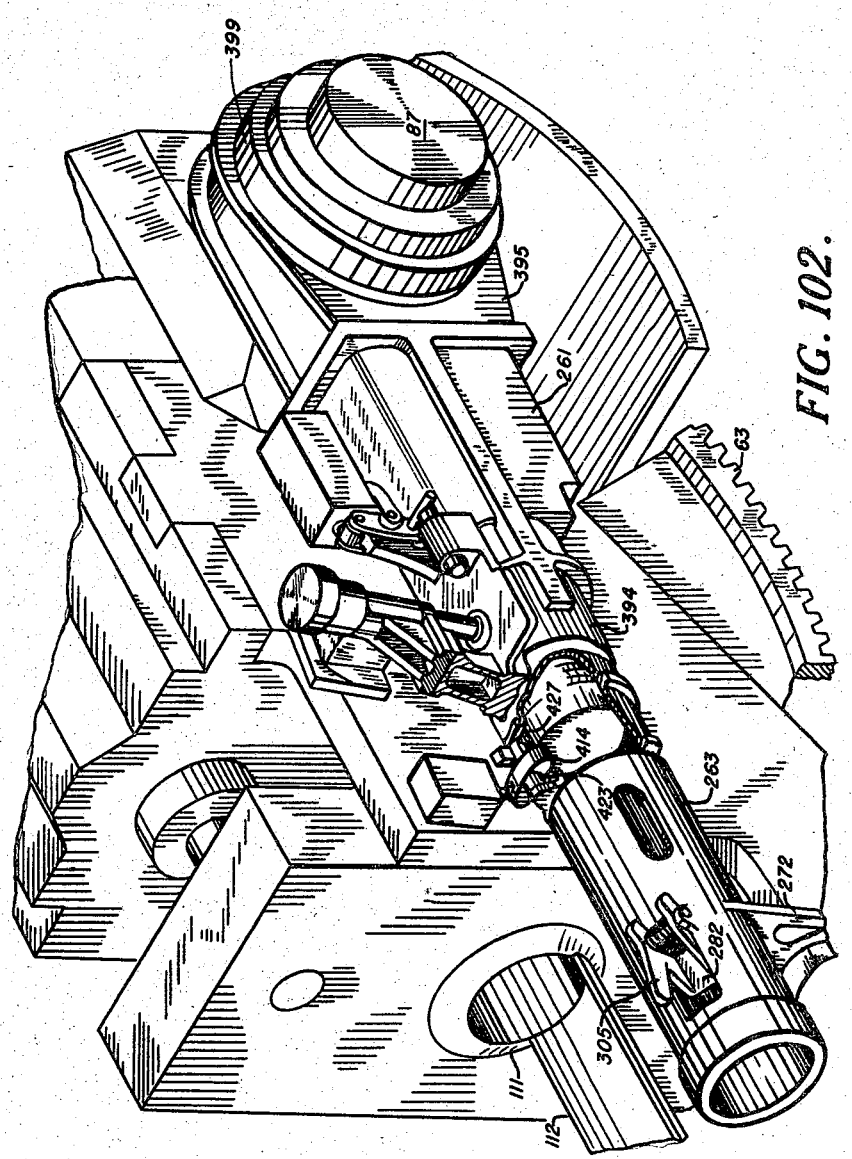
Figure 103:
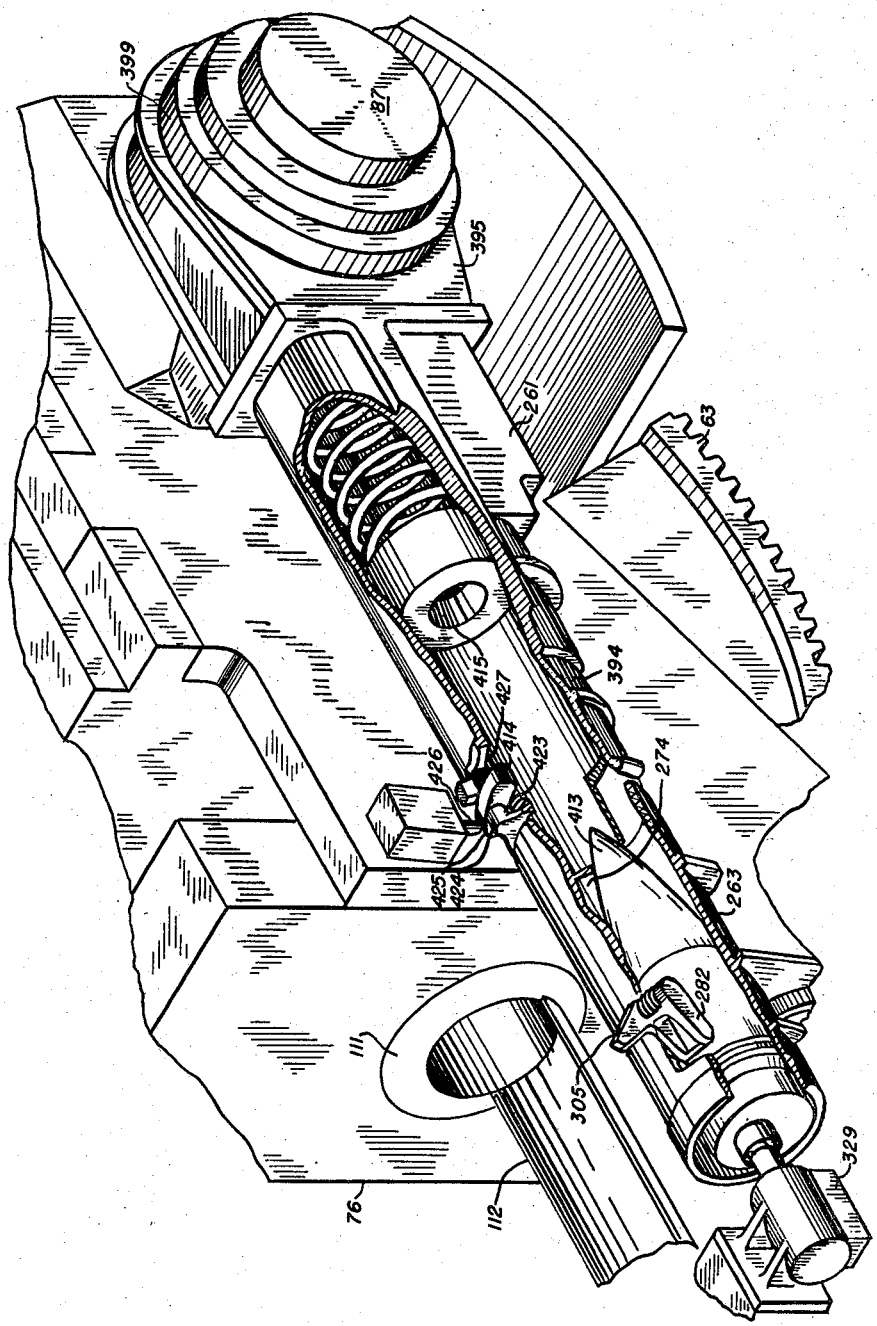
Figure 104:
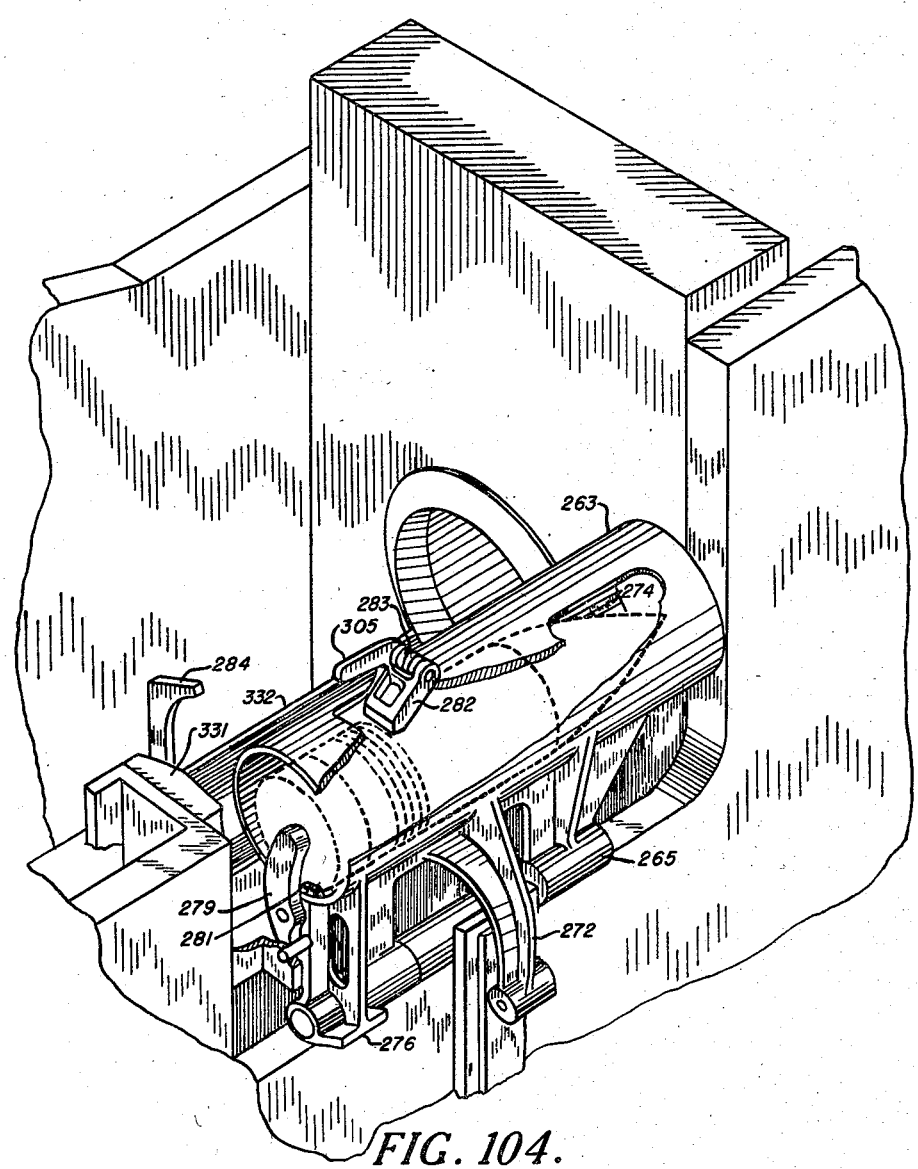
Figure 105:
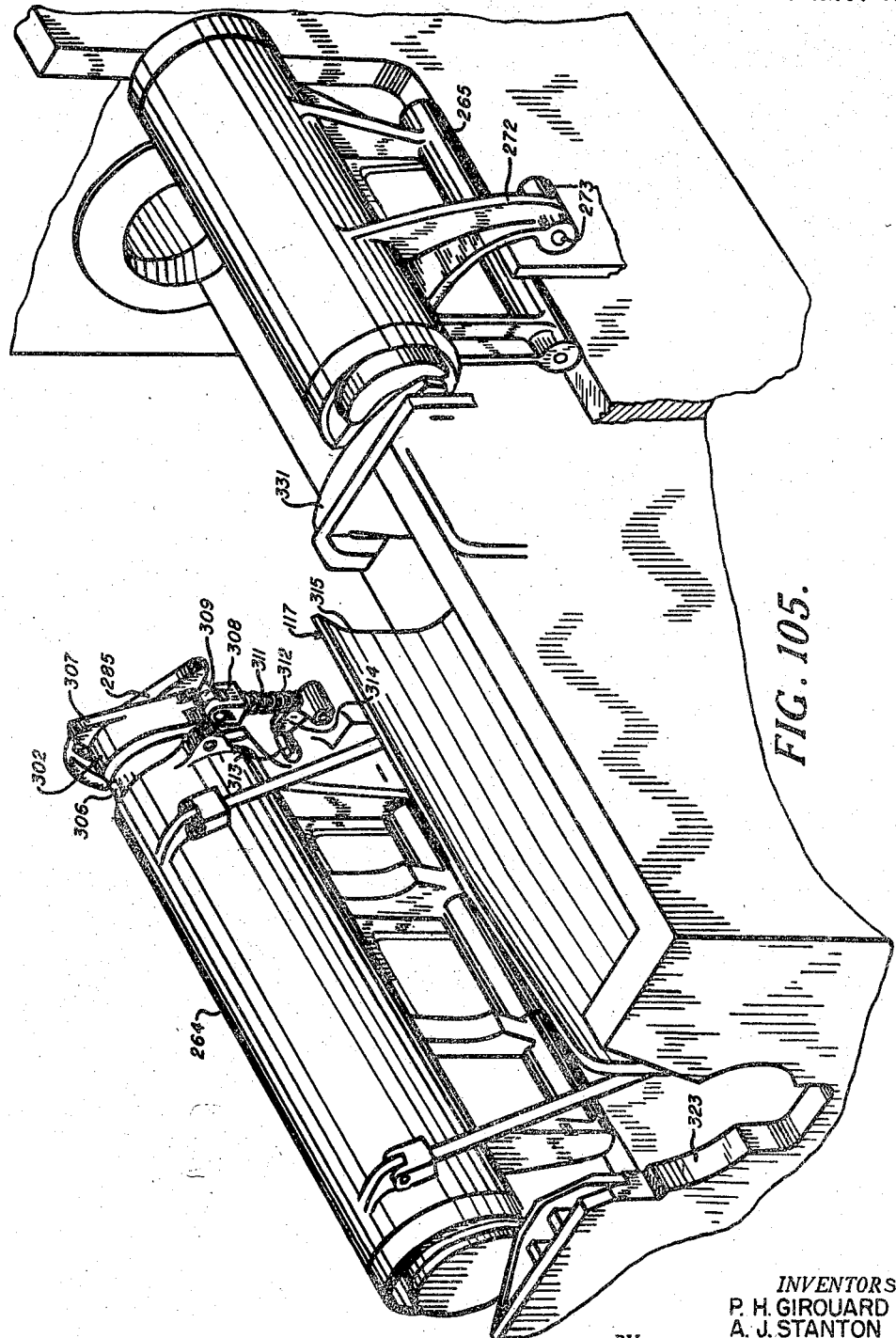
Figure 106:
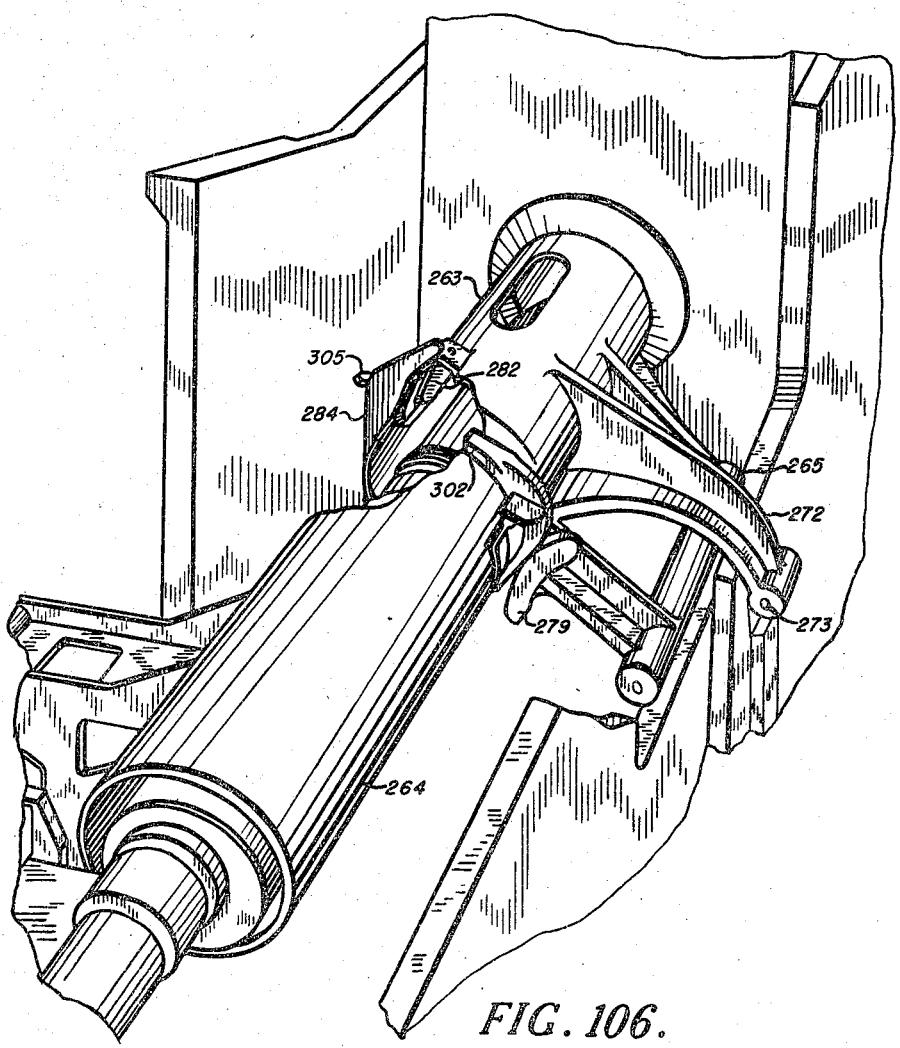
Figure 107:
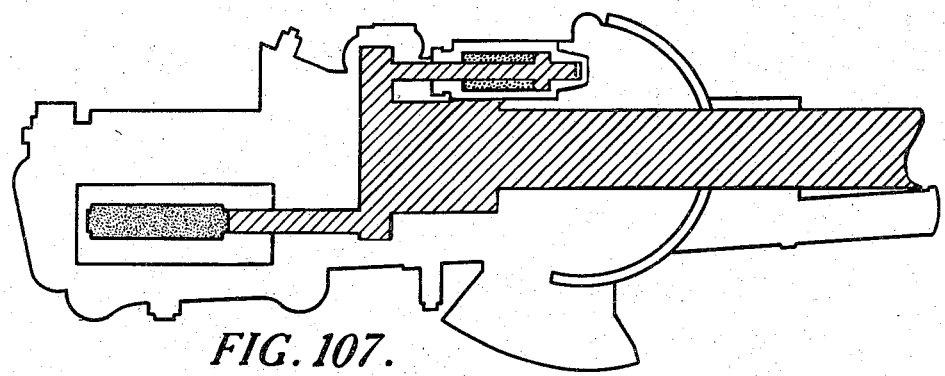
Figure 108:
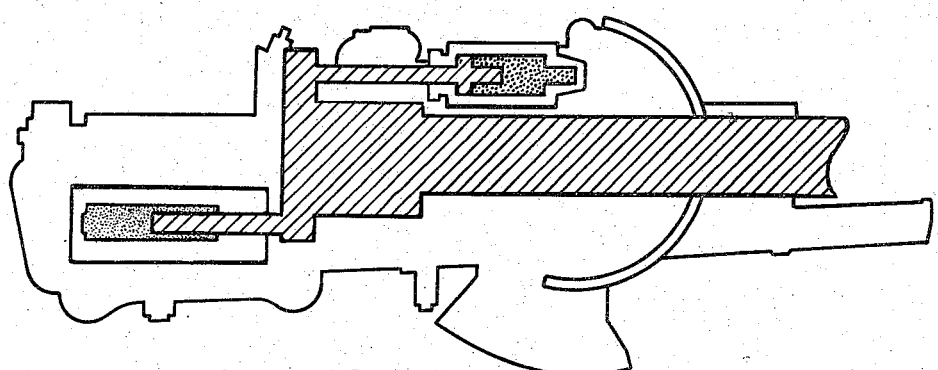
Figure 109:
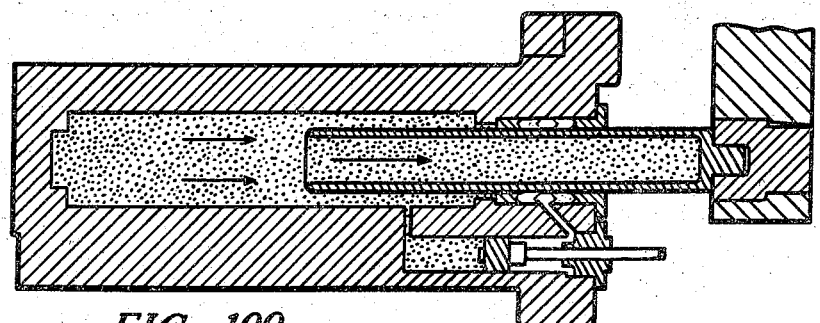
Figure 110:
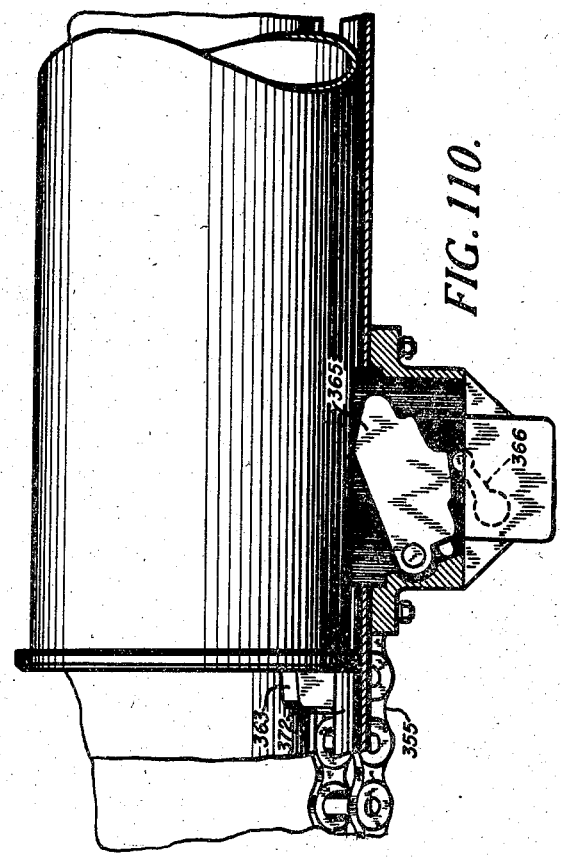

Figs. 4a, 4b, and 4c are respectively the upper, central and lower portions of a vertical section in side elevation of the turret of Fig. 1;

Figs. 5a, 5b, and 5c are views in vertical section taken at right angles to, and corresponding respectively to Figs. 4a, 4b, and 4c;

Fig. 6 is a plan view taken at the turret shelf level;

Fig. 7 is a plan view taken at the pan level of the turret;

Fig. 8 is a plan view of the upper projectile flat;

Fig. 9 is a plan view of the lower projectile flat;

Fig. 10 is a plan view of the powder case stowage magazine level;

Fig. 11 is an elevational view showing the general arrangement and operational details of the empty case handling assemblies of the right side of a gun and slide;

Fig. 12 is an elevational view of the left side of a gun and slide;

Fig. 13 is a pictorial view of the structural arrangement of the projectile flats;

Fig. 14 is a sectional elevation view of the details of the gun to housing attachment means;

Fig. 15 is a partially sectional view of the breechblock assembly showing the block in open position;

Fig. 16 is a partially sectional view of the gunbreech assembly with the housing and recoil mechanism;

Fig. 17 is a pictorial view showing the general arrangement of the gun electrical system;

Fig. 18 is a pictorial view partly in section of the breech bolt and bolt release mechanism;

Fig. 19 is a cutaway pictorial view of the counter-recoil mechanism showing the plunger thereof in full recoil position;

Fig. 20 is a pictorial view partly in section showing details of arrangement of the breech mechanism and the breech bolt release arrangement;

Fig. 21 is a general schematic view of the breech manual mechanism;

Fig. 22 is a view partially in section of the gun housing and hydraulic fluid passages therein;

Fig. 23 is a pictorial view in vertical section through the firing pin and breech bolt chambers of the breechblock;

Fig. 24 is a cutaway view of the firing pin and the firing pin insulation;

Fig. 25 is a pictorial view of the breech mechanism, valve actuator in assembled relationship with the housing and gun breech;

Fig. 26 is a generally schematic view of the gas ejector system showing its general arrangement with respect to the gun slide and gun housing;

Fig. 27 shows the gas ejector pilot valve in vertical section;

Fig. 28 is a view in elevation of the gas ejector blow valve and its relationship with its tripping mechanism;

Fig. 29 is a pictorial view of the projectile transfer tray of a right hand gun assembly and shows its cradle assembly in latched relationship therewith;

Fig. 30 is a pictorial view of the powder case transfer tray of a right hand gun assembly;

Fig. 31 is a pictorial view of the empty powder case tray of a right hand gun assembly showing its coupled relationship with the powder case transfer tray;

Fig. 32 is a pictorial view showing the projectile transfer tray and powder case tray in their mid-cycle positions and showing in detail certain of the inter-locking cam members of these trays;

Fig. 33 is a fragmentary pictorial view of the powder case tray at its mid-cycle position;

Fig. 34 is a partially fragmentary pictorial view of the empty powder case tray in its transfer position;

Fig. 35 is a cutaway view of the rammer assembly at ready to ram position;

Fig. 36 is a cutaway view of the rammer assembly with the rammer chain extended;

Fig. 37 is a view showing the switch and chain cam arrangement of the rammer chain control system in chain retracted position;

Fig. 38 is a view showing the chain control switch in its relationship with the rammer chain on the sprocket at chain extended position;

Fig. 39 is a fragmentary view in elevation of the empty case ejector assembly;

Fig. 40 is a pictorial view of a right hand gun equipment of the turret, and showing the projectile cradle in latched engagement with its transfer tray, and showing the slide hydraulic system;

Fig. 41 is a fragmentary pictorial view of the powder hoist general arrangement;

Fig. 42 is a sectional elevation of the powder hoist;

Fig. 43 is a pictorial view in section of a portion of the turret showing a projectile hoist assembly of a right hand gun in its installed arrangement in the turret;

Fig. 44 is an elevation view in vertical section of the projectile hoist of the turret;

Fig. 45 is a cutaway pictorial view of the conveyor lower end showing the lower sprocket housing section of the projectile hoist;

Fig. 46 is a cutaway pictorial view of the conveyor upper loading section;

Fig. 47 is an elevation view of the projectile cradle showing its general arrangement and the arrangement of the fuze setting receiver-regulator mounted thereon;

Fig. 48 is a cutaway view of the cradle ram and projectile receiving arrangement of the projectile hoist;

Fig. 49 is a view of the fuze pot and fuze setting arrangement of the projectile cradle;

Fig. 50 is a diagrammatic showing of the time cycle relationship of the operational mechanism of the turret;

Fig. 51 is a pictorial view of the projectile hoist cradle showing its relationship with the gun trunnion and also showing the fuze setting regulator mounted on the rear portion thereof;

Fig. 52 is a sectional view in elevation of the fuze pot and fuze setting gear assemblies located in the upper portion of the projectile cradle;

Fig. 53 is a diagrammatic view of the fuze setting control arrangement which shows a general arrangement of the fuze setter regulator and its relationship with the B unit amplifier as well as the turret captain's control panel in the turret officers transfer switchboard;

Fig. 54 is a plan view of the flame tight powder scuttle shutter linkage assembly of the lower section of the powder hoist;

Fig. 55 is a generally schematic drawing of the powder hoist shuttle;

Fig. 56 is a pictorial view showing the general arrangement of the powder hoist cradle;

Fig. 57 is a sectional elevation of details of the rammer of the powder hoist cradle;

Fig. 58 is a pictorial view showing the powder hoist cradle general arrangement from the opposite side of that of Fig. 56;

Fig. 59 is a pictorial view of the parbuckling assembly for use at the projectile hoist loading stations;

Fig. 60 is a pictorial cutaway view of the general arrangement of the projectile hoists;

Fig. 61 is a view of the parbuckling assembly in use with the steadyarm mechanism aligned with the projectile in a position to grab the projectile;

Fig. 62 is an illustration showing the transferring of the projectile from the projectile ring to a position on the platform adjacent the hoist;

Fig. 63 is a view showing the ejecting of the projectile from the parbuckling assembly in a position in alignment with the shutters of the hoist;

Fig. 64 is a pictorial view showing the position of the projectile within the powder hoist conveyor and illustrating the manner of passing the projectile through the shutters of the projectile hoist;

Fig. 65 is a pictorial view of the parbuckling steadyarm mechanism;

Fig. 66 is a pictorial view of the forearm tong, ejecting lever and latch devices of the steadyarm of Fig. 64;

Fig. 67 is a diagrammatic view in elevation illustrating the method of loading the ammunition flat of the turret by the hatchway route;

Fig. 68 is a diagrammatic illustration showing the stowing down of ammunition by way of the portable ammunition tray and the ammunition hoist route;

Fig. 69 is a pictorial view showing the manner of loading the projectile in a powder cradle by means of portable temporary ammunition trays and illustrating their installed arrangement in the gun house and on the gun slide assembly;

Fig. 70 is a generally diagrammatic illustration of the gun firing control system;

Fig. 71 is a generally diagrammatic view of the control system for the elevating gear of one gun of the turret and showing the arrangement for automatic control;

Fig. 72 is a view similar to Fig. 71 and showing the control arrangement for local control of the gun in elevation;

Fig. 73 is a view similar to Fig. 71 and showing the control arrangement for hand control of the turret operating assemblies in elevation;

Fig. 74 is a schematic arrangement of the elevating gear assemblies of one gun of the turret;

Fig. 75 is a pictorial view showing the general arrangement of the training gear equipment in the forward portion of the turret structure;

Fig. 76 is a diagrammatic view of the training gear control of the turret and shows the control arrangement for automatic control;

Fig. 77 is a view similar to Fig. 75 showing schematically the control arrangement for local control of the turret in train;

Fig. 78 is a view similar to Figs. 74 and 75 showing the control circuit for hand control of the turret in train;

Fig. 79 is an illustration in schematic form of the mechanical arrangement of the turret drive in train;

Fig. 80 is a view partially in section of the hoist cradle-to-slide latch;

Fig. 81 is an elevation view of one element the cradle-to-slide latch assembly showing the latch bracket portion of the assembly as mounted on the powder hoist;

Fig. 82 is a view in elevation showing the hoist and cradle assemblies in a cradle latched position and further showing the details of the latch assembly in its engaged relationship;

Fig. 83 is a view in elevation of the projectile hoist conveyor, intermediate section;

Fig. 84 is a pictorial view of a section of the chain flight of the hoist conveyors;

Fig. 85 is a fragmentary view of the projectile cradle fuze pot retractor;

Fig. 86 is a pictorial view of the gear reducer drive coupling and the hand drive mechanism in their installed relationship at the upper hoist sprocket housing, scuttle gearing and control assemblies arrangement;

Fig. 87 is a generally diagrammatic view of the powder hoist scuttle gearing and control assemblies arrangement;

Fig. 88 is a view of the powder hoist shuttle general arrangement in its assembled relationship with the gear drive and the switch control assembly;

Fig. 89 is a pictorial view of the empty case tray at the upper receiving position and just prior to case engagement;

Fig 90 is a pictorial view similar to Fig. 89 and showing the empty case after engagement by the tray latches;

Fig. 91 is a schematic pictorial view of the projectile hoist piping system;

Fig. 92 is a schematic pictorial view of the powder hoist hydraulic piping system;

Fig. 93 is a diagrammatic view of the projectile ring drive control arrangement;

Fig. 94 is a schematic view of the inner projectile ring drive pipe system;

Fig. 95 is a schematic view of the outer projectile ring drive pipe system;

Fig. 96 is a schematic view of the training gear hydraulic pipe system;

Fig. 97 is a schematic view of the elevation gear hydraulic pipe system;

Fig. 98 is a schematic view of the slide hydraulic power piping system;

Fig. 99 is a pictorial view looking down onto the upper rear of the gun and slide assembly;

Fig. 100 is a pictorial view of the empty case tray;

Fig. 101 is an operational view of the projectile cradle assembly at its latched-to-hoist position and shown after reception of a projectile in the cradle;

Fig. 102 is an operational view showing the projectile cradle at its latched-to-slide position prior to ejection of a projectile into the transfer tray;

Fig. 103 is an operational view partially in section and showing the cradle and projectile transfer tray at gun firing position after reception of a projectile in the transfer tray;

Fig. 104 is an operational view of the projectile transfer tray in midcycle position;

Fig. 105 is a view showing the projectile transfer tray, the powder transfer tray and the empty case tray at their respective mid cycle position;

Fig. 106 is an operational view showing the two trays at their ramming position;

Fig. 107 is a diagrammatic operational view of the recoil and counter-recoil assemblies at mid-cycle position after gun firing;

Fig. 108 is a diagrammatic operational view similar to that of Fig. 107 and showing the gun at approach to return to battery position;

Fig. 109 is a diagrammatic operational view of the counter-recoil assembly and showing the relationship of the air chamber and the differential pressure chamber during recoil action; and Fig. 110 is an operational view of the empty case tray at its dumping position in the empty case ejection compartment and showing the operation of the ejection rammer control switch.

Gun arrangements

Referring now to Figs. 1, 4a, 4b, 4c and 5a, 5b, 5c of the drawings a turret assembly 1 incorporating a three gun installation is illustrated, which includes a right and center gun mount 2 of right hand construction as shown in Figs. 2, 3, 11 and 12 and a left gun mount 3 of essentially the same general construction and arrangement but having certain of the installations assembled thereon associated in a reverse or left hand manner. While the invention is not necessarily to be limited to the use of three guns in a turret assembly the same is considered to be a preferred embodiment of the invention and is thus shown for purposes of illustration. In general the description will be drawn to a right hand gun arrangement 2 and except as specifically noted in detail will be considered to pertain equally to the left hand gun.

The turret consists of a number of major structural units and equipment installations hereinafter fully described in a manner whereby the specific details of the structural subcombinations and apparatus subassemblies may be clearly understood.

Turret structural assembly

Figure 2:
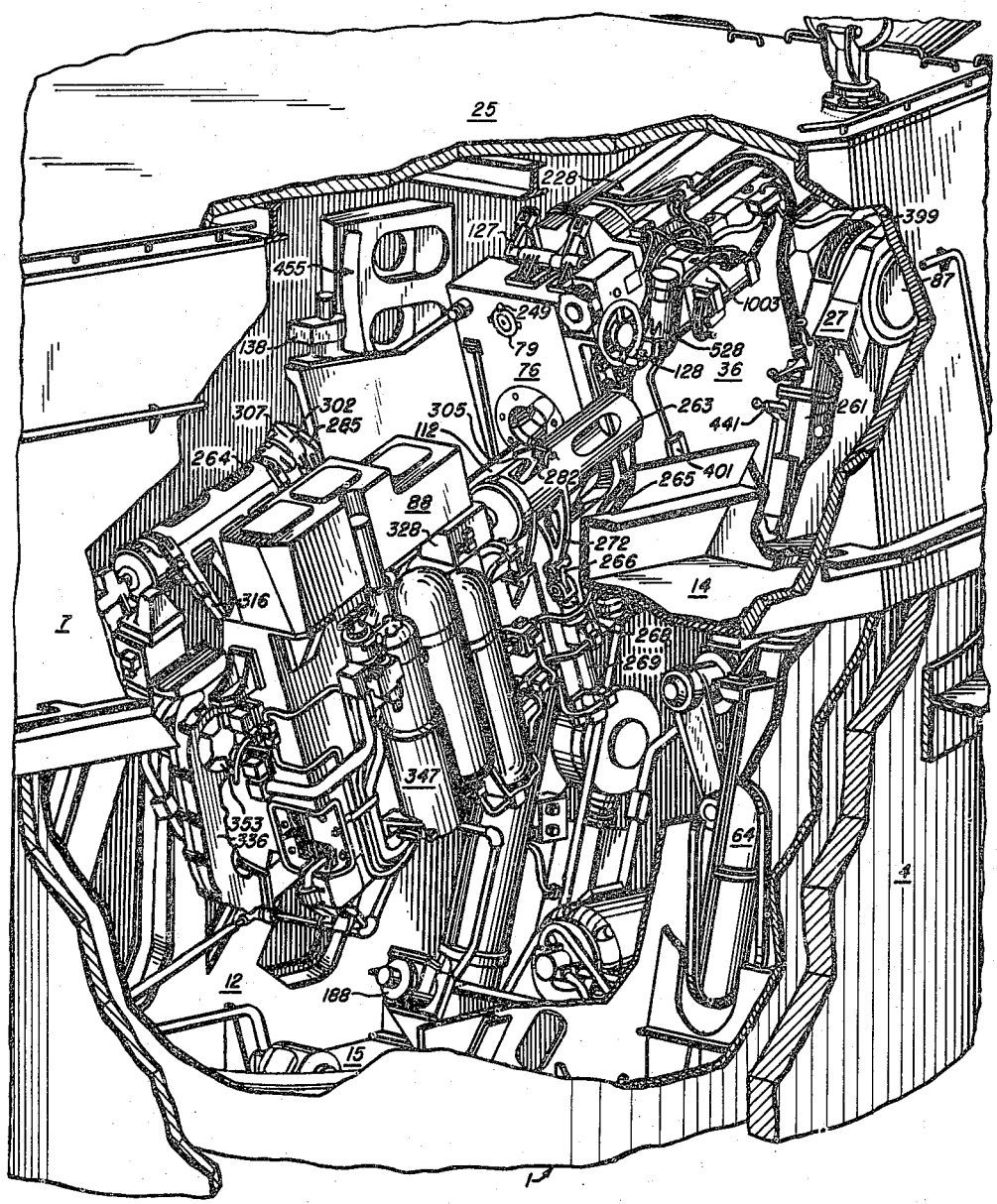
Fig. 2 is a pictorial view of the right side of one gun of the turret.
Figure 3:
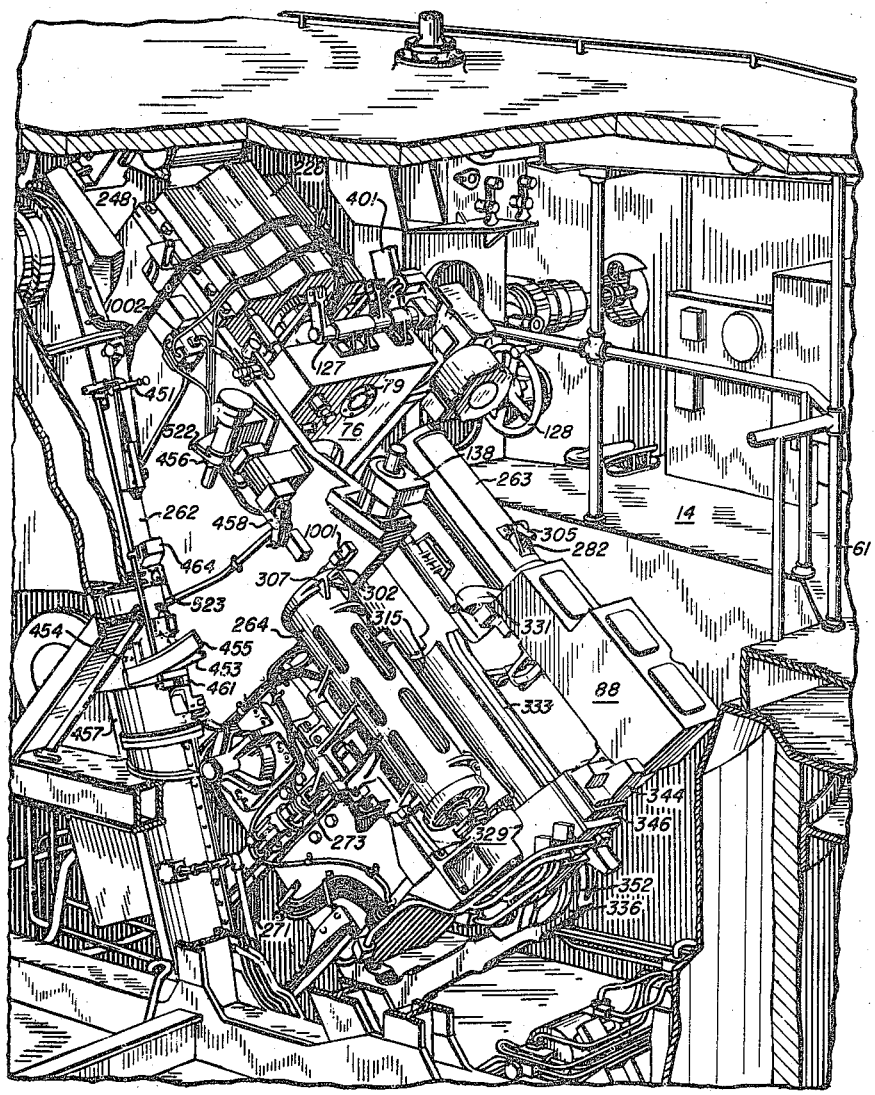
Fig. 3 is a view showing the assemblies of the left side of a gun and mount.

The overall turret structure 1 may be considered as falling into one of two general classifications, namely a first fixed generally circular foundation structure 4 as shown in Figs. 2 to 5c rigidly attached as at 5 Figs. 4a, 4b, and 5b to the vessel, not shown, and providing the supporting and protecting structure for the rotatable assemblies of the second catagory. This second grouping includes all of the structure shown generally in Fig. 1, which is movable with respect to the said fixed structure 5. This latter unitary movable structure is generally rotatable on a roller bearing supporting assembly 6, Fig. 5a, and arranged for rotation about the vertical axis of the rigid or stationary foundation structure. The rotating structure is a unitary assembly generally enclosing and suitably mounting practically all of the ordnance mechanisms and related auxiliary installations of the turret. Included in the rotating structure are the armored gun house 7, of Fig. 6, the attached hatches 8, doors 9, ladders 11, trusses 12, and such special and sundry devices as are common to such apparatus as shown in one or more of Figs. 1 to 10 and 41. The turret, Figs. 4a, 4b, 4c and 5a, 5b, 5c, may be considered as a five story unit comprised of a generally rectangular gun house 7 erected over a four level cylindrical assembly generally indicated at 13 of Figs. 5a, 5b, 5c hereinafter referred to by the application of the term flats as a designation for the several levels thereof. The five levels of the entire unit are suitably separated by the shelf plate 14, Fig. 4a, at the bottom of the gun house 7, the pan plate 15 at the bottom of the hereinafter described gun pits 16, of Fig. 1, two plate dividing members 17 and 18 bounding the upper and lower projectile flats and the base or lowest level platform 19 hereinafter referred to as the powder handling platform.

Circumscribing and joining together the above mentioned flat boundary structure is a plurality of concentric cylindrical bulkhead structures designated generally by the reference characters 21 and 22, Figs. 5b, 5c. Further joining together of the plate structure is provided by a gun girder structure 23, Fig. 5a, positioned between the shelf 14 and pan plates 15. A central column 24 is also provided therein which extends downwardly from the pan 15 to the powder platform 19. The reference to this arrangement as extending downwardly is made for purpose of clarity in designating structure which will be considered as suspended with respect to that structure which is erected above the roller bearing support level. Thus the three lower flats comprise the suspended structure of the turret and the two upper flats provide the suspending means therefor.

The turret structure and space generally between the gun house roof 25 and the pan plate 15, enclosed by the armored gun house 7 comprises five major turret structural components, namely four longitudinally parallel gun supporting girders and an enclosing circular bulkhead assembly 26. Four girder units comprising a pair of wing or outer plate girder structures 27 and a pair of inner truss girder units 28 divide the gun pit 16 into three approximately equal gun receiving pit pockets 29. The truss and plate girder structures are such as to provide open areas interiorly of their elements into which the installation of electrical and hydraulic systems equipment is made.

Welded to the gun pit structure, abutting the wing girders and resting on the circular bulkhead, the shelf plate 14 extends outboard of the bulkhead in a relationship providing greater bulkhead overhang at the rear than at the front and sides thereof.

This shelf plate 14 is cut away adjacent the wing girders and interiorly thereof to provide clear gun operation areas above the gun pit pockets as well as rearwardly of the gun mounting installations.

Suitable floor plates and floor beam supporting structures 31, Fig. 4a, are installed within the gun house 7 to provide for a substantially continuous floor around the gun pit area. The floor or deck 32 built up over this substructure is thus suitably reinforced to provide facilities for the installation of control cabinets and operating equipment.

The ports 33 in the gun house through which the guns project are shown in Figs. 1 and 4, and are located in the forward wall 34 thereof. Suitable sealing means, enclosed by the buckler 35, is provided between the gun slide 36, and the walls of the port opening. The special details of this sealing structure are not shown as they form no part nor are they necessary for a clear understanding of the instant invention.

The suspended rotating structure of the turret, located below the pan plate 15, is isolated from the gun house and gun pits by flameproof installations in the floor thereof. This suspended structure includes the two projectile stowage flats 17 and 18 and the powder stowage flat 19 therebelow, provided by the concentric connecting bulkhead 22, the floor plates 15 and the centrally located column element 24.

Secured under the pan plate 15, and concentric with the circular bulkheads is the horizontally arranged support bearing means 6, Fig. 4b, which comprises large forged circular ring element 37 employed as the upper bearing race, roller elements 38, and a lower milled surfaced roller track race 39. The bearing assembly is suitably supported at its lower race by the circular foundation structure 4.

The column and bulkhead structures best shown in Figs. 4a through 5c are continuous steel cylinders fastened to and extending downwardly from the pan plate through all three floor structures to provide support therefor. The bulkheads on each of the flats are provided with cutaway sections, which form access archways 41 on the projectile flats and an open sector at 42 on part of the powder platform. A straight bulkhead structure 43 of Fig. 10 and having ammunition hoist structure 44, hereinafter described in greater detail, built therein, encloses the remaining portion at the lower turret level. The powder flat level as shown in Fig. 10 is partitioned into three small flame proof fire hazard safety enclosures 45, 46, 47, so constructed as to confine the downward flame and explosion of a powder hoist fire by permitting limited expansion of gases therein while blocking the fire hazard from the other hoist areas, from the powder handling space 48 and from the ship magazines, not shown, which are external to the turret magazines.

The circular bulkheads separate the projectile flats of both Fig. 8 and Fig. 9 into an inner circularly platformed compartment 49, and an outer ring shaped compartment area 51. This ring area is suitably enclosed at its outer periphery by the circular structure of the turret foundations 4.

In both of the projectile flats the annular platform is a rotatable roller mounted power driven unit having its floor surface flush with the floor plates 17, and 18 of the inner concentric circular platforms 49. These annular units serve as projectile stowage platforms, Fig. 13, hereinafter referred to as projectile rings, and are adapted by means of suitable lashing structure associated therewith to maintain the projectiles detachably secured in a convenient arrangement for transfer onto the circular inner platform of the flat.

The floors of each of the circular areas of each of the projectile flats 17 and 18 are provided with a roller mounted circular platforms, which forms the outer limit of each of the concentric areas enclosed by the bulkheads. These platforms 53 and 54 are rotated by a power operated circular rack 52 and pinion arrangement shown generally at 55 of Figs. 4 and 60. Each projectile ring platform is an integral weldment having a circular coaming 56, provided with chain lashing means 57 to restrain the stowed projectiles against premature movement.

The general operative arrangement of the two level projectile storage is shown and described in Patent No. 2,456,620, issued December 21, 1948 to G. A. Chadwick and P. H. Girouard for Ammunition Stowage and Handling. The arrangement of projectiles in the projectile flats of the instant turret is best shown in the plan views of Figs. 8 and 9, and in Figs. 13 and 60.

The structural details of the upper projectile flat include as the major difference over the structure of the lower flat, the provision in the inner compartment 53, thereof, of a heavy transverse platform 58 extending across the compartment above the projectile ring to provide support mountings for the train power drive 59, of Fig. 75.

The gun house which encloses the structure erected above the bearing level is not divided by bulkhead structure but rather incorporates pipe stanchion and rail means 61, Fig. 3, to enclose the rearward and side sections thereof. On the rear line of stanchions and rails are mounted many of the control instruments and devices in a manner whereby they form a partial bulkhead to separate the gun compartment from the turret officers overhand booth space.

Ordnance assemblies

The ordnance installation arrangement of the turret herein described includes design features, construction details and equipment functional relationships all in a novel and advantageous manner which adapts the gun assemblies for continuous automatic fire. These mechanical, electrical, and hydraulic operating and controlling devices enable the gun to be separately served and loaded while providing several different methods by which individual selective control of each gun or combined control of all of the guns may be carried out. These new turret operating and coordinating systems, by their special design characteristics, permit operation and control of the turret as a complete unit.

Referring now in particular to Figs. 4a, 4b, 4c, 5a, 5b, 5c and Fig. 75 of the drawings a preferred arrangement of the turret ordnance is shown wherein the major assemblies comprise the gun mounts 2 and 3, the gun laying equipment indicated at 62, Fig. 7, including the training gear 59, Fig. 79, and elevation gear 63, Fig. 74, the ammunition hoists comprising the powder hoists 44, Figs. 41 and 42, and the projectile hoists 64, Figs. 43 and 44, the ammunition stowing equipment of the flats 17 and 18, Figs. 1, 8, 9 and 13, and of the powder handling platform 19, Figs. 4c, 5c and 10, and the ammunition handling equipment hereinafter described in detail and including that of the several ammunition flats as well as that associated with the gun slide and the ammunition hoists. Additionally the gun fire control equipment, located generally in the rear sections of the gun house 1 is shown at 65. The apparatus of this installation includes additional remotely located elements in intimate association with numerous other ordnance assemblies incorporated in the turret.

Gun

The 8 inch guns of a preferred embodiment of this turret, one of which is shown in detail in Figs. 11 and 12, are of a type embodying a loose fitup liner element 66, as shown in detail in Fig. 14 and from the breech end in Fig. 15, assembled in the gun tube 67 thereof. The assembly of this internally hardened surfaced rifled liner with the gun tube is such as will permit convenient shipboard removal for replacement after the useful life thereof.

The insertion of the liner in the gun tube is accomplished by providing an outside diameter dimension for the liner of 0.01 inch less than the inside diameter of the gun tube. Assembled retention of the liner in the tube is accomplished by means of a locking ring 68 of Figs. 15 and 16, screwed into complementary female threads on the breech end of the tube. Drawing of this locking ring tight, causes a shoulder machined on the breech end of the liner to seat against a mating shoulder in the gun tube bore. The liner is thus locked in the tube, and retention of the locking ring in assembled condition is accomplished as shown in Fig. 14 by peening over its outer edge at two suitable slots 69 provided in the tube.

The design of the gun assembly powder chamber 71 as shown in detail in Fig. 16 is such as to adapt the gun for cartridge case type, preloaded primed and plug sealed powder case ammunition. The powder chamber is provided with an annular recess 72 at the breech end thereof to receive an enlarged portion of the powder case in a conventional manner and thereby retain the case against forward axial displacement upon firing. Slotted recesses 73 as shown in Fig. 15 are also provided at the gun breech and adapted in conjunction with the powder case receiving annular recess 72 for the nesting of an extraction finger assembly 74 below the annular groove surface whereby rearward movement of the finger against the powder case rim will impart ejection thereto.

The gun tube and liner assembly additionally incorporates passage structure 75, Fig. 22, hereinafter described in greater detail, for fluid communication between an external air pressure source and the interior bore whereby powder gases are ejected from the muzzle end of the gun into the atmosphere to avoid leakage into the gun house and to thus prevent fouling of the air therein.

Gun housing and slide assembly

A gun housing assembly 76 of Fig. 16, comprising the gun 67, a slide supporting yoke element 77, and a breech mechanism 78, is provided with gun recoil and counterrecoil mechanism attachment means 79, in addition to the provisions for attachment and mounting of the gas ejector assembly 81 of Fig. 22. Attachment of the housing assembly 76, between the gun breech shoulder 82 and rear cylinder 83, is accomplished preferably by an interrupted thread bayonet-type joint 84 locked, for example, by means of a screw retained locking key 85 of Fig. 14.

With the inclusion of the power operated sliding breech block of the character described in greater detail and claimed in the copending application of Frank Warlick, Serial No. 439,938, filed June 28, 1954, and which matured into U. S. Patent 2,789,472 on April 23, 1957, as indicated at 86, in the housing assembly, the gun is equipped with an automatically operated assemblage including both cartridge firing and empty case extracting mechanisms.

The gun assembly thus comprises principal unit and sub-assembly components hereinafter set forth in greater detail as including the gun, the gas ejector and the gun housing. The gun housing includes the main housing units, the breech mechanism, the firing mechanism and the case extractor.

Gun slide

The right, center and left gun assemblies of the turret, each consisting of the above components are mounted in separate equidistantly arranged and parallel gun slides. Each assembly is pivotally mounted in its respective gun pit by suitable trunnion means 87, whereby the trunnions of the several guns are in horizontal axial alignment.

The common trunnion axis position is immediately to the rear of the turret front armor plate and above the shelf plate. The arrangement of the gun assemblages which are pivotally movable with respect to the trunnion axis is such that a point of balance is obtained at the point of rotation by the use of counterweights at 88, Figs. 2, 3 and 12.

The gun slide assembly as shown in Figs. 11 and 12 supports the gun by a forward cylindrical bearing 89 and by two parallel rail members 91a in ways 91b shown generally at 91, Fig. 20, associated with its housing 76. The supporting structural arrangements are such as to permit upon firing limited sliding recoil-counterrecoil movement, controlled in its degree of movement by recoil brake piston 92 of Fig. 16 and by the counterrecoil mechanisms 93 of the slide as shown in detail in Fig. 19. A recoil piston rod 94, Fig. 16, is secured to a top lug 95, of the housing 76, and a counterrecoil plunger receiver 96 for plunger 116 is secured in a thrust relationship with a bottom lug 97 thereof. From the recoil of firing, the housing and gun are thus thrust back into battery by the counterrecoil mechanism 93 mounted in the slide rearwardly of the housing.

Gun housing

The main housing component 76 is generally rectangular in shape and is furnished with parallel machine finished guideway surfaces in the two side faces thereof, Figs. 20 and 25, to provide for rail support at 91 in the slide 36. Bayonet joint 84 provides attachment of the housing to the gun. Additional provisions are made in the housing structure for assembly of the breech mechanisms 78 therewith.

The gun shoulder bore 99 is longitudinally centered and passes through the forward section 101 of the gun housing. Its machined surfaces provide forward and rear bearing elements 102 and 103. The bayonet type joint 84 incorporates an interrupted square type screw thread and a keyway locking device 104 therefor, as a retaining means between the gun tube and the forward portion of housing assembly.

The breechblock way 105 in the housing of Fig. 15 comprises a rectangularly cut hole extending from top to bottom of the housing and fitted with bronze guide members 106 which are inclined upwardly and forwardly. The position of the guides thus provides a track for the breechblock which will produce a forwardly rising movement to lock the block against the breech at the upper limit of its travel. Stop members 107, in the form of blocks act to limit the upward travel of the breechblock.

The breech bolt actuating cam 108, Figs. 16 and 22, which is essentially a tapered block is located in the breechway and extends vertically downward from the gun shoulder bore.

The housing additionally comprises a back plate 109, Fig. 16, which is longitudinally bored about the center line of the gun for attachment of a deflector 111, and spanning trays 112 of Figs. 35 and 36. The back plate 109 is also longitudinally bored at 113 in the upper portion thereof for reception of the recoil piston 114, and at the bottom portion at 115 for the reception of the counter recoil plunger 116.

The deflector 111 is a portable sleeve of hollow cylindrical shape secured to the housing about the gun centerline.

The spanning tray 112 is a curved tray member fitted to the deflector 111. It extends rearwardly in line with and below the gun centerline and functions to guide the extracted empty powder case into empty case tray assembly 117 of Fig. 31.

The gun breech assembly of the housing, Figs. 16, 20 and 21, incorporates a vertically sliding manual and power operated block assembly 86 and a twin spade case extractor 98. The breech enclosure portion of the housing is provided with ways 105 on which mating recesses 118 of the breechblock are adapted to move vertically between an upper firing position and lower loading and ejecting positions.

Breechblock

The breechblock 86 of Figs. 20 and 23 is an assembled unit, the principal element of which comprises a generally rectangular block, undercut at its rear face below its top surface to provide a protruding tray. The upper tray surface is provided with a longitudinal concave area to allow ammunition travel thereover. This concave tray portion is centrally and longitudinally recessed to receive and to permit passage thereover of the rammer chain 119 of Fig. 36. The forward part of the rammer path in the block is recessed for the reception of a spring loaded case retaining pawl 121 of Fig. 23.

In the preferred embodiment two dovetail slots are provided in the top surface at the sides of the breechblock for the reception of connecting rod yokes 122 of the breech manual drive mechanism.

The firing pin chamber which is located as shown in Fig. 23 to align with the gun centerline when the block is in its upper position, extends longitudinally through the breechblock and is adapted to receive and retain a firing pin mechanism 144 of Fig. 24 therein.

The sliding breechblock 86, Fig. 21, additionally incorporates a positive spring loaded breech locking bolt mechanism 123 and firing mechanism cocking device 124. The breechblock with its assembled locking and firing mechanisms rides in an open breech way which passes vertically through the gun housing. The block slides in this enclosure under the operation either of a power cylinder operator 125, Fig. 16, mounted below the block on a bracket 126 or by an auxiliary, manually operated linkage mechanism 127, of Fig. 20 attached at the top of the block for manual coupling with a hand wheel mechanism 128 of Figs. 2 and 3.

The breechblock when in its closed position, is locked against movement with respect to the gun tube by a bar member 129, Figs. 20, 21 and 23, of the locking bolt mechanism 123 which is heavily spring loaded by a suitable spring 131 of Fig. 16, to provide automatic movement into locking position.

Operation of this bolt is provided by the action of a pinion 132 and rack 133, Fig. 21, and an inner release bar 134 controlled by its coupled arrangement with the firing mechanism and the power system controls, hereinafter described in greater detail. The breechblock 86 functions in such a manner as to retract and return the firing pin 135 and to position certain valves of the power system during the breech opening and closing cycle. The unlocking of the bolt bar 129 is mechanically controlled by either of two devices mounted in the slide. One of these devices, a cam element 136, automatically retracts the bolt as the gun counter recoils. The other is controlled by an auxiliary hand lever mechanism 137 which unlocks the breech when the gun has not been fired. The bolt is held in retracted position when the breech is open by the cam 108, Figs. 16 and 22, mounted vertically in the breechway on the breech face immediately below the cartridge rim seat 72. The breech bolt is also provided with an auxiliary hand lever mechanism 139 for use in unlocking the breech.

The pinion 132 and rack 133 of the breech bolt are located in a T-shaped chamber in the bottom of the block as shown in Figs. 18 and 21. At the closed position of the breechblock the forward end of spring loaded bolt bar is free to move across the top surface of the cam 108 in the breechway. At this position of the block, the inner release bar 134 aligns with the outer release bar 141 of the gun housing to receive the thrust of that bar at gun counterrecoil. This thrust rotates the pinion, retracts the bolt and latches the inner release bar behind the latch seat 142 of the gun housing. The latch device 143 is a spring loaded pawl which is located in the end of the inner release bar 134 as shown in Fig. 18. This latch functions to hold the unlocked bolt only until the forward end of the bolt can ride on the cam.

Firing pin mechanism

The firing pin mechanism 144 is arranged for percussion or electrical firing as shown in Fig. 24 of the drawings and in its assembled relationship with the breechblock in Figs. 20, 21 and 23. As there depicted, the mechanism includes a conventional firing pin 135, the head 145 of which is designed to detonate either an electrical primer of a service ammunition case or the percussion primer of a short case.

This mechanism consists of three groups of parts which include breechblock firing pin insulation 146, a firing pin 135 and a firing pin retracting device 124 of Fig. 23.

The firing pin insulation 146 is mounted in the front of the breechblock as shown in Fig. 24. The insulation is mounted in a flanged bushing 147 which in turn is secured in the breechblock by a threaded locking nut 148. This insulation consists of a mica firing seat insulator 149 in the shape of a truncated cone, a washer-shaped mica forward insulation filler 151, a flanged metallic separator 152 of truncated conic shape, a cylindrical plastic bushing 153, a mica rear insulation fil'er 154, and a metallic washer-shaped rear fil'er 155. These assembled parts insulate the front end of the firing pin when the pin is in its firing position, and also serve to prevent closing of the firing circuit by grounding action through the breechblock. This firing circuit can be closed only after contact of the end of the pin with the primer of the powder case.

The firing pin assembly as shown in Fig. 24 includes the firing pin 135 which is a steel rod with an integral conical head. The arrangement of the firing pin circuit, Fig. 70, is such that when the rear end of the firing pin is connected to the terminal fitting 156 of the electrical circuit, the pin becomes the last link of the firing circuit to be closed. The pin is insulated throughout its entire length by a close fitting casing construction 157 of wrapped insulation. A cylindrical firing pin sleeve 158 encloses the insulated assembly. The forward end the pin and sleeve are separated and insulated from each other by two circular discs, namely a plastic firing pin casing washer 159, and metallic sleeve seat washer 161.

At the approximate center of the sleeve 158, an integral collar 162 serves as a forward seat for the coil spring 163. This spring as assembled on the sleeve and firing pin units, is enclosed within a cylindrical assemblage which comprises the firing mechanism sleeve 158 and the firing mechanism lock 164. These two parts screw together and are locked by lock screw 165. An internal collar 166 within the firing mechanism lock serves as a bearing for the coil spring.

A firing pin handle 167 is mounted on the pin sleeve rearwardly of the collar 166 so as to protrude beyond the rear of the enclosing case formed by the firing mechanism lock. This handle is provided with lugs 168 for engagement with the retracting lever assembly 169.

At the bottom of the handle, there is a cutout recess which provides a ledge for securing the firing pin in its retracted position. The spring 163 is compressed at this retracted position.

A latch device 171 holds the pin mechanism in this retracted position. This latch is secured by a pin 172 in the lug 168 at the bottom rear end of the firing mechanism lock. The entire assembly is secured in position in the breechblock by revolving the assembled unit so that two ears 173 on the firing mechanism lock behind recessed shoulders at 174 in the block.

The electrical terminal nut assembly 175 at the rear end of the firing pin comprises a terminal nut 176, a spring 177 and a terminal stop. This is a special fitting which is screwed on the end of the firing pin to secure the firing cable terminal between the spring and the terminal stop. The flexible positive contact arrangement is such as to permit convenient attachment and detachment. This terminal nut design is adapted for percussive firing of special percussive short case type powder charges used in the event that a service charge misfires.

The firing mechanism retracting device comprises a lever 178 mounted on the rear of the breech block as shown in Fig. 21. This lever is suspended from a pivot pin structure 179 to straddle the rear of the firing pin. The lower or foot end of the lever lies at 124 in the path of travel of the rear end surface of the breech bolt. It bears against the surface thereof by spring action of plunger 181 which is located in a recess at the top of the breechblock. This device provides for retraction of the firing pin from firing position whenever breech unlocking action may occur. The firing pin is thus maintained retracted throughout periods of breech opening and closing movement. It is noted that the firing mechanism does not include a sear cocking device such as is employed in conventional sliding breechblock firing mechanisms.

Empty case extractor

The empty case extracting mechanism of Figs. 15 and 25 incorporates a pair of extractor spade elements 182 which are separately mounted on cam roller shafts 183 of two hydraulic cylinder units 184. The cylinder units are mounted on top of the gun housing. This arrangement suspends and pivots the spades in the breechway for reception of their lower tip ends in the gun breech cartridge rim recesses 73. The back of each spade is fulcrum surfaced to provide bearing against the gun breech at stroking action of the operating cylinder units. The movement of each toe or tip is nearly linear as a result of the provision of a cam course 185 for the pivot pin roller shafts 183. The degree of toe movement is limited by both cylinder stroke and by spring plunger buffers 186, one each of which is located in the path of each extractor toe. Piston springs are provided in each of the cylinders to cooperate with the buffer action in returning the extractors to their normal positions in the breech recess seats.

A manual operating handle device 187 is also provided as an alternative means of operation of the extractor. This device includes a normally removed handle, not shown which is adapted for installation in a socket member 189 of the lever bracket 191. This bracket is on a shaft 192 which extends across the top of the breechway of the gun housing and which is supported in the two bearing brackets 193. Arms 194 on the ends of the shaft carry rollers 195 which are positioned in line with cam slide plunger elements 196. Hand lever movement causes depression of the plungers and results in movement of the spades in their case extracting action.

Gas ejector system

The gas ejector system assembly 81 of the turret gun is an assembled air line system of the character disclosed and claimed in the copending application of Frank Warlick, Serial No. 185,899, filed September 20, 1950, which matured into U. S. Patent 2,798,412 on July 9, 1957, having valves and lead connections therefrom to connect an air supply source such as from the ship's supply to the interior of the gun housing of each gun. A typical installation of the system is as shown in Fig. 26, and the details of the supply to the housing are as shown in Fig. 22. The gas ejector system directs jets of compressed air through the powder chamber and gun bore to expel gases from the muzzle of the gun after firing. Control of the gas ejection is by means of a valve which is arranged to be actuated by movement of one of the extractor spades 182.

The principal components of the gas ejecting system as shown in Fig. 26 are a manifold and pipe system on the slide and gun housing and subassemblies of swing joints and supply line connections associated therewith which include a sliding expansion joint 197, a pilot valve 198 of Fig. 27, a blow valve 199 Fig. 28, a tripping mechanism 201, an air strainer 202, and a manual gate valve 203. Ship's air supply is delivered to each gun by a pipe line 204 connected to the system at the cutoff valve 203 which is preferably located in the gun pocket 29, Fig. 4a, below the slide trunnion. From the cutoff valve the system is arranged to provide flow through an air strainer 202 of conventional design upwardly through a lower manifold unit 205 and therefrom through swing joints 206 to an upper manifold 207 on the gun slide adjacent the trunnion thereof. Air then flows upwardly to pilot valve 198 through the expansion joint stuffing box 208 to the slide housing assembly. Two lines extend from the upper manifold as shown in Fig. 26. One line carries air supply to the blow valve 199 located on the slide at the gun breech, and extends from the blow valve to pilot valve 198 on the slide. The second of these lines carries air supply from the upper manifold directly to the pilot valve 198, and extends rearwardly through expansion joint 197 in the slide to a manifold 211 on the gun housing. From this manifold, the system distributes air to two nozzles in the breechblock guide at 212 and 213 and to a jet 214 in the breechway. Delivery from the manifold to the gun breech is by the pipe line 209 and air passages drilled through the gun housing as shown in Fig. 22. Delivery to the jet is by suitable tubing 215.

The jet 214 is an accessory outlet of the system, and functions to blow off any particles of foreign matter that lodge on the top surfaces of the bolt cam.

The swing joints of the gas ejector system are conventional high pressure flexible pipe connections of gooseneck type arranged to provide positive air seal throughout their bending movement and include an assembly of male and female elbows, having double row ball bearings and suitable neoprene sealing members therebetween.

The sliding expansion joint is a telescoping pipe connection which carries compressed air from the fixed pipe installation of the slide to a moving gun housing. The main part of the joint consists of a stuffing box 208 and an outer sleeve member. The mounting of the expansion joint is in a bore of the slide recoil brake assembly 228 as shown at the face portion thereof in Fig. 26. It is a conventional pipe stuffing box through which moving elements move when the gun recoils and counterrecoils. The pilot valve of the system as shown in Fig. 27 is a conventional valve device which functions to automatically control the period of air flow in a pipe system. Construction and functional arrangement include a poppet type air valve assembly 216 with a floating pilot plunger unit 217 mounted thereon and on a common support. Its function is such that when air pressure is admitted to the upper chamber 190 of the pilot cylinder 200, and is then cut off, the plunger is depressed by piston 210 to open the poppet 216. The air in the upper chamber is allowed to escape through a seepage hole 220 of an air control screw 230. The poppet and plunger moves upward under action of spring 240 to close the poppet valve as air in the upper chamber escapes. The initial movement of the pilot plunger occurs when air is ported through the upper chamber by opening of the blow valve.

The blow valve and its tripping device 218 are mounted on the rear of the recoil brake assembly 228. The valve is a small poppet type and is actuated to open by a valve operating lever 219 which is pivoted in its mounting bracket 221. This mounting lever is tripped by the stroke movement of one of the extractor cylinders. It is a tripping arrangement that holds the valve open only during the brief period of extractor spade movement.

The gate ejector cutoff valve 203 and the air strainer associated therewith are of conventional design as is the pilot valve 198; the details therefor are not illustrated in the drawing. The gate valve is a globe type which enables positive cutoff of the ship's air supply while the strainer is a screening device having an element therein removable for cleaning.

Mounting of the gas ejector blowoff valve is as shown in Fig. 28 and comprises a valve bracket 221 supporting the globe valve 199, a pin mounted actuation arm assembly 218, mounted by pin 222 and adjustable by means of screw assembly 223 to actuate the plunger of the valve. The operating lever is curved to connect with the pin roller shaft member 183 of the extractor assembly.

The gas ejection systems of the right and center guns of the turret are identical while the components of the left hand gun are of opposite hand. The principal parts affected by this design variation are the valve tripping mechanism 201, the sliding expansion joint 197, the manifolds 205 and 207 and the piping associated therewith.

*Counterrecoil mechanism*

The counterrecoil mechanism shown generally at 93 in Fig. 19, is of conventional ordnance design and functions as a hydropneumatic gun recuperator. It comprises an air bottle 224, hereinafter referred to as the counterrecoil cylinder, a plunger 116, plunger packing 225, and a differential cylinder unit 226. In its installed arrangement in the slide it is mounted below and rearwardly of the breechblock assembly with the forward portion of the plunger in a fixed relationship with the rear plate member of the housing. Initially the air chamber is charged with air under sufficiently high pressure to thrust the plunger into coupled connection with the gun housing and to thereafter maintain the gun in battery at any position of slide movement about its trunnions. The plunger is retained in a sliding relationship with the cylinder in such a manner that it is free to move longitudinally therein under gun firing and recoil.

Recoil action builds up air pressure in the air chamber to its peak value under gun firing and recoil, and it is this momentarily stored energy which thrusts the gun back into battery with sufficient force to displace the recoil system fluid in the counterrecoil buffer 227, Fig. 16, of the recoil assembly 228, hereinafter described in detail. In this action and while the mechanism is at rest the differential cylinder unit and the plunger packing operate to seal the air stored therein under high pressure against escape leakage to atmosphere.

The plunger packing 225 is an assembly of molded synthetic chevron rings, alternately spaced with spacers 229 of similar shape and form. These rings are assembled in a bore 231 at the front of the counterrecoil cylinder forwardly of the plunger bearing 232, and between the plunger packing seats 233 and 234. A plunger packing follower element 235 is centered between the packing seats. A gland assemblage 236 retains the plunger and its packing in an assembled relationship within the cylinder. The follower element 235 is connected by means of a drilled lead or passage 239 to the oil chamber 241 of the differential unit 226.

The differential unit is a small cylinder having a floating piston 242 disposed therein which divides the assembly into a liquid filled chamber and an air chamber on its respective sides. The air chamber 243 is connected, by means of passage 244, with the air chamber of the counterrecoil cylinder. It is thus charged with air at the same pressure as that of the main air bottle cylinder. The liquid chamber is filled with hydraulic oil at 245. The piston area on the fluid side is reduced from that of the air side by the area difference due to the piston rod 246. The unit pressure produced in the fluid is thus greater than that of the air, the total pressures on opposite sides of the piston being equal when the piston is in equilibrium, and this differential value of unit pressure is advantageously applied to the follower to insure sealing of the plunger at its packing. The differential pressure value generates an equivalent differential liquid pressure at the plunger packing to distend the chevron rings with a pressure greater than the air pressure in the air bottle. If leakage occurs it will be oil and not air, and the assembly is thus maintained in operative condition. Leakage will be indicated by the amount the visible end extension 247, of the piston rod, protrudes from the cylinder. Liquid replenishing requirements may thus be noted and corrective action taken prior to the piston reaching that critical value at which the air charge may escape.

*Recoil mechanism*

The recoil mechanism 228, comprises a hydraulic throttling device which buffs the motion of the gun assembly on both recoil and counterrecoil. This mechanism is attached to the top of the slide in the installed arrangement as shown at 248 of Fig. 3. Fig. 16 illustrates the interior of an assembled mechanism. A nut and key arrangement 249 is provided on the rear end of the piston rod 94 to secure the rod to the upper portions 95 of the back plate of the gun housing 76. The arrangement additionally prevents rotation of the piston 251 within the cylinder bore 252. The piston is provided with three circular openings 253 which pass longitudinally therethrough for the reception of throttling rods 254. The throttling rods are of variable diameter throughout their length to provide graduated fluid flow through the piston during the period of recoil movement of the piston.

A gradual checking and final arresting of the recoil motion results from the increased resistance to fluid flow as the throttle orifice's effective area is variably decreased.

The forward buffer portion 227 of the piston functions in cooperation with its housing 255 as a dashpot plunger, and under counterrecoil or return-to-battery motion acts with the cylinder head 256 of the housing 255 to buff the return-to-battery. This plunger portion 227 has four variable depth grooves 257 which permit a graduated flow of fluid from the cylinder head during the latter part of the period of counterrecoil movement.

An expansion tank 258, with is connecting pipe 259, serves to permit recoil fluid expansion against a small volume of air entrapped therein. This tank further serves the functions of constantly maintaining an adequate supply of fluid for the system as well as that of allowing fluid expansion under elevated temperature conditions resulting from rapid firing.

*Ammunition transfer trays*

Automatic ammunition transfer from the hoist cradles 261 and 262, Figs. 2, 3, 29 and 30, to the gun ramming position is accomplished by a hydraulically operated projectile transfer tray 263 and powder case transfer tray 264. The projectile transfer tray is mounted on one side of the slide far enough to the rear thereof to provide a minimum clearance with the gun housing at gun battery position. The powder case transfer tray is mounted on the opposite side of the slide sufficiently rearward to just clear the projectile tray when both trays are in gun ramming position. Both trays are hinged to the slide by hinge elements 265 and are provided with link connections 266 and 267, which are arranged in connecting relationship with the piston rods 268 of their respective hydraulic operating cylinders 269 and 271. Hydraulic actuation of the cylinders produces tray movement from tray loading or gun firing position at the side of the slide to ram position in alignment with the gun bore.

The load receiving position of the trays at the side of the gun slide is the position of these trays at the instant of gun firing and will hereinafter be referred to as the "firing position" of the trays.

Each tray is a generally cylindrical casting provided with an integral hinge 265 and with an arm member 272 for operation by the cylinders 269 and 271 respectively associated therewith. The operating arm members 272 are connected with each of the operating hydraulic cylinders respectively by means of links 266 or 267 and pin members 273.

Internally, each tray is provided with a machined rammer track groove 274, Figs. 35 and 36, for the purpose of guiding the rammer chain 119 in its ramming and retracting strokes. Each tray is provided with positive stop members 275, Fig. 30, and 276, Fig. 29, for the powder case tray and the projectile tray respectively which limits their arcuate movements. The stops are arranged to contact the counterrecoil cylinder when in ramming position. The stop elements are also arranged to engage with stop pads 277 and 278 on the gun slide when the tray is coming to rest in firing position.

The projectile transfer tray is provided with a plurality of cam and latch members which, as shown in Figs. 29, 32, 104, 105 and 106, comprise a projectile retaining cam 279, a switch operating cam 281, and a spring loaded projectile latch 282. These devices are spring loaded, the latch 282; by a spring 283 and the cam 281 by a spring not shown, to function in a manner whereby the switch operating cam 281 is depressed as a projectile is delivered into the tray and whereby the latch 279 is caused to engage the projectile in front of its rotating band to prevent it from sliding forward. This latch continues to hold the projectile while the tray swings to ram position. Simultaneously therewith, the retaining cam 279 located at the rear edge of the tray moves to block rearward projectile movement. Both devices are cam actuated to permit release of the projectile as the tray moves into ram position. The latch release cam is shown at 284 and the retaining cam release at 285. The switch operating cam actuates two switches 286 and 287, Fig. 29, of the gun control system. These two switches along with two other switches 288 and 289, Fig. 30, which are actuated by the powder case, are part of a group of ten gun control and firing interlock switches that are actuated by the projectile, the powder case and their respective trays when the trays are at either of their terminal positions.

The functions provided by each of these switches is as follows: Switch 288 is a normally closed switch in the powder case transfer tray control circuit. This switch is open only when the powder case transfer tray is empty at firing position. Switch 286 is a normally closed switch in the projectile transfer tray control circuit. This switch likewise is open only when the projectile tray is empty and in its firing position. Switch 293 of Fig. 89 is normally closed and is in the powder case transfer tray control circuit. It is open only when the empty-case tray is empty and in firing position. The switch 294, Fig. 31 is in the rammer control circuit and is normally open. It is closed only when the powder case transfer tray is in ramming position. A switch at 295, Fig. 31, which is normally open and is in the rammer control circuit is closed only when the projectile tray is in ram position.

Switch 296, Fig. 30, is a normally open switch in the rammer control circuit. It is closed only when the powder case transfer tray leaves firing position.

Switch 287, Fig. 29, is normally open and is in the projectile cradle control circuit. This switch is closed only when the projectile transfer tray is empty and at firing position. A normally open switch 289 is in the powder cradle control circuit and is closed only when the powder case transfer tray is empty and at its firing position. The projectile tray interlock limit switch linkage 297 operates a normally open switch at 298 not shown and in the firing circuit of Fig. 70, and is closed only when the tray is in firing position. The powder case tray interlock limit switch linkage 299 operates a normally open switch 301 in the firing circuit which is closed only when the tray is in its firing position.

The powder case transfer tray as shown in Fig. 30 has also a projectile stop device 302 at the front end thereof, as well as a switch operating pawl 303 and a lever mechanism 304, at its rear end. When a powder case is delivered to the tray it depresses the pawl and moves the lever to actuate two switches 288 and 289 of the gun control system. The projectile stop 302 in the powder case tray operates, when the tray swings to ram position, to take over from the projectile retaining cam 279 the function of retaining the projectile in its position in the projectile tray. As the projectile tray moves to ramming position its projectile retaining cam latch 282 is engaged at its outer projection 305 by a camming finger of the projectile latch release cam 284, Fig. 32, to move it out of engagement with the projectile. This is the action which necessitates the provision of a projectile retaining stop 302 in the powder transfer tray. This projectile stop is shaped in a manner to block rearward drift of the projectile while being adapted to be depressed and to permit a rammed powder case to pass thereover.

When the powder case tray is in firing position, the stop 302 is retracted into its mounting 306, Fig. 30, on the powder tray to permit unobstructed entry therein of the powder case from its hoist cradle.

The powder case tray is provided at its forward end with a camming surface 307 which is adapted to cam the projectile retaining cam 279 out of position as the transfer trays move toward ramming position. The projectile stop takes over the function of maintaining the projectile in the projectile tray during transfer and until the projectile stop in the powder transfer tray is in engagement with the projectile. Assembly of the projectile stop in the powder case comprises a pivotally mounted stop 302, Fig. 32, connected by a yoke member 308 at 309 to a linkage 311 having a compression spring 312 thereon and adapted to move the stop to its projectile engaging position upon release by a plunger assembly 313, Figs. 30 and 105, located on the slide and associated with the bell crank member 314 on the powder transfer tray and connected to the yoke and spring assembly of the stop 302. The configuration of the outer surface of the stop is such as to coincide with the contour of the cam 307 on the forward end of the powder case when this cam is at its engaging position with the retaining cam of the projectile transfer tray. The arrangement of the bell crank 314, its plunger assembly 313 and linkage arm 311 is such as to cause the stop 302 to be moved out of the path of powder case travel when the transfer tray is at firing position on the slide.

The powder transfer tray assemblage 264 includes an attached open empty case tray 315 of assembly 117 which is arranged as illustrated in Fig. 31. This unit is functionally a part of the arrangement for ejecting empty cases from the slide and turret. The empty case tray is attached to the powder transfer tray 264 by adjustable links 316 in a manner to permit movement therewith from ramming to firing position. The ramming and firing positions of the empty case tray are equivalent to the corresponding ramming and firing positions of the transfer trays. In its firing position it is above the counterrecoil cylinder 93, Fig. 100, in a position in readiness to receive an extracted empty powder case. From its receiving or firing position, Figs. 89 and 90, it moves in an arcuate course on two tracks 317, of Fig. 19 which are attached to the counterrecoil assembly cylinder, to its ramming position at the side of the counterrecoil cylinder. The compartment, Figs. 11 and 39 into which the empty case tray moves is the rear portion of the case ejector assembly 318.

The empty case tray is fitted at its rear end with two spring loaded latches, Fig. 31 hereinafter referred to as the empty case upper latch 319 and the empty case lower latch 321. These latches function to retain an extracted empty case in the tray from the instant of reception of the case through the period of movement to ramming position. This retention prevents forward sliding movement of the case in the tray during empty case transfer. The upper latch is shown in Fig. 31 and the operative relationship of both latches with their respective actuators is shown in Figs. 89 and 90. One latch is tripped to release position by the camming block 322, Fig. 34, on the rear plate 323. The other latch 321 is tripped at the end of tray movement as it contacts the surface of an adjustable latch release device 324, Fig. 11, located in the case ejector compartment.

An additional pivoted device 325 is located as shown in Fig. 89 at the rear of the empty case tray. It is a switch operating lever arrangement actuated by the empty case when the tray is in firing position. This lever, in this movement, permits closing of switch 293 of the gun control system. This switch in closing, removes one of the interlocks blocking the gun loading actions and permits movement of the empty case tray to the case ejector compartment. Thereupon this switch remains closed until tray returns to firing position. As the tray returns, the operating lever 327 strikes the switch roller 330 causing it to open.

The actions of ammunition delivery to each of the transfer trays at the firing positions of the trays are buffed to check projectile and powder case travel by hydraulic buffers 328 and 329 mounted on the side of the slide 36 immediately to the rear of each tray.

The projectile buffer 328, Fig. 32 is described and claimed in the copending application to Frank Warlick, Serial No. 187,340, filed September 28, 1950 and which matured into U. S. Patent 2,970,358 on April 30, 1957. It is a unit of the gun operating hydraulic circuit hereinafter described in detail, while the powder case buffer 329 is an independent unit.

The hydraulic type powder case buffer, located directly behind the powder case tray, is self-contained and is of a conventional spring return type incorporating a ball check valve to provide for rapid return of the piston.

The projectile buffer is of such design as to function as a hydraulically operated projectile positioning device whereby the projectile is moved forward after buffing action to a predetermined position in the transfer tray.

In the event the hydraulic action of the buffer fails to properly position the projectile, or after this positioning of the projectile in the transfer tray has taken place by action of the return stroke of the buffer piston, the maintaining of the projectile in such position during movement to ramming position is accomplished by the projectile guide and deflector bracket 331 of Fig. 32. The surface of this element is so beveled as to cam the projectile forward in the tray to a position where the projectile retaining cam 279 of the tray engages the projectile. Similarly a powder case rear guide and deflector plate 332 is attached to the inside of the slide rear plate 323 as shown in Fig. 33. This element likewise is provided with a beveled surface which cams the powder case forwardly in its tray during tray movement from firing to ramming position.

Fig. 31 shows in detail, the empty powder case longitudinal guide and deflector 333 which is mounted in the slide and at the rear of its ammunition loading space. The function of this element is that of preventing empty cases from being thrown or tipped from the tray when the gun is elevated. This deflector is a movable, two-position bar, hingedly mounted at 334 and equipped with a hand-operated mechanical latch at 335 which enables it to be secured either in "firing position" or in "raised position." The deflector is normally in firing position and is raised only in an emergency to permit manual removal of a powder case.

*Rammer mechanism*

The rammer assembly 336 is mounted on the rear and bottom of the slide as shown in Figs. 35 and 36, and comprises generally a casing 337, a chain guide 338, a chain 119, a sprocket wheel 339 for operating the chain, switch controls 291, Fig. 38, and 292, Fig. 37, a buffer 343, and a power drive generally indicated by 344. The rammer is a mechanism which operates to ram simultaneously the projectile and powder case at any position of the gun slide in elevation. The chain element 119 of the assembly is a semi-flexible unit which when retracted, folds into J-shaped course provided by the casing. In its ramming action it is adapted to extend outwardly from an exit port 345 in the top of the casing 337, across the guide 338 to the powder transfer tray, thence through the projectile transfer tray, the deflector of the gun housing 111, and across the top of the breechblock to the breech of the gun.

Alignment of the rammer chain in this linear course is accomplished by means of a longitudinally aligned groove disposed in each of the elements through which it passes. These elements are, at their ramming positions, arranged in such a manner as to provide a track over which the rammer passes. Ramming action of the chain and the retracting stroke which immediately follows the ramming stroke are both chain sprocket driven by a direct drive driven chain sprocket 339. A rotary gear type hydraulic motor 346 mounted on the slide provides the power for actuation of the chain drive. Hydraulic actuation of the motor is by supply piped from the accumulator 347 mounted on the slide. Power drive rotation of the gear motor and the limits of chain movement are precisely controlled by an automatic cam timing mechanism 348 and by a valve enclosed in the hydraulic motor unit. Further details of a suitable hydraulic system for the rammer drive motor are described and claimed in the copending application, Serial No. 439,939 of David Wertman et al., which matured into U. S. Patent No. 2,779,246 on January 27, 1957. These automatic cam timing arrangements also include solenoids which are actuated by one of a pair of switches 291 and 292 of the gun control system selectively at starting movement of the ram and when the ramming movement is completed. The outer switch of Fig. 38 is activated to retract the ram chain. Two cams 349 and 351 are located as shown in Figs. 36 and 37 on the chain links. Upon movement along the rammer course these cams selectively engage the switches 291 and 292 mounted thereon on the chain casing and function to provide actuation of these elements of the gun control circuit.

The buffer 343 for the extracted empty cases is mounted on top of the rammer casing in a position in the path of travel of the empty case and slightly rearward of the firing position of the empty case tray.

The rammer casing 337 is formed into a housing by two pairs of flange bolted sections to provide an enclosure for both the J course portion of the chain link roller tract and the sprocket which drives the chain. This casing, Fig. 99, is mounted at an incline from vertical to provide convenient attachment of the case ejector assembly on the under side of the slide. Circular covers 352, Fig. 30, and 353, Fig. 36, bolted to the casing over openings in the sides carry and cover the sprocket bearings, provide an opening for the drive shaft of the power drive, and serve to receive the end thrust from the drive shaft.

Case ejector

Each slide of the turret is equipped with a case ejector mechanism arranged as shown in Figs. 11 and 39. The ejector assembly is hydraulically power driven and operates automatically to receive empty powder cases from the gun and thereafter thrust them through the gun port 354 to the ship's deck.

The case ejector incorporates a chain drive component 355, chain sprockets 356 and 357 and a chain housing unit 358. It is in the rear bottom of the slide beside the counterrecoil cylinder. The space above this unit comprises a compartment 368 into which the empty case tray 315 dumps the empty cases.

The forward part of the compartment 326 is formed by a plate structure 359 designated herein as the intermediate chute section. This section provides a port 361 having flanged connection with a tube element 362, which extends forward beneath the slide and through the gun port.

The chain conveyor of the assembly is equipped with two equally spaced flights 363. Its forward sprocket 356 is direct-coupled to a power drive hydraulic motor 364, the mechanical cycle of which is automatically controlled by the gun control system proper.

The control system of this assembly includes a drive starting pawl 365, Figs. 34 and 110, and a switch 366 associated therewith and located near the rear sprocket in a manner whereby it will be depressed whenever an empty case is dumped by the empty case transfer tray onto the conveyor chain. Its switch closing action causes the chain to convey the empty case forward into the intermediate chute section at 359. This action thrusts all cases in the tube forward one case length and simultaneously therewith pushes the forwardmost case through the tube door 367 onto the deck.

In addition to a clear opening area 368 at the top of the compartment for reception or entry and withdrawal of the slide empty case tray, this compartment is provided with an access opening 369, Fig. 99, in the slide rear plate which is provided for removal of jammed cases and for maintenance of the compartment. A portable cover plate 371 is bolted thereover as a partial closure for the compartment, however it is provided with an access opening which enables manual ejection by use of a ramming tool or pipe.

Four devices comprising a case guide 372, Fig. 34, a case retaining-latch release 373, Fig. 89, a latch stop 374, Fig. 90, and the switch operating pawl 365, (Fig. 110, are fitted in the floor of the compartment and are in addition to the chain drive unit located therein.

The case guide 372 is a long cam piece bolted in the top of the chain housing bracket 358. It projects above the compartment floor parallel to the case ejection course. When an empty case is dumped into the compartment, the guide prevents it from rolling away from the chain drive unit and the switch operating pawl.

When the empty case tray descends into the compartment, the empty cartridge case is retained in the tray by the two latches 319 and 321, Fig. 31, which act in cooperation with the suitably contoured inner surface of the tray. These latches are released by action of the camming block 375, Fig. 34, located in the rear plate of the slide and by a case retaining-latch release 373 mounted in the floor of the compartment. The latch release trips the lower case latch 321 on the tray when the tray reaches the end of its movement to ramming position. This release comprises a large head screw 376, installed on the chain housing bracket 358, which is secured by a locking split nut and washer not shown.

The latch stop 379 is a similar device, having a longer screw but a similar head. It is located in the path of the tray latch 321 and rearwardly of the latch release. This stop functions as a safety stop to prevent excessive case latch action. It is adjustable and is preset to provide a small clearance from the latch when the latch is held in its tripped position.

The switch operating pawl 365 of Fig. 110 is a switch and lever mechanism mounted in the rear chute side of the bottom of the compartment 368 in a manner whereby it will be depressed by any empty case dumped into the compartment by the empty case tray.

The switch 366 which is actuated by this pawl device 365 functions to control the starting of the chain drive unit.

The chain drive unit, Figs. 11 and 39, of the case ejector mechanism comprises a chain housing 358, a front sprocket 356, a rear sprocket 357, and a chain unit 355 having flights 363 thereon. The chain housing 358 is an assembly of six castings which are formed into three sections. The sections comprise a forward sprocket housing 381, a central chain housing at 358, and a rear sprocket housing 382. As an assembly the sections enclose the two sprockets and the chain in a manner to provide an endless guide tract for the chain.

This chain tract is open along the top to permit the chain flights 363 to protrude into the case-ejector compartment and to permit their travel forwardly from the rear sprocket to the front sprocket. With the exception of this flight opening the housing assemblage is a closed unit.

The forward sprocket 356 of the unit is the driver and is spline shaft mounted in a semi-floating mounting while the rear sprocket 357, which is of the same size, is adjustably mounted by yoke 383 on an idler shaft 384 in a manner to permit take-up and adjustment of the chain which passes thereover.

The chain 355 is a conventional roller chain connected together by links, pins, rollers, and washers to form a continuous chain. Two flight links 363, each having an integral pawl or dog, are assembled on the chain in oppositely disposed relationship at equidistantly spaced points on the periphery thereof. These flights engage the empty powder cases and move them forward as the chain revolves about the sprockets to move along the chain tract of the housing. One half travel of the chain conveys the empty case out of the case ejector and into the tube. If the tube is full, one case is thrust out to the deck by this action of the chain flight.

Two chain guides 385 and 386 and a track 387 as shown in Fig. 11 are assembled within the housing around the rear sprocket to assist in guiding the chain.

The empty case ejecting structure is an assemblage forming a part of the compartment at the rear of the slide and the tubular course through which cases are ejected to the deck. It is generally composed of a rear chute 368 in which the empty case is received and which provides a trough therefor, and an intermediate chute section at 362 which connects the rear chute with an empty case tube forwardly thereof. Attachment of the intermediate chute is with the top of the chain drive forward sprocket housing and with the empty case tube. The tubular section comprises a slightly curved section which extends forwardly from the intermediate chute to a tube forward end which is attached to the forward portion of the curved section.

A two piece tube support 388 is bolted around the forward tube section and to the underside extreme forward end of the tube. A one piece tube bracket 389 clamps the tube to the underside of the slide directly under the center line of the slide trunnions. A two piece closure casting 391 closes the tube opening in the lower shield plate 392.

A spring-closed and hinged cover 367 closes the front end of the empty case tube, and is adapted to be locked closed by eyebolt and wing nut locks when the gun is not in use.

Projectile cradle

A cradle tube 394, Figs. 29, 102 and 103, and a cradle bracket 395 comprise the main elements of the large structural unit hereinafter designated as the projectile cradle 261, for transfer of projectiles from the projectile hoist to the projectile transfer tray. As shown in Figs. 47 and 48 all arrangements for sub-assembly mounting and for cradle swinging movement about the slide trunnion, are provided by these elements.

The cradle tube 394 is a hollow cylindrical weldment, open at both ends, and flange bolted at its top to the bracket 395.

The bracket unit consists of a cradle bracket element 396 and a bracket cap 397. Together these elements by their suspension from a slide trunnion provide a pendant swingable support for the cradle tube. A split ring bearing 398 is mounted therein for free bearing on the journal portion 399, Figs. 51 and 103. A guide arc 401, Fig. 2, is provided for use with guide 527, Fig. 47, to aid cradle alignment within the limited space between the gun girder and the slide. A fuze setter 402, Fig. 52, hereinafter described in greater detail, is assembled on and within the bracket while switch 403 and gear box units 404, Fig. 51, of the fuze setting equipment are mounted externally thereof.

On the underside of the bracket an integral lug 405 is provided with a bushed pin bearing 406 for attachment of the cross head pin at 407 of the cradle operating cylinder 408 of Fig. 91.

A cradle ram assembly 409 is enclosed within the tube as illustrated in Fig. 48. This is a cylindrical element which is adapted for movement in keyways 411 under loading of a helical spring 412. The ram assembly is adapted for linear displacement on reception of a projectile by hoist action in a manner to further compress the initially loaded heavy spring 412 and load the projectile against the pawl 414 of Fig. 103. The loading of the cradle spring 412 is sufficient to insure projectile ejection therefrom into the projectile transfer tray 263.

The lower end of the ram is fitted with an insert 415 having a hardened conical seat for reception of the nose of a projectile 413. This seat provides centering and alignment of the nose of the projectile for reception thereof in the fuze pot 416 of the fuze setter 402 of Fig. 52.

It is noted and shown in Fig. 85 that the fuze pot is retracted from projectile engaging position by the fuze setter retractor lever latch device 417 at all times when fuze-set ammunition is not being used in firing.

The spring 412, Fig. 48, is confined at the top by a spacer ring 418 which is seated in an annular shoulder 419 of the fuze setter housing 421. This is a cylindrical housing which is fixedly mounted in the top of the cradle tube.

A ring shaped ram buffer 422 in a sandwich arrangement of rubber and steel rings serves to stop movement of the spring as the projectile is released from the cradle.

The cradle pawl 414, Fig. 103, which functions as a "cocking trigger" to retain the projectile within the cradle tube is a spring-loaded, pivoted lug having the cam surface thereon adapted for actuation by projectile movement thereover. It is mounted in the lower end of the cradle tube as shown in Fig. 102. Upon release of this pawl by either the manual release mechanism 430, Fig. 49, or the power actuated release mechanism, the projectile is released for removal from the cradle tube. This pawl is pivotally mounted by means of pin 423, and is arranged for actuation about its pivotal axis by two spring-loaded plunger devices at 424 of Fig. 103 acting on integral lever arms 425 thereof, and for release action by pawl tripping plunger 426, or as the case may be, by the manual pawl retract device 430, the operative arrangement of which is shown in greater detail for the powder cradle pawl release mechanism by the elements 484 and 493 to 497 inclusive of Fig. 58. These lever arm elements are on the exterior of the cradle while the pawl lug is adapted for movement through an opening 427 under action of the spring plunger 424. Thus the pawl normally protrudes into the projectile holding space beneath the ram. The ram retractor 441, Fig. 48, is generally similar to the hereinafter described powder cradle ram retractor.

Fuze setting equipment

Each of the three guns of the turret is equipped with a fuze setting device 402 in the projectile cradle thereof. The units are identical and comprise two major assemblies; namely a fuze setter 402 and a fuze setting receiver-regulator 428. A typical installation for one gun is as shown in Fig. 47, and diagrammatically in Fig. 53.

The two assemblies constitute a remotely controlled, power driven installation embodying an automatically setting, power-drive type fuze pot device 436 for use with nose-type mechanical time fuzes, and a receiver-regulator 428. The receiver-regulator embodies an electronic amplifier 429, an electric power output regulator 431, and an electric power driving motor 432.

The fuze setter device as shown in detail in Figs. 49 and 52, and with greater particularity in the copending application of Ernest F. Campbell et al., Serial No. 261,572, filed December 13, 1951, which matured into U. S. Patent 2,792,759 on May 21, 1957 and U. S. Patent 2,444,813 to F. W. Cunningham, dated July 6, 1948, comprises an outer housing 433, a fuze pot housing 434, fuze holding and setting cups 435 and 436, a differential drive 437, a driving gear 438, case 439, an input coupling 444, a fuze pot retracting mechanism 441, and interlock switches 442 and 443.

This fuze setter is mounted within the upper tubular portion of the projectile cradle 261, and has its component sub-assemblies arranged in a manner as shown in Figs. 47 and 51, wherein the A-unit 438 of the receiver-regulator is mounted on the forward side of the cradle and the B-unit amplifier 429 of Fig. 53 is mounted on the gun pocket circular bulkhead.

The fuze setter outer housing 433 serves as a guide for the cradle ram spring 412 and encloses the fuze pot assembly as shown in Fig. 49. The fuze pot assembly of Fig. 53 comprises a holding cup 435, a setting cup 436, and a different drive mechanism 437 therefor. All other component units are separate from the other housing group. The units comprising the driving gear mechanism and drive motor for the fuze setter are located at 432 in the receiver-regulator assembly 428 and enclosed by the gear case 404, of Figs. 47 and 53, the input coupling 444, and the fuze pot retracting mechanism 417 are mounted on the cradle bracket 395. The input coupling 444 is connected to the output shaft of the A-unit.

The details of the fuze setting drive mechanism, and the fuze setting receiver-regulator 428 do not form any essential part of the instant invention and, therefore, are set forth only in diagrammatic form in Fig. 53 with sufficient detail to make clear the relationship of the fuze pot and the cradle. The complete structure of the fuze setter is set forth in the copending application to Ernest F. Campbell et al. supra.

*Powder cradle mechanism*

The powder hoist cradle mechanism, Figs. 42, 43 and 56 to 58, is mounted to the sprocket housing 631 above the upper hoist at 529 and extends upwardly to the gun trunnion 87, it operates to transfer powder cases from the conveyor 628 to the slide 36. This cradle tube 445 mechanism consists of a cradle and sub-assembly attachment similar to that of the projectile cradle 394 except for the size thereof and for the fact that the projectile cradle is additionally provided with a fuze setting mechanism therein.

The major elements and sub-assemblies of the cradle mechanism comprise a cradle assembly 262 having a cradle tube and bracket designated 445 and 446 respectively, a ram 447, Fig. 57, a ram retractor mechanism 448, a pawl 449, Fig. 58, and pawl retracting mechanism 451, switch mechanism 452, an upper latch bracket 453, and a cradle guide 454, for a guide arc member 455, Fig. 3, on the slide 36. The coacting elements on the slide include a pair of buffer elements comprising a top buffer 456 and a bottom buffer at 457, Fig. 82. Additionally cradle latches are provided thereon or associated therewith which comprise a cradle-to-slide latch 458, Figs. 80 and 81, and a cradle-to-hoist latch 459 of Fig. 82. These elements are generally similar both in construction and operation to that of the projectile cradle assemblies.

The powder cradle main element 262, Fig. 56, is an assembly of a large cradle tube 445 and a cradle bracket 446. The bracket assembly 446 suspends the two portions from the gun slide trunnion 87 while the cradle tube 445 provides a receiving unit for reception of a powder case and additionally provides for movement of the case to a position at the powder case transfer tray 264 on the gun slide 36 of Fig. 30.

All sub-assemblies of the powder cradle 262 are attached to the cradle tube 445 or the cradle bracket 446, as the case may be. The cradle tube 445 is a generally hollow cylinder open at both ends and flange mounted by bolts to the lower portion of the bracket assembly 446 as shown in Fig. 57. Machined surfaces thereon are provided to secure pawls 461, Fig. 58, a guide 462, Fig. 82, a lower latch bracket 463, stop pads 464 and switch mechanism 465, Fig. 81, all as hereinafter set forth in detail and identified in Figs. 56 and 57. The cradle tube 445 is machined internally for reception of the spring ram device 447 and elements of the ram retracting device 448 in a manner similar to that of the projectile cradle.

The bracket unit consists of two parts comprising a cradle bracket 446 and a bracket cap 466. Together these units form a means for pendant swinging support of the cradle on the trunnion journal 87. The cradle also functions with the guide arc member 455 to align the cradle movement within its limited space between the gun girder 28 and the slide 36, Fig. 5a. An integral yoke 467 is provided on the bracket below the trunnion axis thereof for connection by means of a bushed pin bearing 468 to the cradle operating cylinder crosshead at 469 of Fig. 92. The cradle ram arrangement enclosed within the tube is as illustrated in Fig. 57. It is a cylindrical element which telescopes over a stationary spring guide 471, compressing a helical spring 472 therein. In receiving a powder case in the cradle the spring 472 is displaced upwardly toward the trunnion to further compress the initially loaded spring with sufficient pressure to provide for powder case ejection at the transfer tray. The bottom face of the powder case ram differs from that of the projectile ram in that the lower face is flat to serve as a seat for the powder case plug while that of the projectile cradle is recessed to receive the nose of the projectile. The upper seat for the spring is provided by a ring 473 machined integral with the cylindrical spring guide 471.

A ring shaped sandwich 474 of steel and rubber provides a ram buffer to stop ram movement as a powder case is ejected from the cradle.

The powder case cradle is also provided with a ram retractor 448 which operates similarly to that of the projectile cradle retractor in that it is provided for the purpose of retracting the ram when it is desired to lower powder cases to the powder case handling flat by reverse operation of the hoist assembly. This unit comprises a ram retractor crank 475, a gear housing 476, a retractor screw shaft 477, a slide 478 and lug elements 479 and 481 as shown in Fig. 57. The lug is normally held out of the ram path by the spring plunger 482.

This ram retractor mechanism cannot retract the ram except with the assistance of conveyor action. If the cradle is empty, as is commonly the case when the ram must be retracted, it is necessary to lower the cradle to the conveyor, load it with a powder case by operating the conveyor one cycle upward, and then raise the ram by manual operation of the hand crank. The hand crank operates a small worm and worm gear to rotate the retractor shaft. Turning the crank clockwise raises the retractor from its stop position. When it has moved beyond the travel of the spring plunger, the rat-trap springs 480 therein turns the lug into the ram path and beneath the cocked or rammed position shown in Fig. 57. The retraction operation is completed when the powder case is returned to the conveyor.

The cradle pawl 449, is a spring-loaded pivoted lug having a cam surface thereon which is designated by the reference character 483. It is similar in function but has a different shape from that of the projectile hoist pawl. It is mounted in the lower end of the cradle tube as shown in Fig. 58 and it serves as a cocking trigger to selectively hold and release the cradle load.

In addition to this pin pivoting arrangement the pawl includes two integral lever arms 484 and 485 located in the way of the spring plunger 490 and manual retract devices, 49, the lower end of 494 of Fig. 58, respectively. These lever arm elements are on the exterior of the cradle while the pawl lugs move through an opening under action of the spring plunger to protrude into the powder case space.

In this position the pawl normally projects into the tube, the top surface thereof being so located with respect to the conveyor that it is below the flight stopping position. As the conveyor lifts the powder case into the cradle, the cam surface of the pawl functions to displace the pawl, which snaps beneath the powder case at flight stopping position. In this position the top of the pawl is but a very small distance below the powder case. In this position the cradle is locked or cocked. As the cradle swings about its axis away from the conveyor, the powder case is swept from the conveyor flight and comes to rest on the pawl.

The spring plunger arm 486 of the pawl 449 is provided with a pin and roller 487 and 488 respectively to provide a clevis assembly 489. This roller receives the constant thrust of the spring plunger 490 and in addition receives the opposing pawl tripping blow that releases the powder case from its cocked position. Tripping is performed automatically when the cradle latches to the slide by the action of the piston unit 491 as shown in Fig. 30. The pawl tripping cylinder 492 is a component of the hoist assembly but is primarily a unit of the hydraulic pressure system of the slide power equipment. The piston 491 of the tripping cylinder is located in the path of the pawl roller perpendicularly above it in such a manner that when the cradle is latched to the slide, the crack or gap is very small. Pawl movement by manual retracting mechanism 451 as shown in Fig. 58 is provided by a device which consists of a cradle pawl retract handle 493, shaft 494, lever 484 and necessary brackets and linkage 496 and 497. It is an arrangement with a detent handle that is normally latched in a non-operating position but which has the handle arranged to permit unlocking action by outward pull thereon as necessary to rotate the lever. When the lower lever is positioned, a toe thereof is disposed in the way or path of one of the integral lever arms 484 of the pawl 449.

Ten electric switch units are mounted on the cradle and these electrical components are elements of the hoist control system, the identities of which and the location of the same as well as the actuating arrangement therefor are hereinafter set forth as follows:

Two of these switches hereinafter designated as cradle loaded switches are mounted on the bracket at an opening near the bottom of the cradle and are identified as switches 498 and 499, Figs. 56 and 58, and these switches are operated by a lever arm roller at 501 that extends through the opening 502 in the cradle. Entry of a powder case into the cradle opens switch 498 and closes switch 499.

Two switches are mounted together immediately below the switches hereinbefore described and are designated as latch-to-slide switches and are identified in Figs. 56 and 58 as switches 503 and 504 respectively. All of these switches are operated simultaneously by a roller shaft extension and lever assembly designated as 506 in Fig. 30. The shaft 507 is an element of a hydraulic cradle-to-slide latch device of Fig. 80. It functions to depress the plunger, and operates these switches when the cradle completes its movement to align with the slide transfer tray. Switch 503 is an interlock control in the circuit which controls conveyor starting and running and is associated with solenoid designated 505. It is open only when the cradle is latched to the slide. Switch 504 is an element of the gun control system of Fig. 17.

Two additional switches are mounted immediately below the pawl as shown in Fig. 58 and are designated as cradle pawl switches, and are identified by 508 and 509. These switches are operated by a lever 511 integral with pawl as shown in Fig. 56. The lever is provided with two adjustable switch operating screws as shown at 512 and 513, one each of which projects into the way of each switch. Both screws are adjusted to close the switches when the pawl extends into the cradle.

Switch 508 is an element of the cradle raise control. It opens to block hydraulic valve control action and its association with solenoid 514 is such that when a powder case is rammed into the cradle the porting action is blocked. Switch 509 is an element of the gun control system of Fig. 17.

A machine screw in a retract arm of the pawl retractor linkage operates a single switch located at the upper end of the cradle pawl retract handle. This switch is identified as switch 848 in Fig. 58 and functions only when the cradle is operated to lower a powder case to the conveyor, it is a conveyor starting control that is normally open but it is closed when the manual pawl retraction mechanism is operating to unload a powder case from the cradle to the conveyor.

The three remaining switches of the ten moutned on the cradle are located together on the forward or under side of the cradle immediately above hte latch bracket 516. These switches are designated in Figs. 30 and 56 as switches 517, 518 and 519. All of these switches are arranged so that they are actuated simultaneously when the cradle is secured to the conveyor. The actuating device is a switch tripping roller that extends through the loop of the latch bracket into the way of the latch device mounted on the top of the upper sprocket housing.

When the powder case cradle is actuated to the position shown in Fig. 42 switches 517 and 519 are closed while 518 is open.

In addition to the cradle arrangement hereinbefore described there are seven devices attached to the cradle which function with the cradle swinging movement. These are the cradle guide 454, two strike pads 464, two buffer pads 522 and 524, and two latch brackets 453 and 463 as identified on Figs. 56 and 58.

The cradle is held in alignment as it swings in the narrow space between the gun girder and the slide by an attached slotted guide 454 that is mated with a fixed plate on the gun girder. The guide arc 455 is hereinafter designated as the cradle guide arc member and is bolted on the gun girder in a position radial from the center of the cradle bracket journal. This plate extends vertically on the side of the gun girder from alongside the upper sprocket of the conveyor to a point above the gun house floor. Its upper end is mounted on a structural extension of the gun girder. The cradle travels on this arc track of 79° for maximum cradle swing from the conveyor to the slide at 5° depression within the limits of the guide arc. Cradle movement is limited at the conveyor and at the slide by positive stops or buffers in the path of travel and which are located in the upper and lower buffer pads 522 and 524 respectively. The upper stop 522 is a lug on the cradle top buffer 456 as shown in Fig. 30 while the lower stop is a block assembly mounted in the top of the upper sprocket assembly 529.

Cradle approach to both of these stop surfaces is decelerated and buffed by the hydraulic buffers 456 and 457 shown in Figs. 30 and 42. The final movement thereof is stopped by the resilient synthetic pads mounted in the two buffer pad units 522, 524. This bottom buffer 457 is mounted on the gun girder in a position shown in Fig. 42 and is a self-contained hydraulic design, in a cylindrical housing having a plunger spring assembly therein generally identical in design to the projectile hoist cradle buffer. It serves as a quick return type of buffer developing high pressure buffing with the piston fluid action only, and arranged to give fluid expansion in a trapped air chamber. This buffer is mounted in the path of a circular strike pad on the cradle which is a steel piece mounted on top of a laminated fabric cushion. It presents a flat surface perpendicular to the axis of the plunger. A lug on the gun girder backs up the buffer mounting flange and absorbs the heavy blow of cradle movement to the conveyor.

The top buffer is identical in design to the bottom buffer except that the housing therefor does not include the separate expansion chamber, and the bracket plates include integral key and stop lug assemblies.

It is positioned on the slide with its plunger in the path of a cushion strike pad of the same arrangement as the pad on the opposite side of the cradle.

Cradle latching assemblies

The arrangements which hold both the projectile and powder cradles at their upper and lower terminal positions are assemblies comprising fixed brackets on each of the cradles and moving latches on the respective conveyors and on the slide. These parts are shown in Fig. 42 for the powder hoist and in Fig. 44 for the projectile hoist. Latches in each instance are components of hydraulic cylinder devices, the upper one of which is arranged in the hydraulic system of the slide power equipment while the lower latch device is connected hydraulically in the hoist power drive circuit. The cradle-to-slide latches 534 of Fig. 80 as shown in their latched relationship in Figs. 29 and 30 function with buffing action of upper powder buffer 456 and upper projectile buffer 528 to latch the respective cradles to the slide at upper cradle travel. The latch of Fig. 80 generally comprises latch arm 533 operated by a spring 531 in a hydraulic piston device 534 which secures a latching roller 535 under the hook-shaped bracket 536 of Fig. 81. Spring action provides latch engagement while the release of the latch is accomplished hydraulically by the piston device. The design is identical for both the powder case cradle-to-slide latch and the projectile hoist cradle-to-slide latch. The extension 507 shown on the roller shaft of this latch is the switch actuating shaft element 507 associated, for example, with switches 503 and 504 of the powder cradle system. This shaft element functions to shift the switch operating plunger of the lever assembly 506 of the powder cradle and 537 of the projectile cradle.

The bracket and latch units 538, Fig. 82, which secure the cradles at the hoist conveyor differ from the slide latch units both as to shape and arrangement of the bracket and its latch, and also as to the functionally different details of the hydraulic cylinder thereof. These units are of identical design for both the powder cradle-to-hoist latch and the respective projectile hoist assembly. The latch bracket, as shown in Figs. 47, 56 and 82 is a combination of a cam actuating roller 539 and a mounting and actuating mechanism for switches positioned as at 517, 518 and 519 on the powder cradle assembly, and 541, 542 and 543 on the projectile hoist assembly. Its roller operates the cam surface 532 of the latch element 544 of Figs. 42, 44 and 82 when the cradle swings into alignment with the conveyor. At latching position the end surface of the flange moves behind the roller to secure the cradle positively under the compression load of the plunger spring. By reason of the hydraulic connection and operating arrangements of this cylinder, pressure is applied at 525, the front of the plunger to unlatch the latch instead of at the rear as in the slide latch.

The switch actuating mechanism 526, Fig. 81, of the cradle-to-hoist latch switches, is pivoted in the latch bracket immediately above the cam roller 539. It is operated by the latch after the latch clears the roller and moves to the position shown in Fig. 82. This position of the latch holds the cradle securely and without lost motion or wobble during maximum roll of ship or under shock of ramming the powder case or projectile into the cradle.

*Projectile hoist*

The projectile hoist arrangement shown in Figs. 43 and 44 is typical of the three projectile hoists of the turret of the instant invention. These hoists are generally a right, a center and a left design but the installations thereof in the turret are substantially identical.

The projectile hoist in general is considered to be an assembly of the semi-automatic power driven endless chain conveyor, and a cradle assembly at the upper end thereof which operates to move a projectile therefrom to a position at the transfer trays of the slide. While the project cradle is an assembly which may be separated from the projectile hoist conveyor, it nevertheless forms a functional assembly therewith and structurally comprises a part thereof when lowered to its position in alignment with the hoist. The details of the cradle are hereinabove set forth, and reference thereto in the description of the structure of the hoist is made only in such detail as is deemed necessary to show the structural and functional relationship therebetween.

The projectile hoist assembly consists generally of a conveyor assembly 64, the hereinabove mentioned cradle assembly, and power drive and control assemblies for operating the hoist in semi-automatic relationship with the balance of the gun loading system.

The conveyor assembly comprises generally a hoist tube 545, a pair of operating sprockets 546 and 559 for the conveyor chain 547 which passes thereover and which is rotated by the upper one of said sprockets, and a gear reduction unit 548. The power drive assembly associated therewith, and hereinafter described in greater detail, and which is arranged to drive the upper sprocket 546 of the hoist chain, comprises a system of motor and pump assemblies, a controller therefor, and a B-end unit and its related control assembly. The flight hydraulic system further includes as an element thereof the cradle operating cylinder assembly 408 of Fig. 91 which is connected between the gun mounting structure and the upper end of the projectile cradle in a manner to provide swinging movement of the cradle about its trunnion axis.

The conveyors of the system, Fig. 41, extend from the lower projectile flat 18 upwardly into the gun pit 16 at a point beneath the respective slide trunnions 87. The course of each is generally vertical from the bottom sprocket 559 to a point below the pan plate 15 where it curves forwardly and upwardly in parallel relationship with the gun girder. Its upper sprocket 546 and housing assembly protrudes from the top of the conveyor and is arranged with its sprockets splined to receive the output shaft of the gear reducer 548. As hereinafter described in detail the hoist is arranged in such a manner that it may receive projectiles from each or both of the projectile handling flats.

The hoist tube of the conveyor is an assemblage of seven flanged sections attached as by bolting to form a continuous tubular structure which is secured in the turret by lugs and bolted flanges at the lower projectile flat, the upper projectile flat and the platform above the pan plate. The location of these elements and the arrangement of the section is as shown in Fig. 44. The seven sections comprising each of the hoist tubes are identified as a lower sprocket housing 551, an intermediate section 552, an upper loading level section 553, a long curved section 554, a short curved section 555, a straight tube section 556, and an upper sprocket housing 557. Three of these sections, namely the two sprocket housings and the upper loading level section are bronze castings fabricated in flanged halves and bolted together. The other sections are steel weldments fabricated similarly of flanged halves.

The lower sprocket housing section 551, as shown in Fig. 45, is the lowest element of the hoist, and provided therewith is a hoist loading aperture 558 in the housing 551 for mounting the idler sprocket 559 therein. It comprises two halves 561 and 562 of the hereinabove mentioned section, a cover 563, and attached hinged shutters 564 and 565. Mechanical trigger and electrical control switch units are operatively associated therewith and identified in Fig. 45. This section assembly is mounted in the lower projectile flat with its flange projectile shelf flush with the handling room floor and with the sprocket portion thereof nested below the flat in a manner such that the cover is accessible from the outer handling room therebelow.

The two shutters at each projectile handling flat are spring-loaded by springs 566 and hinged at 567 and so linked together that they move freely to pass a parbuckled projectile into the conveyor slide path, and thereafter spring out to close the opening and hold the projectile in the hoist way. One shutter is fitted with a handle 568 and a manually operated pin detent 569. This arrangement enables the opening to be secured for removing projectiles from the hoist during reverse operation loading of the flat.

The trigger 571 is a pivoted cam device, spring-loaded by spring 572, and arranged to protrude into the hoist way. It is depressed whenever a projectile is thrust into the hoist or when the hoist is reversed and a projectile is lowered into the aperture. The shutter linkage generally designated as 573 and the trigger 571 are arranged to separately actuate the switches of the hoist control system. The shutter movement operates the switch designated by the symbol 574, opening the switch when the shutters are open. Trigger depression operates switch 575 when hoisting the projectile and switch 576 when lowering the projectile, thus closing the control circuit in the first instance, and in the second instance opening the circuit. Projectile movement in loading of the hoist is buffed by two padded buffer devices at 577 and 578 arranged in the hoist way, as shown in Fig. 45. While a third buffer device 579 which functions as a bumper plate is a generally slotted unit mounted in the bottom of the hoist way in a manner to buff projectiles when the hoist is operating in reverse movement, for lowering projectiles to the flat. This latter unit is a disc mounted in a recess of the shelf flange and resting on four synthetic rubber pads, while the two padded buffers hereinabove described are hardened steel block members mounted against a thick pad of synthetic rubber.

The straight hoist tube section located immediately above the lower sprocket section extends nearly to the floor of the upper projectile flat. This section, as hereinabove stated, is formed of two flanged halves fitted together and having a trigger and selector device arranged therein as shown in Figs. 59 and 83. This trigger 581 is an intermediate projectile operating trigger which actuates an electric switch 582 of the hoist at a position wherein it forms a functional part of the loading level selector device 583 of the system.

Figs. 43 and 46 show the assembled arrangement of the hoist tube section which is immediately above the intermediate section. This portion of the conveyor is functionally identical to the apertured portion of the lower sprocket housing section with the exception that it further includes a sub-assembly of landing pawls 584 and a control arrangement system for operation in the upper projectile flat. The shutter, trigger and electric control switch arrangement are the same as in the lower flight. However, the shutter switch is designated as 585 and the trigger switches indicated as 586 and 587. These landing pawls which are mounted in the upper loading level as shown in Fig. 46 support the projectiles loaded into the hoist at the upper projectile flat. They are arranged for retraction to permit a projectile to rise from the lower flat and pass therethrough and are also arranged to be manually latched out of the hoist way when projectiles are being lowered into the bottom hoist level. This mechanism is a separate sub-assembly mounted in a pawl housing 588 which is bolted in the hoist tube structure on the under side of the upper projectile flat. Pawls 589 and 591 are spring loaded, shaft pivoted and linked in a manner to move together. They are automatically retracted by the cam action of rising projectiles during hoisting. They are manually latched out of the hoist way for lowering action by a portable handle 592 normally stowed as shown in Fig. 83. The latching out assembly 593 as illustrated in Fig. 46 is held in position by the portable pawl retracting handle of Fig. 83 which is connected for operation at the left end of the landing pawl shaft.

The landing pawl mechanism generally includes an electric switch not shown but of the hoist control system. This switch of the control circuit is normally open but is closed only when the pawls are retracted and latched out for projectile flat loading by reverse hoist action. The loading lever selector 583 is included in the intermediate section hereinabove described and includes mechanism for controlling the use of either or both loading apertures as may be desired. The elements of this device are identified in Figs. 59 and 83 and comprise a selector handle 595, an indicator 596, a trigger 581, a trigger switch 582, a selector switch 599, and the associated connecting linkage therewith indicated at 601. It is a manually positioned selector and an automatic control unit which directs hoist handling and loading and shifts the electric hoist control for three selections of loading, namely an upper hoist loading, a lower hoist loading and loading at both hoists.

It will be apparent that when the selector is positioned in the upper position, the hoist loading crew on the lower flat are not able to serve projectiles to that hoist. When it is set at the lower flat an indication is given to the loading crew that the controls are set for loading at the lower level only.

When the selector is set at both positions the trigger is positioned to control the indicator in such a manner that the parbuckling crews may load from both projectile levels. The loading control arrangement for the two flats is such that as loading action occurs on the lower level an indicator at the manual control station at each flat indicates a load signal and the conveyor operates upwardly after one projectile has been thrust therein, and it hoists the projectile to a position where, on rising, it depresses the intermediate trigger 581 thereby causing the indicator at that level to indicate a "Do Not Load" condition. Thus by following the indicator signal the hoist crews serve the hoist every other cycle at the lower flat and empty spaces in the conveyor are loaded at the upper flat. This arrangement permits more rapid service to the gun than does loading at a single level.

The switch elements of the mechanism are so actuated in a parallel cycle as to permit alternate loading and also to provide the necessary electrical interlock control to start the drive cycle with three triggers controlling the action instead of one. The intermediate switch elements are trigger switch 582 and selector switch 599 in the control system arrangement. The three tube sections which connect the upper loading level section and the upper sprocket housing section provide a change in course of the hoist way from the vertical course of the lower section to a curved course which leads to the projectile cradle.

The top element 557 of the conveyor provides the housing for the upper sprocket 546, the mounting structure for the two large power drive mechanisms and the cradle-to-slide latch device, in addition to its function as a mating unit for engagement by the moving cradle. As previously stated its open end is shaped to receive the lower end of the cradle in such a manner that the latter may be attached and secured thereto. The units attached to this upper sprocket housing are the gear reducer 548, the B-end drive assembly 602, and the cradle latching mechanism 538. The latching device is mounted on a machined pad at the top of the section, adjacent the open upper end and in the way of a moving bracket on the cradle. Mounting for the gear reducer of the character of 813, Fig. 86 is provided by a circular surface on one side, which is concentric with the enclosed sprocket mounting and is fitted with attachment means to precisely align and secure the parts in operatively coupled relationship. On the same side of the housing a large rectangular lug is provided with three machined pads to serve as a mounting for the B-end drive unit. The sprocket unit mounted in both the upper and lower sprocket housings are identical as to tooth details and are of a type adapted to receive a roller chain 547 thereover. The suspension of the upper and lower sprockets differ in their details, since the upper sprocket is a driving sprocket while the lower one is an idler sprocket.

It is noted that in the turret assembly the right and left hoist sprockets are alike but the sprockets and chain of the center hoist differ in design details therefrom, as to the lengths of the chain links.

The hoist lower sprocket is an idler assembly, mounted for free bearing in an adjustable yoke 603 as shown in Fig. 45. The sprocket is press fitted on a stub shaft at 604 on either end of which are suitable radial bearing elements mounted in the yoke. Each side of the yoke has a trunnion seated in a block 607 which slides in vertical ways not shown but arranged in the housing 551. Movement of the two blocks is limited by an adjusting device comprising a threaded adjusting shaft 605 located in the top of the yoke and adjustably secured in a bracket shaped clip 609. This arrangement permits the take-up of chain slack as wear develops therein.

The upper sprocket assembly is a unit through which the conveyor is driven as aforestated. It is supported in the upper housing assembly by large radial ball bearings at 611 arranged on its hub in a manner as shown in Fig. 44. The center of the hub has a splined bore for a mountable coupling and drive shaft which passes through the sprocket 546. This shaft has identical mountings in the hub of the worm wheel not shown of the gear reducer 548.

The chains 547 of Fig. 84 of the hoist conveyors are mounted on the sprocket to form an endless chain conveyor of sixteen flights 594 equally spaced thereon. These provide projectile carrying pawls 616 which extend from the chain as shown in a typical chain section of Fig. 44. The chains are of the roller and link type, with alternate links consisting of a pair of inner links 617 located on both ends of the sleeve on which the rollers 615 revolve, and a pair of outer links 618, attached on chain pins 619 which are within the sleeves 621. The guide rollers 622 which function as guides in the tracks of the hoist tube are located on the chain pins 619 and are held by washers and cotters in a conventional manner. Each roller is bushed at 614 and is fitted for free bearing on its pin. Additionally the pins, links and sleeves have the conventional facilities for lubrication. The chains are provided with sides 623 which are shaped to reach from the chain guide track into the projectile way of the conveyor. All flights are mounted on adjoining sleeves of the chain and each is formed at its sprocket contact point so that it has bearing in the sprocket case identical to that of the rollers. It provides a projectile supporting surface with a cam shaped element 612 thereon that is arranged to lift the projectile into the cradle to permit reception and holding of the projectile by the cam pawl of the cradle.

The surface of a flight on which the projectile rests is flat at 606 and perpendicular to the center line of the chain. A sloping cam edge 624 meets this surface. This cam eases the projectile downward onto the cradle pawl which is in the path of action between the conveyor and the cradle. This action occurs when the cradle swings away from the conveyor, and it is this movement which sweeps the projectile from the flight. In this sweeping movement the cam edge of the flight lowers the projectile a very slight amount to a retaining position with the pawl of the cradle.

The same cam edge also functions when the hoist is reversed, to lift a projectile from the cradle pawl of the downwardly swinging cradle to the top surface of the flight.

A conventional worm and worm wheel mechanism not shown embodies a drive arrangement which serves as the drive for the upper sprocket. It is coupled by a splined shaft through the sprocket into the B-end of the power drive. The unit is suitably attached in aligned relationship with the side of the upper sprocket housing.

*Powder hoist*

The powder hoists for the three guns of the turret are arranged as shown in the plan views of Figs. 7 to 10 and are arranged within the turret as shown in Fig. 41. The hoists for the right and center gun are alike while the left gun arrangement is similar but of opposite hand.

Each hoist 44 is a semi-automatic, reversible, power-driven endless-chain conveyor lift which comprises generally an electric-hydraulic drive 626, a flametight powder scuttle 627, a conveyor assembly 628, and suitable control units therefor.

The power case cradle is considered to be a part of the hoist system in so far as hoist function is concerned as these assemblies are functionally and structurally interdependent. The details of the cradle are hereinabove separately set forth, but those details of structure and function wherein the cradle functions as a hoist unit are recited in the description of the hoist system.

The conveyor 628 extends from the powder handling platform 19 into the gun pits at a point beneath the slide trunnion. The course thereof is vertical from the lower sprockets 629 to a point below the pan plate 15, where it curves forwardly and upwardly parallel with the gun girder 23. Its upper sprockets housing protrudes from the top and is arranged with its shaft coupled to the driving shaft of the gear reducer 625. The electric motor 632 and the pump assemblies 633 are vertically mounted on foundation pads 634 in the upper projectile flat, and adjacent similarly positioned power plant elements shown at 635 and at 636 for the slide, and projectile hoist assemblies respectively.

The hoist powder scuttle 627 of Figs. 42, 55 and 87, is an assembly having as its principal components a cylindrical housing 637, an oscillating shuttle assembly 638, and the power drive 639 of Fig. 55 and its associated control devices. The shuttle comprises certain sub-assemblies, the component details of which are hereinafter set forth in greater detail but which include generally a shuttle housing 641, shutter mechanism 642 therefor, a shuttle element 643, shuttle drive 644, of Fig. 87, its gear box 645, Fig. 55, a shuttle drive latch mechanism 646, the electric drive mechanism 639, a hand drive mechanism 647, of Fig. 88, and shuttle controls which include the following: a function control fork 648, a pawl retract lever 649, shuttle control panel 651, and switch and solenoid assemblies hereinafter described in detail.

The shuttle housing of Fig. 42, comprises an assembly of six steel weldments, bolted together in a manner to form a cylindrical enclosure. Its assembly with the transverse bulkhead in the lower sprocket housing of the hoist is a flange bolted arrangement. An opening is provided in the rear sector of the housing which is fitted with two pivoted shutters 652 and 653, as shown in detail in Fig. 54. The opening is of sufficient size to provide reception of a powder case therein. This opening forms a loading port with which the shuttle chambers 654 and 655 Fig. 55 align to receive powder cases. The interior configuration of this chamber is cylindrical and is machined and finished in a manner to present a fine flameproof arrangement with the oscillating shuttle 638 assembled therein.

The two shutters are as shown in Fig. 41 and are hinged in a manner to be springloaded to close, and linked together to the linkage and lever arrangement 656 shown in the plan view of Fig. 54. This shutter mechanism moves both shutters in a manner to pass a powder case and thereafter automatically close to retain the case in the shuttle. The lever arrangement for shuttle control includes an arm 657 which operates the switch 658 of the hoist control system. This switch functions in an interlock capacity in an arrangement such that when the shutters are open, the switch contacts are open; when in this position the switch operates as one of the elements in the hoist loading control circuit to block shuttle movement.

A handle 659 which is attached to an arm of the left shutter as indicated in plan in Fig. 54 permits manual opening of the shutter and latching action in such open position. A hub 661 in the bottom of the housing Figs. 55 and 87 and a spud shaft 662, in the top, center the shuttle device in the cylindrical space of the housing 637. This shuttle unit is an assembly of a large rectangular weldment, two bumper plate units 663 and 664, and two trigger mechanisms 665 and 666. The shuttle is formed with two large recesses in opposite sides thereof and separated by an integral partition 667. These chambers provided thereby are hereinafter referred to as chamber A and B respectively. Each is shaped to receive and, with the enclosing shuttle housing, to enclose a powder case inserted therein. The surfaces of the shuttle assembly are also machined to a fine flame sealing clearance arrangement in cooperation with the housing. The shuttle is keyed and secured at its bottom by suitable attachments, such for example as by nuts through the shuttle hub 661.

A drive coupling is thus provided through which the device may be oscillated by the drive arrangement of Fig. 87. A slotted floating plate bumper 663, Fig. 55, forms the floor of each chamber, and serves as a buffer plate for absorbing the shock of powder cases lowered thereon when the hoist is operated in a reverse manner for loading the powder magazines. This slotted plate further functions as a chain flight clearance element to permit the conveyor chain to operate through the shuttle. Its position is fixed but each plate rests on synthetic resilient pads 669. The trigger arrangements 665 and 666, shown in Fig. 55, are separately operated pivoted levers which actuate separate cam devices at 671 and 672 to lift a switch operating shaft 673. The action controls the opening and closing of four switches of the control circuit. These switches are identified in the description as 674, 675, 676 and 677.

The arrangement of the mechanism in the shuttle that operates these switches is such that the switches are not actuated when a trigger is depressed by loading a cartridge case into an empty shuttle chamber from the powder handling room. The switch operation occurs subsequently when the shuttle oscillates about its axis.

The detailed arrangements for controlling shuttle oscillation are such that the upper end of the trigger shaft 673 fits freely in the spud shaft 662, but it is prevented from turning therein when the shuttle oscillates. This is by action of a square section 679 which mates with a guide 681. This prevents the two cams from revolving when the shuttle oscillates with the triggers.

Two circular profile cams 671 and 672, Fig. 87, are spline mounted on the trigger shaft 673. Each is located above a trigger, and its high point is oriented so that a roller 682 on a trigger operates to lift cams 671 or 672, shaft 673, and switch lever 683 when the loaded chamber is at the hoist. The action of the lower trigger which is in chamber A is similar to that of the upper trigger which extends into chamber B. This trigger action, in cooperation with the switch functioning action, provides starting and stopping action of the conveyor when the shuttle is latched for discharge into the hoist, and for shuttle power drive control when the conveyor has emptied the shuttle in hoisting the powder case, or when it has delivered powder to the shuttle in its lowering by reverse action for powder flat loading. A drive linkage 684 which oscillates the shuttle is located beneath the powder handling platform, and consists of a gear box unit 645, Fig. 55, mounted beneath the shuttle housing 641 and coupled to a shuttle drive connecting link 685 shown in Fig. 87. The gearing and linkage connections through the power and hand drive unit operate the shuttle in alternate clockwise and counterclockwise oscillatory rotations of 180° and hold it at the end of each oscillation until its chambers are loaded and unloaded by reason of the limit stops 686 and the stiff leg, and latch arrangement of Fig. 87.

The driven unit 687 that transmits drive action to the shuttle is the shuttle hub 661. The attachment is by a circular portion thereof secured to the bottom of the shuttle by suitable means such for example as keys 678 and hub nuts. It is provided with two integral stop lugs 686, one of which is shown on its under side in Fig. 87, and each of which lugs are arranged in the path or way of the large adjustable stop screws at 691 of Figs. 41 and 55 of the gear box 645.

The mounted position of the gear box assembly is as shown in Fig. 55, and is a unit which provides the main pivot bearing for the shuttle hub. It houses the spur gear element 692 and gear segment 693 which together drive the hub and shuttle. The drive arrangement is shown diagrammatically in Fig. 87, wherein the spur gear 692 is mounted on the shuttle hub 661 and is driven by a gear segment 693 which is in turn mounted on an extension not shown of shaft 694. This shaft extends vertically below the gear box as shown at 695 of Fig. 55, and which provides a mounting for a crank arm 696 of the drive linkage.

One of the adjustable screws which limits shuttle rotation is identified in Fig. 55 at 691. Both screws protrude into the shuttle hub chamber 668. These screws function to align chambers A and B of the shuttle at their respective conveyor delivery positions and are adjustable to serve this function. Additionally they center the bumper plate slots for chain flight clearance and form a part of the stiff-leg action of the drive linkage.

The gear box crank 696, a connecting link 685, a drive arm 697 and rack shaft 695 as shown in Fig. 87 comprise the drive linkage 684, which when driven by the power or hand drive mechanism indicated generally at 646 of Figs. 55 and 87 functions to turn the gear segment, the gear, and the shuttle into engagement with one of the stop screws 691 and also hold the shuttle motionless by latching the drive shaft after the linkage has been turned to a spring-loaded stiff-legged position. Thus the drive linkage becomes a shuttle holding latch.

The connecting link 685 is a pre-loaded spring column unit consisting of a cylindrical spring sleeve 698 in threaded relationship with an adjustment cap 699 and enclosing connecting rod 701, spring 702 and spring guide assemblage 703, all as shown in Fig. 87. In its assembled arrangement it presses a spring between the cap and a shoulder 704 on the connecting rod to preload the spring 702. This heavily spring compressed flexible link functions at the end of shutter rotation and can be cranked, linked, and drive arm rotated beyond its center and stop. In this position, the connecting rod shoulder moves into the spring sleeve 698 and slightly lifts the spring guide from the end of the sleeve. The link 685 thus becomes a heavy thrusting column acting toward the crank 696 and drive arm pin 705, and their respective stops and latches, to provide a shuttle holding stiff-legged device.

The stiff-legged action is obtained by rotating the drive arm past dead center in each direction of drive linkage action. The arm 697 is keyed at the bottom of the latch shaft 706, which shaft has limited rotation in vertical bearings not shown but mounted in the shuttle drive latch housing 730 of Fig. 88 and located at the side of shuttle housing as shown at 646 in Fig. 55. Stop lug 688 which is integral with element 689 is positioned in the way of adjustable stop screws 690 and limits the degree of shaft rotation.

Two circular discs 707 and 708 serve as drive latch cams and are mounted on the latch shaft 706 above the stop lug 689. Each has a notch 709 which is synchronized with one of the top lug limiting positions so that spring-loaded latch pawls 711 and 712 engage with it. These lug, latch, and pawl details anchor the latch shaft at the stiff-leg holding position of the drive linkage.

The latch shafts are released from their latched positions and the drive linkage kicks from its stiff-leg position when the latch pawls are withdrawn from their notches and the latch shaft is caused to rotate by action of the power or hand drive.

In addition to the latch shaft assembly hereinabove described the latch housing includes the shaft mounting at 713 and 714 for the two latch pawls 711 and 712, as well as electrical and mechanical arrangements for retracting them and for preventing their retraction.

Pawl arrangements are alike, and each includes a spring operated latching pawl 715 and a switch operating lever 716 therefor. Release or retraction is controlled by a solenoid 717 when the A-unit is in electric power drive, and by a manual lever 649 when under manual operation. This lever is secured at 713 above the housing on the top of the pawl retract shaft 719. When operated it rotates the retract cams 718 which are pinned on the shaft 719. These cams swing the pawl 711 and 712 away from the drive latch cams 707 and 708.

Automatic electric power retraction of the pawls is produced by separate pull type solenoids 721 and 722 of the powder hoist control circuit. Their plungers 723 and 724 are linked to the respective pawls so as not to cause the retract shaft or the pawl retract lever to move.

Cam latch interlock micro-switches as shown at 725 are operated by the latch pawl action. These switches are elements of the powder hoist control circuit and are mounted in a latch inter-lock switch box 730 at the front of the housing Fig. 88 and are positioned as shown in Fig. 87.

Manual pawl retraction is blocked by a lock lever 726 when the conveyor hoist chain is moving. This lock lever which is a hand driven mechanical interlock, is located above the latch pawl and is arranged to move into a notch 727 in the pawl retract shaft 719. It is spring-pivoted at 728 and is linked to solenoid 717. The spring releases the lock and the solenoid sets it. Two control switches, not shown, govern this action wherein, one, a relay contact, closes when the hoist is operating, and the other, a selector switch, closes when the shifting clutch 729 is positioned for hand drive.

A vertical shaft 731 serves as a drive shaft for either electric power drive or hand drive and is attached to the drive linkage by a sleeve coupling 732 on the upper end thereof. This shaft extends upwardly from the drive latch housing and extends into two enclosed units 733 and 734 mounted as shown in Fig. 88 above the drive latch housing assembly. These units as shown in Fig. 87 comprise the gear reducer assembly 733 and a hand drive unit 734 hereinafter described in detail.

The general arrangement of the gear reducer as mounted on the top of a shuttle drive latch housing is shown in Fig. 87. The electric power drive component elements as enclosed within the housing comprise an electric motor 740, shaft coupling 735, a pinion shaft 736, a pinion 737, a combination gear and slip clutch assembly 738, a worm 739 and a meshing worm wheel 741. This drive reduction assembly functions to turn the worm wheel 741 in a manner to provide 180° rotation of the shuttle.

The pinion shaft 736 is integral with the spur pinion 737 and its arrangement is such as to be in constant mesh with the clutch gear.

The clutch gear at 733 of Fig. 87 is a spur gear driven by the pinion 737 and shaft 736 and mounted with free bearing on a sleeve 742 on the worm shaft 743. It is driven through a spring-loaded clutch disc assembly 744 in a manner to permit motor drive slip at the end of each shuttle rotation when the drive linkage and the shuttle stop at the stiff-legged position. The gear is compressed between two banks of clutch discs located at 745 and which are assembled between a clutch end plate 746 and a thrust plate 747. The clutch end plate 746 is pinned to a flange at 748 on the worm shaft 743, while the thrust plate is mounted on shaft splines at the outer end thereof, and hence is the shaft driving element. This plate has its adjusted torque load produced by six coil springs 749 nested within a cover 751 and secured by an adjusting screw 752.

The worm 739 is integral with the shaft 743 while its meshing worm wheel 741, which is a straight type double thread worm is mounted with free bearing on the vertical shaft 731.

Motor drive engagement with the vertical shaft 731 is by a two position, sliding collar, positive jaw type clutch 729. This unit is mounted above the worm gear assembly on the splined vertical shaft and is arranged in a manner whereby it may be shifted manually from engagement with the worm shaft to similar engagement with a gear 753 of the hand drive crank 754. Its clutch jaws 755 are shaped so that it has only one engagement position with each gear.

The shifting device 756 is shown diagrammatically in Fig. 87. It has a pin coupling of its shifting fork 648 and fork arm 757 to a pivot block 758 of the clutch and freely slides the unit on the splined shaft 759. Its handle includes a spring detent arrangement which secures it in a selected setting corresponding to either automatic or hand operated positions by means of detent holes 760 provided in the hand drive housing of Fig. 88.

An adjustable clevis 761 on the other end of the shifting fork arm is attached to a connecting rod and shaft assembly 762. This device operates the four selector switches shown at 763. It is spring-loaded at the top of the latch drive housing to urge the shifting fork and the switches toward the power drive arrangement of the selecting device.

The switch actuating coupling from this linkage to the actuator shaft 764 is generally of a loose coupling type, and is arranged to retard the switch selecting action until the shifting clutch moves out of engagement with the coupling member from which it is being unclutched. This is an adjusted safety arrangement which prevents the drive from being engaged in hand position with the selector switches in power drive position.

When the actuator shaft of this selector mechanism is rotated to the hand drive position of the shifting fork, three switches at 763 of the scuttle control system are opened and two additional switches associated therewith are closed. The hand drive 734 consists of a hand crank 754, a hand drive bevel pinion 765, a bevel gear 753, and the shifting clutch and vertical shaft connection of the power drive.

This drive is such as to provide limited movement in each direction to provide engagement at one position and prevent engagement at a second position when the electric power drive and its controls are engaged. The hand crank 754 is a crank lever and folding handle device having a clamped mounting on the end of the pinion shaft 766. This mounting is adjustable in a manner to enable the handle to fold and stow when the drive is unclutched, Fig. 88 and in which position it is seated between two lugs on the hand drive housing. It is held in this position by a spring lock at 767 which is pivoted within the crank lever. This lock also functions to hold the device in its operating position.

The hand crank drives the bevel pinion 765 which is integral with the pinion shaft 766 and which is in mesh at all times with the bevel gear 753. This arrangement provides a speed reduction which turns the bevel gear between the stops provided by a lug 768 on the gear and mating stop lugs within the hand drive housing. The stops function to facilitate clutch engagement by limiting the movement within the same limits as the latch shaft, and to prevent excess torque in the vertical shaft and latch shaft when the drive linkage stops. This function is accomplished by providing only one position for clutch engagement, and, by synchronizing that position and the stop lug 768 on the gear with the limit position of the stop lug on the latch shaft.

As hereinbefore described the control units which function to control all scuttle operations comprise the control fork 648, the pawl retract lever 649, the shuttle electrical-mechanical control assembly, and, the switches and solenoids of the control circuit associated therewith. The fork functions as a clutch shifting and control selector device, while the pawl retract lever of cradle is manually operated and is used in hand drive to release the latch shaft from its latch position.

The powder conveyor 628 of each powder hoist assembly consists of a hoist tube 769, sprockets 629 and 771, a conveyor chain 773 running thereover and a gear reduction mechanism, in which the hoist tube is an assemblage of five flange sections bolted together to form a continuous tubular structure as hereinbefore stated as extending from the powder flat to the gun pit.

The lower sprocket housing section 637 as shown in Fig. 55 is the lowest element of the hoist. It is provided with a hoist loading aperture and the housing and mounting for the idler sprocket 629. The housing 637 consists of the two halves of the section mounted before the flame-tight powder shuttle as shown in Fig. 54. This section is flange mounted on the powder handling platform in flush relationship with the floor and disposed with the sprocket portion nested below the platform. It is disposed before the powder handling room traverse bulkheads, Fig. 1, and is flame sealed from the handling room by that bulkhead and the powder scuttle. It is this arrangement of the hoist and bulkhead structure which provides the expansion chambers for confining any fire which may occur in the powder hoist to that area of the closed expansion chambers disposed centrally of the powder platform.

The hoist structure above the lower sprocket housing section comprises a short straight hoist tube section 774 extending through the floor of the lower projectile flat to a long straight section 775 assembled thereabove. These sections are comprised of two flanged halves bolted together as shown at 776 in Fig. 42.

The curved tube section 777 connects the top of the long straight section and the upper sprocket housings, and provides the change in course of the hoist way from the vertical course of the lower section to the sloping course that leads to the cradle. It is identical to the straight sections in cross section.

The top element 778 of the conveyor is a housing for the upper sprocket 771 and serves as the mounting structure for the two large power drive mechanisms 779 and 781. The part of the powder cradle-to-hoist latch device 525, Fig. 82, and its mating unit 544 which engages the moving cradle are mounted on this structure. The open top end of the hoist is shaped to receive the lower end of the cradle in such a manner that the latter may be attached and secured as shown in a typical arrangement for both latch assemblies in Fig. 82. The units attached to the sprocket housing are the gear reducer 779, the B-end drive assembly 781, and the cradle latching block. The drive units are arranged as shown in Figs. 41 and 42 and are hereinafter described in detail.

The latching block device as previously described under the heading of latch devices is mounted on a machined pad at the top of the section and adjacent to the open upper end. It is in the way or path of travel of a moving bracket 538 on the cradle 262.

The mounting for the gear reducer is provided by a circular surface on one side of the closed sprocket mounting and concentric with the sprocket in precise alignment with the sprocket shaft 783 Fig. 42. The mounting for the B-end drive unit is provided on the same side of the housing by a large rectangular lug at 784 having machined pads thereon.

The two sprockets are alike as to size, each being adapted for a roller type chain. These sprockets differ, however, as to their method of mounting in their respective housings, wherein the lower sprocket 629 is an idler mounted assembly with an adjustable yoke 786 as shown in Fig. 55, and the upper sprocket is the chain drive device.

The lower sprocket is press fitted on a stub shaft 785, on either end of which are radial ball bearing assemblies mounted in the yoke 786. Each side of the yoke has a trunnion at 787 that is seated in a block not shown which slides in vertical ways at 788 of the housing. Movement of the two blocks is limited by the adjusting limits of a threaded adjusting shaft 789 located in the top of the yoke and adjustably secured in a bracket shaped clip 791. The arrangement thus permits chain slack to be eliminated as wear develops. It also provides for vertical adjustment of the lower sprocket.

The upper sprocket assembly of Fig. 99 is the unit through which the conveyor is driven. It is supported in the upper housing by radial ball bearings arranged on its hub 792 of Fig. 42. The arrangement is similar to that of the projectile hoist sprocket of Fig. 44. The center of the hub is splined internally for driving coupled engagement with the splined drive shaft which passes through the sprocket. The shaft is mounted in the hub 792 of a conventional worm wheel not shown of the gear reducer assembly 625 as illustrated in Fig. 41. This arrangement permits the shaft to be removed or installed from the sprocket or worm wheel side of the assemblage.

The powder hoist chain 773 of Fig. 84 is mounted on a sprocket in a manner to form an endless chain conveyor 628 of thirteen powder case carrying flights equally spaced thereon.

Details of the chain link are identical to those hereinabove described with respect to the projectile hoist chain, except that the links are shorter.

The conveyor component by which the upper sprocket is driven is the case enclosed worm and worm wheel mechanism at 625 of Figs. 41 and 99. This unit is mounted on the upper sprocket housing as previously set forth and is coupled by a hereinabove described shaft to the sprocket and to the B-end 781 of the power drive unit.

Each gear reducer 625 of Fig. 99 consists of a case 797, enclosing a worm and worm wheel not shown but of generally conventional arrangement and design. This mechanism is completely enclosed in a case which aligns and supports the worm gear and provides an oil bath reservoir for the gear assembly. It is a large two piece case consisting of a gear reducer housing 797 which encloses the gears and which is mounted on the upper sprocket housing, and an attached circular gear housing cover 806.

A special drive coupling 807 is mounted on the worm shaft not shown but similar to spline 808, as shown in Fig. 86, and a hand drive mechanism 809 is attached to the drive input 804 of the gear reducer.

These devices of the hand drive mechanism 809 and drive coupling, Fig. 86, are mounted on the worm shaft lower cover 811. The construction, function and the manner of mounting of these devices is the same as the corresponding parts of the projectile hoist hand drive mechanism and drive coupling. The description of these devices as shown in Fig. 86 is to be considered as applying to both the powder hoist and projectile hoist systems.

The flexible power drive coupling 807 is combined with a worm wheel element 812 of the manual drive device. It consists of two hub units 798 and 799, a centering ring 801, two stacks of coupling discs 802, one hub nut not shown but mounted on the upper spline shaft and twelve bolts 805. The gear unit 813, Fig. 86 is the adjustable element of the coupling. It comprises a small gear at 814 engaging the lower internal gear 816, a large gear at 815 engaging the upper inner part of the internal gear ring 816, a large retainer ring 817 and a small retainer ring not shown. The small stub spur gear 814 serves as the hub element, and is mounted on the B-end shaft at 808. The large spur gear at 815 is mounted with free bearing on a concentric internal journal not shown but of the small gear and is retained by the small retaining ring associated therewith. Both gears are engaged by annular gear teeth within the gear ring 816. The details of the gear are not shown as they form no essential part of the instant invention. The ring has parallel annular spur gears internally arranged to mate with both the small and large gears. This unit is removable to adjust the drive by unbolting the large retainer ring and rotating one shaft with respect to the other in increments of six minutes of arc, which is the equivalent in value of shifting one tooth in the gear ring mesh. The other parts of the coupling are not disturbed when making this adjustment.

Flexible connection of the two units is provided by the bolt coupling positions of the short and long bolts of Fig. 86. Long bolts 827 secure the two banks 829 of ten discs each to the center ring at two positions, 180° apart. Short bolts 828 secure the discs to the hub in a similar manner. The drive is thus transmitted to the flexible discs which function to compensate for any misalignment in the two shafts.

The hand drive crank mechanism 809 is an emergency manual drive for the conveyor which is provided for the purpose of unloading the hoist in the event of power failure. It is designed primarily for lowering the loaded chain. This mechanism is a retractable worm not shown but enclosed drive assembly which consists of a worm at 822, a hand crank 823, a worm housing 824, and the worm wheel 812 of the coupling. It is normally stowed with the worm out of mesh and secured for example by the detent pin 825. When released the worm housing swings to a worm-worm wheel engaged position that is secured by the detent pin. The hand crank 823 must be turned as the teeth mesh in order to provide this engagement. In order to operate the conveyor it is necessary to open the coupling by removing the large retainer ring 817 and to disengage the gear ring 816. The hand crank has a serrated clamp assembly on the worm and its handle is fitted with a retractable plunger 821 that engages the padded stop lug 826. This stop prevents the drive from overhauling and the handle from rotating if the operator releases it. This overhauling of a loaded conveyor will occur when the coupling is opened, dropping all projectiles in the bottom of the hoist. It is, therefore, imperative that the hand drive be fully engaged before opening the coupling, and it is for this purpose that the stop lug arrangement is provided in the hand drive assembly.

Hoist power drive assembly

The power drive for the previously described conveyors and cradles of the projectile and powder case hoist systems include electric-hydraulic installations located as shown in Figs. 41 to 44 inclusive and which are essentially the same for both the powder and projectile hoist handling systems. They comprise a power plant, a pair of operating or driving units, and an auxiliary assembly at 831 for transmitting and controlling the driving action and for holding the loaded conveyor against overhauling movement. The component hydraulic assemblies thereof are shown in Figs. 91 and 92 and identified as a power plant 832, an electric motor 833, a controller therefor 834, an A-end pump 633, a supercharger pump 835, an oil filter 836 in the line thereof, a supply tank 837, Fig. 43, and a drive pipe system as described hereinafter in greater detail. The conveyor operating unit consists of a B-end hydraulic motor 602 or 781, a valve plate and selector assembly 838, a brake 839 and clutch 841 associated therewith, a main valve block assembly 842 and timing mechanisms 843. The units for operation of the cradle comprise a cradle operating cylinder assembly 408 or 844 which is operatively connected to the cradle, and a cradle directional valve block 845 for controlling the direction of movement of the cradle.

A metering valve block 846 and a power-off control unit 847 comprise the elements of the hydraulic system and control auxiliaries.

The assembled arrangement of the electric motor, A-end hydraulic pump and a super-charger or auxiliary pump are shown in Figs. 90 and 91. Detailed description of this structure is hereinafter presented in a more complete manner in the description of the turret hydraulic systems.

Projectile flats

The projectile stowage of the turret is located in the upper and lower projectile flats 17 and 18 of Figs. 1, 4b, 5b, 8 and 9. The compartmental subdivisions and space arrangements are identical in both flats and comprise a circular bulkhead 22, Fig. 4b separating the flats into an outer ring shaped space and an inner circular compartment. An archway 41 is provided in the rear of the circular bulkhead to facilitate passage and handling of projectiles between the two compartments. The floor of the ring shaped compartment is subdivided into a large projectile stowage ring and a concentric space that encircles the bulkhead. At the rear near the archway is a small working area at 49, Fig. 13 for projectile handling when serving the hoist of the center gun.

The two stowage rings 49 and 51 of each flat are carriage assemblies, roller mounted as shown in Fig. 60 and located below the floor of the flat with the top platform thereof in flush relationship with the floor plates of the adjacent projectile handling platform.

The drive apparatus for the stowage ring is mounted below the floor level of each ring carriage and comprises a driven circular internal ring type rack 52 or 851 of the assembly 55 and which is in engagement with a power driven pinion 852 operated by an electrohydraulic, variable speed, reversible, semi-automatic power plant 853. The power drives of the two projectile flat rings are independent and each is arranged with manual control selection and starting control for clockwise or counterclockwise drive of the ring carriage and its load of projectiles.

The drive is arranged, when started, to move the carriage through a small arc and thereafter stop automatically to provide movement of an unloaded section out of the way and place stowed projectiles within reach of the parbuckling mechanism 849 of Figs. 13 and 61 to 65 serving that hoist.

While projectile transfer may be performed manually, it is preferable to use the parbuckling gear. This is especially desirable in rough weather. In either method of transfer, projectiles are removed from the stowage rings only when the rings are at rest.

The details of this parbuckling gear are illustrated to present a better understanding of the manner of handling the projectiles, but do not form a part of this invention. Details of this parbuckling gear are set forth in detail in the copending application of George L. Smith, Serial No. 177,748, filed August 4, 1950, and which matured into U. S. Patent No. 2,779,245 on January 29, 1957.

Projectile ring drive assembly

The four electric-hydraulic power drive assemblies which rotate the projectile rings of the turret are virtually identical installations; the control arrangements for which are shown in their installed arrangement in Fig. 60. Fig. 93 is a diagrammatic view of the projectile ring drive and the arrangement of the components thereof. The component arrangements as shown are for an outer ring drive and are similar for all four projectile ring assemblies. This drive generally consists of the following units which are indicated in Fig. 60 of the drawings.

In each projectile flat, the electric motor 854 and the A-end assemblies 855 for the inner and outer ring drives are mounted on the floor of the inner compartment. Each motor is direct coupled for output drive at both ends of its armature shaft 856. One end of this armature shaft is connected to the auxiliary pump 857 in a flanged mounted arrangement with the motor case while the other end is associated with the main pump 858, Fig. 93 which is enclosed within the A-end assembly 855. All four electric motor controllers 859 are above the inner projectile stowage ring of the lower bulkhead flat. They are mounted on the circular bulkhead and the controllers for the two lower flat installations are immediately to the right of the archway while the controller for the upper flat inner ring drive motor is at the far right of the upper compartment. The unit for the upper flat outer ring drive motor is located at the front of the flat.

The B-end assembly 861 for each ring drive is mounted under the projectile flat adjacent to the ring drive pinion mechanism. Its output shaft 862 is close coupled to a worm shaft 863 of this mechanism. Hydraulic drive pipes of Figs. 94 and 95 connects the valve pipe parts of the B-end unit 861 with the A-end pump. A response output shaft 864, Fig. 93, is coupled to this response gear 865.

The response gear and shaft assembly includes a beveled gear drive arrangement coupled at 867 between the B-end and an input shaft 866 of the A-end. One gear bracket, Fig. 94, of this mechanism is under the flat at 868, Fig. 60, and the other is in the inner compartment above it. Their shafts are joined by a sleeve coupling 869. Handwheels 871, Fig. 93, of the manual control mechanism 872 are located as shown in Fig. 60 at a position convenient to the projectile handling areas of the respective compartments. For the outer ring assemblies they are mounted on the circular bulkhead near the left projectile hoist and for the circular rings the handwheels are mounted on pedestals 877 near the center projectile hoist. The pinion drive 873 mechanism 55 is mounted on the output shaft of a housed mechanism hereinafter designated as the gear reducer 874 of assembly 55. This unit is bolted beneath the flat with the pinion positioned for correct engagement with the rack 52 or 851, and is coupled to the drive shaft 862 of the B-end assembly. As all four pinion drive units of the turret are alike, each is accessible from the projectile handling platform by removing a portable inspection plate 875, Fig. 94, associated therewith.

The gear reducer 874 illustrated in Fig. 93 is a heavy duty worm, wormwheel, and pinion 852 shaft drive assembly arranged with the pinion at the top and above an oil reservoir housing which encloses the worm and the driven wheel. The wormwheel and worm are of a nonoverhauling double thread design arrangement and provide a reduction ratio of 20 to 1. Both shafts are mounted in thrust-radial roller or ball bearing groups, that are fitted for correct alignment at assembly. The housing includes special details, not shown, for filling, draining, venting and gaging lubricants therein.

The worm shaft 863 of the gear reducer is direct coupled to the B shaft of the hydraulic power drive assembly by a self-aligning flexible coupling 876 of commercial design. This coupling is one of six special coupling devices included in this power drive.

The hydraulic system piping arrangement is described in detail under the heading of turret hydraulic assemblies.

*Ammunition stowage*

The ship and turret design arrangements of the instant invention are such as to permit alternative methods of routing powder and projectiles to their stowed positions in the handling flats. One method is similar to the conventional operation of earlier ships wherein it strikes each load increment unit from the main deck to the magazine level. This method is hereinafter described as the hatchway route method and is as shown in Fig. 67 of the drawings.

The other method is a much faster method and as shown in Figs. 68 and 69, utilizes the turret ammunition hoists, and temporary tray assemblies 896, 897, and 898, for loading the flat by the hoist route.

In ammunition stowage by the hatchway route both powder and projectiles are handled by the same whip hoist strike 882 when stowing to the lower turret levels. The ship and turret arrangements are such that the load increments are lowered through a hatch 881 and corresponding hatches at each deck level to a level adjacent that of the powder handling platform 19.

This arrangement consists of a hatchway strike 882 outside the turret from the main deck to the magazine level, a conveyor arrangement or trolley system 883 through the turret foundation bulkhead to the powder handling room, and a hatchway strike 884 in the turret from the powder handling room to the projectile flat.

The hoist for the main deck strike is suspended above the hatchway 881 either by a portable davit 885 of Fig. 68 or from the boom equipment 879 of Fig. 67 that is provided for handling the ship's paravanes. The hoist for lifting projectiles from the powder handling room floor to the projectile flat is located at the rear of the upper projectile flat. It is permanently mounted by a bracket under the pan floor structure, so that its hook is centered over the hatchway. This is an electric whip hoist with automatic limit switch and brake stop control, whereby the stop control may be set for automatic stop at either projectile flat as well as at the powder handling room hook loading position.

The conveyor for moving projectiles from the foot of the main deck strike into the powder handling room is an overhead trolley with rails mounted in a fixed structure and curving around the powder handling room to serve all scuttles and to carry projectiles beneath the turret hatchway and whip hoist.

Projectiles are handled by means of a projectile holding yoke 886 and base stirrup 887 with a wire rope sling and becket 888. When the projectile is delivered to the handling platform at the side of the hatch on the turret projectile flat this yoke carrier is removed and the projectiles are manhandled to stowage position on the respective rings.

As hereinabove stated the turret of this invention is suitably adapted for projectile and powder case stowage by the hoist and transfer route of Fig. 68 by virtue of the provision of a reversible elevator structure in the hoist assemblage and by usage of tray assemblies as shown 889, 891 and 896–898 in Fig. 69.

This novel storage is shown diagrammatically in Fig. 68 and comprises structure in addition to the conventional stowage provisions also incorporated herein and shown diagrammatically in Fig. 67. The specific details of the hoist and boom assemblies form no part of the instant invention as these units are of conventional design.

Portable ammunition trays 891, Fig. 69, portable davits 885, and whip hoists, Fig. 68, are mounted on the turret assembly as shown. The three access doors 9, Fig. 6, are opened and fitted with the three special accessories trays 889, 891 and 896 which are adapted to extend across the turret officer's booth 893, Fig. 40, and onto the slides 36, when the gun is positioned at 0° elevation.

The trays 898 and 897 are large portable plate structures supported on the top of the powder and projectile transfer trays respectively and at their ramming positions and trays 891 and 889 are supported by portable stands 894 and braces 895 respectively provided at the rear of the turret rear plate. The tray assembly on the gun slide 36 includes tray 896 and has two wing elements 897 and 898 extending to the right and left positions of the transfer trays respectively. These wing trays align with their respective hoist cradles at the upper latched position of each cradle on the slide. The arrangement is such as to permit manual sliding of the powder case and projectile increments in a continuous flow onto the gun slides, and to permit subsequent rolling of these increments to their respective wing trays.

When moving a projectile from the transfer tray to the hoist conveyor the projectile is manually transferred into the cradle. As this cannot be performed against the heavy spring load of the cradle springs 412 and 472 a manually operated ram retractor crank is provided as hereinbefore described in detail and shown for both cradles in Figs. 48 and 57, to operate the retractor shaft slide and lug 481, Fig. 57, elements associated therewith. The lug is normally held out of the ram path by the spring plunger element 482.

The ram retractor mechanism cannot retract the ram except in conjunction with conveyor action. If the cradle is empty, as is usually the case when the ram must be retracted, it is necessary to lower the cradle to the hoist conveyor, load it with a projectile by operating the conveyor one cycle upward, latch the ram in the compressed position by operating the hand crank ram retractor, reverse the hoist and lower the projectile from the cradle. The cradle may then be raised to the slide for manual transfer of projectiles from the transfer tray into the cradle.

The hand crank 475 operates a small worm and worm gear in the housing 476 to rotate the retractor shaft 477. Clockwise rotation raises the retract assembly 478 in slide 78 from its stop position against plunger 482. When it has moved beyond the travel of the spring plunger 482 the rat trap spring 480 turns the lug 481 into the ram path and beneath the cocked ram. The retraction operation is completed when the projectile is returned to the conveyor.

The operation of the powder cradle of Fig. 57 for case transfer from a transfer tray to the hoist conveyor is essentially the same as that of the projectile cradle Fig. 48 hereinabove described in detail.

The retaining pawl of both cradles may be manually retracted by operation of their respective cradle pawl retract devices. This action releases the load increment for lowering movement of the hoist conveyor.

The hoist mechanisms operate in reverse cycles at this time to transfer or route ammunition increments semi-automatically down the hoist. The cycles of operation are repeated as rapidly as attendants in the handling flats unload the respective hoists.

The arrangements of the projectile tray and of the projectile hoist mechanism will effect loading to each or both projectile flats as desired. Powder case loading is only to the powder handling flat 19 at the lowermost turret level. Transfer of powder cases is thereupon made to the ship's powder magazines externally adjacent the powder handling flat.

Gun elevating equipment

The gun elevating equipment installed for each of the three guns of the turret comprise independent elevating gear assemblies Figs. 74 and 97, which are identical as to their powering assemblies and controlling devices. They differ only as to the position and arrangement of the component parts of these assembled devices. The elevating gear assemblies control and operate the gun laying movements of the three gun slides. They are arranged as shown in Fig. 2 to depress and elevate the gun within 46° arcs. This arcuate movement is limited by stops 138 at 5° depression and buffer stop 188 at 41° elevation.

These elevating gear assemblies comprise an electric-hydraulic drive machine, employing a pinion-and-arc rack type of final drive. The control mechanism therefore is a selective type which permits automatic gun laying operations simultaneously for all three guns from a remote ship station or simultaneous automatic operation for all three guns from a single pointer's station, or separate control from three emergency handwheel stations. It is also a feature of the preferred control system therefore, to additionally include, control arrangements which permit remote automatic stop control to enable each gun captain to stop gun laying and bring a gun to its immediate unloading position and thereafter to return the gun operation to the selected method of remote or local control. The ability of the three guns to be controlled simultaneously or individually is of advantage in the event of malfunction of the operating gear system of one gun in that it does not prevent the operation of the elevating gears of the other two guns. The drive units for the elevating gear are of a high speed type which permit laying movement at better than 8° per second rate. Additionally, they are so designed that the accelerating capacity of the drive will enable the gun laying movement to obtain full speed from a position of rest in .2 second.

The systems for control of the elevating gear assemblies are shown diagrammatically in Figs. 71, 72 and 73, wherein Fig. 71 shows automatic control, Fig. 72 shows local control, and hand control for the gun is shown in Fig. 73.

The principal components, Fig. 74, of each elevating gear system 63 include a power drive assembly 899 comprising an electric motor 901, controller 902, tandem pumps indicated at 903, a B-end assembly 904, a speed reducer 905, auxiliary pumps 906, motors 907 and control devices as shown in the diagram of Fig. 97. Additionally the system includes firing cut-out mechanisms which are embodied in the operational control arrangement therefor. The elevating gear power drive as identified with respect to the other units of the assembly is shown in the schematic arrangement of Figs. 74 and 97 wherein the main electric motor is centrally located in the gun pocket to the right of the respective gun centerline. The tandem pump unit 903 consisting of a replenishing pump 908 and a lubricating pump 909, is flange mounted on the rear of the motor, with direct drive coupling to the rotor shaft.

The main power drive from the electric motor is through shafting 911 with gear-type coupling 912 to the variable displacement hydraulic pump 913 or A-end, which is located before the electric motor. The A-end assembly is connected by two large power pipes to the B-end 904, which is mounted before and above the A-end unit. The B-end drive shaft is coupled to the speed reducer 905 which is mounted between the gun girders. The speed reducer pinion 914 meshes with the elevating arc 915 of the gun slide.

Attached to the rear of the speed reducer worm housing is another housing which extends downwardly at an angle and contains the response drive gearing 916 which connects to the follow-up mechanism 917. This follow-up mechanism is mounted on top of the A-end case at 918 Fig. 97 and functions to control gun movement in response to gun order. Each of the three gun systems incorporate a separate and complete hydraulic power system hereinafter described in greater detail. All of these hydraulic systems function in like manner but differ in arrangement because of structural condition in the respective gun pockets.

Referring now in detail to the drive system of Fig. 97 the structural elements thereof are designated as a gun pointer's control panel 919, a pointer's handwheel assembly 921, a gun elevation order transmitter 922, a regulator checking control 923, a train angle input 924, an emergency handwheel control 925, an elevating arc 915, the hereinbefore mentioned B-end 904 with power pipes connected thereto and a speed reducer 905.

A danger zone cut-out mechanism is shown at 926, a response gear 927, response worm 928, worm wheel 929, a neutral interlock switch 931, a lever arm shown at 932, lever shaft 933 associated therewith, a main cylinder 934 having its piston at 935, an elevation response signal gear 936, a hand control clutch 937, a limit stop 938, control screw 939, follow-up gear 941 of the mechanism 917, control nut sleeve 942 and control nut 943 therefor.

The A-end assembly 913 includes a tilting box 944, stroking piston 945, tilting block stud 946, stroking piston cylinder 947 and a yoke 948.

The elevation indicator regulator is shown at 949, and as shown, is operatively connected to the A-end assembly. The main electric motor which is coupled to drive the A-end unit is shown at 901, the replenishing pump 908 and the lubricating pump 909 are shown as connected to the drive motor.

Details of the hydraulic system for the elevation gear assembly are hereinafter set forth with reference to the turret hydraulic piping arrangements and systems.

Training gear

The turret training gear as illustrated in Figs. 75 and 79 is arranged to rotate the turret within an arc of 300°, limited by positive stops 150° left and 150° right of turret 0° position.

It is a high speed power-drive arrangement comprising a rack and pinion assembly 951, a worm and wormwheel assembly 952, an electric hydraulic power-drive 59, and an arrangement of hand and servo-type controls therefor which in their installed arrangement are capable of training the turret at a rate of 5° per second.

The turret training gear drive is arranged to provide equal drive torque to each end of the worm 954 which drives the wormwheel 955 and training pinion 956. This balanced drive feature is accomplished by a twin hydraulic-drive worm and an arrangement of manifold drive pipes 957 and 958 from a single main pump line 959. In a preferred embodiment the turret has control selection for drive operation automatically, from remote station with servo control, or from local station with servo control, or from local station by hand control; which methods are generally designated as Auto, Local and Hand.

Servo power for stroking the power drive pump 961 is derived from a separate, constant speed auxiliary electric motor 962 Figs. 76 to 78 and a high pressure pump installation connected thereto.

The training gear assembly comprises as its major component the power drive assembly 59 which includes a main electric motor 963, a controller 964, Figs. 76 and 77, an A-end assembly 965, Fig. 75, which is a hydraulic pump, a B-end assembly 966 which functions as a hydraulic motor, and a reduction gear assembly 967. Also included in the drive system is the training worm 954, the wormwheel 955 and its pinions 956. Auxiliary electric motors and pump and turret control devices which are hereinafter referred to in greater detail, comprise the remainder of the training gear assembly.

The power drive electric motor 963, the reduction gear 967 and the A-end unit are mounted in alignment on a transverse girder in the inner projectile handling room of the projectile flat as shown in Fig. 75. The A-end assemblies are located above the pan plate at the front of the turret; the arrangement of these units appears also in the elevation views of Figs. 4 and 5.

Figs. 76, 77 and 78 illustrate the control arrangement for the training gear. Automatic control is as shown in Fig. 76, local control as in Fig. 77 and hand control as in Fig. 78.

The mechanical arrangement of the training gear is as shown in Fig. 75. It illustrates the arrangement of a preferred embodiment of the power drive components in a relationship with the driven worm gear, the response and hand control gears and the receiver-regulator 953 of the system. The details of the mechanical elements are not considered to be an essential part of this invention and they are therefore, illustrated and described only in a manner to show an operational relationship of the assembly whereby train drive is provided for the turret.

The main electric motor drives the A-end pump at constant speed in one direction through the reduction gear 967. Two large pipe manifolds 968 and 969 connect the valve-plate ports 971 of the A-end with the valve-plate ports assemblies 972 and 973 of both B-ends 966.

The B-end shafts are coupled direct to opposite ends of the training worm 954 of the assembly 952. A gear take-off drive 974 at the right B-end is connected to response inputs of the A-end follow-up control 975 and the receiver-regulator 953. An auxiliary response drive 977 from the training worm 954 to the regulator input provides a more direct response drive with less potential mechanical error. Angular variations between these two response inputs to the regulator are compensated for by a special coupling 978 of a spring wind-up type.

In addition to the two main-drive type manifolds connecting the A-end and the B-end the installation includes, filling, replenishing, circulating, draining and control pipe systems which inter-connect the enclosed cases of the A-end and the B-end with the expansion tank 979 of Fig. 96, a replenishing pump 981, filters 982, the auxiliary pumps at 976 and the regulator, as shown in the piping general arrangement of Fig. 96.

The A-end assembly incorporated in the training gear drive is a variable-stroke, multi-piston, positive-displacement pump to which are attached a main cylinder 983 and a control mechanism 984. The pump is a nine piston rotating group of conventional design and operates on the same principle as the A-end unit of the elevation gear system hereinabove described. The control mechanism is generally similar in arrangement to the follow-up, limit stop and hand input device of the elevation gear and differs principally therefrom in the type of differential unit of the follow-up control.

The A-end assembly is mounted in the turret at the left of the reduction gear as shown in Fig. 75 and its splined-gear type of coupling at 985 connects the reduction-gear output shaft 986 to the A-end main shaft 987. The A-end assembly replenishing pressure circulating and draining system pipe connection which provides a main drive, replenishing, and circulating pressures in the A-end when power is being transmitted thereto. The details of these latter systems are not shown as they form no part of the instant invention.

The two B-end units cooperate to turn the turret by driving the worm 954, worm wheel 955, and pinion elements of the assembly 957. This dual B-end drive provides a non-overhauling action for the worm and worm wheel assembly. The drive installation is adjustably fitted to a fixed position which provides a correct mesh of the pinion with a 360° training rack, that is keyed and bolted on the turret foundation at the lower roller path of the turret rotating structure as shown in Fig. 4. In this position, the worm, worm wheel and pinion assembly is securely seated in the structural blocks and plates at the front of the turret rotating structure. This mounting aligns the two ends of the worm with the two B-shafts and through flexible couplings 988 and 989 prevents drive torque misalignment of the worm in B-end shaft.

The bracket assembly 991 consists of a sectional case 992 enclosing a worm and worm wheel and supporting the driven pinion. It includes large heavy duty roller and ball type radial and thrust bearings for the worm wheel and pinion and the adjustable thrust bearing blocks for the worm. This case is an oil tight standard enclosure for the worm, the worm wheel and their bearings wherein the parts thereof are immersed in circulating lubricant provided by an electric motor 993 and gear type pump unit 994 of the training gear lubrication system.

The training-gear control arrangement of Figs. 76 to 78 for this training gear consists of starting-stopping controls, electric controls, hand wheel controls, starting and interlock devices, power drive transmission controls, hydraulic system controls, receiver-regulator controls, positive stop controls, hand facilities and brackets for gun installation. All are arranged to permit selective methods of turret train control. Selections are designated Hand, Local, and Auto. They permit training gear operation with variations as follows:

In the hand control selection, the training gear is controlled by mechanical movement from the A-end tilting box by the hand wheels 995 at the trainer station 996 as shown in Fig. 76.

Local control is servo control by the handwheels at the trainers station and is as shown in Fig. 77. Handwheel movement positions the valve in the receiver-regulator which control stroking of the main piston.

In Auto control, an electrical signal positions the valves in the receiver-regulator. This signal originates at a remote selector station, exterior to the turret, or at a radar operator station, within the turret.

The devices by means of which these control selections function and by means of which the training gear is started, stopped and limited in movement are shown in diagrammatic form, as the specific control devices are generally conventional and do not form a part of the instant invention.

*Turret hydraulic systems*

The operative details of the hydraulic system elements are not considered to be a part of the instant invention and are, therefore, presented in a manner to supplement the showing of the drawings and not in a manner to explain the specific function of each element. Similar legends are used throughout, and the same for similar systems insofar as the elements are similar.

*Slide, housing and rammer system*

The slide housing rammer hydraulic piping system of Fig. 98 shows the general piping arrangement in its relationship with the gun slide and ammunition handling assemblies for the gun. The installed arrangement is shown for one gun in Fig. 40. Further details of such a system are described and claimed in the copending application of David Wertman, Serial No. 502,536, filed April 19, 1955, which matured into U. S. Patent No. 2,834,256 on May 13, 1958. The hydraulic system operating units of Fig. 98 are referred to by a separate system of identifying reference characters from that previously used, in order to facilitate reading of the drawings pertaining to this hydraulic system. The elements of this hydraulic system drawing which have been previously referred to by numerical reference characters will be referred to herein by that same reference designation and the same appear on Fig. 40, but only the herein applied separate designation appears in drawing Fig. 98 in view of clarity and space limitations.

In Fig. 98 the system elements are referred to by the prefix P for pipe system units of the accumulator and pump constant pressure system, the prefix PT for alternating pressure and return line pipes, by prefix T for supply tank return pipe system, and by prefix A for air system units. The prefix D is used for drain lines to the expansion tank.

In this figure the pump for the assembly which is shown at P is driven by the electric motor EM and has its output arranged to pass through pipe P–31 to the dual oil filter DOF. It is connected by pipes T–31 and T–32 to receive fluid from the storage tank ST. Cutoff of flow from tank ST to the pump P is controlled by valve V–C.

Additionally the main elements of this system include an expansion tank ET, connected by means of line D–33 with the storage tank ST, an accumulator 347 shown as A, and a pump valve control block 997, shown as PVB.

The dual oil filter DOF has its outlet side in communication through pipe P–32 to a left lower manifold 998, LLM on the gun slide. The left lower manifold is connected to provide discharge through a plurality of paths. The principal path includes a swing joint pipe assembly 999SWJ connected to left upper manifold 818 LUM, a pipe connection P–33 between the left upper manifold and the pump valve block PVB, and a connection through pipe P–1 to the accumulator A which controls the pressure available for the operation of all of the hydraulic units of the system.

The powder transfer tray operating cylinder 998, POTC is shown in Fig. 3, and the projectile transfer tray operating cylinder 999 PRTC is shown in Fig. 2. Other principal units include the transfer tray control valve V–TC, a sequence valve V–C, a powder cradle pawl tripping cylinder PTC at 1001 and a powder cradle tripping cylinder controlled valve 1002, V–PTC. A projectile cradle pawl tripping cylinder PCC is shown at 492 while the projectile cradle pawl tripping cylinder controlled valve V–PCC is shown at 1003. Other elements included as main units are the sliding joint 1004 of Fig. 25 SLJ, the swing joints 1005 of Fig. 26 SWJ, a breech operating valve block BVB, a breech operating cylinder 125 of Fig. 16 BOC, a breech closing valve operated cylinder BCC, and the extractor cylinders 184 EC of Fig. 15. The rammer drive unit 344 is indicated generally at RDU and the empty case drive unit 364 at ECB. The projectile buffer 328 is shown at PB, the powder cradle latching cylinder 534 at POLC and the projectile cradle latching cylinder at PRLC. The manifold units of the system include the left upper manifold 1006 LUM, the left lower manifold 1007 LLM, the right upper manifold 818 RUM, and the right lower manifold 998 RLM.

The pipe system of the pump and accumulator constant pressure system includes the main delivery line P–1 which runs from the pump control valve block to the accumulator 347. Line P–2 is a line running from the accumulator to a flange joint for lines P–3 and P–5. The rammer drive unit is connected to this joint by line P–3 to flange. Line P–4 connects the empty case drive unit line to a flange in line P–1. The connection of the transfer tray control valve unit is by line P–5 which runs to flange connection with P–2.

The line P–6 connects the projectile cradle pawl tripping cylinder control valve line to a flange of line P–7 and P–34. The powder cradle pawl tripping cylinder control valve line P–7 also runs to this same flange. The line connecting the sliding joint to a flange of P–1 is designated as P–8. Line P–9 connects the breech operating valve block line to the gun housing and to lines P–10 and P–11. P–10 connects the gun housing to the left extractor cylinder 184 while the line P–11 connects the gun housing to the right extractor cylinder. Line P–31 connects the pump to the dual oil filter DOF. Line P–32 is the line from the dual oil filter to the left lower manifold LLM. Line P–33 runs from the left upper manifold LUM to the pump control valve block. Line P–34 is a connection between flanges of P–6 and P–7 and flanges of P–1 and P–8.

The alternating pressure and return line pipes include a pipe PT–1 which runs from the pump control valve block to the accumulator line, and line PT–2 connecting the pump control valve block to the accumulator line. Line PT–3 of this system is a line connecting the breech operating valve block to the gun housing and to lines PT–4 and PT–19. Line PT–4 runs from the gun housing to the left extractor cylinder while line PT–5 also runs from the gun housing to the left extractor cylinder. The breech operating valve block line PT–6 is connected to the breech housing and to lines PT–5 and PT–20. Line PT–7 connects the transfer tray control valve line to flanges of PT–15, and PT–17. Line PT–8 connects the sequence valve to the transfer tray control valve. Lines PT–9 and PT–10 connect the sequence valve line to flanges of PT–32 and PT–33, and flanges of PT–16 and PT–18 respectively.

The projectile cradle pawl tripping cylinder control valve line PT–11 runs to the tripping cylinder. Line PT–12 also connects the projectile cradle pawl tripping cylinder control valve line to the tripping cylinder. The powder cradle pawl tripping cylinder control valve line PT–13 runs to the tripping cylinder and as does line PT–14. Line PT–15 is a line from the powder transfer tray operating cylinder to the flanges of PT–7 and PT–17. Line PT–16 connects the powder transfer tray operating cylinder to the hereinabove recited flange of lines PT–10 and PT–18. Line PT–17 connects the projectile transfer tray operating cylinder to the flanges of PT–7 and 15 as above stated. Line PT–18 connects this operating cylinder to the flanges of PT–10 and PT–16. PT–19 is a line running from the gun housing to the right extractor cylinder while the line PT–20 is an additional line running to the right extractor cylinder. PT–21 connects the breech operating valve block to the lower cylinder head of the breech operating cylinder. Line PT–22 connects the breech operating valve block line to the upper cylinder head of the breech operating cylinder.

The rammer drive unit line PT-23 is connected to the breech closing valve operating cylinder. Line PT-24 is a line running to the sequence valve from the projectile buffer. Line PT-31 is an additional line from the sequence valve to the projectile buffer and is an extension of line PT-8. The line PT-32 connects the projectile cradle latching cylinder to a flange of PT-9 and PT-33. Line PT-33 connects the powder cradle latching cylinder to this same flange.

The supply tank return pipe system elements are indicated by the prefix T and include the line T-1 which is a line from the pump control valve block to flanges of T-39, T-42, and T-43. The line T-2 runs from the empty case drive unit to a flange joint of T-37, T-38, and T-40. The line from the sliding joints to flanges of T-38 and T-42 is shown at T-3. Line T-4 is a transfer tray control valve line and runs to flanges of T-5 and T-37. The line T-5 connects the rammer drive unit with this same flange. Powder cradle pawl tripping cylinder control valve connections to the flange of T-7 and T-43 are by the line T-6. Similarly the line T-7 is connected between the projectile cradle pawl tripping cylinder control valve and these same flanges.

The line T-31 is a connection between the storage tank ST and the cut-off valve V-C. The line T-32 runs from this cut-off valve line to the pump P. Line T-33 connects the dual oil filter to the flanges of T-34 and T-35. T-34 is a line from the storage tank to this same flange. Line T-35 is a line from this flange to the lower manifold LLM. The pump control valve block line T-36 is connected to the left upper manifold LUM. Line T-37 connects the lines T-4 and T-5 to the flanges of T-2, T-38 and T-40 as hereinabove stated. This flange is connected by line T-38 to the flanges of T-3, T-42. Line T-39 is line connecting the projectile cradle latching cylinder to the hereinabove recited flange of T-1, T-42 and T-43. The line connecting the powder cradle latching cylinder to flanges of T-2, T-37 and T-38 is the line T-40. Line T-41 is a line from the projectile buffer to the empty case drive unit. Line T-42 connects the above flange of T-1, to the flange of T-3 and line T-33 connects this flange with the flange of T-33 and T-35 as above stated.

The drain lines running to the expansion tank include the line D-1 from the rammer drive unit to the flange of lines D-10 and D-12, the line D-2, which is connected from the empty case drive unit line to flanges of lines D-5, D-11, D-36 and D-37, and line D-3 which connects the accumulator with the flange connections of D-17 and D-37. Additionally, the line D-4 is a line from the sliding joints to the flanges of D-9, D-13, D-34 and D-35 while the line D-5 is a line from the sequence valve to the above recited flanges of lines D-2 and D-37. A transfer tray control valve is connected by line D-6 to the above recited flange connection of D-3 and D-17. The projectile cradle pawl tripping cylinder is connected to the cylinder control valve through lines D-7 and D-8 by means of flange connections with D-31, D-34 and D-36. A powder cradle pawl tripping cylinder control valve line D-9 is connected with the flange connection of D-4, D-13, D-34 and D-35. The powder cradle pawl tripping cylinder is also connected by means of the line D-10 with the flange into which D-1 is connected. Line D-11 of this system connects the projectile transfer tray operating cylinder with the flanges of D-2, D-5, D-36 and D-37 hereinabove referred to with reference to line D-2. Line D-12 is a line connecting a powder transfer tray operating cylinder to the flange of D-1 etc. Line D-13 connects between the breech closing valve operating cylinder and the flange of D-4. Line D-31 runs from the flange of D-7, and D-8 to the right upper manifold RUM, while the line D-32 is a line from the right lower manifold RLM to the expansion tank. Line D-33 is a line from the expansion tank to the storage tank. Additional lines include line D-34 which connects the flange of D-4 to flange of D-7, and line D-35 which connects the flange of D-1 to the flange D-4. Line D-36 connects the flange of D-5 to the flange of D-7 and line D-37 connects the flange of D-3 to the flange of D-2.

The air system associated with the accumulator and hydraulic assemblies for the slide includes line A-1-A which runs from the accumulator to the air flask 1008, line A-1-B which similarly connects the accumulator with the air flask and a line A-2 which runs from the accumulator line to air gage A-8. Line A-3 in this system is a line from the gas ejector air supply line to the air cut-off valve A-6 also shown in Fig. 26. Line A-4 is a gas ejector supply line which runs to the air strainer A-7. The line connecting the gas ejector supply line to the right lower manifold RLM is the line A-5. The gas ejector air supply cut-off valve is shown at A-6 and the above-mentioned gas ejector air strainer is shown at A-7. The accumulator air pressure gage as above-mentioned is shown at A-8 of this drawing.

*Projectile ring drive hydraulic system*

The inner ring drive piping arrangement is shown in Fig. 94 and the hydraulic piping arrangement for the outer drive ring is shown in Fig. 95. Insofar as similar designations apply in both ring drive assemblies the same reference characters will be applied thereto. The main drive pipe PR-1 connects the A-end drive 858 to the B-end drive 861. The line PR-2 connects the A-end drive to the B-end main drive pipe in a manner similar to that of line PR-1. Line PR-3 is a line connecting the main system replenishing system with the B-end assembly, and is a by-pass line as is line PR-4. Line PR-5a is an auxiliary pump to filter line and line PR-5b is a filter to control valve block line. Line PR-6 is a section line from the tank to the auxiliary pump 857. Line PR-7 is a drain line connection from the B-end response case to the A-end storage tank. The line connecting the control valve block to the control shaft holding brake is shown at PR-8a while the line connecting this control valve block to the B-end brake cylinder is designated at PR-8b. The lines connecting the control valve block to the B-end response case is the line PR-9 and a second line PR-10 connects this control valve block line to a line box of the A-end assembly.

*Projectile hoist hydraulic system*

The projectile hoist hydraulic piping system of Fig. 91 includes a line L-1 which runs from the cradle directional valve block to adapter block 24. The line L-2 runs from the cradle directional valve block to adapter block 18. Line L-3 runs from the A-end to the B-end housing of 602. Line L-4 connects the A-end 832 to the B-end main valve block. Line L-6 runs from the expansion tank to the A-end. The line L-7 is connected from the A-end to the B-end valve plate. Line L-8 is connected from the cradle directional valve block to the cradle operating cylinder. Line L-9 runs from the expansion tank to the auxiliary pump line.

Line L-10 extends from the A-end to the adapter block 26. Line L-11 is connected between the cradle-to-hoist latch and the upper adapter block 32. Line L-12 is a line from the B-end main valve block to adapter block 26. Line L-13 is connected from the filter to the A-end stroking cylinder. Line L-14 is connected from the filter to the auxiliary pump. Line L-15 is connected from the A-end to the metering valve block. Line L-16 runs from the cradle-to-hoist latch to the upper adapter block 25. Line L-17 runs from the B-end timing gear housing to the lower adapter block 29. Line L-18 is a drain line which runs to the purifier.

Line L-20 connects the A-end to the line L-21 and to the drain line. Line L-21 is a line from the A-end to the drain line as is line L-22. Line L-23 connects the lower adapter block 25 to lower shut-off valve and to L-21. Line L-24 is a line connecting the cradle operating cylinder to the immediate adapter block 29. Line L-25 connects the cradle directional valve block to upper adapter block 32. Line L-26 connects the cradle directional valve block to upper adapter block 29. Line L-27 connects the B-end main valve block to the lower adapter block 32. Line L-28 connects the cradle directional valve block to the adapter block 26. Line L-29 is connected between the B-end main valve block and the cradle directional valve block. Line L-30 connects the brake to the B-end valve plate and selector mechanism. Line L-31 connects the B-end valve plate to the timing gear housing. Line L-32 is connected between the B-end valve plate and the timing gear housing. Line L-33 connects with line L-10 and runs to line L-38 and to the drain line. Line L-34 connects the B-end main valve block to the metering valve block. Line L-35 connects the B-end main valve block to the metering valve block. Line L-36 is a line connecting the cradle-to-hoist latch with the lower adapter block 32. Line L-37 is connected between the metering valve block and the lower adapter block 29. Line L-38 connects the B-end timing gear housing to the drain line. Line L-39 is an adapter block to 18 to lower adapter block 29 connection.

Line L-40 connects the cradle directional valve block to the cradle operating cylinder. Line L-44 is a connection between the power-off control valve and the upper adapter block 29. Line L-45 is a line connecting the B-end main valve block to the power-off control valve. Line L-46 connects the power-off control valve to the adapter block 26. Line L-47 is a replenishing line from the purifier. Line 48 is an additional replenishing line from the purifier and runs to connect with line L-6.

*Powder hoist hydraulic system*

The powder hoist hydraulic piping general arrangement is shown in Fig. 92 and is similar to the arrangement of the projectile hoist of Fig. 91. The same designation applies thereto with the exception that in the powder hoist hydraulic system the line L-20 is connected between the A-end and the line L-38. The line L-21 also is connected between the A-end and the line L-38 while the line L-22 is connected from the A-end to the line L-33. The line L-23 is connected between the lower adapter block 25 and the line L-38.

Additionally the line L-33 is connected between the adapter block 43 and line L-18. In the case of line L-38 the connection is between the B-end timing gear housing and the line L-18. With the exception of these differences and the arrangement resulting from the position of the respective hoist assembly in the gun turret wherein they are arranged at opposite sides of the slide, the assemblies are similar. It will be obvious from reference to the drawing Figs. 91 and 92 that the two hydraulic systems are arranged for use on opposite sides of the gun slide.

*Elevator gear hydraulic system*

The elevation hydraulic pipe system for the turret elevation control is shown in Fig. 97 wherein a letter and number system of reference characters is used to point out the several elements of the system. In the pipe system of the drawing the line A-1 is a line from the A-end to the B-end and serves as a main power pipe. A-2 also connects the A-end to the B-end. A-4 is a connection from the A-end to the cutoff valve, and A-5 is also a line running from the A-end to a cutoff valve. A-6 is a connection from the cutoff valve to the A-end drain plug T, while A-7 is from the cutoff valve to the A-end drain plug. D indicates the location of the indicator-regulator connection to the sump pump and oscillator. D-1 is an expansion tank drain. D-2 is a lubrication supply tank drain. E is an indicator-regulator connection to the expansion tank. HP-4 is a connection to the high-pressure pump compensator, and HPC is a connection from the regulator to the T. HPC-1 connects the T to the main block cylinder relief-valve block. HPC-3 runs from the main cylinder relief-valve block to HPC-4 T. HPC-4 runs from HPC-3 T to a hand control clutch release-valve block. HPC-5 connects HCP-4 T to the main cylinder. HPP conects the HPP-2 T to the above recited T. HPP-2 is a connection from the high-pressure pump to the HPP T. HPP-3 is a connection from HPP T to the power failure valve. IHP is a connection from the indicator-regulator to the main cylinder relief-valve block. HPC-5 connects HPC-4 T to the main cylinder block to the main cylinder. Line L-1 is a connection from the lubricating oil filter to the speed reducer relief valve. Line L-2 connects the speed reducer assembly to the lubricating oil supply tank while L-3 connects the speed reducer relief valve to the speed reducer center bearing assembly. L-4 is a connection from the speed reducer relief valve to the worm shaft bearing assembly. LF is a lubrication pump to lubrication oil filter connection. LX is a lubrication oil supply tank connection to a lubrication pump. OSC is a connection between the sump pump and oscillator and runs to the indicator-regulator. PF is a low-pressure pump connection to the control duplex filter. PF-2 is a control duplex filter connection running to the high-pressure pump. The main cylinder to indicator-regulator connection is PR while PX is a connection from the indicator-regulator to PX-12 T. PXF is a control duplex filter connection to PX-10 T. PXR is a connection from PX-8 T to the A-end case. PX-1 is a connection from PX to PX-21 T while PX-2 is a connection from this PX-21 T to PX-15. PX-3 is a shutoff and by-pass valve connection running to the expansion tank. PX-4 is a connection between the replenishing pump and PX-17 T. PX-5 is a connection from the expansion tank to the shutoff valve. PX-6 is a follow-up control to T connection. PX-7 connects the B-end to this T. PX-8 is a filler connection to PXR T. PX-9 is a connection between the replenishing relief-valve block and PX-8 T. PX-10 is a connection from the PX-20 T to the PXF T. PX-11 is a connection from the T to the power-failure valve and PX-12 is a connection from the T to the PX T. PX-13 is a connection to the B-end drain. PX-14 is a connection between PX-15 T and the PX-16 T. PX-15 is a T to shutoff and by-pass connection. PX-16 is a low-pressure pump connection to the PX-4 T. PX-17 is a connection between the shutoff valve and the T PX-4. PX-20 is a high-pressure pump connection to PX-10 T. PX-21 is a connection from the main cylinder relief valve to PX-1 T. PX-23 is a connection to the A-end drain. R-1 is a connection from the replenishing pump to the replenishing filter and R-2 is a connection from this replenishing filter to R-3 T. R-3 is a connection from this R-2 T to the active system replenishing valve block and the connection from R-3 T to the replenishing relief-valve block is by means of connection R-4. S is a sump pump and oscillator connection to the expansion tank.

*Training gear hydraulic piping system*

The training gear hydraulic piping system is shown in its general arrangement in Fig. 96 of the drawing wherein the pipe system designations are by letter and numeral reference characters as in the case of the other hydraulic systems of the turret hereinbefore described. In this pipe system the pipe A-1 is a connection from the active system line and runs from the A-end to the B-end motors. A-2 similarly is an active system line or drive pipe running from the A-end to the B-end motors. Connection A-4 is a drain line from the active system pipe A-1. A-5 is a drain line from the active system pipe A-2. D is a line from the receiver-regulator to the sump pump and oscillator. HP-4 is a high-pressure line from the high pressure pump to the compensator, and HPC is a control high-pressure line running from the receiver-regulator to a three way flange connection as shown. HPC-1 is connected from this control high-pressure line and the three way flange connection and runs to the main cylinder relief valve block. HPC-3 also connects with this control high-pressure line and runs from the main cylinder relief valve block to the main cylinder. HPC-4 is a control high pressure line from the three way flange connection to the A-end control case. HPP of this system is a high-pressure supply line from the receiver-regulator to the three way flange connection, while HPP-2 is a high-pressure supply line from the high-pressure pump to the three way flange connection. HPP-3 is a high-pressure supply line from the three way flange connection to the power failure valve. IHP is a connection from the intermediate-high-pressure line and runs from the receiver-regulator to main cylinder relief valve block. IHP-1 is an intermediate-high-pressure line from the main cylinder relief valve block to the main cylinder. The designation OSC is used for the oscillator line and is a connection from the receiver-regulator to the sump pump and oscillator.

Line PF is a low-pressure line from the low pressure pump to the control duplex filter while line PF-2 is a low-pressure line from this control duplex filter to the high-pressure pump. PR is a hydraulic response pressure line connection from the receiver-regulator to the main cylinder. The exhaust pressure line PX from the receiver-regulator runs to a three way flange connection. PX-1 is an exhaust pressure line between the two three way flange connection and PX-2 is similarly an exhaust pressure line connection between the two three-way flange connections. PX-3 is an exhaust pressure line from the cutoff valve to the expansion tank. PX-4 is similarly an exhaust pressure line and connects the three way flange connection with the replenishing pump. PX-5 is an exhaust pressure line from the expansion tank to the cutoff valve. PX-6 is an exhaust pressure line from the left B-end to the four way flange connection. PX-7 is also an exhaust pressure line connection from the four way flange and runs to the cutoff valve. PX-8 is an exhaust pressure line from the filler connection to the A-end and PX-9 is an exhaust pressure line from the right B-end to the four way flange connection. PX-10 is of the exhaust pressure line system and connects the three way flange to the four way flange connection. PX-11 is an exhaust pressure line from the power failure valve to the three way flange connection. PX-12 is a line from the A-end to the drain valve. PX-13 is an exhaust pressure line between the two three way flange connections. PX-14 is an exhaust pressure line between the two three way flange connections as is PX-13. PX-15 is an exhaust pressure line of the system and runs from the cutoff valve to the three way flange connection. PX-16 is an exhaust pressure line from the three way flange connection to a low-pressure pump. PX-17 is an exhaust pressure line from the left B-end to the drain valve. PX-18 is a connection from the right B-end to the drain valve and is a line of the exhaust pressure line system. PX-19 is a line of this exhaust pressure line system and runs from a three way flange connection to the A-end. PX-20 of the exhaust pressure line system runs from the high-pressure pump to the three way flange connection while PX-21 runs from the main cylinder relief valve block to the three way flange connection. PX-22 is an exhaust pressure line between two three way flange connections. PX-23 is an exhaust pressure line from the A-end to the three way flange connection. PXF is a low pressure line from the duplex filter to the three way flange connection.

R-1 is a replenishing pressure line and runs from the replenishing pump to the replenishing filter while R-2 is a replenishing line connection from the replenishing filter to a three way flange connection. Line R-3 is a replenishing pressure line of the system and runs from the three way flange connection to the active system replenishing valve block. R-4 of this replenishing pressure line system is a connection from the three way flange to the power-failure valve. R-5 of this system for replenishing pressure is a connection from the power-failure valve to the A-end centering detent.

The mode of operation of the hydraulic systems is not an essential part of the instant invention and therefore is set forth in diagrammatic form only in a manner to illustrate the connecting system of an operative turret training control drive.

*Electric control system*

The gun turret control equipment for the power operating units hereinbefore described include switches, solenoids and wired circuit installations and control panel equipment therefor which are essentially the same for each of the guns of the turret and differ only as to right and left hand positions of a few of the parts. The general arrangement of the electrical control system in the turret is shown for one gun in Fig. 17 and represents a typical example of the extent of this installation. The equipment in the circuit arrangement shown in this figure includes elements for the control of the projectile and powder hoist circuits, gun control circuit elements, and a powder hoist circuit.

The slide power equipment control system comprises the following sub-assemblies and their circuit elements embodied in a circuit which includes a gun captain's control panel GCP, a connection box designated in the circuit diagrams as CB-1, a second connection box designated in the circuit diagrams as CB-2. The three circuits comprise elements as hereinafter set forth. For purposes of clairity letter designations are given to all elements of the control circuits. Some of these elements have hereinbefore been set forth with numerical reference characters applied thereto. Cross-referencing therebetween is provided in order to more clearly show the relationship of the switch elements of the control circuit with the actuating elements of the mechanical systems of the turret. The powder-tray interlock 288 indicated in the gun control system diagram as AC, the projectile tray interlock 286 as AD, the empty-case tray interlock switch 293 as AE, the rammer interlock switch 291 as AG, the powder tray interlock switch 294 as AH, the projectile tray interlock switch 295 as AJ, the rammer limit switch 292 as AK, the empty-case drive interlock switch as AN, the empty-case tray interlock switch as AO, the gun interlock switch as AQ and the powder tray interlock switch 296 as AS. Additionally the system includes breechblock interlock switch AF-1, breechblock interlock switch AF-2 and breechblock interlock switch AF-3.

The solenoid units of the gun control circuit include a transfer tray solenoid SAA, transfer tray solenoid SAB, a rammer control solenoid SAC, a circuit rammer control solenoid SAD, a breech control solenoid SAE, an empty case drive control solenoid SAF, a projectile cradle pawl control solenoid SAG and a powder cradle control solenoid SAH.

The powder cradle circuit includes a powder cradle latch interlock switch 504 not shown in the circuit diagram but on Fig. 30, powder cradle pawl interlock switch 509 of Fig. 58 and a powder tray interlock switch 289 as CL.

The control circuit for the projectile cradle system includes a projectile cradle latch interlock switch indicated as 1009, the projectile cradle pawl interlock switch shown as 1011 and projectile tray interlock switch 287 as BL. In the installed arrangement of this electrical equipment in the turret the gun captain's panel is located in the turret officer's booth immediately in the rear of the gun in the upper rear portion of the gun house. The system is connected to receive electric current supply at two alternating current voltages. One at 440 volts for power motor supply the second at 115 volts for control circuit supply. These power supplies are derived from the power motor controllers for both hoist drives as well as a slide motor controller, all three of which controllers are arranged with 115 volt transformers T for separate control supply.

Control circuit cable extends from the gun captain's panel to three connection boxes of the circuit for gun control, powder hoist and projectile hoists, respectively. These connection boxes are identified as CB–1 and CB–2. Wires of the gun circuit run to all connection boxes but most of the wires of the gun circuit go to the box CB–2, which is secured on the roof girder, then run through flexible loops of cables through the power tube component PT to the connection box CB–1. This box is attached under the gun slide and provides terminal connections to wires secured to the slide which complete the connections to the 16 switches and the 8 solenoids mounted on the gun slide. The electrical control installation provides switching controls for starting and stopping the power motors, for supplying the control circuits, for controlling the actions of all slide power equipment, for controlling fuze settings and for stopping gun laying and gun firing.

The electrical circuit control arrangement is such as to provide visual indication to the gun captain's panel of the principal ammunition service and gun loading operations. This is provided by an indicating light system as shown in schematic view of Fig. 70 wherein the light system is connected in parallel with the respective solenoids. Each of the solenoids is controlled by the interlock and limit switches of the system and all switches are operated by movement of related mechanisms of the slide, rammer and breech. The arrangement provides that all switches in a given circuit are closed only when all mechanical conditions are proper for the execution of the action controlled by the particular solenoid. The controls thus cause the sequential motion of the hoist cradles, lifting to and latching to the slide, tripping of the cradle pawls, movement of the transfer trays to ramming position, unlatching and lowering of the cradles, the rammer chain action, the actions connected with empty-case ejection, rammer retraction, breech closing, and movement of the transfer trays to their firing position. Breech opening and empty-case extraction are mechanically and hydraulically controlled, but are followed automatically by repetition of the above circuit-control action. The specific details of the gun control electrical circuit are not considered to form essential part of the instant invention but are referred to only with sufficient detail to make clear that the operation of the guns of the turret are automatic and that they operate in predetermined control sequential cycle.

Certain additional elements are included in the drawings of the gun control circuit and are indicated in the legends associated therewith for purposes of clarity and understanding the drawing but which devices are not herein discussed in detail as they are believed to be obvious and additionally are not believed to be subject matter of the specific invention for the hereinabove stated reason.

Parbuckling steady arm mechanism

The steady arm mechanism of Figs. 59, 65 and 66 is an auxiliary parbuckling gear device located adjacent to each gypsy head 1015 and projectile hoist loading opening as shown in Figs. 61 to 64. It is a semiautomatic mechanical arrangement manually controlled and power actuated from the gypsy head by the snubbing rope 1016. It is used in projectile transfer to grab projectiles, hold them securely while they are in transit, and eject them into the projectile hoist.

The device as illustrated in Fig. 66 consists of a deck-mounted base 1017 in which is pivoted an upper arm 1018 and a forearm assembly 1019. A handle bar 1021 is mounted in the hinge 1022 between the two arms and a tong 1023 and tong operating mechanism 1024 are located in the end of the forearm. A lug 1025 on the bottom of the forearm and a sheave 1026 in the base provide for attachment of a snubbing rope 1016.

When the tong is thrust around a projectile and the rope is snubbed on a gypsy head, the tong closes and the arm holds against stops 1027 as it rotates toward the hoist. Projectile and tongs are thus thrust to a stop position at the hoist and are held by the rope.

Additionally the assembly includes the steadying lever 1029 associated with the ejecting lever handle 1028 of the ejecting lever 1031, and a guide rail 1032 for guiding the projectile in its path of movement to the hoist.

The details of the forearm tong are shown in Fig. 66 and additionally include the connecting link 1033, a latch shaft 1034, a pivot pin 1035, a link 1036, a lower latch 1037, a compression spring 1038, an extension spring 1039 and a spring support 1041. The upper latch 1042 is attached to the upper end of the latch shaft 1034.

The detailed operational relationship of the elements of the forearm tong form no essential part of the instant invention and are therefore set forth only in a manner to make clear the associated operation of the parbuckling gear with the projectile flat structure and the hoist shutter structure.

Operation

The operation of the hereinabove described gun turret mount assemblage will best be understood by a first presentation of the mode and order of functioning with the intention of including broadly a picturization of the cycle of operation from an initially empty condition, which includes an empty gun breech, empty transfer trays, empty cradles and hoists as well as an empty case disposal chute and tube, through the sequence required in loading, firing and ejecting of one round of ammunition therein and the subsequent disposal of the ejected empty powder case. Secondary presentations thereinafter set forth the more detailed interactional cooperability of each element of the system with the system as a whole with particular emphasis on the coordination of movements of interrelated elements and assemblies whereby the device will be completely automatic in operation. Additional detailed description directed to the several control systems of the instant invention are thereafter presented, as an elaboration on the preceding description regarding the mechanical system of a preferred embodiment of the instant invention. The thereinabove recited interactional relationship of the several gun mount elements and assemblies is herein presented in a manner defining the functional association and mutual cooperativeness of these elements thereof with the structure initiating and producing the sequential functioning of the several control systems, whereby the operation of the herein presented embodiment of the invention may be fully understood. Whereas in the following description several operations may be performed concurrently, it will of course be necessary to describe them in sequence.

In the initial loading of a projectile increment and a powder case increment into the gun, the hoists therefor are loaded from storage and handling flats located below the gun mount, the powder case is loaded into the powder hoist from the lowermost handling platform, and the projectile is loaded from either of the two projectile flats as desired. Subsequent loading of the projectile hoist may be limited to either the upper or the lower flat, or may selectively take place from both flats, as the case may be.

The loading of powder cases into the powder case hoist is accomplished in the powder handling flat by means of a plurality of two wheeled trucks 879 which are adapted to be received into the powder case scuttle assemblies 878 at the outer bulkhead wall of the flat for the reception of a powder increment for manual transfer to the hoist.

The bulkhead shuttles are constructed and arranged with a pair of powder case receiving chambers, each of which alternately receives a powder case from the external powder magazine and discharges the received case from an opposite position 180° therefrom and interiorly of the handling flat.

The bulkhead wall scuttle receives the case on its powder magazine side in one of its pair of holding assemblies which, upon manually controlled 180° oscillatory semi-circular rotation thereof about its turntable pivotal axis to a position in the interior of the flat, positions the case for reception by the handling truck. The truck operator now manually removes the truck with its received powder case and moves it across the floor of the flat to a powder case receiving position at the hoist scuttle. In a similar manner, the scuttle assembly of the hoist is provided with a case receiving shuttle adapted to partially receive the truck therein for convenient case reception.

The projectiles are stored prior to usage in the two projectile flats of the turret and hoist loading therefrom for service to the gun may take place from either level. Alternatively one or all of the hoists may be loaded from both levels at substantially the same time. The hoist control system operation for loading from both levels is such that lower flight loading is made only to alternate hoist elevator chain flights. Upper flat loading is made to the initially vacant hoist flight and subsequently to the flight left vacant by the loaders of the lower flat personnel crew. The projectile loaded at the lower flight is permitted to pass through the upper flat loading station to advance the vacant flight therebelow to its projectile receiving position at the upper flat shutters.

The loading of projectiles from their stowed positions on the projectile ring to the projectile hoists is accomplished by a steady arm parbuckling assembly as shown in Figs. 61 to 64. The arm is adapted to swing into a projectile receiving position at the stowage ring whereupon its projectile gripping mechanism engages and removes a projectile from this projectile stowage ring and transfers it to a discharge position at the hoist. The construction and arrangement of elements of the steady arm assembly is such as to permit its movement in a predetermined orbit from the projectile ring to the hoists receiving chamber. Actuation of the parbuckling assembly and gear associated therewith is accomplished by means of a cable attached thereto and operated by a motor driven gypsyhead.

The respective hoists are then placed in operating condition to advance the projectile and powder cases into their respective cradles at the upper end of the hoists. Upon insertion of the projectile and powder cases into their respective cradles, a heavy coil spring ejection mechanism therein is compressed or cocked and rendered operable, and spring loaded pawls pivot into position at the lower end of each cradle to engage and retain each ammunition unit against movement. Thereafter the cradles are caused to swing, each about its respective pivotal axis from a receiving position of Figs. 99 and 101 to a position parallel to the axis of the gun slide and in alignment with the tubular transfer tray on the gun slide as shown for the projectile cradle in Fig. 102. In this action each cradle is hydraulically buffed on the slide, and spring loaded latches on the slide engage the cradles and hold them in their discharge positions in alignment with the transfer trays.

Upon movement into alignment with the transfer trays, interlock switches on the trays and cradles complete an electrical circuit which causes hydraulic power retraction of the spring loaded retaining pawls of the cradle to release or trigger the ejecting mechanism on the cradle assembly. The heavily compressed ejector springs force the projectile and powder cases into their respective transfer trays to a position against the buffer stops thereof, as shown in Figs. 103 and 104 for projectile handling.

As the projectile travels rearwardly through its transfer tray it exerts a camming action on a spring loaded projectile holding latch which pivots sufficiently to allow the engaged projectile to pass thereunder. The hydraulic buffers, mounted on the slide rearwardly of the transfer trays, act as stops to arrest the motion of the projectile and powder cases. Buffer actions are alike for both the powder case and the projectile. However the powder case buffer plunger is spring returned, whereas the projectile buffer is connected to the hydraulic power system and its plunger returns under power thus positioning the projectile precisely within the tray in a manner to prevent interference during the subsequent movement of the control circuit synchronized transfer tray.

This ammunition transfer operation is interlocked with breech opening action. When the cradles latch to the slide, the powder case retaining pawl is tripped immediately and the powder case moves rearwardly into the powder case transfer tray. The projectile retaining pawl, however, is not tripped until the breech has opened. This delayed delivery of the projectile is for the purpose of reducing the "dead time" in fuze setting. This arrangement also facilitates operations in the event of misfire. It enables the automatic gun loading action to be stopped before projectile tripping. This may be accomplished without having a projectile in the transfer tray when a misfired case is to be extracted, and replaced by the subsequent ramming of an additional powder case.

As the ammunition units are delivered to their respective trays, the cradle retaining latches are automatically actuated to release the empty cradles, which now swing downwardly initially by gravity and followed by hydraulic powered drive to receive the next round of ammunition from their respective hoist conveyors. Simultaneously therewith the delivered ammunition units actuate the switch mechanism of their respective trays. When these switches are so actuated and when the interlocking positions of other elements of the gun control system permit, the two transfer trays are rotated hydraulically through their arc of travel from a position of Fig. 105 to a position in alignment with the gun liner bore as shown in Fig. 106. Upon such movement the trays operate cam and stop devices at ramming position to position the ammunition units or increments for ramming.

As the projectile transfer tray leaves its projectile receiving position on the slide for movement to ramming position, the pivotally mounted spring loaded, projectile retaining cam located on the extreme rear edge of the tray breaks contact with a camming pin on the slide and pivots by spring action to partially obstruct the rear end of the tray. This retaining device limits rearward sliding movement of the projectile to prevent it from slipping out the rear of the tray prior to contact engagement of the tray with the front end of the powder case tray or the stop device of that tray. Meanwhile, the spring actuated projectile holding latch presses against the projectile at its rotating band to prevent any forward movement of the projectile in the tray.

In the travel of the powder case transfer tray from receiving to discharging or ramming position, the projectile stop on the forward end of the tray moves to a position between the projectile and powder case. This stop is caused to move to this position when the trip lever contacts a stationary tripping lever on the slide. As the powder case therein bears against its rear guide and deflector plate during transfer tray movement it is cammed forward in the tray to properly position it for subsequent ramming.

As the transfer trays move to approach ramming position the projectile retaining cam at the rear of the projectile transfer tray contacts a camming surface on the powder case transfer tray and is cammed out of the way. The projectile holding latch rides over a stationary camming block and is lifted from engagement with the projectile as the tray comes to rest at ramming position.

The stops on the transfer trays ensure alignment of the trays in ramming position. If the gun is elevated, the projectile stop on the front end of the powder case transfer tray keeps the projectile from falling back against the powder case.

Both transfer trays being now in alignment, the transfer tray stops actuated by the positioning of the trays in the slide function to place the hydraulic ram chain drive means of Figs. 35 and 36 in operation. Thereupon the powder case and projectile are simultaneously rammed through both trays to position the load in firing position within the gun as shown in Fig. 36.

The above mentioned loading assemblies are now retracted as the breechblock elevating means moves the breechblock into its closed firing position. The operation of the breechblock mechanism is such as will upon its upward path of travel render the firing pin active for firing actuation and will also cause closing of a bolt therein to maintain a locking relationship of the block with the gun slide assembly during the subsequent period of firing.

The functional arrangement for the normal operation of the breech mechanism is such as to provide automatic action following an initial breech hand unlocking which is a manual operation required for the first round.

When the breech is opened for loading, the top of the block is aligned with ammunition tray elements of the slide and housing and with the ramming chain course. When the ammunition has been rammed, the powder case retaining pawl in the breechblock immediately engages the case to prevent it from sliding out of the gun chamber. The ramming chain is now automatically withdrawn, the transfer trays moved to their respective firing position and the breechblock caused to rise between its slanting guides with a slightly forward movement to a position which wedges the cartridge case in the gun chamber. At the top limit of the block's upward movement, the sliding locking bolt moves forward into engagement with its receiving recess in the block enclosure to lock the breech. This bolt also functions to move the firing mechanism to the firing position.

The firing of the gun is thereupon controlled by fire control system actuating means, and upon actuation thereof, either by remote or local control means, as the case may be, gun discharge takes place.

The gun is fired by passing an electrical current through the firing pin. Thereupon the housing assembly recoils within the slide on the lubriated guide rails, and the gun recoils within the lubricated slide liner of Fig. 99. As the slide recoils, the counterrecoil plunger is pushed to the rear and the recoil piston is pulled to the rear as indicated in Fig. 103. In this action liquid in back of the recoil piston is throttled through the parts in the piston at a variable rate due to the varying diameter of the throttling rods. This action breaks the gun movement, stops the gun within a predetermined travel stroke, and fills the forward part of the cylinder and the buffer bore of the cylinder head with fluid as shown in detail in Fig. 16. Simultaneous with recoil mechanism action, movement of the counterrecoil plunger increases the initial air pressure in the counterrecoil cylinder. Maintenance of this pressure by special plunger packing arrangements and differential system action is illustrated diagrammatically in Fig. 109.

At the end of recoil the movement is reversed and the gun is returned to battery by air pressure in the counterrecoil mechanism. This movement is rapid and consequently must be checked. This checking takes place in the last portion of countermovement by action of the buffer on the forward end of the recoil piston rod. This buffer recoil piston rod arrangement displaces liquid from the bore in the recoil cylinder head as shown in Fig. 107. This displacement occurs through the four grooves of varying depth and through the small clearance between the buffer and the entrance bushing. This action retards the countermovement and brings the gun to a gentle stop as it reaches battery position. The return flow of liquid through the recoil piston parts, during the countermovement, imposes some braking effect, but the major retarding action is performed by the buffer.

Gun operation thus consists of a series of breech mechanism, gun, and gas ejector actions which are power operated in normal gun operation, and adapted for manual operation at initial loading. After initial loading, gun breech actions are operated by recoil, counterrecoil and automatically controlled hydraulically powered units. The system is adapted to function at any position of the gun slide in elevation or depression during gun laying movement. Likewise the manual operations may be effectively carried out at any angle of elevation, but only when the gun slide is at rest. Gun unloading may be performed manually at unloading position which is 9 degrees gun elevation.

The hydraulic and inertia powered actions of the gun are breech bolt unlocking action, breechblock lowering action, empty case extraction and breechblock raising action.

After gun firing occurs, the gun and housing recoil rearwardly and on counter recoil actuates a cam in the slide to cause release of the breech bolt and permit dropping of the block in its ways. As the breech is unlocked, the firing pin mechanism is withdrawn, power system valves are positioned to port hydraulic fluid to the breechblock operating cylinder to initiate lowering of the block and also to control subsequent breech mechanism actions as the block is dropped. Additionally, extractor control valves become actuated at a point of breechblock travel near the completion of downward movement thereof to initiate extractor action for freeing the gun chamber of the empty powder case. The extractor fingers are moved momentarily to throw the case rearwardly out of the housing into an empty case tray of Fig. 100 in alignment therewith, after which the extractors return to normal gun loading position. The downward delivery of the empty case from the empty case tray into the case ejection mechanism for expulsion from the turret is accomplished during the cycle of service of the succeeding round.

Breech closing is achieved by the same cylinder unit that functioned to lower the block. This closing action is controlled in automatic fire by hydraulic interlock devices that prevent closing movement until ammunition has been rammed into the gun and the ramming mechanism and ammunition transfer trays of the slide have been retracted to gun firing position, however the breech starts its closing action as soon as the rammer has retracted to a position clear of the breech block. This is shown in the time cycle diagram of Fig. 50.

Gas ejection is accomplished by applying air under pressure from some suitable source such, for example, as ship's supply to the interior of the gun breech for exhaust of burned gases at the muzzle. This air which is introduced at the breech after firing, functions to clear the gun and the interior of the turret house of powder smoke gases.

The functional arrangements for service maintenance of the gun and for unloading it without firing are provided by suitable auxiliary manual devices for unlocking the breech, lowering the block, extracting empty or loaded cartridge cases therefrom and for raising the block. These hereinbefore described provisions are in addition to the automatically controlled and operated devices for normal operation and firing of the gun.

The synchronized mechanical actions of the slide in normal operation thus are those which deliver ammunition from the hoists to the slide, transfer ammunition on the slide to ram position, ram the ammunition, retract the rammer, retract the transfer trays, control gun recoil, return the gun to battery and receive and eject the empty powder case.

Control of these operations is achieved by means of the electric gun control system, Fig. 17 and by self contained recoil brake and counterrecoil mechanisms.

The recoil brake and the counterrecoil mechanism may be of conventional design and their respective mode of operation is presented herein only with sufficient detail as is required to clearly set forth the operation of the elements of structure of the gun assembly which are associated therewith. The arrangement of these recoil and counterrecoil assemblies however differs from the conventional in that the recoil mechanism is arranged above the gun tube and forms an integral assembly therewith rather than an attached bottle assembly as previously used. The location of the counterrecoil assembly below the breechblock structure similarly is a departure from the conventional.

Reference is made to Figs. 107 and 108, which show the operating positions of the recoil and counterrecoil mechanisms at battery and in recoil. Fig. 108 shows diagrammatically the functioning of the recoil brake of the recoil mechanism during recoil, while Fig. 107, shows the buffing action of the recoil mechanism in return to battery under action of the operation of the counterrecoil mechanism as shown diagrammatically in Fig. 109. The operation of these prior art assemblies is believed to be self-explanatory in view of the clear showing of the drawings.

The ejection of the empty powder case from the gun by the action of the extractor fingers is with considerable force, hence for this portion of the cycle of operation the requirement for the powder case longitudinal guide and deflector is that of serving to prevent the case from being thrown or tipped from the slide or from the empty powder case tray during such ejection. These elements function to direct the empty case rearwardly toward the empty case buffer at the rear of the slide.

As the empty case passes onto the empty case tray, the two case latches on the rear edge of the tray pivot against spring action to permit the case rim to pass over the tray rear edge. Both latches then snap back into their normal positions to engage the rim after buffing action to prevent forward movement of the case in the tray. The hydraulic type empty case buffer mounted on the rammer receives the impact of the empty case and brings it to rest in the empty powder case tray. In this position the case actuates a switch operating lever on the rear of the tray. This lever closes an interlock switch which completes a circuit capable of initiating hydraulic system actuation for the shifting of the transfer trays from firing position to their respective discharge positions.

The powder case transfer tray being mechanically coupled to the empty case transfer tray, is thereby moved from its case receiving position to its discharge and ramming position while the empty case tray moving in advance thereto is guided in its path of movement downwardly around the counterrecoil cylinder to its position in the case ejector compartment. Any protrudence of the empty case over the rear of the tray is overcome by the camming action of the tapered recess on the rear inside of the slide, and by a camming block located on the slide rear plate.

As the empty case tray moves along its track to the bottom of the case ejector compartment, two latches are operated to release the rim of the case. The upper latch is released by the camming block on the rear plate, and the lower latch by the latch release in the floor of the compartment. In its rest position in the ejector compartment the empty case is free to be moved by the case ejector.

The case ejector drive unit for the chain flight type ejector is caused to advance the case ejector one flight upon depression, by the empty case, of a switch closing pawl located in the compartment rear section. This switch closing activates the drive unit supply circuit from the time of switch contact making, until switch closing by release of the pawl at case ejection.

As the chain revolves on its sprockets, one of the two flights or pawls on the chain engages the rear of the powder case and forces it forward into the intermediate chute section of the empty case tube. A spring loaded pawl on the bottom of the bore in the intermediate chute section keeps the case from sliding back after the flight on the chain ends its contact with the powder case.

Each time an empty case is forced into the tube, the cases already in the tube are pushed forward the length of one case. The tube of the described inventive embodiment is adapted to hold as its capacity five tubes. The forwardmost case in the tube presses against the spring loaded tube cover, opens the cover, and drops to the ship deck therebelow.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. In a loading system for a trunnion mounted major calibre shipboard gun turret, the combination with the gun and slide thereof of a pair of handling systems for projectiles and powder cases respectively and disposed on opposite sides of said gun, each of said handling systems including a hoist, a cradle pivotally mounted on the gun trunnion mounting assembly for movement in a vertical plane from a position at the hoist to a position adjacent the gun whereby swingable movement of said cradle will move a load increment from its hoist to a transfer position at the gun and whereby said transfer is unaffected by the position of the gun in elevation, and a pair of transfer tray devices each pivotally mounted on respective sides of said slide for moving each of said load increments from said transfer positions externally of said slide concurrently in pairs to an aligned ramming position rearwardly of and in axial alignment with the gun bore.

2. In combination with a major calibre gun, slide and housing assembly, a loading means comprising a pair of generally cylindrical transfer trays for sequentially transferring respectively a powder case increment and a projectile increment from positions parallel to and externally adjacent the gun on opposite sides thereof to a mutually aligned position in alignment with the bore of the gun wherein the bores of the transfer trays are in alignment, guide means in each of said trays disposed to provide a linear path through said trays at the aligned position thereof for facilitating simultaneous ramming therethrough, said transfer trays being pivotally mounted on the slide at opposite sides thereof in an arrangement in which the powder case transfer tray is mounted immediately rearward of the position of the projectile transfer tray whereby they may be moved arcuately about their respective pivotal axes to ramming position, and power drive means for each of said transfer trays operative to sequentially move the transfer trays from their respective load receiving positions to their mutually aligned ramming positions.

3. In a loading system for a major calibre gun of a type for use of semi-fixed pre-packed powder case ammunition, a pair of hoist units for receiving a powder case increment and a projectile increment respectively therein and to convey the same upwardly from a lower position of pendantly mounted rest, and a pair of cradle elements respectively disposed on opposite sides of the gun for swinging movement to receive a load increment from the powder case hoist and the projectile hoist respectively and movable in arcuate paths to transfer the load increment to a position adjacent the gun at any position of gun elevation.

4. In combination with a gun and slide assembly, a pair of transfer trays disposed at opposite sides of said gun respectively, each of said trays being adapted to receive a round increment of ammunition comprising two separate elements, means by which each of said trays are swingable from a lower receiving position to an upper delivery position in axial alignment with the gun, and means for swinging said trays alternately from a receiving position to a discharged position whereby a round can be delivered to said gun each time the trays are in delivery position.

5. The structure set forth in claim 4 further including an empty case tray swingable with one of said transfer trays from a receiving position in axial alignment with the gun barrel to a discharged position, and means for swinging said tray to and from its receiving and discharged position as each ammunition round is transferred by the transfer trays from their respective receiving position to their respective mutually aligned discharging position in a manner whereby the movement of said empty case tray is in time relationship with the movement of said loading trays.

6. A loading system for handling semi-fixed ammunition load increments for a major caliber gun of the character described comprising a gun, a gun slide, a gun housing within which the gun is mounted and which is mounted in the gun slide for sliding movement with respect thereto, a powder transfer tray pivotally mounted on one side of said gun slide, a projectile transfer tray mounted longitudinally in advance of said powder tray and on the opposite side of said gun slide, each of said trays being disposed for arcuate movement from a position exteriorly parallel to the axis of said gun to a mutually aligned position in alignment with the bore of the gun such that both a powder case increment and a projectile increment of an ammunition load as carried by the respective ones of said transfer trays may be rammed from this mutually aligned position to move the ammunition load increments into the gun, rammer means operatively connected to said gun slide, guide means in each of said transfer trays for providing guided reception and movement of the rammer through the trays for simultaneous ramming of the load increments in the respective transfer trays to a firing position in the gun, and means actuated contemporaneously with movement of the said transfer trays to the mutually aligned ramming position thereof for initiating ramming stroke movement of the rammer means.

7. A generally cylindrical projectile transfer tray assembly for a major calibre gun slide assembly comprising a clamping pawl pivotally mounted on the forward end of said projectile transfer tray for maintaining a projectile received in said transfer tray against forward movement, holding means comprising a pivotally mounted spring actuated cam located at the rear portion of said tray and disposed to function as a holding means on said tray for preventing rearward movement of the projectile under elevated conditions of the gun slide in its movement in elevation, a spring disposed between said projectile transfer tray and said cam and disposed to permit retractional movement of said cam with respect to said projectile.

8. A generally cylindrical projectile transfer tray for usage on the slide of a major calibre turret gun, comprising a linkage means pivotally mounted thereon, a clevis portion on the linkage means for pivotal mounting on the slide of said gun, connecting link means integral with said cylindrical tray for reception of linkage means of a power drive assembly, a pawl at a rearward portion of said tray disposed to retain a projectile against forward movement therein, said pawl having a projection thereon for engagement with a pawl at a rearward portion of said tray for retaining a projectile against forward movement therein, said pawl having a projection thereon for engagement with a pawl retracting element of the gun slide for disengagement of the pawl from the projectile.

9. In a gun loading apparatus, a gun slide, a hydraulic power drive system for said slide, a projectile transfer tray disposed for movement on said gun slide, a powder transfer tray, means for hingedly mounting the said trays on the gun slide, linkage lever means thereon disposed for driving connection with said power drive system of the slide, an interlock operating pawl on the rearward end of said powder transfer tray, and a projectile retaining pawl means hingedly mounted on the forward end of said powder case tray and disposed to restrict rearward movement of a projectile contained in said projectile transfer tray during movement, said projectile retaining pawl means being movable out of the path of travel of the powder case upon ramming action imparted thereto.

10. The structure of claim 9 wherein the projectile transfer tray and the powder transfer tray thereof are further characterized by the inclusion of a longitudinal rammer guide groove in the inner bores thereof and disposed to guide a rammer chain therethrough in linear ramming movement.

11. In combination with an automatic gun apparatus, a gun slide, a pair of ammunition transfer trays disposed on mutually opposite sides of said slide for pivotal movement with respect thereto to receive a powder case charge and a projectile, means for securing the trays to the gun slide for pivotal movement from a mutually spaced ammunition receiving position to a discharge position in axial alignment with the bore of said gun, and means for simultaneously moving the trays to said discharge position whereby an ammunition round of a semi-fixed character can be delivered to the gun each time the trays are in said discharge position.

12. In combination with a gun and trunnion mounted slide assembly, a projectile cradle swingable about the gun trunnion for receiving a projectile increment of an ammunition round, a powder case cradle swingable about the opposite end of the gun trunnion for receiving the powder increment of an ammunition round, each of said cradles being swingable from lower ammunition increment receiving position to an upper discharge position, a projectile transfer tray swingable from an ammunition increment receiving position in aligned adjacency to the upper position of said projectile cradle, and a powder case transfer tray movably mounted on the opposite side of said slide for receiving a powder case from the powder cradle at the upper limit of powder cradle movement, power drive means connected to each of said trays to move the trays to a mutually aligned position whereby the separate load increments are disposed at a ramming position in axial alignment with the gun.

13. In combination with a gun and slide assembly, a powder case transfer tray swingable from a receiving position at one side of the gun to a discharged position in axial alignment with the gun barrel, said tray being open at both ends for longitudinal ramming therethrough when moved into a discharged position in alignment with the gun, a rammer disposed rearwardly of said tray and having means thereon for guided reception in said tray, means in said tray for providing linear movement of said rammer forwardly through said tray into the gun barrel, a projectile transfer tray swingable from a receiving position at the opposite side of the gun from said powder case transfer tray and disposed to position a projectile immediately in advance of the powder case tray at the ramming position thereof whereby the powder case and projectile will be rammed simultaneously through both trays to the gun breech, and means in said projectile transfer tray for guiding the rammer during ramming movement therethrough.

14. In a shipboard gun turret of a character utilizing semi-fixed ammunition, a gun mount assembly comprising a gun, gun slide, and mounting means for said gun slide, said mounting means comprising a rigid supporting frame mounted on said turret and a horizontally disposed trunnion means for providing arcuate movement of said gun slide in elevation, a gun housing disposed for sliding movement in said gun slide, a breechblock housing in said gun housing, a breechblock transversly slidable in said breechblock housing, means on said gun housing and engageable with said gun slide for initiating operation of said breechblock to open and close said gun breech, an ammunition loading means for said gun comprising a generally tubular projectile transfer tray, a generally tubular powder case tray, means for mounting each of said aforenamed trays on said slide for independent pivotal movement about mutually parallel axes for movement to a ramming position in mutual alignment with the gun breech, and transversely therefrom to respective positions in mutually spaced relation on the outside of said gun slide, means for providing arcuate movement of each of said trays about its respective pivotal axis, and a pair of pendantly disposed transfer cradle assemblies each pivotally mounted in spaced parallel relation on opposite sides of the gun trunnion means for arcuate rotation about mutually opposite sides of the gun and for movement from a pendant increment receiving position therefor to an angularly elevated increment ejecting position in alignment with the load receiving position of the respective transfer tray therefor.

15. In a shipboard gun turret adapted for usage of prepacked powder case type semi-fixed ammunition, the combination of a gun, a gun mount including a trunnion mounted gun slide assembly and an automatically controlled and operated gun loading means, a transversely operable sliding breechblock incorporated in said slide assembly, said automatically controlled loading means comprising, ramming means, a projecticle transfer tray and a powder case transfer tray each of generally cylindrical form and mounted for pivotal connection with the gun slide to swing in an arc from an ammunition receiving position exteriorly of the slide to a ramming position in alignment with the gun bore, ramming guide means in each of said transfer trays for receiving said ramming means and providing a guided ramming path therethrough whereby said ramming means rams through both trays to the gun breech only when trays are in axial alignment in the slide, and a control system operatively connected to the trays, ramming means, and breechblock for interlocked operation thereof, and means for effecting automatic cyclic operation of said gun loading means.

16. Apparatus of the character of claim 15 in combination an empty case disposal means comprising an empty case receiving tray, transfer drive means for the empty case tray, said drive means including means connected to said powder transfer tray for movement therewith, an ejection tube extending forwardly from the disposal means, and power drive means connected to move an empty case from the empty case receiving tray through the ejection tube.

17. A turret comprising an ammunition handling and gun loading system for shipboard major caliber guns of a type for usage of semi-fixed ammunition, said turret being movable in train and the gun thereof being movable in elevation, said gun loading system comprising a rotatable turret enclosing assembly having different ammunition stowage flat levels, comprising a powder handling flat at the lowermost level, and a plurality of superimposed projectile storage flats and a gun pit and housing structure thereover, a powder hoist extending from the powder flat upwardly to the gun pit, a projectile hoist extending from the lowermost projecticle flat upwardly to the gun pit, said projecticle hoist being also in operative communication with the uppermost projectile flat, a powder case cradle and a projectile cradle, each of said cradles being normally in communication with the uppermost end of their respective hoists, the hoist and cradle assemblies being positioned on opposite sides of the gun in the gun pit, the cradles being pendantly supported by the turret structure and pivotally mounted for arcuate rotation in a vertical plane about the axis of rotation of the gun in elevation, a powder case transfer tray and a projectile transfer tray each mounted for movement from a receiving position in alignment with its respective cradle at the uppermost limit of cradle travel to a discharge position rearward of and in alignment with the bore of the gun, ramming means including a chain type rammer, and a rammer receiving guide means provided in both trays for facilitating simultaneous ammunition ramming therethrough to the gun breech only when these trays are in axial alignment with the gun bore.

18. The structure of claim 17 further characterized by the inclusion in combination of a control system operatively connected to the trays, rammer and breech of the gun for effecting automatic cyclic operation thereof.

19. The combination of a gun according to claim 17 including in the loading and handling means thereof an empty case disposal means, said disposal means comprising an empty case receiving tray connected to said powder case transfer tray for movement therewith to receive an empty case ejected from the gun breech, transfer drive means for the empty case tray connected to move an empty case from the empty case receiving position thereof into a discharge position thereof, an ejection tube extending forwardly from the disposal means, and power drive means having an empty case engaging member disposed for moving an empty case from said empty case discharge position into said ejection tube thereby to subsequently eject the empty case from the ejection tube.

20. In combination with the structure of claim 2 a chain link type rammer assembly, comprising a link chain, a drive means including sprocket means in engagement with said chain for imparting motion thereto, the chain being operatively driven by the rotating drive means and movable in a linear path.

21. In a turret gun assembly of the type embodying a gun tube therein, a gun housing, a gun slide on which the gun housing and gun assembly are mounted, in combination with a loading means comprising a pair of load increment transfer tray assemblies, a first one of which is mounted on one side of the gun slide for reception of a projectile, the second of said transfer tray assemblies being mounted rearwardly of said first tray and on the opposite side of the gun slide, each of said transfer tray assemblies being mounted and controlled for movement from their respective positions externally of said gun slide to a position internally thereof in aligned relationship with each other and with the bore of the gun tube whereby a powder case increment and a projectile increment when loaded into the respective transfer tray assemblies will be moved into an aligned position suitable for simultaneous ramming into the breech of the gun tube.

22. The apparatus of claim 21 further including a clamping pawl in the first or projectile transfer tray assembly for holding a projectile against forward movement in said first tray assembly, pivotally mounted cam actuated holding means on said gun slide disposed immediately rearward of said first transfer tray assembly at its external position on the slide for the prevention of rearward movement of a projectile carried thereby, cam actuating means on said second or powder case transfer tray assembly at the forward end thereof and disposed to engage and retract said holding means for a projectile in the projectile transfer tray assembly as both of the tray assemblies are moved into their respective ramming positions in the gun slide, and actuation means operatively connected to move the transfer tray assemblies between their ramming positions and a firing position external of the gun slide.

23. The apparatus of claim 22, including in combination therewith a sprocket driven chain type rammer having a buffing pad on the head end thereof and mounted for linear ramming and retraction movement longitudinally through the powder case transfer tray and the projectile transfer tray for simultaneous ramming of the powder case and projectile into the gun tube and further for retraction by reverse operation of the sprocket drive to retract through the two transfer trays to a position where the buffing pad incorporated on the head end thereof function as a buffer for the empty case upon its extraction from the gun tube, hydraulic drive means for said sprocket, and an electric control means including a pair of switch elements engageable with said rammer at predetermined stations thereon to initiate retraction of said ramming means and to stop said drive following complete retraction thereof.

24. Including in combination with the loading means structure of claim 21 an empty powder case disposed and ejection means assembly for ejecting a spent empty case from a forward portion of the gun turret, said disposal and ejection means assembly including means providing an empty case chamber, an empty case transfer tray operatively coupled with said powder case transfer tray for movement therewith to move a received empty case downwardly below the bore axis of the gun tube into said chamber wherein the empty case tray forms an upper closure portion of said chamber, a chain flight type conveyor means in said compartment, a case ejection tube mounted on the forward end of said empty case chamber means and extending therefrom to a forward external portion of the gun housing of the turret to expel an empty case increment upon movement of said conveyor means through one cycle of operation.

25. In a turret for a naval vessel of a character for usage of powder case type semi-fixed ammunition, the combination of a gun mount assembly comprising a gun slide and trunnion mounting means therefor, a gun slidably mounted in said gun slide, a housing assembly carrying said gun for longitudinal movement in said gun slide, a breechblock assembly slidably mounted in said housing, said breechblock being provided with a semi-arcuate recessed top portion disposed when the breechblock is at the open position thereof for alignment with the lowermost portion of the gun bore, means carried by said gun housing for initiating and providing movement of the breechblock from a firing position thereof to a gun loading position, a slidable breechbolt in said breechblock, breechblock actuation means mounted on said gun housing and disposed to lock the breechbolt when the breechblock is at its closed position, said last named means including an actuator disposed to provide retraction of said breechbolt on breech opening movement, empty case ejection means for effecting ejection of the fired empty case over said arcuate portion of the breechblock to the rearward portion of the gun slide upon completion of the lowering of the breechblock, actuator means for operating the empty case ejection means in response to breechblock movement, a generally tubular projectile transfer tray, a tubular powder case tray, means pivotally mounting each of said trays on the gun slide for movement from a position external to the gun slide into a mutually aligned position in axial alignment with the gun bore, said projectile transfer tray being disposed forwardly with respect to the powder case transfer tray and on the opposite side of the gun slide therefrom, a powder case transfer cradle for loading said powder transfer tray, a projectile transfer cradle assembly for loading the projectile transfer tray, trunnion means disposed about the axis of arcuate rotation of said gun slide for pivotally mounting each of said transfer cradles for movement from a pendant position to a position in alignment with a respective transfer tray therefor, a powder case hoist assembly and a projectile hoist assembly disposed mutually on opposite sides of the gun slide and disposed for loading of the respective cradles at the upper ends thereof, and empty case disposal means mounted on the gun slide assembly rearwardly of the gun breech and including an empty case tray connected to the powder case tray for movement therewith from a position axially rearward of the gun to a position therebelow and below the position of the powder case at the ramming position thereof.

26. The structure of claim 25 further characterized by guide means in each of said transfer trays disposed in mutual alignment when the trays are at the mutually aligned position, and ramming means carried by said gun slide for movement through said guide means in both of said transfer trays for ramming a projectile and powder case into the gun breech.

27. In combination with a turret gun assembly of a character using prepacked semi-fixed case ammunition, a gun, a gun slide, a gun housing mounting said gun for recoil and counter-recoil movement, rammer means including a longitudinally movable rammer head element for ramming an ammunition charge into the bore of said gun, trunnion mounting means for supporting the gun for movement in elevation, an ammunition increment handling system comprising a pair of transfer trays of generally cylindrical form having means therein for receiving and guiding the rammer head element in a linear movement therethrough, said trays being disposed on mutually opposite sides of the gun slide, said cylindrical trays being mounted rearwardly of the breech portion of the gun, and mounted on said gun slide for arcuate movement into mutual alignment and in an aligned position with the gun barrel, one of said trays being disposed immediately forward of the position of the other tray of said pair, a pair of cradle elements, each disposed to receive a load increment of ammunition and pendantly mounted on opposite sides of said trunnion mounting means for receiving an ammunition load increment from below said gun slide, means for independently moving said cradles and the increment therein upwardly through an arcuate path to a position in aligned adjacency with the respective transfer tray therefor whereby the load increment may be discharged at the load receiving position of said tray, and means for moving said trays into axial alignment with the gun bore for ramming thereof, by said rammer.

28. In a major caliber gun of a character for usage of prepacked powder case type semi-fixed ammunition, the combination of a gun, a gun housing, a gun slide, a transversely slidable breechblock assembly mounted in said gun housing, an empty case extractor disposed on said gun housing and having means extending into adjacency with the gun breech to engage and extract a case from the gun, means renderng said empty case extractor operative in response to breechblock lowering movement, loading means comprising a powder transfer tray pivotally mounted on said gun slide, and a projectile transfer tray mounted longitudinally in advance of said powder transfer tray on the opposite side of said gun, means for moving each of said trays from respective positions exteriorally of and generally parallel to said gun to positions in mutual alignment with the bore of the gun, rammer means operatively connected to said gun slide, and means for providing guided reception of the rammer by said trays for simultaneously ramming of the load increments contained in their respective transfer trays to a position in the gun breech.

29. In a shipboard gun mount assembly for usage of semi-fixed ammunition, the combination of a gun, a gun slide, a gun housing mounted in said gun slide, supporting means for said gun and gun slide for providing arcuate gun movement in elevation about a horizontal axis, said gun housing including a drop type breechblock assembly for closure of the breech end of said gun, means for effecting dropping movement of said breechblock, a pair of power operated ammunition transfer tray assemblies pivotally mounted on the gun slide for movement from mutually opposite positions outside of the slide to mutually aligned ramming positions in the slide, rammer means for contemporaneously ramming ammunition through said transfer tray assemblies into the gun breech, means actuated in response to rammer means retraction across said breechblock for initiating breechblock closure movement, a powder case hoist and a projectile hoist each disposed respectively on opposite sides of said slide, and a pair of hoist fed cradle assemblies mounted for transfer of ammunition from said hoist to respective ones of said transfer trays, said transfer trays being provided with means to guide said rammer means for linear movement therethrough.

30. In an ammunition handling system for semi-fixed ammunition increments for a major caliber gun of the type comprising a pivotally mounted gun barrel assembly, a gun mounting assembly including horizontally disposed gun slide trunnions supporting the gun for movement through a vertical arc, and a gun slide having a power operated sliding breech closing mechanism therein, the combination with said gun and slide of a handling means for said ammunition increments, comprising projectile increment loading means, a powder case increment loading means, and an empty case disposal means, said handling means comprising a powder case hoist and a projectile hoist respectively disposed at opposite sides of the gun below the gun trunnions and extending from a loading chamber thereof below the gun upto a position adjacent said gun slide, a projectile cradle and a powder case cradle disposed respectively above the projectile hoist and the powder case hoist for reception of ammunition increments from the hoist for subsequent delivery to the gun slide, each of said cradles being pivotally mounted at one end thereof for arcuate swinging movement about the axis of said trunnions, a load ejecting means in each of said cradles, each of said cradles being operatively associated with one of said hoists whereby the powder case hoist feeds into the ejecting means provided in the powder cradle and the projectile hoist likewise feeds the projectile ejecting means therefor in the projectile cradle, drive means for providing swinging movement of the cradles from a receiving position in alignment with the hoists to a discharge position substantially parallel with the gun bore at any angle of elevation of the gun and rearwardly of the gun breech, ammunition transfer means comprising a powder case transfer tray and a projectile transfer tray, means for pivotally mounting said trays on the gun slide for movement into mutual alignment with the gun bore from respective transverse positions on the gun slide in alignment with the discharge position of the respective one of said cradles therefor whereby each of said trays is disposed to receive a load discharged from the respective load ejecting means of the cradle therefor, transfer tray power drive means operatively connected to each tray in a manner whereby the trays transfer their thus received loads to a gun loading position axially rearward of the gun bore, the location of the projectile transfer tray being forward of the powder case transfer tray, ramming means disposed rearwardly of the gun and of the projectile and powder case transfer trays, driving means connected to actuate said ramming means forwardly against a powder case to ram the same through the powder case and the projectile transfer trays while simultaneously ramming the projectile in advance thereof into a gun breech receiving position in the gun, the said transfer trays being provided with rammer receptive guide means therein, said empty case disposal means comprising an empty case transfer tray, and an empty case conveyor, said empty case transfer tray being located rearwardly of the breech and operatively connected to said powder transfer tray at a position transverse thereof whereby the ejected case will be received therein when the powder transfer tray is at the firing position thereof and thereafter moved downwardly therewith to a ramming position in the said disposal means by the coupled movement of the powder case transfer tray in movement respectively from firing to ramming position thereof, the said empty case disposal means being also provided with a tube means disposed to expel empty cases ejected thereinto, therefrom forwardly of the gun mount, and suitable power operated and controlled drive means connected to operate cyclically said empty case disposal means in response to movement of the empty case from the empty case tray on to said empty case conveyor.

31. In combination with a trainable turret of the character having a rotatable enclosing assembly having different ammunitions stowage levels, said levels comprising a powder handling flat at the lowermost level and a plurality of superposed projectiles storage flats, an ammunition handling and loading system for shipboard major caliber guns of a type for usage of semi-fixed ammunition, an elevatable gun and mount, said system comprising a powder case hoist for reception of a powder case from the said powder handling flat and extending upwardly thereto to the gun, a projectile hoist extending from the lowermost projectile storage flat upwardly to the gun, said projectile hoist being also in operative communication with the uppermost projectile storage flat, projectile reception means at each projectile storage flat for projectile hoist loading therefrom, a gun loading means comprising a powder case cradle and a projectile cradle, each of said cradles being normally in communication with the uppermost end of the respective hoist therefor, said powder case hoist and cradle assembly being positioned on the opposite side of the gun from said projectile hoist and projectile cradle, said cradles being pivotally supported by said mount and pendantly disposed to be rotatable about the axis of rotation of the gun in elevation, a powder case transfer tray and a projectile transfer tray mounted for movement from a receiving position in alignment with its respective cradle at the uppermost limit of cradle travel to a mutually aligned discharge position rearward of and in alignment with the bore of the gun.

32. In a turret for a naval vessel the combination of a gun mount assembly comprising a gun, gun slide and trunnion mounting means therefor, a gun housing assembly slidably mounted in said gun slide, a breechblock transversely slideable in said gun housing assembly, the upper portion of said breechblock being provided with a semi-arcuate recessed portion positionable in alignment with the lowermost position of the gun bore whereby a projectile and powder case passing thereover will be guided into and retained in the gun bore, a powder case extracting means actuatable for movement to eject the powder case over the said breechblock recessed portion back to a rearward portion of the slide upon lowering of the breechblock, said slide also including power operated breechblock actuation means and power operated extraction-actuation means suitably connected thereto and to the said powder case extracting means for automatic gun operation, said slide being additionally provided with a pivotally mounted generally tubular projectile transfer tray, and a pivotally mounted generally tubular powder case tray, the projectile transfer tray being disposed forwardly with respect to the powder case transfer tray and on the opposite side of the slide therefrom, the movement of each of the trays about the respective pivotal axis thereof being effective to move the trays from an ammunition increment receiving position beside the gun slide to a position in alignment with the gun bore, a pair of transfer cradle assemblies comprising a projectile cradle and a powder case cradle each pivotally mounted to said trunnion mounted means for movement from a pendantly disposed load increment receiving position to an angularly elevated load increment ejecting position in alignment with the load receiving position of the respective transfer tray therefor, a pair of hoist assemblies, one each for the projectile cradle and the powder case cradle and connected thereto at their upper ends to discharge load increments therefrom into the respective cradle assembly, an empty case disposal means mounted on the gun slide assembly rearwardly of the gun breech and including an empty case tray connected to the powder case tray for movement therewith from a position axially rearward of the gun breech to a position therebelow and below the position of the powder case at the ramming position thereof, said disposal means including means for providing an empty case receiving chamber having a chainflight conveyor therein, power drive means operatively connected to said conveyor to move an empty case received therein forwardly therefrom, and an empty case tube mounted on the forward end of said disposal means chamber and extending forwardly beneath the gun in a generally parallel arrangement therewith whereby an empty case may be ejected therefrom.

References Cited in the file of this patent

UNITED STATES PATENTS

| | | |
|---|---|---|
| 718,719 | Meigs et al. | Jan. 20, 1903 |
| 1,022,469 | Dawson et al. | Apr. 9, 1912 |
| 1,188,631 | Dawson et al. | June 27, 1916 |
| 1,371,738 | Dawson et al. | Mar. 15, 1921 |
| 1,402,401 | Dawson et al. | Jan. 3, 1922 |
| 2,004,856 | Daum | June 11, 1935 |
| 2,062,212 | Daum | Nov. 24, 1936 |
| 2,261,194 | Vickers | Nov. 4, 1941 |
| 2,346,877 | Trofimov | Apr. 18, 1944 |
| 2,439,142 | Molins et al. | Apr. 6, 1948 |
| 2,442,842 | Cole et al. | June 8, 1948 |
| 2,451,764 | Molins et al. | Oct. 19, 1948 |
| 2,456,620 | Chadwick et al. | Dec. 21, 1948 |
| 2,592,790 | Brereton | Apr. 15, 1952 |
| 2,655,079 | Aldrin et al. | Oct. 13, 1953 |

FOREIGN PATENTS

| | | |
|---|---|---|
| 368,631 | Italy | Feb. 21, 1939 |